US008750083B2

(12) United States Patent
Sato et al.

(10) Patent No.: US 8,750,083 B2
(45) Date of Patent: *Jun. 10, 2014

(54) OPTICAL PICKUP APPARATUS AND DISC APPARATUS INCLUDING THE SAME

(75) Inventors: Minoru Sato, Ota (JP); Kiyotaka Eizumi, Guangdong (CN); Shuichi Ichiura, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,624

(22) Filed: Apr. 27, 2011

(65) Prior Publication Data
US 2012/0182850 A1 Jul. 19, 2012

Related U.S. Application Data

(63) Continuation of application No. PCT/JP2009/068621, filed on Oct. 29, 2009.

(30) Foreign Application Priority Data

Oct. 30, 2008 (JP) .................................. 2008-280164
Feb. 18, 2009 (JP) .................................. 2009-034805
Aug. 6, 2009 (JP) .................................. 2009-183202

(51) Int. Cl.
*G11B 7/1353* (2012.01)
*G11B 7/12* (2012.01)

(52) U.S. Cl.
USPC .................. 369/44.37; 369/44.12; 369/44.41; 369/112.03; 369/112.05

(58) Field of Classification Search
USPC ................. 369/44.37, 44.12, 44.41, 112.203, 369/112.05
See application file for complete search history.

(56) References Cited

U.S. PATENT DOCUMENTS 8,000,188 B2 * 8/2011 Sato .......................... 369/44.37
2002/0031062 A1 3/2002 Izumi et al.
(Continued)

FOREIGN PATENT DOCUMENTS

JP 2001-222825 8/2001
JP 2006-004499 1/2006
(Continued)

OTHER PUBLICATIONS

Japan Patent Office, International Search Report for Application No. PCT/JP2009/068621 Mail Date Nov. 24, 2009.

(Continued)

*Primary Examiner* — Wayne Young
*Assistant Examiner* — Dionne Pendleton
(74) *Attorney, Agent, or Firm* — SoCal IP Law Group LLP; Steven C. Sereboff; John E. Gunther

(57) ABSTRACT

An optical pickup apparatus includes at least: a light emitting element capable of emitting at least first wavelength light and second wavelength light; and a diffraction grating configured to split the first wavelength light into at least a first main beam and a first sub-beam and to split the second wavelength light into at least a second main beam and a second sub-beam, a following expression (1) being satisfied:

$$1.05 < \frac{Yp1}{Yp2} < 2.50 \quad (1)$$

where: Yp1 is an interval between the first main beam and the first sub-beam when a first media corresponding to the first wavelength light is irradiated with the first main beam and the first sub-beam, and Yp2 is an interval between the second main beam and the second sub-beam when a second media corresponding to the second wavelength light is irradiated with the second main beam and the second sub-beam.

13 Claims, 30 Drawing Sheets

(56) References Cited

U.S. PATENT DOCUMENTS

| | | |
|---|---|---|
| 2003/0072228 A1 | 4/2003 | Izumi et al. |
| 2003/0080274 A1 | 5/2003 | Izumi et al. |
| 2005/0018561 A1* | 1/2005 | Miyake ............... 369/44.41 |
| 2006/0007838 A1* | 1/2006 | Nakata et al. ......... 369/112.12 |
| 2006/0193053 A1 | 8/2006 | Shibuya et al. |
| 2007/0133374 A1 | 6/2007 | Arai |
| 2007/0274367 A1 | 11/2007 | Nishimoto et al. |
| 2008/0198730 A1* | 8/2008 | Mori et al. ............ 369/112.23 |
| 2009/0022032 A1 | 1/2009 | Kawasaki et al. |

FOREIGN PATENT DOCUMENTS

| | | |
|---|---|---|
| JP | 2008-192199 | 8/2006 |
| JP | 2007-122779 | 5/2007 |
| JP | 2007-149249 | 6/2007 |
| JP | 2007-164962 | 6/2007 |
| JP | 2008-176899 | 7/2008 |
| WO | WO 2010-050571 | 5/2010 |

OTHER PUBLICATIONS

Taiwan Intellectual Property Office, Notification of Office Action for Application No. 098132317, Mail Date Jan. 6, 2014.

* cited by examiner

OPTICAL PICKUP APPARATUS AND DISC APPARATUS INCLUDING THE SAME

CROSS-REFERENCE TO RELATED APPLICATIONS

This is a continuation application of International Patent Application No. PCT/JP2009/68621 filed Oct. 29, 2009, which claims the benefit of priority to Japanese Patent Application Nos. 2008-280164, 2009-34805, and 2009-183202, filed Oct. 30, 2008, Feb. 18, 2009, and Aug. 6, 2009, respectively. The full contents of the International Patent Application are incorporated herein by reference.

BACKGROUND OF THE INVENTION

1. Field of the Invention

The present invention relates to an optical pickup apparatus and a disc apparatus including the same.

2. Description of the Related Art

An optical disc is inserted into an optical disc device (not shown) provided with an optical pickup apparatus. The optical disc to be inserted into the optical disc device, not shown, is formed in a substantially disc shape.

The discs include data read-only optical discs such as "CD-ROM", "DVD-ROM", "HD DVDROM" and "BD-ROM", data recordable optical discs such as "CD-R", "DVD-R", "DVD+R", "HD DVD-R" and "BD-R", data writable/erasable and data rewritable-type optical discs such as "CD-RW", "DVD-RW", "DVD+RW", "DVDRAM", "HD DVD-RW", "HD DVD-RAM" and "BDRE", and the like.

Explaining about the optical discs, "CD" is an abbreviation for "Compact Disc" (trademark). "DVD" (registered trademark) is an abbreviation for "Digital Versatile Disc". "HD DVD" (registered trademark) is an abbreviation for "High Definition DVD". "Blu-ray" as used in "Blu-ray Disc" (registered trademark) refers to a blue-violet laser beam adopted to realize a higher density recording than a red laser beam. "HD DVD" is compatible with the DVDs and also has a larger storage capacity than those of the DVD discs. For the CDs, an infrared laser beam is used. For the DVDs, a red laser beam is used. Whereas, when reading out data/information/signal stored on optical discs such as the "Blu-ray Disc" or "HD DVD" or when writing data/information/signal on optical discs such as "Blu-ray Disc" or "HD DVD", a blue-violet laser beam is used.

"ROM" as used in "CD-ROM", "DVD-ROM" and "HD DVD-ROM" is an abbreviation for "Read Only Memory". "BD-ROM" is an abbreviation for "Blu-ray Disc-ROM". "CD-ROM", "DVD-ROM", "HD DVD-ROM" and "BD-ROM" are those of a data/information read-only type. "R" as used in "CD-R", "DVD-R", "DVD+R", and "HD DVD-R" is an abbreviation for "Recordable". "BD-R" is an abbreviation for "Blu-ray Disc-R". "CD-R", "DVD-R", "DVD+R", "HD DVD-R" and "BD-R" are those of a data/information writable type. "RW" as used in "CD-RW", "DVD-RW", "DVD+RW" and "HD DVD-RW" is an abbreviation of "Re-Writable". "BD-RE" is an abbreviation of "Blu-ray Disc-RE". "CD-RW", "DVD-RW", "DVD+RW", "HD DVD-RW" and "BD-RE" are those of a data/information rewritable type. "RAM" as used in "DVD-RAM" and "HD DVD-RAM" is an abbreviation of "Random Access Memory". "DVD-RAM" and "HD DVD-RAM" are data/information readable/writable/erasable.

An optical disc on which data/information/signal can be recorded in an optical disc device includes a signal layer serving as a signal recording surface of the optical disc and being provided with a groove (not shown) in which the data/information/signal is to be stored. The groove means an elongated recess, for example. When a disc-shaped optical disc is seen in a plan view, the groove is formed in a substantially helical shape. If the optical disc is seen from a signal layer side which, when the optical disc is irradiated with a laser beam, is a side irradiated with the laser beam, the groove is spiral. Since the groove is extremely small, the groove cannot be visually recognized.

The optical pickup apparatus is provided with an optical system that detects error signals such as a focus error signal and a tracking error signal so as to appropriately form a light collection spot to a predetermined recording track on the optical disc by controlling the position of an objective lens.

A focus means a focal point, for example. "Focusing" means to focus on a point or to bring into focus. "Tracking" means to track and observe, for example, using light, a signal layer of an optical disc or a very small pit (hole, dent), a groove, a wobble and the like provided in the signal layer of the optical disc and to determine a position of a track drawn in a substantially spiral shape. "Pit" means a hole or a recess, for example. "Wobble" means wobbling of a track in which a data signal such as information is recorded, for example.

Methods of detecting focusing of a light collection spot on an optical disc in an optical pickup apparatus include a detecting method based on, for example, a differential astigmatism method. The differential astigmatism method is a method of detecting displacement of a light collection spot by detecting a point-image distortion formed by an optical system with astigmatism, for example. Further, methods of detecting tracking of a light collection spot on an optical disc in an optical pickup apparatus include a detecting method based on, for example, a differential push-pull method. The differential push-pull method is, for example, a method of detecting displacement of a light collection spot by means of a main beam for data reading/writing and two sub-beams for detecting a correction signal of deviation.

Describing the method of detecting a tracking error signal, in a case where a tracking error signal is detected by an optical pickup apparatus for an optical disc conforming to the CD standard (CD-ROM, CDR, CD-RW and the like) having a track pitch of 1.6 μm (micron/micrometer), for example, a "three-beam method (or also referred to as a three-spot method) in which three light fluxes are used is mainly adopted as a method of detecting a tracking error signal. Also, if a tracking error signal is to be detected by an optical pickup apparatus for an optical disc conforming to the DVD standard (DVD-ROM, DVD-R, DVD-RW and the like) having a track pitch of 0.74 μm, for example, an "inline method" in which at least three light fluxes are used, for example, is mainly used as a method of detecting a tracking error signal. The name of each of the methods of detecting a tracking error signal as used here is a name provided for the sake of convenience.

A track pitch of a DVD-RAM of Version 1 having a land/groove structure is approximately 0.74 μm, for example, while a track pitch of a DVD-RAM of Version 2.0 and Version 2.1 having a land/groove structure is approximately 0.615 μm. Also, for example, a track pitch of the DVD-ROM, DVD-R, DVD-RW and the like having a structure different from the land/groove structure is approximately 0.74 μm, while the track pitch of the DVDRAM of Version 2.0 and Version 2.1 having a land/groove structure is approximately 0.615 μm. As described above, the track pitch is different for the DVD-RAM of Version 1 that has a land/groove structure, the DVD-ROM, the DVD-R, the DVD-RW and the like that have a structure different from the land/groove structure, and the DVD-RAM of Version 2.0 and Version 2.1 that has the land/groove structure.

First, the "three-beam method" mainly adopted in detection of an error signal in the CD standard will be described. In an optical pickup apparatus, as shown in FIG. 26, a diffraction grating 320 for CD is arranged on an optical path between a semiconductor laser element 210 and a polarization beam splitter 230. The diffraction grating 320 for CD has a linear grating groove formed at an equal interval in a constant cycle and has a function of diffracting and branching a laser beam emitted from the semiconductor laser element 210 into at least three beams, that is, a main beam (0th-order light) and two sub-beams (±1st-order diffraction light flux).

These three beams pass through the polarization beam splitter 230, a collimating lens 240, and an objective lens 250 and then, as shown in the left side in FIG. 27, on a signal layer Da of an optical disc D, a main spot 100 corresponding to the main beam and sub-spots 101 and 102 corresponding to the two sub-beams, respectively, are formed. On the signal layer Da of the optical disc D, tracks D100 for recording the signal are provided periodically, and an interval δ between the main spot 100 and the sub-spots 101 and 102 in a disc radial direction is adjusted to match approximately ½ of a cycle Dtp of the track D100 by a means that rotationally adjusts the diffraction grating 320 for CD about the optical axis. Reflection light from the main spot 100 and the sub-spots 101 and 102 reaches the objective lens 250, the collimator lens 240, and the polarization beam splitter 230 again and a part of the light amount passes through the polarization beam splitter 230 and then, enters a photodetector 270 via a detection lens 260.

In the photodetector 270, as shown in the right in FIG. 27, light receiving surfaces 200a, 200b, and 200c corresponding to reflection lights of the main spot 100 and the sub-spots 101 and 102, respectively, are arranged. When the reflection lights of the main spot 100 and the sub-spots 101 and 102 are incident on the light receiving surfaces 200a, 200b, and 200c, respectively, a main-detection-light spot 200 corresponding to the main spot 100 and sub-detection-light spots 201 and 202 corresponding to the sub-spots 101 and 102 are formed, respectively.

Here, in a case where the main spot 100 is accurately scanning the track D100, the light amounts of the sub-detection-light spots 201 and 202 are the same. However, in a case where the scanning of the main spot 100 is deviated from the track D100, there will be a difference in the light amounts between the sub-detection-light spots 201 and 202. Then, by performing a subtraction process or the like on the light amounts of the sub-detection-light spots 201 and 202 using a subtractor 400 and the like, for example, a tracking error signal indicating scanning deviation in tracking is generated.

Next, the "inline type" mainly adopted for detection of an error signal in the DVD standard will be described. The inline-type optical system can basically detect a tracking error signal based on substantially the same optical system as the three-beam method. However, the inline type is different from the three-beam type optical system in that, as shown in the left in FIG. 29, a diffraction grating 340 for DVD in which the phase of a periodic structure of a grating groove formed in one half plane 341 is deviated by approximately 180 degrees from the phase of the periodic structure of the grating groove formed in the other half plane 342 is used.

Here, it is assumed that the diffraction grating 340 for DVD is provided at substantially the same position as that of the diffraction grating 320 for CD shown in FIG. 26 and is replaced with the diffraction grating 320 for CD. Also, in order to support to the inline method, it is assumed that arrangement positions of the diffraction grating 340 for DVD, the light collection optical system and the like are adjusted in such a manner that the main spot 100 and the sub-spots 101 and 102 formed on the signal layer Da of the optical disc D is formed on the same track D100 as shown in the left in FIG. 28.

When the light receiving surface 200a of the photodetector 270 is irradiated with the main beam for DVD that forms the main-detection-light spot 200, a subtractor 500a connected to the light receiving surface 200a calculates a difference in an output signal from the light receiving surface 200a and generates a main-push-pull signal Sa, for example.

When the light receiving surface 200b of the photodetector 270 is irradiated with a first sub-beam for DVD forming the sub-detection-light spot 201, a subtractor 500b connected to the light receiving surface 200b calculates a difference in an output signal from the light receiving surface 200b and generates a preceding sub-push-pull signal Sb, for example.

When the light receiving surface 200c of the photodetector 270 is irradiated with a second sub-beam for DVD forming the sub-detection-light spot 202, a subtractor 500c connected to the light receiving surface 200c calculates a difference in an output signal from the light receiving surface 200c and generates a lagging sub-push-pull signal Sc, for example.

As shown on the right in FIG. 28, the push-pull signal Sa detected from the main-detection-light spot 200 and the push-pull signals Sb and Sc detected from the sub-detection-light spots 201 and 202 corresponding to each of the sub-spots 101 and 102 are outputted in opposite phases to each other similarly to the three-beam method. After that, the push-pull signals Sb and Sc are added by an adder 510, and the added signal is subjected to a subtraction process by the subtractor 530 with respect to the push-pull signal Sa, whereby a tracking error signal in which respective offset components of the push-pull signals Sa, Sb and Sc are canceled out can be generated.

Recently, optical pickup apparatuses capable of recording and reproducing optical discs conforming to the CD standard as well as optical discs conforming to the DVD standard are being proposed. In such optical pickup apparatuses, in order to reduce costs through simplification of an optical system, a multi-laser unit is used that is equipped with a semiconductor laser element for CD that emits a first laser beam having a first wavelength of an infrared wavelength band 765 to 805 nm (nanometers) suitable for the CD standard and a semiconductor laser element for DVD that emits a second laser beam having a second wavelength of a red wavelength band of 645 to 675 nm suitable for the DVD standard.

Also, in such an optical pickup apparatus, in order to achieve further simplification of the optical system, a two-wavelength diffraction grating that supports both the three-beam type CD standard and the inline-type DVD standard is used (See patent Document 1 shown below, for example). For example, as shown in FIG. 29, a two-wavelength diffraction grating 300A is configured in such a manner that, with respect to two planes opposing in the thickness direction of an optical glass plate 360, the diffraction grating 320 for CD is fixed to one of the planes and the diffraction grating 340 for DVD is fixed to the other plane.

Other than the structure of the two-wavelength diffraction grating 300A shown in FIG. 29, a two-wavelength diffraction grating 300B of a structure as shown in FIG. 30, for example, is proposed (See Japanese Patent Laid-Open No. 2007-164962 (page 1, FIGS. 1 to 8), Japanese Patent Laid-Open No. 2007-149249 (page 1, FIGS. 1 to 7), for example). The two-wavelength diffraction grating 300B is configured in such a manner that the diffraction grating 320 for CD containing a liquid crystal material and the like is stacked on and fixed to the diffraction grating 340 for DVD and then, they are sandwiched and fixed between two optical glass plates 361 and 362, for example.

However, if the two-wavelength diffraction grating 300A or 300B in which the diffraction grating 320 for CD and the diffraction grating 340 for DVD as above are combined is used, when the first laser beam of the CD standard is made to be incident on the diffraction grating 320 for CD, for example, the first laser beam is diffracted by the diffraction grating 320 for CD and branched into three beams, that is, a main beam (0th-order light) and two sub-beams (±1st-order diffraction light fluxes). And the three beams are further diffracted and branched with the diffraction grating 340 for DVD.

As described above, the first laser beam or the second laser beam emitted from the multi-laser unit passes through both the diffraction grating 320 for CD and the diffraction grating 340 for DVD of the two-wavelength diffraction gratings 300A or 300B, and as a result, unnecessary diffracted light is generated since diffraction and branching are performed in the diffraction gratings 320 and 340 for CD and for DVD, respectively. As a result, there is a drawback that a detection accuracy of an error signal such as a tracking error signal is reduced.

Also, due to the generation of unnecessary diffracted light, transmittances of the 0th-order light and the ±1st-order diffraction light in the diffraction gratings 320 and 340 are lowered, and as a result, there is also a drawback that use efficiency of outgoing light emitted from the multi-laser unit is lowered.

Also, in order to be compatible with a plurality of types of optical discs D with different track pitches Dtp such as DVD-ROM, DVD-R, DVD-RW, DVD-RAM (Version 1, 2.0, 2.1) and the like without a malfunction, there is a market need for elaborate optical pickup apparatuses capable of providing easy control such as tracking control and the like and optical disc devices provided with the elaborate optical pickup apparatuses capable of providing easy control of tracking control and the like.

For example, there is a market need for an optical pickup apparatus in which an amplitude of an error signal such as a tracking error signal and the like due to displacement of the objective lens 250 is not decrease during data recording/reproducing of a plurality of types of optical discs D with different track pitches Dtp and an optical pickup apparatus in which offset does not remain in the error signal such as a tracking error signal and the like.

Further, there is a need for an inexpensive optical pickup apparatus and an inexpensive optical disc device which obviate the above drawbacks.

SUMMARY OF THE INVENTION

An optical pickup apparatus according to an aspect of the present invention, at least includes: a light emitting element capable of emitting at least first wavelength light and second wavelength light; and a diffraction grating configured to split the first wavelength light into at least a first main beam and a first sub-beam and to split the second wavelength light into at least a second main beam and a second sub-beam, a following expression (1) being satisfied:

$$1.05 < \frac{Yp1}{Yp2} < 2.50 \quad (1)$$

where: Yp1 is an interval between the first main beam and the first sub-beam when a first media corresponding to the first wavelength light is irradiated with the first main beam and the first sub-beam, and Yp2 is an interval between the second main beam and the second sub-beam when a second media corresponding to the second wavelength light is irradiated with the second main beam and the second sub-beam.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
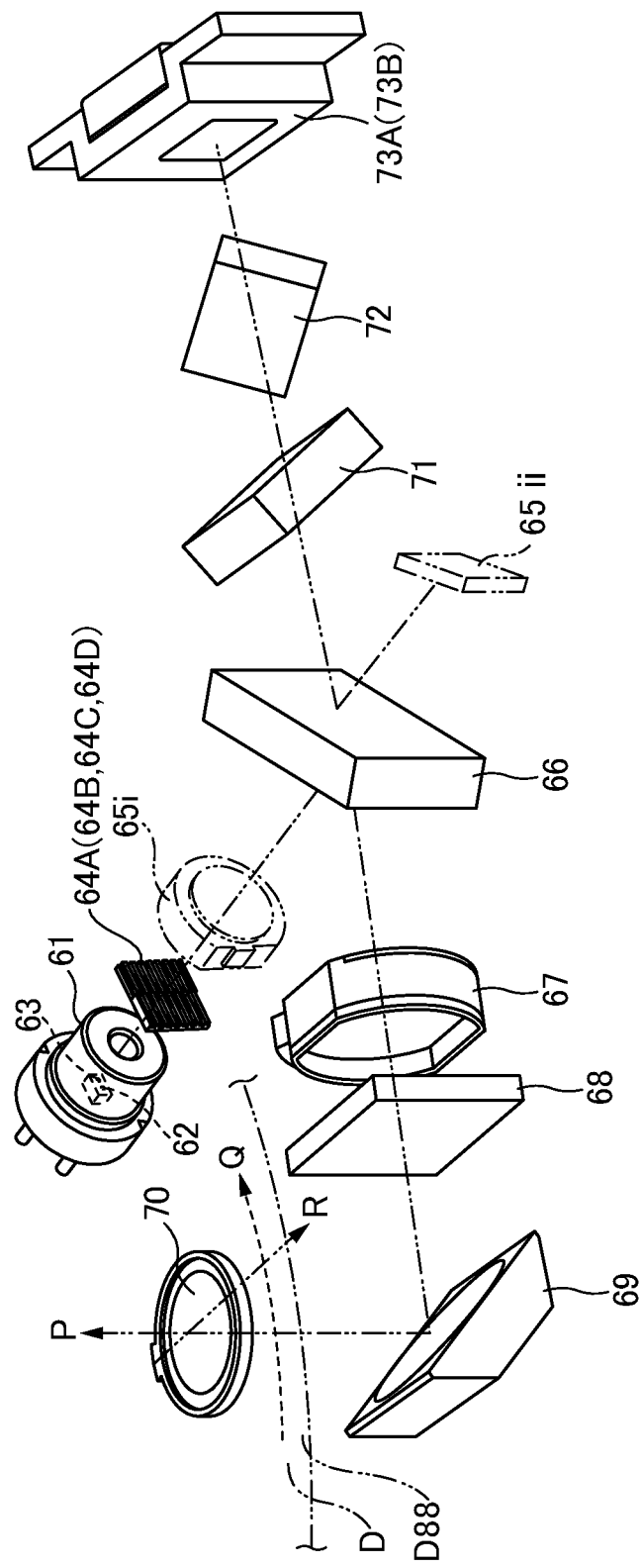
FIG. 1 is an optical layout diagram of an optical pickup apparatus according to an embodiment of the present invention.

At least the following details will become apparent from descriptions of this specification and of the accompanying drawings.

An optical pickup apparatus according to an embodiment of the present invention includes at least: a light emitting element capable of emitting at least first wavelength light and second wavelength light; and a diffraction grating configured to split the first wavelength light into at least a first main beam and a first sub-beam and to split the second wavelength light into at least a second main beam and a second sub-beam, a following expression (1) being satisfied:

$$1.05 < \frac{Yp1}{Yp2} < 2.50 \qquad (1)$$

where: Yp1 is an interval between the first main beam and the first sub-beam when a first media corresponding to the first wavelength light is irradiated with the first main beam and the first sub-beam, and Yp2 is an interval between the second main beam and the second sub-beam when a second media corresponding to the second wavelength light is irradiated with the second main beam and the second sub-beam.

With the configuration described above, an optical pickup apparatus is provided which reliably supports the first wavelength light and the second wavelength light and has an improved detection accuracy of an error signal. When the first wavelength light emitted from the light emitting element is split into at least the first main beam and the first sub-beam by the diffraction grating and the first media is irradiated with the first main beam and the first sub-beam, the first media is irradiated with the first main beam and the first sub-beam accurately. Also, when the second wavelength light emitted from the light emitting element is split into at least the second main beam and the second sub-beam by the diffraction grating and the second media is irradiated with the second main beam and the second sub-beam, the second media is irradiated with the second main beam and the second sub-beam accurately.

An optical pickup apparatus according to an embodiment of the present invention includes at least: a light emitting element capable of emitting at least first wavelength light and second wavelength light; and a diffraction grating configured to split the first wavelength light into at least a first main beam and a first sub-beam and to split the second wavelength light into at least a second main beam and a second sub-beam, following expressions (2) and (3) being satisfied:

$$0.90 < A1 < 0.94 \qquad (2),$$

and $$0.87 < A2 < 0.91 \qquad (3),$$

where: A1 is a light efficiency ratio of light intensity of the first main beam to a total sum of the light intensity of the first main beam and light intensity of the first sub-beam when a first media corresponding to the first wavelength light is irradiated with the first main beam and the first sub-beam irradiated on, and A2 is a light efficiency ratio of light intensity of the second main beam to a total sum of the light intensity of the second main beam and light intensity of the second sub-beam when a second media corresponding to the second wavelength light is irradiated with the second main beam and the second sub-beam.

With the configuration described above, an optical pickup apparatus is provided which reliably supports the first wavelength light and the second wavelength light and has an improved detection accuracy of an error signal. When the first wavelength light emitted from the light emitting element is split into at least the first main beam and the first sub-beam by the diffraction grating and the first media is irradiated with the first main beam and the first sub-beam, the first media is irradiated with the first main beam and the first sub-beam reliably. Also, when the second wavelength light emitted from the light emitting element is split into at least the second main beam and the second sub-beam by the diffraction grating and the second media is irradiated with the second main beam and the second sub-beam, the second media is irradiated with the second main beam and the second sub-beam reliably.

An optical pickup apparatus according to an embodiment of the present invention includes at least: a light emitting element capable of emitting at least first wavelength light and second wavelength light; and a diffraction grating corresponding to the second wavelength light, a light collection position of the first wavelength light on a first media corresponding to the first wavelength light being different from a light collection position of the second wavelength light on a second media corresponding to the second wavelength light in accordance with a light emitting position of the first wavelength light and a light emitting position of the second wavelength light in the light emitting element being different from each other.

The optical pickup apparatus in which the first wavelength light is reliably collected onto the first media and the second wavelength light is reliably collected onto the second media is configured as above.

In an optical pickup apparatus according to an embodiment of the present invention, the light collection position of the second wavelength light on the second media in a substantially disc shape is located on a further inner peripheral side of the media in a substantially disc shape than the light collection position of the first wavelength light on the first media in a substantially disc shape is located.

The optical pickup apparatus in which the first wavelength light is reliably collected onto the first media and the second wavelength light is reliably collected onto the second media is configured as above.

An optical pickup apparatus according to an embodiment of the present invention includes at least: a diffraction grating configured to split first wavelength light into at least a first main beam and a first sub-beam, and to split second wavelength light into at least a second main beam and a second sub-beam, the diffraction grating including a diffraction surface portion corresponding to the second wavelength light; and a photodetector including a first main light-receiving portion configured to be irradiated with the first main beam, a first sub-light-receiving portion configured to be irradiated with the first sub-beam, a second main light-receiving portion configured to be irradiated with the second main beam, and a second sub-light-receiving portion configured to be irradiated with the second sub-beam, a distance between the first main light-receiving portion and the first sub-light-receiving portion being changed relative to a standardized distance between the first main light-receiving portion and the first sub-light-receiving portion.

With the configuration described above, an optical pickup apparatus is provided in which generation of unnecessary light is suppressed. With the diffraction grating having the diffraction surface portion corresponding to the second wavelength light being equipped in the optical pickup apparatus and, when the first wavelength light passes through the diffraction surface portion of the diffraction grating corresponding to the second wavelength light, with the first wavelength light being split into at least the first main beam and the first sub-beam, it is possible to substantially prevent unnecessary light from being generated when the first wavelength light passes through the diffraction grating. Also, when the second wavelength light passes through the diffraction surface portion of the diffraction grating corresponding to the second wavelength light, the second wavelength light is split into at least the second main beam and the second sub-beam without substantially generating unnecessary light. Also, in this photodetector, since a distance between the first main-light-receiving portion and the first sub-light-receiving portion is changed with respect to the distance between the standardized distance between the first main-light-receiving portion and the first sub-light-receiving portion, it is possible to avoid an occurrence of nonconformity in which, when the first wavelength light passes through the diffraction surface portion of the diffraction grating corresponding to the second wavelength light, the first sub-light-receiving portion of the photodetector is not irradiated with the first sub-beam of the first wavelength light split by the diffraction surface portion of the diffraction grating corresponding to the second wavelength light. The "standardization" as used in the present invention is used for the sake of convenience in describing, for example, those that have been widely spread. The first sub-light-receiving portion whose distance is changed with respect to the first main-light-receiving portion of the photodetector is irradiated with the first sub-beam of the first wavelength light that is split without substantially generating unnecessary light when the first wavelength light passes through the diffraction surface portion of the diffraction grating corresponding to the second wavelength light. The first main-light-receiving portion of the photodetector is irradiated with the first main beam of the first wavelength light that is split without substantially generating unnecessary light when the first wavelength light passes through the diffraction surface portion of the diffraction grating corresponding to the second wavelength light. The second sub-light-receiving portion of the photodetector is irradiated with the second sub-beam of the second wavelength light that is split without substantially generating unnecessary light when the second wavelength light passes through the diffraction surface portion of the diffraction grating corresponding to the second wavelength light. The second main-light-receiving portion of the photodetector is irradiated with the second main beam of the second wavelength light that is split without substantially generating unnecessary light when the second wavelength light passes through the diffraction surface portion of the diffraction grating corresponding to the second wavelength light.

In an optical pickup apparatus according to an embodiment of the present invention, a changed distance between the first main light-receiving portion and the first sub-light-receiving portion is set longer than the standardized distance between the first main light-receiving portion and the first sub-light-receiving portion.

With the configuration described above, an optical pickup apparatus with improved signal detection accuracy is provided. It becomes easier to avoid an adverse effect of the first main beam, generated by being split from the first wavelength light with the diffraction surface portion of the diffraction grating, on the first sub-light-receiving portion of the photodetector. Also, it becomes easier to avoid an adverse effect of the first sub-beam, generated by being split from the first wavelength light by the diffraction surface portion of the diffraction grating, on the first main-light-receiving portion of the photodetector. For example, if the changed distance between the first main-light-receiving portion and the first sub-light-receiving portion is set shorter than the standardized distance between the first main-light-receiving portion and the first sub-light-receiving portion, there is concern that the first main beam may cause interference on the first sub-light-receiving portion of the photodetector. Also, for example, if the changed distance between the first main-light-receiving portion and the first sub-light-receiving portion is set shorter than the standardized distance between the first main-light-receiving portion and the first sub-light-receiving portion, there is concern that the first sub-beam may cause interference on the first main-light-receiving portion of the photodetector. However, since the changed distance between the first main-light-receiving portion and the first sub-light-receiving portion is set longer than the standardized distance between the first main-light-receiving portion and the first sub-light-receiving portion, when the first main-light-receiving portion of the photodetector is irradiated with the first main beam, it becomes easier to avoid an interference of the first main beam on the first sub-light-receiving portion. Also, since the changed distance between the first main-light-receiving portion and the first sub-light-receiving portion is set longer than the standardized distance between the first main-light-receiving portion and the first sub-light-receiving portion, when the first sub-light-receiving portion of the photodetector is irradiated with the first sub-beam, it is easier to avoid interference of the first sub-beam on the first main-light-receiving portion.

In an optical pickup apparatus according to an embodiment of the present invention, when a value of the standardized distance between the first main light-receiving portion and the first sub-light-receiving portion is defined as a value of 100%, a value of the changed distance between the first main light-receiving portion and the first sub-light-receiving portion is set at a value of substantially 111% of the value of the distance between the first main light-receiving portion and the first sub-light-receiving portion.

With the configuration described above, an optical pickup apparatus with improved signal detection accuracy is provided. It is possible to avoid an adverse effect of the first main beam, generated by being split from the first wavelength light by the diffraction surface portion of the diffraction grating, on the first sub-light-receiving portion of the photodetector. Also, it is possible to avoid an adverse effect of the first sub-beam, generated by being split from the first wavelength light by the diffraction surface portion of the diffraction grating, on the first main-light-receiving portion of the photodetector. For example, if the changed distance between the first main-light-receiving portion and the first sub-light-receiving portion is set shorter than the standardized distance between the first main-light-receiving portion and the first sub-light-receiving portion, there is concern that the first main beam may cause interference on the first sub-light-receiving portion of the photodetector. Also, for example, if the changed distance between the first main-light-receiving portion and the first sub-light-receiving portion is set shorter than the standardized distance between the first main-light-receiving portion and the first sub-light-receiving portion, there is concern that the first sub-beam may cause interference on the first main-light-receiving portion of the photodetector. However, since, with a value of the standardized distance between the first main-light-receiving portion and the first sub-light-receiving portion being defined as a value of 100%, the value of the changed distance between the first main-light-receiving portion and the first sub-light-receiving portion is set at a value of approximately 111% of the value of the standardized distance between the first main-light-receiving portion and the first sub-light-receiving portion, it is possible to avoid an interference by the first main beam on the first sub-light-receiving portion when the first main beam is irradiated on the first main-light-receiving portion of the photodetector. Also, since, with the value of the standardized distance between the first main-light-receiving portion and the first sub-light-receiving portion being defined as a value of 100%, the value of the changed distance between the first main-light-receiving portion and the first sub-light-receiving portion is set at a value of approximately 111% of the value of the standardized distance between the first main-light-receiving portion and the first sub-light-receiving portion, it is possible to avoid an interference by the first sub-beam on the first main-light-receiving portion when the first sub-light-receiving portion of the photodetector is irradiated with the first sub-beam.

In an optical pickup apparatus according to an embodiment of the present invention, when a value of a standardized distance between the second main light-receiving portion and the second sub-light-receiving portion is defined as a value of 100%, a value of a distance between the second main light-receiving portion and the second sub-light-receiving portion is set at a value of substantially 100% of the value of the standardized distance between the second main light-receiving portion and the second sub-light-receiving portion.

With the configuration described above, an optical pickup apparatus with improved signal detection accuracy is provided. It is possible to avoid an adverse effect of the second main beam, generated by being split from the second wavelength light with the diffraction surface portion of the diffraction grating, on the second sub-light-receiving portion of the photodetector. Also, it is possible to avoid an adverse effect of the second sub-beam, generated by being split from the second wavelength light with the diffraction surface portion of the diffraction grating, on the second main-light-receiving portion of the photodetector. For example, if a distance between the second main-light-receiving portion and the second sub-light-receiving portion is set shorter than the standardized distance between the second main-light-receiving portion and the second sub-light-receiving portion, there is concern that the second main beam may cause interference on the second sub-light-receiving portion of the photodetector. Also, for example, if the distance between the second main-light-receiving portion and the second sub-light-receiving portion is set shorter than the standardized distance between the second main-light-receiving portion and the second sub-light-receiving portion, there is concern that the second sub-beam may cause interference on the second main-light-receiving portion of the photodetector. However, since, with the standardized distance between the second main-light-receiving portion and the second sub-light-receiving portion being defined as a value of 100%, the value of the distance between the second main-light-receiving portion and the second sub-light-receiving portion is set at a value of approximately 100% of the value of the standardized distance between the second main-light-receiving portion and the second sub-light-receiving portion, it is possible to avoid an interference of the second main beam on the second sub-light-receiving portion when second main-light-receiving portion of the photodetector is irradiated with the second main beam. Also, since, with the standardized distance between the second main-light-receiving portion and the second sub-light-receiving portion being defined as a value of 100%, the value of the distance between the second main-light-receiving portion and the second sub-light-receiving portion is set at a value of approximately 100% of the value of the standardized distance between the second main-light-receiving portion and the second sub-light-receiving portion, it is possible to avoid an interference of the second sub-beam on the second main-light-receiving portion when the second sub-light-receiving portion of the photodetector is irradiated with the second sub-beam.

An optical pickup apparatus according to an embodiment of the present invention includes at least: a diffraction grating configured to split first wavelength light into at least a first main beam and a first sub-beam, and to split second wavelength light into at least a second main beam and a second sub-beam, the diffraction grating including a diffraction surface portion corresponding to the second wavelength light; and a photodetector including a first main light-receiving portion configured to be irradiated with the first main beam, a first sub-light-receiving portion configured to be irradiated with the first sub-beam, a second main light-receiving portion configured to be irradiated with the second main beam, and a second sub-light-receiving portion configured to be irradiated with the second sub-beam, alight splitting ratio among the first sub-light-receiving portion on a front side, the first main light-receiving portion at a center, and the first sub-light-receiving portion on a rear side being changed relative to a standardized light splitting ratio among the first sub-light-receiving portion on a front side, the first main light-receiving portion at a center, and the first sub-light-receiving portion on a rear side, when the repositioned first sub-light-receiving portions are disposed in a pairwise manner across the first main light-receiving portion positioned as a center, and the first sub-light-receiving portion on the front side, the first main light-receiving portion at the center, and the first sub-light-receiving portion on the rear side are arranged in a row.

With the configuration described above, an optical pickup apparatus is provided in which generation of unnecessary light is suppressed. With the diffraction grating having the diffraction surface portion corresponding to the second wavelength light being equipped in the optical pickup apparatus and, when the first wavelength light passes through the diffraction surface portion of the diffraction grating corresponding to the second wavelength light, with the first wavelength light being split at least into the first main beam and the first sub-beam, it is possible to substantially prevent unnecessary light from being generated when the first wavelength light passes through the diffraction grating. Also, when the second wavelength light passes through the diffraction surface portion of the diffraction grating corresponding to the second wavelength light, the second wavelength light is split into at least the second main beam and the second sub-beam without generating unnecessary light. Detection of the first main beam and detection of the first sub-beam can be performed more accurately with the photodetector whose setting has been changed. When the first wavelength light passes through the diffraction grating having the diffraction surface portion corresponding to the second wavelength light and the first wavelength light is split into at least a front-side first sub-beam, a central first main beam, and a rear-side first sub-beam, if a light splitting ratio of the front-side first sub-light-receiving portion irradiated with the front-side first sub-beam, the central first main-light-receiving portion irradiated with the central first main beam, and the rear-side first sub-light-receiving portion irradiated with the rear-side first sub-beam is changed to a standardized light splitting ratio of the front-side first sub-light-receiving portion, the central first main-light-receiving portion, and the rear-side first sub-light-receiving portion, the detection of the first main beam and the detection of the first sub-beam can be performed more accurately with the photodetector whose setting has been changed.

In an optical pickup apparatus according to an embodiment of the present invention, when the repositioned first sub-light-receiving portions are disposed in the pairwise manner across the first main light-receiving portion positioned at the center, and the first sub-light-receiving portion on the front side, the first main light-receiving portion at the center, and the first sub-light-receiving portion on the rear side are arranged in a row, the light splitting ratio among the first sub-light-receiving portion on the front side, the first main light-receiving portion at the center, and the first sub-light-receiving portion on the rear side is set substantially at 1:(20 to 26):1.

With the configuration described above, detection of the first main beam and detection of the first sub-beam are performed accurately with the photodetector whose setting has been changed. For example, when the first wavelength light passes through the diffraction grating having the first diffraction surface portion corresponding to the first wavelength light and the second diffraction surface portion corresponding to the second wavelength light, the first wavelength light is split into at least the front-side first sub-beam, the central first main beam, and the rear-side first sub-beam, by setting a light splitting ratio among the front-side first sub-light-receiving portion irradiated with the front-side first sub-beam, the central first main-light-receiving portion irradiated with the central first main beam, and the rear-side first sub-light-receiving portion irradiated with the rear-side first sub-beam at, for example, approximately 1:16:1, the detection of the first main beam and the detection of the first sub-beam have been accurately performed with the standardized photodetector. However, in a case where the first wavelength light passes through the diffraction grating having the diffraction surface portion corresponding to the second wavelength light and in which the diffraction surface portion corresponding to the first wavelength light is omitted and the first wavelength light is split into at least the front-side first sub-beam, the central first main beam, and the rear-side first sub-beam, with the light splitting ratio of the front-side first sub-light-receiving portion irradiated with the front-side first sub-beam, the central first main-light-receiving portion irradiated with the central first main beam, and the rear-side first sub-light-receiving portion irradiated with the rear-side first sub-beam being set at, for example, approximately 1:16:1, there has been concern that the detection of the first main beam and the detection of the first sub-beam may not be performed accurately by the standardized photodetector. On the other hand, in a case where the first wavelength light passes through the diffraction grating having the diffraction surface portion corresponding to the second wavelength light and the first wavelength light is split into at least the front-side first sub-beam, the central first main beam, and the rear-side first sub-beam, with the light splitting ratio of the front-side first sub-light-receiving portion irradiated with the front-side first sub-beam, the central first main-light-receiving portion irradiated with the central first main beam, and the rear-side first sub-light-receiving portion irradiated with the rear-side first sub-beam being set approximately at 1:(20 to 26):1, the detection of the first main beam and the detection of the first sub-beam are performed accurately with the photodetector whose setting has been changed. If the light splitting ratio of the front-side first sub-light-receiving portion irradiated with the front-side first sub-beam, the central first main-light-receiving portion irradiated with the central first main beam, and the rear-side first sub-light-receiving portion irradiated with the rear-side first sub-beam is set at approximately 1:less than 20:1 or if this light splitting ratio is set at approximately 1:exceeding 26:1, for example, there has been concern that the detection of the first main beam and the detection of the first sub-beam may not be performed accurately, but by setting this light splitting ratio at approximately 1:(20 to 26):1 or preferably at approximately 1:(21 to 25):1, the detection of the first main beam and the detection of the first sub-beam can be easily performed with accuracy.

In an optical pickup apparatus according to an embodiment of the present invention, when the second sub-light-receiving portions are disposed in a pairwise manner across the second main light-receiving portion positioned as a center, and the second sub-light-receiving portion on a front side, the second main light-receiving portion at a center, and the second sub-light-receiving portion on a rear side are arranged in a row, a light splitting ratio among the second sub-light-receiving portion on the front side, the second main light-receiving portion at the center, and the second sub-light-receiving portion on the rear side is set substantially at 1:(12 to 18):1.

With the configuration described above, detection of the second main beam and detection of the second sub-beam are performed accurately with the photodetector. When the second wavelength light passes through the diffraction grating having the diffraction surface portion corresponding to the second wavelength light and the second wavelength light is split into at least the front-side second sub-beam, the central second main beam, and the rear-side second sub-beam, with a light splitting ratio of the front-side second sub-light-receiving portion irradiated with the front-side second sub-beam, the central second main-light-receiving portion irradiated with the central second main beam, and the rear-side second sub-light-receiving portion irradiated with the rear-side second sub-beam being set at approximately 1:(12 to 18):1, the detection of the second main beam and the detection of the second sub-beam are performed accurately with the photodetector. If the light splitting ratio among the front-side second sub-light-receiving portion irradiated with the front-side second sub-beam, the central second main-light-receiving portion irradiated with the central second main beam, and the rear-side second sub-light-receiving portion irradiated with the rear-side second sub-beam is set at approximately 1:less than 12:1 or if this light splitting ratio is set at approximately 1:exceeding 18:1, for example, there has been concern that the detection of the second main beam and the detection of the second sub-beam may not be performed accurately, but by setting this light splitting ratio at approximately 1:(12 to 18):1 or preferably at approximately 1:(14 to 18):1, the detection of the second main beam and the detection of the second sub-beam are performed accurately.

An optical pickup apparatus according to an embodiment of the present invention includes at least: a diffraction grating configured to split first wavelength light into at least a first main beam and a first sub-beam, and to split second wavelength light into at least a second main beam and a second sub-beam, the diffraction grating including a diffraction surface portion corresponding to the second wavelength light; and a photodetector including a first main light-receiving portion configured to be irradiated with the first main beam, a first sub-light-receiving portion configured to be irradiated with the first sub-beam, a second main light-receiving portion configured to be irradiated with the second main beam, and a second sub-light-receiving portion configured to be irradiated with the second sub-beam, a value of light receiving sensitivity of the first main light-receiving portion being changed relative to or being equal to a value of standardized light receiving sensitivity of the first main light-receiving portion; and a value of light receiving sensitivity of the first sub-light-receiving portion being changed relative to a value of standardized light receiving sensitivity of the first sub-light-receiving portion.

With the configuration described above, an optical pickup apparatus is provided in which generation of unnecessary light is suppressed. With the diffraction grating having the diffraction surface portion corresponding to the second wavelength light being equipped in the optical pickup apparatus and, when the first wavelength light passes through the diffraction surface portion of the diffraction grating corresponding to the second wavelength light, with the first wavelength light being split into at least the first main beam and the first sub-beam, it is possible to substantially prevent unnecessary light from being generated when the first wavelength light passes through the diffraction grating. Also, when the second wavelength light passes through the diffraction surface portion of the diffraction grating corresponding to the second wavelength light, the second wavelength light is split into at least the second main beam and the second sub-beam without substantially generating unnecessary light. It becomes easier to perform detection of the first main beam and detection of the first sub-beam accurately with the photodetector whose setting has been changed. If the value of the light receiving sensitivity of the first main-light-receiving portion is changed from or made equal to the value of the standardized light receiving sensitivity of the first main-light-receiving portion, and if the value of the light receiving sensitivity of the first sub-light-receiving portion is changed from the value of the standardized light receiving sensitivity of the first sub-light-receiving portion, the detection of the first main beam and the detection of the first sub-beam are easily performed with accuracy by the photodetector whose setting has been changed.

In an optical pickup apparatus according to an embodiment of the present invention, when the value of the standardized light receiving sensitivity of the first main light-receiving portion is defined as a value of 100%, a changed or the same value of the light receiving sensitivity of the first main light-receiving portion is set at a lower value of substantially less than or equal to 100% of the value of the standardized light receiving sensitivity of the first main light-receiving portion; and when the value of the standardized light receiving sensitivity of the first sub-light-receiving portion is defined as a value of 100%, a changed value of the light receiving sensitivity of the first sub-light-receiving portion is set at a higher value of substantially greater than or equal to 100% of the standardized light receiving sensitivity of the first sub-light-receiving portion.

With the configuration described above, the detection of the first main beam and the detection of the first sub-beam are easily performed with accuracy by the photodetector whose setting has been changed. If the value of the light receiving sensitivity of the first main-light-receiving portion, which was changed or made equal, is set at a low value of approximately 100% or less with respect to the value of the standardized light receiving sensitivity of the first main-light-receiving portion set at 100% and if the changed value of the light receiving sensitivity of the first sub-light-receiving portion is set at a high value of approximately 100% or more with respect to the value of the standardized light receiving sensitivity of the first sub-light-receiving portion set at 100%, the detection of the first main beam and the detection of the first sub-beam are easily performed with accuracy by the photodetector with changed setting.

In an optical pickup apparatus according to an embodiment of the present invention, when the value of the standardized light receiving sensitivity of the first main light-receiving portion is defined as a value of 100%, a changed or the same value of the light receiving sensitivity of the first main light-receiving portion is set at a value of substantially 95 to 100% of the value of the standardized light receiving sensitivity of the first main light-receiving portion; and when the value of the standardized light receiving sensitivity of the first sub-light-receiving portion is defined as a value of 100%, a changed value of the light receiving sensitivity of the first sub-light-receiving portion is set at a value of substantially 120 to 160% of the value of the standardized light receiving sensitivity of the first sub-light-receiving portion.

With the configuration described above, the detection of the first main beam and the detection of the first sub-beam are performed with accuracy with the photodetector whose setting has been changed. If the value of the light receiving sensitivity of the first main-light-receiving portion, which was changed or made equal, is set at a value of approximately 95 to 100% With respect to the value of the standardized light receiving sensitivity of the first main-light-receiving portion set at 100%, and if the changed value of the light receiving sensitivity of the first sub-light-receiving portion is set at a value at approximately 120 to 160% with respect to the value of the standardized light receiving sensitivity of the first sub-light-receiving portion set at 100%, the detection of the first main beam and the detection of the first sub-beam are performed accurately by the photodetector with changed setting.

In an optical pickup apparatus according to an embodiment of the present invention, when a value of standardized light receiving sensitivity of the second main light-receiving portion is defined as a value of 100%, a value of light receiving sensitivity of the second main light-receiving portion is set at a value of substantially 100% of the value of the standardized light receiving sensitivity of the second main light-receiving portion; and when a value of standardized light receiving sensitivity of the second sub-light-receiving portion is defined as a value of 100%, a value of light receiving sensitivity of the second sub-light-receiving portion is set at a value of substantially 100% of the value of the standardized light receiving sensitivity of the second sub-light-receiving portion.

With the configuration described above, the detection of the second main beam and the detection of the second sub-beam are performed with accuracy with the photodetector. If the value of the light receiving sensitivity of the second main-light-receiving portion is set at a value of approximately 100% with respect to the value of the standardized light receiving sensitivity of the second main-light-receiving portion set at 100%, and if a value of the light receiving sensitivity of the second sub-light-receiving portion is set at a value at approximately 100% with respect to the value of the standardized light receiving sensitivity of the second sub-light-receiving portion set at 100%, the detection of the second main beam and the detection of the second sub-beam are performed accurately by the photodetector.

An optical pickup apparatus according to an embodiment of the present invention includes at least: a diffraction grating configured to split first wavelength light into at least a first main beam and a first sub-beam, and to split second wavelength light into at least a second main beam and a second sub-beam, the diffraction grating including a diffraction surface portion corresponding to the second wavelength light; and a photodetector including a first main light-receiving portion configured to be irradiated with the first main beam, a first sub-light-receiving portion configured to be irradiated with the first sub-beam, a second main light-receiving portion configured to be irradiated with the second main beam, and a second sub-light-receiving portion configured to be irradiated with the second sub-beam, a value of a signal outputted from the first main light-receiving portion being changed relative to or being equal to a value of a standardized signal outputted from the first main light-receiving portion, a value of a signal outputted from the first sub-light-receiving portion is changed relative to a value of a standardized signal outputted from the first sub-light-receiving portion.

With the configuration described above, an optical pickup apparatus is provided in which occurrence of unnecessary light is suppressed. With the diffraction grating having the diffraction surface portion corresponding to the second wavelength light being equipped in the optical pickup apparatus and, when the first wavelength light passes through the diffraction surface portion of the diffraction grating corresponding to the second wavelength light, with the first wavelength light being split into at least the first main beam and the first sub-beam, it is possible to substantially prevent generation of unnecessary light when the first wavelength light passes through the diffraction grating. Also, when the second wavelength light passes through the diffraction surface portion of the diffraction grating corresponding to the second wavelength light, the second wavelength light is split into at least the second main beam and the second sub-beam without substantially generating unnecessary light. Also, it becomes easier to perform detection of the first main beam and detection of the first sub-beam with accuracy. If the value of a signal outputted from the first main-light-receiving portion is changed from or made equal to the value of a standardized signal outputted from the first main-light-receiving portion, and if the value of the signal outputted from the first sub-light-receiving portion is changed from the value of the standardized signal outputted from the first sub-light-receiving portion, the detection of the first main beam and the detection of the first sub-beam are easily performed with accuracy.

In an optical pickup apparatus according to an embodiment of the present invention, when the value of the standardized signal outputted from the first main light-receiving portion is defined as a value of 100%, a changed or equivalent value of the signal outputted from the first main light-receiving portion is set at a lower value of substantially 100% or less of the value of the standardized signal outputted from the first main light-receiving portion; and when the value of the standardized signal outputted from the first sub-light-receiving portion is defined as a value of 100%, a changed value of the signal outputted from the first sub-light-receiving portion is set at a higher value of substantially 100% or greater of the value of the standardized signal outputted from the first sub-light-receiving portion.

With the above configuration, the detection of the first main beam and the detection of the first sub-beam are easily performed with accuracy. If the value of a signal outputted from the first main-light-receiving portion, which was changed or made equal, is set at a low value of approximately 100% or less with respect to the value of a standardized signal outputted from the first main-light-receiving portion set at 100%, and if the value of the signal outputted from the changed first sub-light-receiving portion is set at a high value of at approximately 100% or more with respect to the value of the standardized signal outputted from the first sub-light-receiving portion set at 100%, the detection of the first main beam and the detection of the first sub-beam are easily performed with accuracy.

In an optical pickup apparatus according to an embodiment of the present invention, when the value of the standardized signal outputted from the first main light-receiving portion is defined as a value of 100%, a changed or equal value of the signal outputted from the first main light-receiving portion is set at a value of substantially 95 to 100% of the value of the standardized signal outputted from the first main light-receiving portion; and when the value of the standardized signal outputted from the first sub-light-receiving portion is defined as a value of 100%, a changed value of the signal outputted from the first sub-light-receiving portion is set at a value of substantially 120 to 160% of the value of the standardized signal outputted from the first sub-light-receiving portion.

With the above configuration, the detection of the first main beam and the detection of the first sub-beam are easily performed with accuracy. If the value of a signal outputted from the first main-light-receiving portion, which was changed or made equal, is set at a value of approximately 95 to 100% with respect to the value of a standardized signal outputted from the first main-light-receiving portion set at 100%, and if the value of a signal outputted from the changed first sub-light-receiving portion is set at a value at approximately 120 to 160% with respect to the value of a standardized signal outputted from the first sub-light-receiving portion set at 100%, the detection of the first main beam and the detection of the first sub-beam are easily performed with accuracy.

In an optical pickup apparatus according to an embodiment of the present invention, when a value of a standardized signal outputted from the second main light-receiving portion is defined as a value of 100%, a value of a signal outputted from the second main light-receiving portion is set at a value of substantially 100% of the value of the standardized signal outputted from the second main light-receiving portion; and when a value of a standardized signal outputted from the second sub-light-receiving portion is defined as a value of 100%, a value of the signal outputted from the second sub-light-receiving portion is set a value of substantially 100% of the value of the standardized signal outputted from the second sub-light-receiving portion.

With the above configuration, the detection of the second main beam and the detection of the second sub-beam are performed with accuracy by the photodetector. If the value of a signal outputted from the second main-light-receiving portion is set at a value of approximately 100% with respect to the value of a standardized signal outputted from the second main-light-receiving portion set at 100%, and if the value of a signal outputted from the second sub-light-receiving portion is set at a value of at approximately 100% with respect to the value of a standardized signal outputted from the second sub-light-receiving portion at 100%, the detection of the second main beam and the detection of the second sub-beam are performed with accuracy by the photodetector.

In an optical pickup apparatus according to an embodiment of the present invention, a diffraction surface portion of the diffraction grating acts both as a diffraction surface portion configured to split the first wavelength light into at least the first main beam and the first sub-beam, and a diffraction surface portion configured to split the second wavelength light into at least the second main beam and the second sub-beam.

The optical pickup apparatus in which occurrence of unnecessary diffraction light in the diffraction grating is suppressed, deterioration of light efficiency is prevented, and moreover, the price can be kept low is configured as above. If the diffraction surface portion of the diffraction grating is formed to act both as a diffraction surface portion that splits the first wavelength light at least into the first main beam and the first sub-beam and a diffraction surface portion that splits the second wavelength light at least into the second main beam and the second sub-beam, unnecessary diffraction of the first wavelength light, which results in lowered efficiency of the first wavelength light, or unnecessary diffraction of the second wavelength light, which results in lowered efficiency of the second wavelength light, is avoided. Also, since the diffraction surface portion of the diffraction grating is formed to act both as a diffraction surface portion that splits the first wavelength light at least into the first main beam and the first sub-beam and a diffraction surface portion that splits the second wavelength light at least into the second main beam and the second sub-beam, a diffraction grating with the reduced numbers of portions to be worked and work processes is configured. Since the numbers of portions to be worked and work processes are reduced, the price of the diffraction grating is kept low. As a result, the optical pickup apparatus capable of keeping the price low can be configured.

In an optical pickup apparatus according to an embodiment of the present invention, the diffraction grating is divided into a plurality of region portions.

With the above configuration, the detection of an error signal of the optical pickup apparatus with respect to media is easily performed favorably. For example, the tracking in the optical pickup apparatus to the media is easily performed favorably. The media refers to those recording and mediating information and those recording and transmitting information. Also, the tracking in the optical pickup apparatus means an operation in which oscillation of the media in the radial direction is followed so as to allow a spot to be present on the target track all the time. Since the diffraction grating is composed of a plurality of regions, at least three independent spots are formed on the media, respectively. Since at least three independent spots are formed on the media, respectively, deterioration of detection accuracy of error signals such as a tracking error signal during recording/reproducing and the like of two or more types of the media can be avoided easily.

In an optical pickup apparatus according to an embodiment of the present invention, the diffraction grating is divided into an even number of region portions.

With the above configuration, the spot formed on the media is formed as a spot with accuracy. For example, since the diffraction grating is split into an even number of regions, which are one region and the other region, when the diffraction grating is equipped in the optical pickup apparatus, the light incident on the diffraction grating can be easily illuminated in a state in which the light is split into substantially two equal parts, which are the one region of the diffraction grating and the other region of the diffraction grating. Since the light can be easily illuminated on the one region of the diffraction grating and the other region of the diffraction grating in the substantially two equally divided parts, the diffraction grating can be easily equipped in the optical pickup apparatus with accuracy. Therefore, the spots can be formed easily on the media with accuracy. As a result, the detection accuracy of error signals during recording/reproducing and the like of two or more types of media is improved.

In an optical pickup apparatus according to an embodiment of the present invention, the diffraction grating is divided into at least four region portions including a first region portion, a second region portion, a third region portion, and a fourth region portion.

With the above configuration, the detection of an error signal of the optical pickup apparatus with respect to the media is performed favorably. For example, the tracking of the optical pickup apparatus with respect to the media is performed favorably. Since the diffraction grating is composed of four regions, at least three independent spots are formed on the media, respectively. Since at least three independent spots are formed, respectively, deterioration of the detection accuracy of error signals such as a tracking error signal during recording/reproducing and the like of the two or more types of media is avoided.

An optical pickup apparatus according to an embodiment of the present invention further includes: a light emitting element capable of emitting light of a plurality of types of wavelength.

With the above configuration, price reduction with reduction in the number of components in the optical pickup apparatus can be realized. Since the light emitting element is formed as a light emitting element that emits a plurality of types of wavelength light capable of emitting at least two or more types of wavelength light including the first wavelength light and the second wavelength light, for example, the optical pickup apparatus becomes capable of handling multimedia. Also, in addition, since the light emitting element capable of emitting at least the first wavelength light and the light emitting element capable of emitting the second wavelength light are configured as one light emitting element, the number of components in the optical pickup apparatus can be reduced. With the reduction of the number of components in the optical pickup apparatus, the price of the optical pickup apparatus is kept low. Therefore, the optical pickup apparatus with the reduced number of components and the reduced price can be provided.

In an optical pickup apparatus according to an embodiment of the present invention, the first wavelength light has a wavelength of substantially 765 to 840 nm, and the second wavelength light has a wavelength of substantially 630 to 685 nm.

With the above configuration, occurrence of unnecessary light when the first wavelength light, which is wavelength light of approximately 765 to 840 nm, passes through the diffraction grating is substantially prevented. Also, occurrence of unnecessary light when the second wavelength light, which is wavelength light of approximately 630 to 685 nm, passes through the diffraction grating is substantially prevented.

In an optical pickup apparatus according to an embodiment of the present invention, the first wavelength light has a wavelength of substantially 630 to 685 nm, and wherein the second wavelength light has a wavelength of substantially 340 to 450 nm.

With the above configuration, occurrence of unnecessary light when the first wavelength light, which is wavelength light of approximately 630 to 685 nm, passes through the diffraction grating is substantially prevented. Also, occurrence of unnecessary light when the second wavelength light, which is wavelength light of approximately 340 to 450 nm, passes through the diffraction grating is substantially prevented.

In an optical pickup apparatus according to an embodiment of the present invention, the optical pickup apparatus is capable of supporting a media having a plurality of signal surface portions.

With the above configuration, reading of signals and information of the optical pickup apparatus from the media having a plurality of signal face portions and/or writing of signals and information of the optical pickup apparatus to the media having a plurality of signal face portions and the like are performed favorably.

Also, with the above configuration, an optical pickup apparatus is provided in which unnecessary diffraction light is suppressed in accordance with two or more types of laser beams with different wavelengths and detection accuracy of error signals is improved.

An optical disc device provided with at least an optical pickup apparatus that can solve at least one of the above problems is configured as above.

According to the present invention, an optical pickup apparatus in which the first wavelength light and the second wavelength light are reliably handled and detection accuracy of error signals is improved can be configured.

Also, according to the present invention, an optical pickup apparatus in which the first wavelength light is reliably collected onto the first media and the second wavelength light is reliably collected onto the second media can be configured.

Also, according to the present invention, an optical pickup apparatus in which occurrence of unnecessary light is suppressed can be configured.

Also, according to the present invention, detection of the first main beam and the detection of the first sub-beam can be easily performed with accuracy by the photodetector with changed setting.

Also, according to the present invention, an optical pickup apparatus can be provided in which two or more types of laser beams with different wavelengths are handled, unnecessary diffraction light is suppressed, and detection accuracy of error signals is improved.

Also, according to the present invention, an optical disc device provided with at least an optical pickup apparatus that can solve at least one of the above problems can be configured.

Embodiments of an optical pickup apparatus and an optical disc device provided with the same will be described below in detail on the basis of the attached drawings.

Embodiment 1

Optical System of Optical Pickup Apparatus

Figure 2:
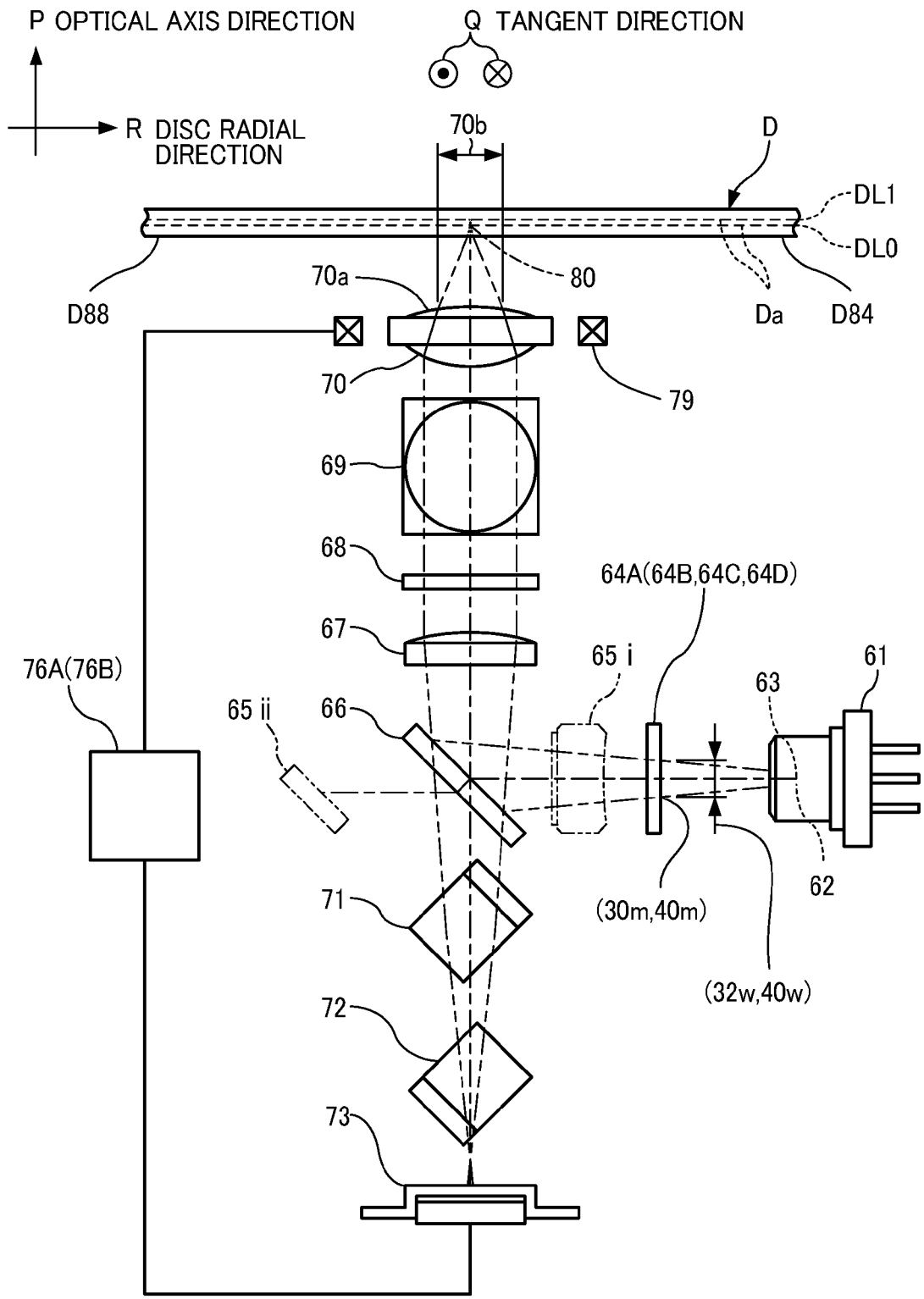
FIG. 2 is an explanatory diagram of the optical pickup apparatus according to the embodiment of the present invention.
Figure 3:
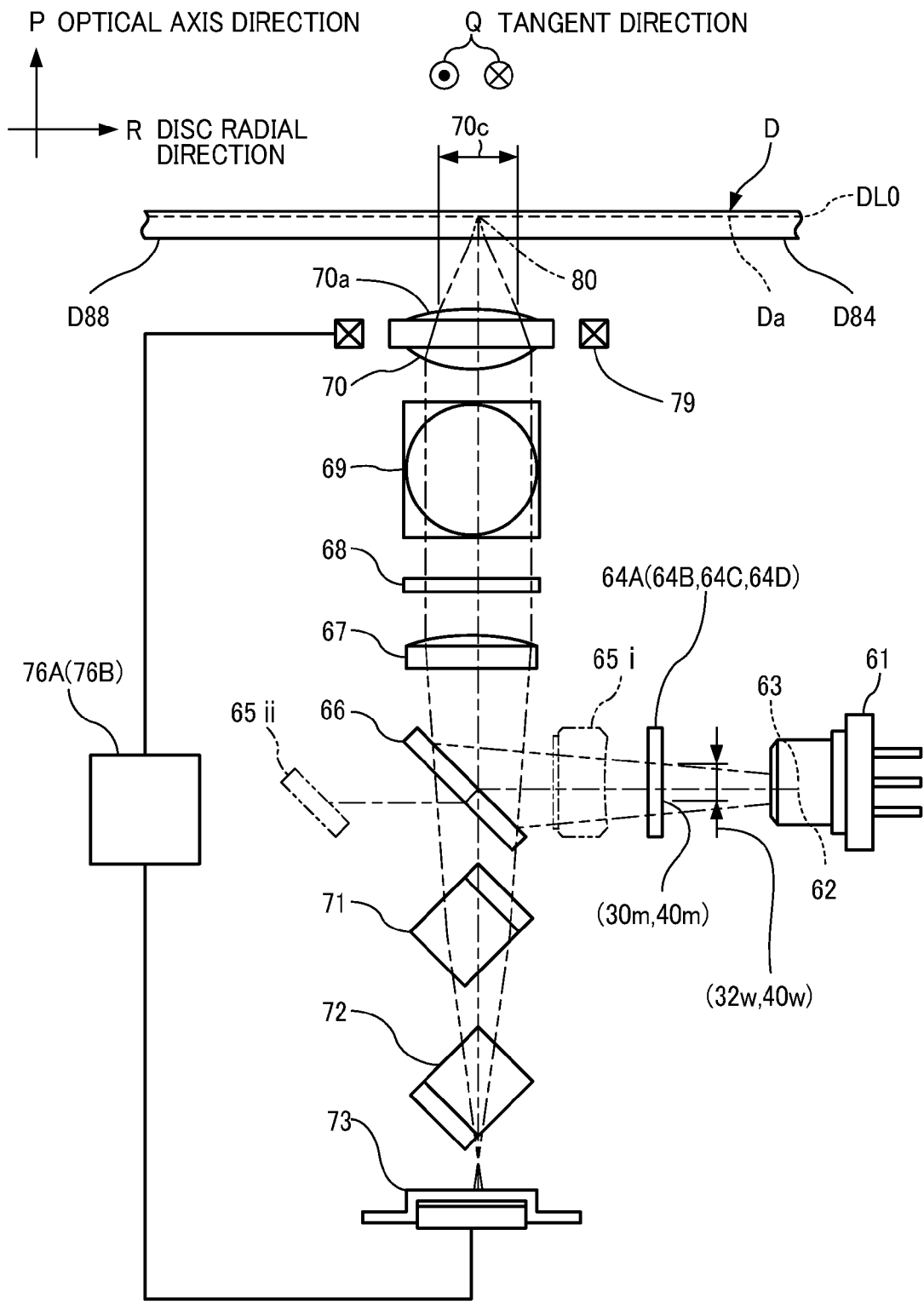
FIG. 3 is an explanatory diagram of the optical pickup apparatus according to the embodiment of the present invention.

FIG. 1 is an optical layout view of an optical pickup apparatus according to an embodiment of the present invention, and FIGS. 2 and 3 are explanatory diagrams of the optical pickup apparatus according to the embodiment of the present invention.

The optical pickup apparatus is configured to conform to media D such as an optical disc D and the like conforming to the CD standard (CD-ROM, CD-R, CD-RW and the like) or to the DVD standard (DVD-ROM, DVD-RAM (Version 1, 2.0, 2.1), DVD-R, DVD+R, DVD-RW, DVD+RW and the like). The media means those configured to record and mediate information and those configured to record and transmit information. For example, the media here means discs and the like in which data, information, signals and the like are stored. A single track is formed substantially spirally from an innermost peripheral side D84 to an outer peripheral side D88 of the optical disc D having a substantially disc shape.

The disc includes the various types of optical disc discs described above. Also, the disc includes optical discs (not shown) such as the "CBHD (China Blue High-Definition)" standard, which is an optical disc conforming to a standard specified in China, for example (e.g., former name is "CH-DVD" standard). Also, the discs include an optical disc D in which a signal surface is provided on either side of the disc and data writing/erasing, data rewriting and the like are made possible, for example. Also, the disc includes an optical disc D in which a two-layer signal face is provided in such a manner that data writing/erasing, data rewriting and the like are made possible, for example. Also, the disc includes an optical disc for "HD-DVD" (not shown) in which a three-layer signal face is provided in such a manner that data writing/erasing, data rewriting and the like are made possible, for example. Also, the discs include an optical disc for "Blu-ray Disc" (not shown) in which a four-layer signal face is provided in such a manner that data writing/erasing, data rewriting and the like are made possible, for example. Also, the disc includes an optical disc D in which various writing and the like of a label and the like is made possible by applying a laser beam also to a label face side of the disc, for example. A signal layer Da in the optical disc D is formed by a metal layer of a metal thin film or the like, for example. Information and data are recorded in the signal layer Da formed by a metal thin film or the like.

An optical disc device provided with the optical pickup apparatus is configured to handle the above various discs, for example. Using the optical disc device provided with the optical pickup apparatus, data reproduction of information and the like recorded in the various types of optical discs is performed. Also, using the optical disc device provided with the optical pickup apparatus, data recording of information and the like in the various types of optical discs is performed.

A focusing detecting method of a light collection spot on the optical disc D in this optical pickup apparatus is a detecting method based on astigmatic method, for example. The astigmatic method is a method of detecting displacement of the light collection spot by detecting a point-image distortion formed by an optical system with astigmatism, for example. Also, the focusing detecting method includes a detecting method based on a differential astigmatic method and the like, for example. As described above, the differential astigmatic method is defined as a method of detecting displacement of a light collection spot by detecting a point-image distortion formed by an optical system with astigmatism, for example. Also, the differential astigmatic method is defined as a method of generating a focus error signal by subtracting a focus error signal generated by a sub-spot multiplied by a predetermined coefficient from a focus error signal generated in a main spot, for example, and a push-pull leakage can be kept small. The focusing detecting method of the light collection spot in this optical pickup apparatus is a detecting method based on the astigmatic method, the differential astigmatic method and the like, for example. Specifically speaking, this optical pickup apparatus is assumed to be an optical pickup apparatus provided with an optical system in accordance with the differential astigmatic method. The focusing detecting method may be other detecting methods including a Foucault method, a knife edge method and the like, for example, employed independently or at the same time. Depending on the type of each of the optical discs D, the focusing detecting method such as the differential astigmatic method or the like is automatically selected as appropriate.

A tracking detecting method of the light collection spot of the optical disc D in this optical pickup apparatus is assumed to be a detecting method based on a differential push-pull method, a phase difference method and the like, for example. As described above, the differential push-pull method is a method of detecting displacement of the light collection spot by a main beam for data reading/writing and two sub-beams for detecting correction signals of displacement, for example. The tracking detecting method includes a detecting method based on a DPD (Differential Phase Detection) method including the phase difference method, for example. Specifically speaking, the tracking detecting method includes a phase difference method based on a phase difference signal detected by a quadrant optical detecting device 73A, for example. The tracking detecting method of the light collection spot in this optical pickup apparatus may be a detection method based on the DPP method, the DPD method, the phase difference method, a heterodyne detecting method or the like employed independently or at the same time. Depending on the type of the optical disc D, each tracking detecting method such as the phase difference method, for example, is automatically selected as appropriate. Also, the optical detecting device 73A of this optical pickup apparatus is configured as a photodetector 73A, for example.

A laser unit 61 is a multi-laser unit having a first light source 62 which emits a first laser beam of a first wavelength of approximately 765 to 840 nm (782 nm, for example) in an infrared wavelength band suitable for the CD standard and a second light source 63 which emits a second laser beam of a second wavelength of approximately 630 to 685 nm (655 nm, for example) in a red wavelength band suitable for the DVD standard on the same light emitting surface 61a. The laser unit 61 is configured as a two-wavelength light emitting element 61, for example, capable of emitting laser beams of two types of wavelengths, that is, the first laser beam and the second laser beam in which the wavelength is different from that of the first laser beam and is a laser beam of a wavelength shorter than that of the first laser beam. As described above, the laser unit 61 is the light emitting element 61 capable of emitting laser beams of a plurality of types of wavelengths. The first light source 62 and the second light source 63 constitute a semiconductor laser element.

A laser beam of a power of greater than or equal to 0.2 mW and less than or equal to 500 mW (milliwatt), and specifically, greater than or equal to 2 mW and less than or equal to 400 mW, is emitted from the first light source 62 and/or the second light source 63 constituting the laser unit 61. For example, with the laser beam of a power of less than 0.2 mW an amount of light of the laser beam that reaches the photodetector 73A after being applied to the optical disc D and then reflected is insufficient. When reproducing data or the like in the optical disc D, a laser beam of a power of several to several tens of mW, such as greater than or equal to 0.2 mW, preferably greater than or equal to 0.5 mW, and more preferably greater than or equal to 2 mW and less than or equal to 20 mW is sufficient. When writing data or the like in the optical disc D, a laser beam of a power of several tens to several hundreds of mW is required. When writing data or the like in the optical disc D at a high speed, for example, a pulse laser beam of a power of such as 400 mW and 500 mW could be required.

The laser unit 61 is configured as a substantially cylindrical or substantially columnar CAN package type laser diode with an excellent heat radiation characteristic, for example. Depending on the design/specification and the like of the optical pickup apparatus, a lead-frame package type laser diode (not shown) in a substantially plate shape capable of reduction in thickness, size and the like, for example, may be used instead of the CAN packet type laser unit 61.

The first laser beam and the second laser beam emitted from the first light source 62 and the second light source 63, respectively, are diffracted by a diffraction grating 64A divided into a plurality of parts or four parts, for example, so as to generate at least three beams of a main beam (0th-order light) and two sub-beams (±1st order diffraction light flux) and then, a spread angle is adjusted by a coupling lens 65i, for example, and reflected by a polarization filter surface of a plate-type polarization beam splitter 66.

The laser beam reflected by the polarization beam splitter 66 is, after being formed into a parallel beam with a collimator lens 67, which is an optical lens, converted into a circularly polarized beam by passing through a quarter-wave plate 68, incident on a reflective mirror 69 as a result of which its optical axis is made to bend, incident on an objective lens 70, which is an optical lens, converged with the objective lens 70 and is incident on the optical disc D.

In order to be adapted to the optical disc D having a plurality of layers DL0 and DL1, which are the first layer DL0 (FIG. 2) and the second layer DL1, the objective lens 70 is provided in the optical pickup apparatus in a state movable substantially along an optical axis direction (P-axis direction) of the objective lens 70. By providing the objective lens 70 substantially along the optical axis direction (P-axis direction) of the objective lens 70 in a movable state in the optical pickup apparatus, the optical pickup apparatus is configured to be adapted to the optical disc D having a plurality of signal layers Da. Also, since the objective lens 70 accurately follows a track of the signal layer Da in the optical disc D and the like, the objective lens is provided in the optical pickup apparatus in a state movable substantially along a disc radial direction (R-axis direction).

Depending on the design/specification and the like of the optical pickup apparatus, in order to be adapted to the optical disc D having the plurality of layers DL0 and DL1, which are the first layer DL0 (FIG. 2) and the second layer DL1, the collimator lens 67 is provided in the optical pickup apparatus in a state movable substantially along the optical axis direction of the collimator lens 67. By providing the collimator lens 67 in the optical pickup device substantially along the optical axis direction of the collimator lens 67 in a movable state, the optical pickup apparatus is configured to be more reliably adapted to the optical disc D having the plurality of signal layers Da.

As described above, an exemplary light collecting optical system includes the diffraction grating 64A, the coupling lens 65i, the polarization beam splitter 66, the collimator lens 67, the quarter-wave plate 68, the reflective mirror 69, the objective lens 70 and the like. The objective lens 70 converges the main beam and the two sub-beams branched by the diffraction grating 64A and is substantially parallel to or diagonally inclined with respect to an elongated track above the track of the optical disc D to form a main spot corresponding to the main beam and two sub-spots corresponding to the two sub-beams substantially in a single row.

Depending on the design/specification and the like of the optical pickup apparatus, the coupling lens (65*i*), for example, does not have to be equipped and may be omitted. Also, in FIG. 1, an exemplary optical layout of the optical pickup apparatus in which the quarter-wave plate 68 is located between the collimator lens 67 and the reflective mirror 69 is shown, but depending on the design/specification and the like of the optical pickup apparatus, the quarter-wave plate (68) does not have to be equipped between the collimator lens (67) and the reflective mirror (69), for example, and an optical pickup apparatus in which the quarter-wave plate (68) is located between the polarization beam splitter (66) and the collimator lens (67) can be used. Parentheses ( ) given to reference numerals in this application are used for convenience in explaining those somewhat different from those shown in the figures.

Also, in the optical pickup apparatus capable of recording a signal in the optical disc D, a light receiving element 65*ii* that monitors the laser beam emitted from the laser unit 61 and provides a feed back for controlling of the laser unit 61 is equipped in the vicinity of the polarization beam splitter 66, for example.

The objective lens 70 is designed in such a manner that the diffraction grating 64A diffracts each of laser beams of wavelengths suitable for various types of optical disc D in accordance with the respective optical characteristics in a substantially ring band shape, for example, around the optical axis on an incident surface, and the three beams formed by diffracted and branched by the diffraction grating have the spherical aberration corrected with respect to each optical disc D and are provided with a light converging function, for example. By driving the objective lens 70 substantially along a focus direction (P-axis direction shown in FIG. 1), a tracking direction (R-axis direction orthogonal to a Q-axis indicating the track forming direction shown in FIG. 1 and also orthogonal to the P-axis) and a tilt direction (lens oscillation direction), the laser beam is focused on the signal layer Da on the optical disc D, and the laser beam is directed from the objective lens 70 to the optical disc D in such a manner that the laser beam follows the predetermined track of the optical disc D.

The laser beam modulated and reflected by the signal layer Da of the optical disc D returns to the objective lens 70 and reaches the polarization beam splitter 66 via a return path, which is an optical path substantially the same as an outward path to the middle. If the signal layer Da of the optical disc D is irradiated with a right-turning laser beam, for example, the reflected laser beam will be a circularly polarized beam in a state reversed into a left-turning laser beam, for example. Also, a laser beam which is for example, S-polarized on an outward path to the optical disc D becomes, for example, a P-polarized laser beam on a return path and is emitted from the quarter-wave plate 68, and the P-polarization laser beam is incident on the polarization beam splitter 66.

The P-polarized laser beam on the return path substantially passes through the polarization beam splitter 66. The laser beam returned to the polarization beam splitter 66 passes through a first parallel plate 71 arranged with inclination in order to correct astigmatism when transmitting through the polarization beam splitter 66, for example. Also, since the laser beam, which has passed through the first parallel plate 71, passes through a second parallel plate 72 arranged with inclination, with astigmatism being given which becomes a focus error component in the laser beam with which the optical disc D is irradiated, for example, and with comatic aberration caused by the polarization beam splitter 66 and the first parallel plate 71 being corrected, the laser beam is guided to the photodetector 73A. As a result, the photodetector 73A generates a tracking error signal, a focus error signal and the like based on the laser beam guided by the second parallel plate 72.

Depending on the design/specification and the like of the optical pickup apparatus, the first parallel plate 71 and the second parallel plate 72 may be astigmatic elements 71 and 72, for example. The first astigmatic element 71 and the second astigmatic element 72 are also examples of a light collecting optical system of the optical pickup apparatus, for example. Also, instead of the first parallel plate 71 and the second parallel plate 72, an astigmatic element may be a sensor lens (not shown) such as an anamorphic lens (not shown) that makes it possible to detect focusing of a light collection spot 80 formed on the signal layer Da of the optical disc D by generating astigmatism of the laser beam based on the astigmatic method/differential astigmatic method and the like, for example.

The photodetector 73A receives the laser beam reflected from the optical disc D, converts the signal to an electric signal such as a tracking error signal or a focus error signal and operates a servo mechanism (not shown) such as a lens holder (not shown) and the like attached to the objective lens 70 constituting the optical pickup apparatus. "Servo" means a mechanism that measures a state of a target to be controlled, for example, compares it with a predetermined reference value and automatically performs modification control and the like. Also, the photodetector 73A receives the laser beam reflected from the optical disc D, converts the signal to an electric signal and detects data/information/signal and the like recorded in the optical disc D.

<<Positions of Main Spots 80 of First Wavelength Light and Second Wavelength Light Formed on Optical Disc D>>

The positions of the main spots 80 of the first wavelength light and the second wavelength light formed on the optical disc D will be described below using FIGS. 2 and 3.

A position at which the first light source 62 is equipped in the laser unit 61 and a position at which the second light source 63 is equipped in the laser unit 61 are different from each other. Thus, for example, when the optical pickup apparatus is located on the innermost peripheral side D84 of the optical disc D, when the optical pickup apparatus is located on the outermost peripheral side D88 of the optical disc D, or when the optical pickup apparatus is located at any position from the innermost peripheral side D84 to the outermost peripheral side D88 of the optical disc D, a position at which a main-spot 80 is formed substantially along the disc radial direction (R-axis direction) of the first wavelength light on the signal surface portion Da of the optical disc D based on the CD standard corresponding to the first wavelength light and a position at which the main-spot 80 is formed substantially along the disc radial direction (R-axis direction) of the second wavelength light on the signal surface portion Da of the optical disc D based on the DVD standard corresponding to the second wavelength are different by several μm to several tens of μm on a line substantially along the disc radial direction (R-axis direction).

When the optical disc D based on the CD standard is irradiated with the laser beam or the optical disc D based on the DVD standard is irradiated with the laser beam using the optical pickup apparatus provided with one objective lens 70, a disc radial-direction light collection position of the laser beam for CD to the optical disc D based on the CD standard and a disc radial-direction light collection position of the laser beam for DVD to the optical disc D based on the DVD standard are different from each other.

Also, when the optical pickup apparatus is located on the innermost peripheral side D84 of the optical disc D, when the optical pickup apparatus is located on the outermost peripheral side D88 of the optical disc D, or when the optical pickup apparatus is located at any position from the innermost peripheral side D84 to the outermost peripheral side D88 of the optical disc D, a position at which the main spot 80 of the first wavelength light is produced substantially along the disc radial direction (R-axis direction) on the signal surface portion Da of the optical disc D in a substantially disc shape based on the CD standard and corresponding to the first wavelength light is located closer to the innermost peripheral side D84 of the optical disc D in a substantially disc shape by several μm to several tens of μm than a position at which the main spot 80 of the second wavelength light is formed substantially along the disc radial direction (R-axis direction) on the signal surface portion Da of the optical disc D in a substantially disc shape based on the DVD standard and corresponding to the second wavelength light.

Depending on the design/specification and the like of the optical pickup apparatus, for example, if the optical pickup apparatus is located on the innermost peripheral side D84 of the optical disc D, if the optical pickup apparatus is located on the outermost peripheral side D88 of the optical disc D, or if the optical pickup apparatus is located at any position from the innermost peripheral side D84 to the outermost peripheral side D88 of the optical disc D, the optical pickup apparatus may be configured in such a manner that the irradiation position substantially along the disc radial direction (R-axis direction) of the main spot 80 of the first wavelength light produced on the signal surface portion Da of the optical disc D in a substantially disc shape based on the CD standard and corresponding to the first wavelength light is located closer to the innermost peripheral side D84 of the optical disc D in a substantially disc shape by several μm to several tens of μm than the irradiation position substantially along the disc radial direction (R-axis direction) of the main spot 80 of the second wavelength light produced on the signal surface portion Da of the optical disc D in a substantially disc shape based on the DVD standard and corresponding to the second wavelength light.

A size of the pit or the like on the signal surface portion Da of the optical disc D based on the DVD standard and corresponding to the second wavelength light is smaller than a size of a pit or the like on the signal surface portion Da of the optical disc D based on the CD standard and corresponding to the first wavelength light. A size of the spot 80 for the light formed on the signal surface portion Da of the optical disc D based on the DVD standard and corresponding to the second wavelength light is smaller than a size of the spot 80 of the light formed on the signal surface portion Da of the optical disc D based on the CD standard and corresponding to the first wavelength light. As a result, the optical pickup apparatus is configured in such a manner that the second wavelength light conforming to the DVD standard of a wavelength shorter than the first wavelength light conforming to the CD standard is located substantially on the optical-system center axis of the optical pickup apparatus.

<<Interval Yp Between Main Spot 80 and Sub-Spots 81 and 82 of First Wavelength Light and Second Wavelength Light Formed on Optical Disc D>>

An interval Yp between the main spot 80 and the sub-spots 81 and 82 of the first wavelength light and the second wavelength light formed on the optical disc D will be described below with reference to FIGS. 4 and 5.

Figure 4:
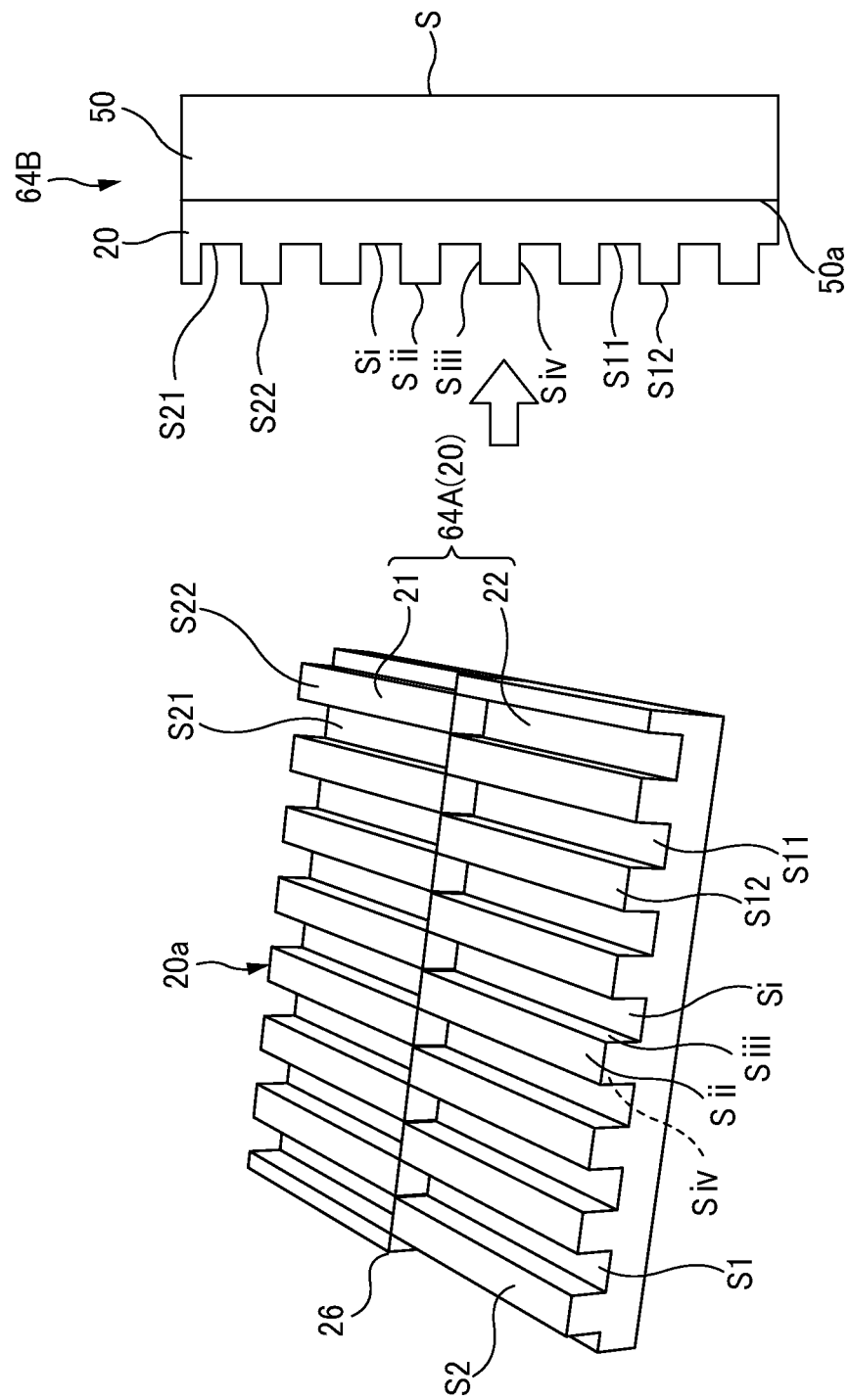
FIG. 4 is a diagram for explaining a diffraction grating according to the embodiment of the present invention.
Figure 5:
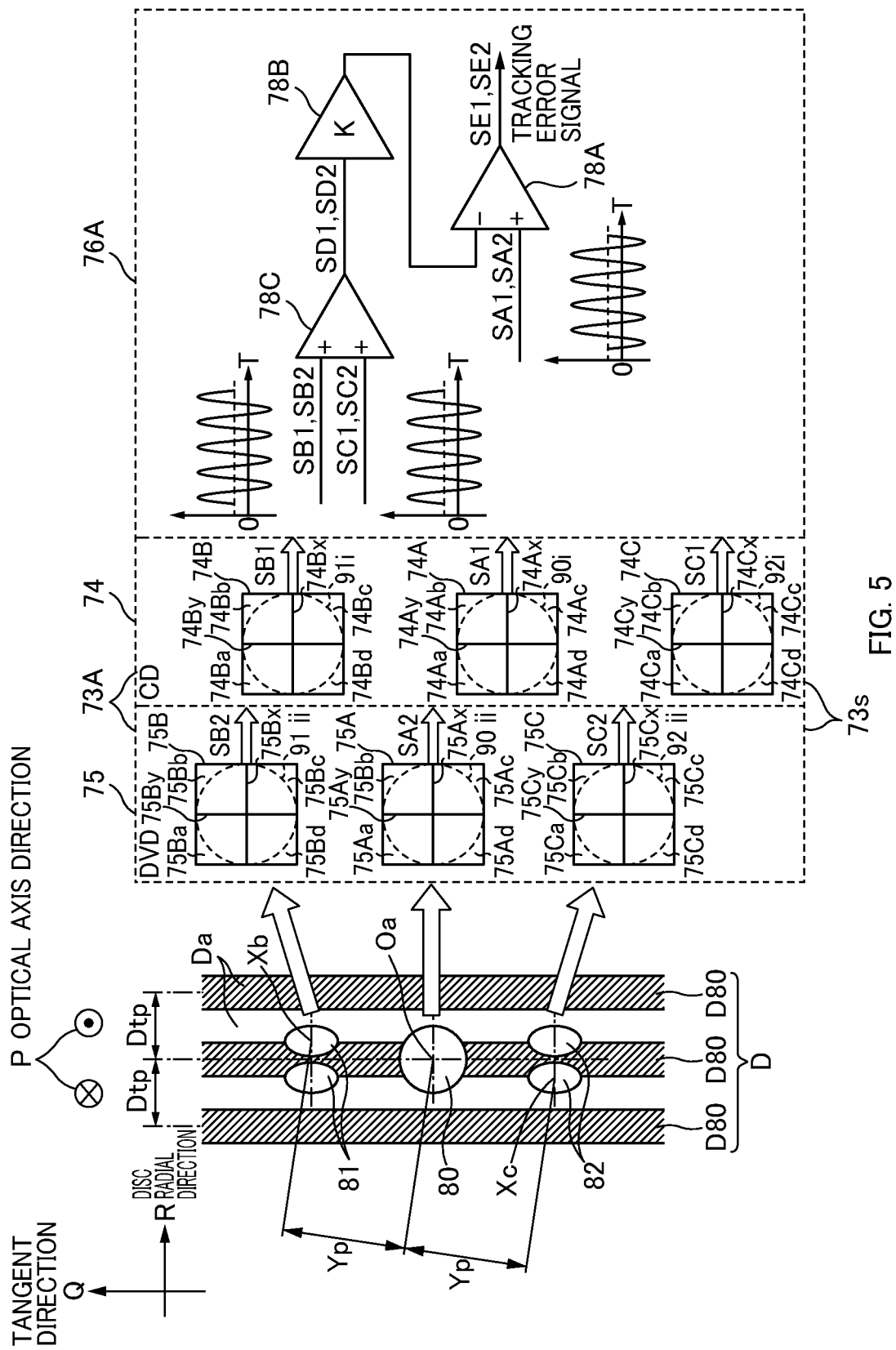
FIG. 5 is a diagram for explaining arrangement of a light collection spot on an optical disc in an inline method and an outline of a tracking error signal detection system according to the embodiment of the present invention.

FIG. 4 is a diagram illustrating a diffraction grating according to an embodiment of the present invention, and FIG. 5 is a diagram illustrating an outline of a light collection spot layout on the optical disc and a tracking error signal detection system in an inline method according to the embodiment of the present invention.

The optical pickup apparatus of the present embodiment is adapted to the optical discs D of both the CD standard and the DVD standard. A track pitch Dtp of the optical disc D of the CD standard such as CD-ROM, CD-R, CD-RW and the like, the track pitch Dtp of the optical disc D of DVD-ROM, DVD-R, DVD+R, DVD-RW, and DVD+RW, the track pitch Dtp of the optical disc D of the DVDRAM (Version 1), and the track pitch Dtp of the optical disc D of the DVD-RAM (Versions 2.0, 2.1) are different, but in each of the figures, the various types of optical discs D are expressed collectively for convenience. Also, for convenience, the shape/arrangement/form and the like of each of the optical spots 80, 81, and 82 applied/formed on the signal surface portion Da of the optical disc D are assumed to have a shape/arrangement/form and the like as illustrated.

The diffraction grating 64A (FIG. 4) is an inexpensive inline method-compliant diffraction grating 64A having substantially the same configuration as that of the diffraction grating 20 for DVD. The diffraction grating 64A only includes the diffraction grating 20 for DVD compliant with the inline method and does not include the three-beam method compliant diffraction grating for CD. The diffraction grating as used herein refers to a member on which a diffraction surface portion that diffracts light is formed, for example, and is referred to as an inline grating, for example. The diffraction grating and the like illustrated herein are drawn for the sake of convenience to facilitate understanding of the details. Light incident on the inline-compliant diffraction grating 64A is split into a single first main beam and at least two first sub-beams by the inline-compliant diffraction grating 64A.

First, a case will be described in which the first wavelength incident on the inline-compliant diffraction grating 64A is a wavelength for the CD standard and the second wavelength incident on the inline-compliant diffraction grating 64A is a wavelength for the DVD standard. The first wavelength is defined as a wavelength λ(cd) for the CD standard. The first wavelength λ(cd) is approximately 765 to 840 nm. The second wavelength is defined as a wavelength λ(dvd) for the DVD standard. The second wavelength λ(dvd) is approximately 630 to 685 nm.

For a case where the single first main beam and at least two first sub-beams are irradiated on the first optical disc D corresponding to the first wavelength light, Yp1 is defined as an interval Yp between an irradiation point Oa which is at a substantially central part of the spot 80 of the first main beam and an irradiation point Xb which is at a substantially central part of the spot 81 of the first sub-beam.

For a case where the single first main beam and at least two first sub-beams are irradiated on the first optical disc D corresponding to the first wavelength light, Yp1 is defined as an interval Yp between the irradiation point Oa which is at a substantially central part of the spot 80 of the first main beam and an irradiation point Xc which is at a substantially central part of the spot 82 of the first sub-beam.

For a case where the single second main beam and at least two second sub-beams are irradiated on the second optical disc D corresponding to the second wavelength light, Yp2 is defined as an interval Yp between an irradiation point Oa which is at a substantially central part of the spot 80 of the second main beam and an irradiation point Xb which is at a substantially central part of the spot 81 of the second sub-beam.

For a case where the single second main beam and at least two second sub-beams are irradiated on the second optical disc D corresponding to the second wavelength light, Yp2 is defined as an interval Yp between the irradiation point Oa which is at a substantially central part of the spot 80 of the second main beam and an irradiation point Xc which is at a substantially central part of the spot 82 of the second sub-beam.

Based on the definitions above, for example, the following equation (4) is assumed:

$$\frac{\lambda(cd)}{\lambda(dvd)} = \frac{Yp1}{Yp2} \qquad (4)$$

Assuming, for example, that the wavelength (first wavelength) $\lambda(cd)$ for the CD standard is approximately 765 nm, 765 is substituted into $\lambda(cd)$ in equation (4). Assuming, for example, that the wavelength (second wavelength) $\lambda(dvd)$ for the DVD standard is approximately 685 nm, 685 is substituted into $\lambda(dvd)$ in equation (4). Then, a value is derived as described in the following equation (5):

$$765/685=1.11679 \qquad (5).$$

Assuming that the wavelength (first wavelength) $\lambda(cd)$ for the CD standard is, for example, approximately 840 nm, 840 is substituted into $\lambda(cd)$ in equation (4). Assuming that the wavelength (second wavelength) $\lambda(dvd)$ for the DVD standard is approximately 630 nm, 630 is substituted into $\lambda(dvd)$ in equation (4). Then, a value is derived as described in the following equation (6):

$$840/630=1.33333 \qquad (6).$$

As described above, the optical pickup apparatus capable of emitting the first wavelength $\lambda(cd)$, which is the wavelength for the CD standard, and the second wavelength $\lambda(dvd)$, which is the wavelength for the DVD standard, is an optical pickup apparatus that satisfies, for example, the following equation (7):

$$1.05 < \frac{Yp1}{Yp2} < 1.35 \qquad (7)$$

Next, a case will be described in which the first wavelength incident on the inline-compliant diffraction grating 64A is a wavelength for the DVD standard and the second wavelength incident on the inline-compliant diffraction grating 64A is a wavelength for the BD standard. The first wavelength is assumed to be a wavelength $\lambda(dvd)$ for the DVD standard. The first wavelength $\lambda(dvd)$ is approximately 630 to 685 nm. Also, the second wavelength is assumed to be a wavelength $\lambda(bd)$ for the BD standard. The second wavelength $\lambda(bd)$ is approximately 340 to 450 nm. In this case, for example, the following equation (8) is assumed:

$$\frac{\lambda(dvd)}{\lambda(bd)} = \frac{Yp1}{Yp2} \qquad (8)$$

Assuming, for example, that the wavelength (first wavelength) $\lambda(dvd)$ for the DVD standard is approximately 630 nm, 630 is substituted into $\lambda(dvd)$ in equation (8). Assuming, for example, that the wavelength (second wavelength) $\lambda(bd)$ for the BD standard is approximately 450 nm, 450 is substituted into $\lambda(bd)$ in equation (8). Then, a value is derived as described in the following equation (9):

$$630/450=1.40000 \qquad (9)$$

Assuming, for example, that the wavelength (first wavelength) $\lambda(dvd)$ for the DVD standard is approximately 685 nm, 685 is substituted into $\lambda(dvd)$ in equation (8). Assuming, for example, that the wavelength (second wavelength) $\lambda(bd)$ for the BD standard is approximately 340 nm, 340 is substituted into $\lambda(bd)$ in equation (8). Then, a value is derived as described in the following equation (10):

$$685/340=2.01471 \qquad (10).$$

As described above, the optical pickup apparatus capable of emitting the first wavelength $\lambda(dvd)$, which is the wavelength for the DVD standard, and the second wavelength $\lambda(bd)$, which is the wavelength for the BD standard, is an optical pickup apparatus that satisfies the following equation (11), for example:

$$1.35 < \frac{Yp1}{Yp2} < 2.05 \qquad (11)$$

Next, a case will be described in which the first wavelength incident on the inline-compliant diffraction grating 64A is a wavelength for the CD standard and the second wavelength incident on the inline-compliant diffraction grating 64A is a wavelength for the BD standard. The first wavelength is a wavelength $\lambda(cd)$ for the CD standard. The first wavelength $\lambda(cd)$ is approximately 765 to 840 nm. Also, the second wavelength is a wavelength $\lambda(bd)$ for the BD standard. The second wavelength $\lambda(bd)$ is approximately 340 to 450 nm. In this case, for example the following equation (12) is assumed:

$$\frac{\lambda(cd)}{\lambda(bd)} = \frac{Yp1}{Yp2} \qquad (12)$$

Assuming, for example, that the wavelength (first wavelength) $\lambda(cd)$ for the CD standard is approximately 765 nm 765 is substituted into $\lambda(cd)$ in equation (12). Assuming, for example, that the wavelength (second wavelength) $\lambda(bd)$ for the BD standard is approximately 450 nm 450 is substituted into $\lambda(bd)$ in equation (12). Then, a value is derived as described in the following equation (13):

$$765/450=1.70000 \qquad (13).$$

Further, assuming, for example, that the wavelength (first wavelength) $\lambda(cd)$ for the CD standard is approximately 840 nm 840 is substituted into $\lambda(cd)$ in the equation (12). Assuming, for example that the wavelength (second wavelength) $\lambda(bd)$ for the BD standard is approximately 340 nm, 340 is substituted into $\lambda(bd)$ in the equation (12). Then, a value is derived as described in the following equation (14):

$$840/340=2.47059 \qquad (14).$$

As described above, the optical pickup apparatus capable of emitting the first wavelength λ(cd), which is the wavelength for the CD standard, and the second wavelength λ(bd), which is the wavelength for the BD standard, is an optical pickup apparatus that, for example, satisfies the following equation (15):

$$1.65 < \frac{Yp1}{Yp2} < 2.50 \quad (15)$$

<<Light Splitting Ratio Among Spots 80, 81, and 82 formed on Optical Disc D and Efficiency Ratio of Light Intensity of Spot 80 to the Total Sum of Light Intensities of Spots 80, 81, 82 formed on Optical Disc D>>

Referring to FIG. 5, for example, a light splitting ratio, which is an intensity ratio of lights of the spots 80, 81, and 82 formed on the optical disc D, and efficiency ratios A1 and A2 of the light of the main spot 80 will be described below.

First, for a case where the single main beam of the first wavelength light and at least two sub-beams of the first wavelength light are irradiated on the optical disc D conforming to the CD standard, a light efficiency ratio A1 is, for example, defined as the intensity of light of the main spot 80 produced on the optical disc D by the single main beam of the first wavelength light against the total sum of the intensity of the light of the main spot 80 produced on the optical disc D by the single main beam of the first wavelength light and the intensities of lights of the sub-spots 81 and 82 produced on the optical disc D by the at least two sub-beams of the first wavelength light.

For a case where the single main beam of the second wavelength light and at least two sub-beams of the second wavelength light are irradiated on the optical disc D conforming to the DVD standard, a light efficiency ratio A2, for example, is defined as the intensity of light of the main spot 80 produced on the optical disc D by the single main beam of the second wavelength light against the total sum of the intensity of the light of the main spot 80 produced on the optical disc D by the single main beam of the second wavelength light and the intensities of lights of the sub-spots 81 and 82 produced on the optical disc D by the at least two sub-beams of the second wavelength light.

First, the intensity of light irradiated on the optical disc D conforming to the DVD standard and the light splitting ratio and the like will be described. For example, the light splitting ratio among the preceding sub-spot 81 on the track D80 of the optical disc D conforming to the DVD standard, the main spot 80 on the track D80 of the optical disc D conforming to the DVD standard, and the following sub-spot 82 on the track D80 of the optical disc D conforming to the DVD standard is approximately 1:(16±1.6):1.

For example, the light splitting ratio among the preceding sub-spot 81 on the track D80 of the optical disc D conforming to the DVD standard, the main spot 80 on the track D80 of the optical disc D conforming to the DVD standard, and the following sub-spot 82 on the track D80 of the optical disc D conforming to the DVD standard is approximately 1:14.4:1.

In this case, the intensity of light of the sub-spot 81 or 82 on the optical disc D conforming to the DVD standard is approximately 1/16.4 of the total intensity of light irradiated on the optical disc D conforming to the DVD standard. In this case, the intensity of light of the main spot 80 on the optical disc D conforming to the DVD standard is approximately 14.4/16.4 of the total intensity of light irradiated on the optical disc D conforming to the DVD standard. That is, in this case, the light efficiency ratio A2 of the main spot 80 on the optical disc D conforming to the DVD standard is 0.87805.

Further, for example, the light splitting ratio among the preceding sub-spot 81 on the track D80 of the optical disc D conforming to the DVD standard, the main spot 80 on the track D80 of the optical disc D conforming to the DVD standard, and the following sub-spot 82 on the track D80 of the optical disc D conforming to the DVD standard is approximately 1:17.6:1.

The intensity of light of the sub-spot 81 or 82 on the optical disc D conforming to the DVD standard in this case is approximately 1/19.6 of the total intensity of light irradiated on the optical disc D conforming to the DVD standard. In this case, the intensity of light of the main spot 80 on the optical disc D conforming to the DVD standard is approximately 17.6/19.6 of the total intensity of light irradiated on the optical disc D conforming to the DVD standard. That is, in this case, the light efficiency ratio A2 of the main spot 80 on the optical disc D conforming to the DVD standard is 0.89796.

Specifically, for example, the light splitting ratio among the preceding sub-spot 81 on the track D80 of the optical disc D conforming to the DVD standard, the main spot 80 on the track D80 of the optical disc D conforming to the DVD standard, and the following sub-spot 82 on the track D80 of the optical disc D conforming to the DVD standard is approximately 1:16:1.

In this case, the intensity of light of the sub-spot 81 or 82 on the optical disc D conforming to the DVD standard is approximately 1/18 of the total intensity of light irradiated on the optical disc D conforming to the DVD standard. In this case, the intensity of light of the main spot 80 on the optical disc D conforming to the DVD standard is approximately 16/18 of the total intensity of light irradiated on the optical disc D conforming to the DVD standard. That is, in this case, the light efficiency ratio A2 of the main spot 80 on the optical disc D conforming to the DVD standard is 0.88889.

Depending on the design/specification and the like of the optical pickup apparatus, for example, the light splitting ratio among the preceding sub-spot 81 on the track D80 of the optical disc D conforming to the DVD standard, the main spot 80 on the track D80 of the optical disc D conforming to the DVD standard, and the following sub-spot 82 on the track D80 of the optical disc D conforming to the DVD standard is approximately 1:15:1.

In this case, the intensity of light of the sub-spot 81 or 82 on the optical disc D conforming to the DVD standard is approximately 1/17 of the total intensity of light irradiated on the optical disc D conforming to the DVD standard. In this case, the intensity of light of the main spot 80 on the optical disc D conforming to the DVD standard is approximately 15/17 of the total intensity of light irradiated on the optical disc D conforming to the DVD standard. That is, in this case, the light efficiency ratio A2 of the main spot 80 on the optical disc D conforming to the DVD standard is 0.88235.

Figure 28:
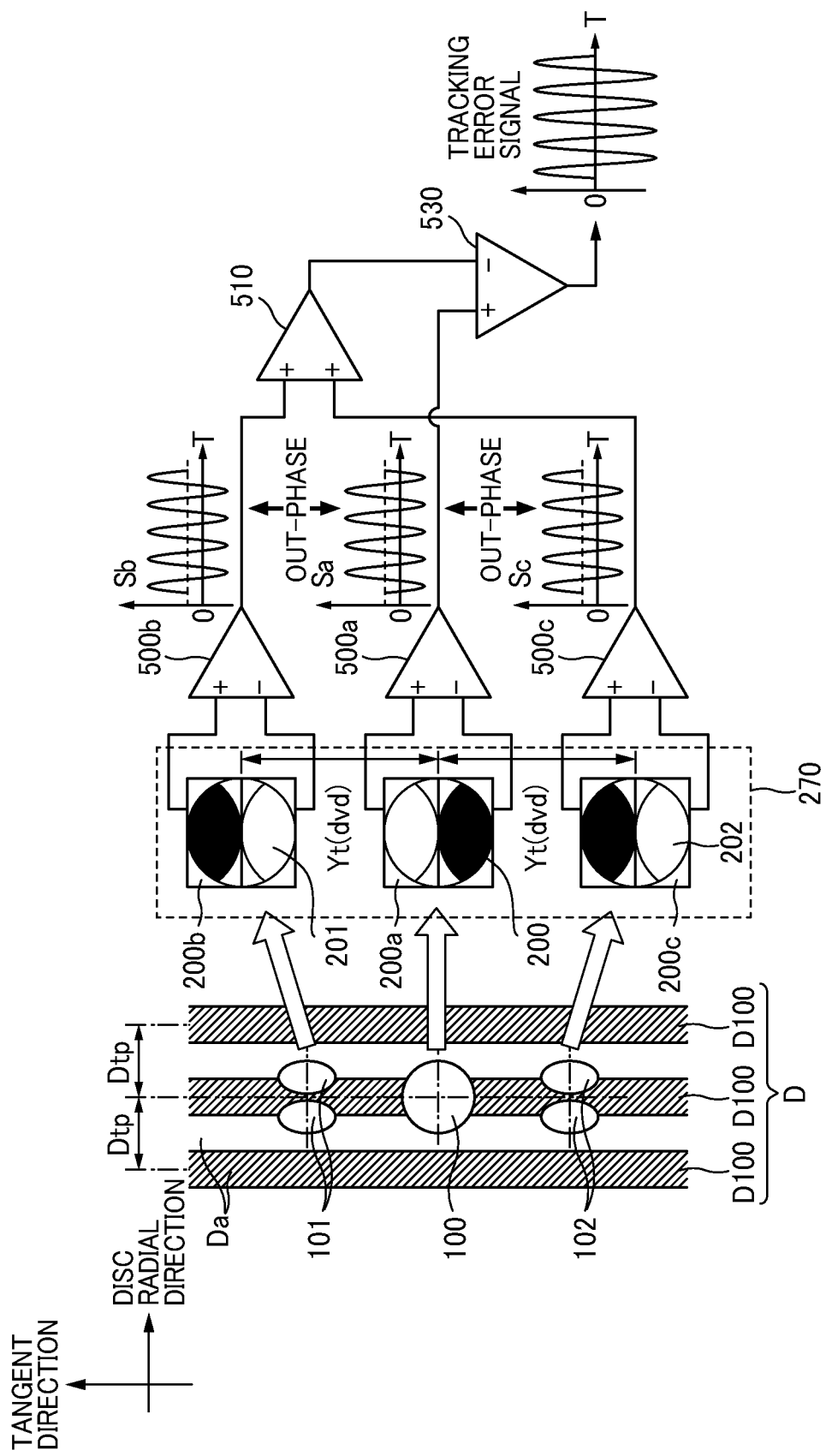
FIG. 28 is a diagram for explaining an inline method.

The light splitting ratio of the laser beams irradiated on the optical disc D conforming to the inline-method DVD standard shown in FIG. 5 is substantially the same as the light splitting ratio of the laser beams irradiated on the optical disc D conforming to the inline-method DVD standard shown in FIG. 28.

For example, the light splitting ratio among the preceding sub-spot 101 on the track D100 of the optical disc D conforming to the DVD standard, the main spot 100 on the track D100 of the optical disc D conforming to the DVD standard, and the following sub-spot 102 on the track D100 of the optical disc D conforming to the DVD standard is approximately 1:15:1.

In this case, the intensity of light of the sub-spot 101 or 102 on the optical disc D conforming to the DVD standard is approximately 1/17 of the total intensity of light irradiated on the optical disc D conforming to the DVD standard. In this case, the intensity of light of the main spot 100 on the optical disc D conforming to the DVD standard is approximately 15/17 of the total intensity of light irradiated on the optical disc D conforming to the DVD standard. That is, in this case, the light efficiency ratio A2 of the main spot 100 on the optical disc D conforming to the DVD standard is 0.88235.

Next, the intensity of light irradiated on the optical disc D conforming to the CD standard and the light splitting ratio and the like shown in FIG. 5 will be described. For example, the light splitting ratio among the preceding sub-spot 81 on the track D80 of the optical disc D conforming to the CD standard, the main spot 80 on the track D80 of the optical disc D conforming to the CD standard, and the following sub-spot 82 on the track D80 of the optical disc D conforming to the CD standard is approximately 1:(23±2.3):1.

For example, the light splitting ratio among the preceding sub-spot 81 on the track D80 of the optical disc D conforming to the CD standard, the main spot 80 on the track D80 of the optical disc D conforming to the CD standard, and the following sub-spot 82 on the track D80 of the optical disc D conforming to the CD standard is approximately 1:20.7:1.

In this case, the intensity of light of the sub-spot 81 or 82 on the optical disc D conforming to the CD standard is approximately 1/22.7 of the total intensity of light irradiated on the optical disc D conforming to the CD standard. In this case, the intensity of light of the main spot 80 on the optical disc D conforming to the CD standard is approximately 20.7/22.7 of the total intensity of light irradiated on the optical disc D conforming to the CD standard. That is, in this case, the light efficiency ratio A1 of the main spot 80 on the optical disc D conforming to the CD standard is 0.91189.

Also, for example, the light splitting ratio among the preceding sub-spot 81 on the track D80 of the optical disc D conforming to the CD standard, the main spot 80 on the track D80 of the optical disc D conforming to the CD standard, and the following sub-spot 82 on the track D80 of the optical disc D conforming to the CD standard is approximately 1:25.3:1.

In this case, the intensity of light of the sub-spot 81 or 82 on the optical disc D conforming to the CD standard is approximately 1/27.3 of the total intensity of light irradiated on the optical disc D conforming to the CD standard. In this case, the intensity of light of the main spot 80 on the optical disc D conforming to the CD standard is approximately 25.3/27.3 of the total intensity of light irradiated on the optical disc D conforming to the CD standard. That is, in this case, the light efficiency ratio A1 of the main spot 80 on the optical disc D conforming to the CD standard is 0.92674.

Specifically, for example, the light splitting ratio among the preceding sub-spot 81 on the track D80 of the optical disc D conforming to the CD standard, the main spot 80 on the track D80 of the optical disc D conforming to the CD standard, and the following sub-spot 82 on the track D80 of the optical disc D conforming to the CD standard is approximately 1:23:1.

In this case, the intensity of light of the sub-spot 81 or 82 on the optical disc D conforming to the CD standard is approximately 1/25 of the total intensity of light irradiated on the optical disc D conforming to the CD standard. In this case, the intensity of light of the main spot 80 on the optical disc D conforming to the CD standard is approximately 23/25 of the total intensity of light irradiated on the optical disc D conforming to the CD standard. That is, in this case, the light efficiency ratio A1 of the main spot 80 on the optical disc D conforming to the CD standard is 0.92000.

Figure 27:
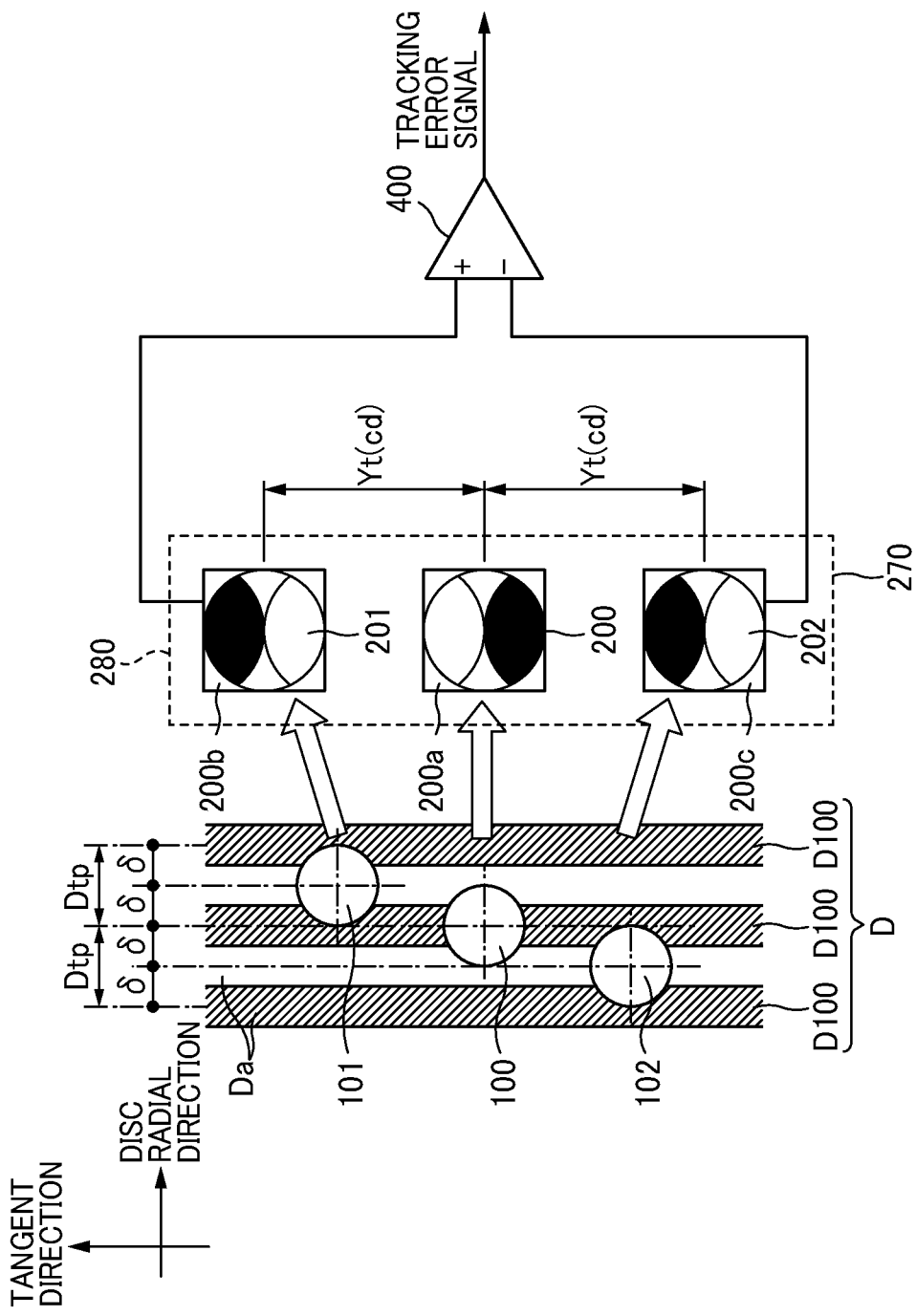
FIG. 27 is a diagram for explaining a three-beam method.

The light splitting ratio of the laser beams irradiated on the optical disc D conforming to the inline-method CD standard shown in FIG. 5 is different from the light splitting ratio of the laser beams irradiated on the optical disc D conforming to the three-beam method CD standard shown in FIG. 27.

For example, the light splitting ratio among the preceding sub-spot 101 on the track D100 of the optical disc D conforming to the CD standard, the main spot 100 on the track D100 of the optical disc D conforming to the CD standard, and the following sub-spot 102 on the track D100 of the optical disc D conforming to the CD standard is approximately 1:16:1.

In this case, the intensity of light of the sub-spot 101 or 102 on the optical disc D conforming to the CD standard is approximately 1/18 of the total intensity of light irradiated on the optical disc D conforming to the CD standard. In this case, the intensity of light in the main spot 100 on the optical disc D conforming to the CD standard is approximately 16/18 of the total intensity of light irradiated on the optical disc D conforming to the CD standard. That is, in this case, the light efficiency ratio A1 of the main spot 100 on the optical disc D conforming to the CD standard is 0.88889.

In a case where the optical pickup apparatus includes the diffraction grating 64A which does not have a diffraction grating portion corresponding to the laser beam for CD, when the laser beams for CD having passed through the diffraction grating 64A are irradiated on the optical disc D conforming to the CD standard, the light splitting ratio of laser beams irradiated on the optical disc D conforming to the CD standard is changed.

Further, depending on the design/specification and the like of the optical pickup apparatus, the light splitting ratio among the preceding sub-spot 81 on the track D80 of the optical disc D conforming to the CD standard, the main spot 80 on the track D80 of the optical disc D conforming to the CD standard, and the following sub-spot 82 on the track D80 of the optical disc D conforming to the CD standard may be, for example, approximately 1:23.5:1.

In this case, the intensity of light of the sub-spot 81 or 82 on the optical disc D conforming to the CD standard is approximately 1/25.5 of the total intensity of light irradiated on the optical disc D conforming to the CD standard. In this case, the intensity of light of the main spot 80 on the optical disc D conforming to the CD standard is approximately 23.5/25.5 of the total intensity of light irradiated on the optical disc D conforming to the CD standard. That is, in this case, the light efficiency ratio A1 of the main spot 80 on the optical disc D conforming to the CD standard is 0.92157.

Further, depending on the design/specification and the like of the optical pickup apparatus, the light splitting ratio among the preceding sub-spot 81 on the track D80 of the optical disc D conforming to the CD standard, the main spot 80 on the track D80 of the optical disc D conforming to the CD standard, and the following sub-spot 82 on the track D80 of the optical disc D conforming to the CD standard may be, for example, approximately 1:20:1.

In this case, the intensity of light of the sub-spot 81 or 82 on the optical disc D conforming to the CD standard is approximately 1/22 of the total intensity of light irradiated on the optical disc D conforming to the CD standard. In this case, the intensity of light of the main spot 80 on the optical disc D conforming to the CD standard is approximately 20/22 of the total intensity of light irradiated on the optical disc D conforming to the CD standard. That is, in this case, the light efficiency ratio A1 of the main spot 80 on the optical disc D conforming to the CD standard is 0.90909.

Further, depending on the design/specification and the like of the optical pickup apparatus, the light splitting ratio among the preceding sub-spot 81 on the track D80 of the optical disc D conforming to the CD standard, the main spot 80 on the track D80 of the optical disc D conforming to the CD standard, and the following sub-spot 82 on the track D80 of the optical disc D conforming to the CD standard may be, for example, approximately 1:26:1.

In this case, the intensity of light of the sub-spot 81 or 82 on the optical disc D conforming to the CD standard is approximately 1/28 of the total intensity of light irradiated on the optical disc D conforming to the CD standard. In this case, the intensity of light of the main spot 80 on the optical disc D conforming to the CD standard is approximately 26/28 of the total intensity of light irradiated on the optical disc D conforming to the CD standard. That is, in this case, the light efficiency ratio A1 of the main spot 80 on the optical disc D conforming to the CD standard is 0.92857.

<<Diffraction Grating 64A and Photodetector 73A>>

Referring to FIGS. 4 and 5, the diffraction grating 64A and the photodetector 73A will be described below.

Figure 29:
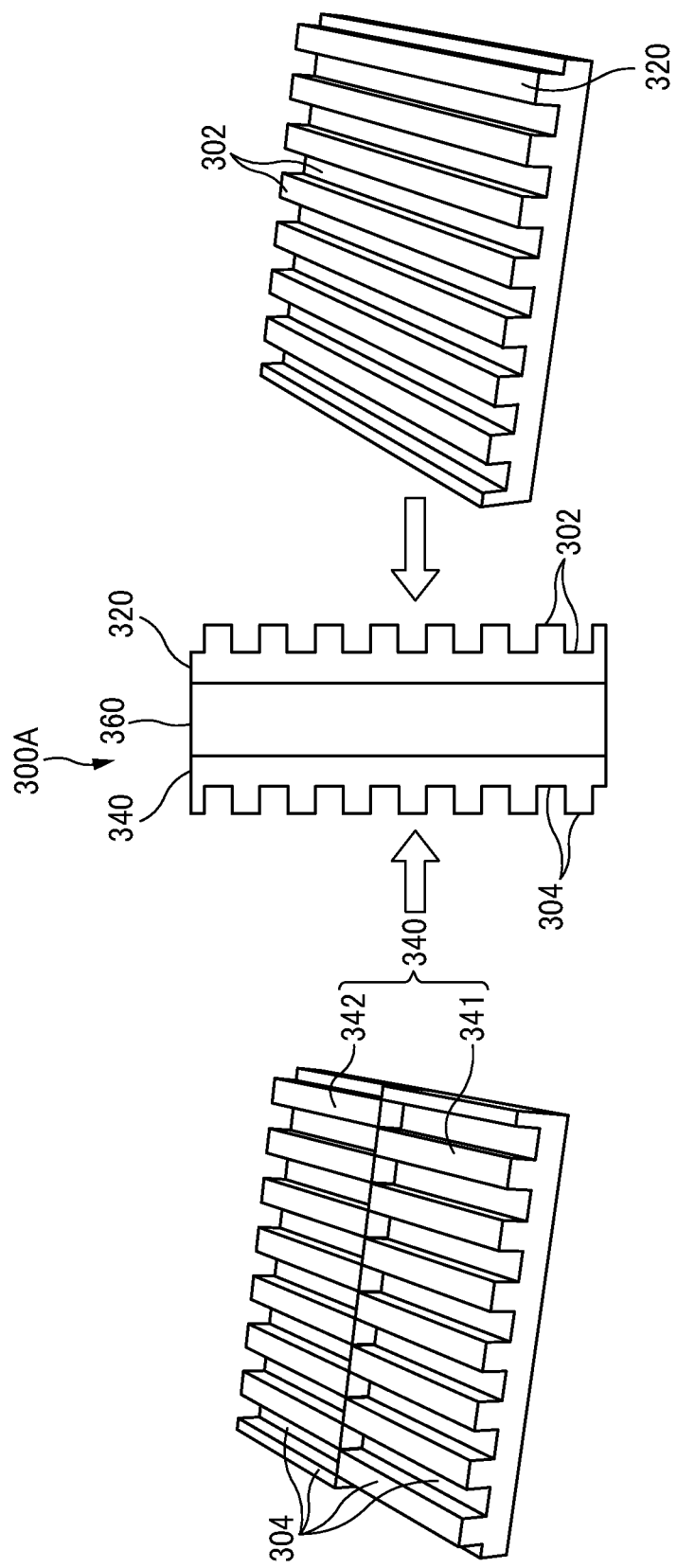
FIG. 29 is a diagram for explaining a two-wavelength diffraction grating.
Figure 30:
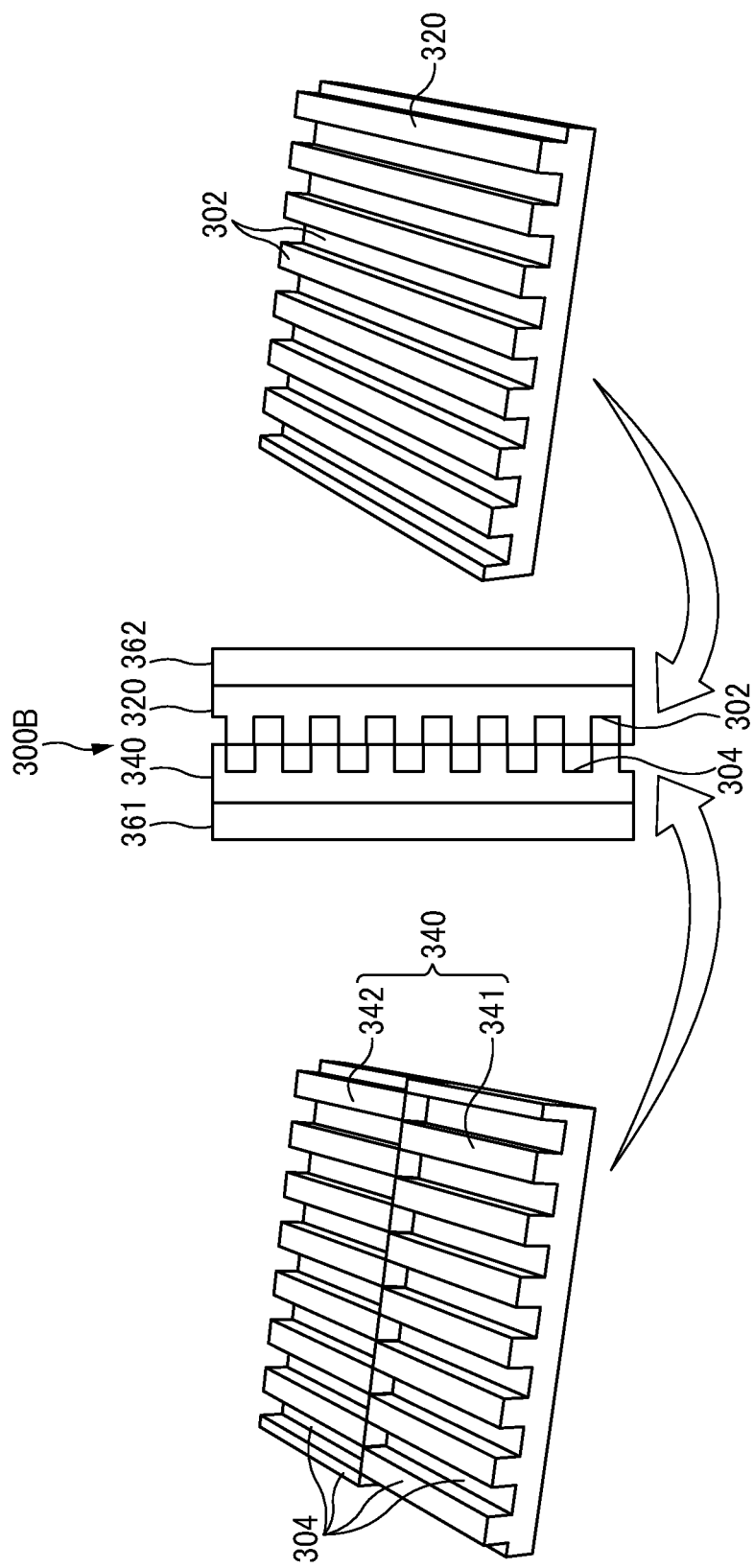
FIG. 30 is a diagram for explaining another two-wavelength diffraction grating.

In the two-wavelength diffraction gratings 300A and 300B provided with both the diffraction grating portion 320 for CD (FIGS. 29 and 30) and the diffraction grating portion 340 for DVD, as the result of transmission of the first laser beam compliant with the CD standard or the second laser beam compliant with the DVD standard through both the diffraction grating portion 320 for CD and the diffraction grating portion 340 for DVD, there is a drawback of an occurrence of unnecessary diffraction light. In order to obviate such occurrence of unnecessary diffraction light, the diffraction grating 64A (FIG. 4) only includes the single-wavelength diffraction grating portion 20 compliant with the DVD standard.

Specifically, the diffraction grating 64A is, as shown on the left side in FIG. 4, configured as a diffraction grating member 20 for DVD in which a phase of a periodic structure of a grating groove formed in one half plane 21 is shifted by approximately 180 degrees with respect to a phase of a periodic structure of the grating groove formed in the other half plane 22. The optical layout of the diffraction grating 64A complies with the inline method, and as shown in FIG. 5, is adjusted in such a manner that the main spot 80 based on the main beam of the first or second laser beam and the sub-spots 81 and 82 based on the sub-beam of the first or second laser beam irradiated on the optical disc D are formed on the same track D80 substantially in a single row in a substantially parallel or inclined state.

By adopting the configuration of the diffraction grating 64A including only the diffraction grating member 20 for DVD and the optical layout thereof as above, as described above, unnecessary diffraction light is suppressed, and tracking error signals SE1 and SE2 based on the inline method can be detected appropriately. Specifically, as shown in FIG. 5, in the case of the second laser beam compliant with the DVD standard, the detection of the tracking error signal SE2 is performed in a manner described below.

For example, if the second laser beam compliant with the DVD standard is irradiated on the optical disc D, the detection of the tracking error signal SE2 is performed as below.

In a case where the main beam for DVD forming the detection light spot 80 conforming to the DVD standard is reflected from the signal layer Da of the optical disc D and irradiated on a main-light-receiving portion 75A in the second light receiving region 75, for example, a DVD light receiving region 75, of the photodetector 73A as a main-detection-light spot 90ii, a subtractor connected to the main-light-receiving portion 75A calculates a difference between output signals from the main-light-receiving portion 75A, and generates a main-push-pull signal SA2, for example.

Further, in a case where the first sub-beam for DVD forming the first sub-detection-light spot 81 conforming to the DVD standard is reflected from the signal layer Da of the optical disc D and irradiated on one second sub-light-receiving portion 75B in the DVD light receiving region 75 of the photodetector 73A as a first sub-detection-light spot 91ii, the subtractor connected to the one of the second sub-light-receiving portions 75B calculates a difference between output signals from the one second sub-light-receiving portion 75B, and generates a preceding sub-push-pull signal SB2, for example.

Further, in a case where the second sub-beam for DVD forming the second sub-detection-light spot 82 conforming to the DVD standard is reflected from the signal layer Da of the optical disc D, and irradiated on the other second sub-light-receiving portion 75C in the DVD light receiving region 75 of the photodetector 73A as a second sub-detection-light spot 92ii, the subtractor connected to the other second sub-light-receiving portion 75C calculates a difference between output signals from the other second sub-light-receiving portion 75C, and generates a lagging sub-push-pull signal SC2, for example.

The push-pull signal SA2 detected from the main-detection-light spot 90ii corresponding to the main spot 80 and the push-pull signals SB2 and SC2 detected from the sub-detection-light spots 91ii and 92ii corresponding to the sub-spots 81 and 82, respectively, are outputted in opposite phases to each other. Thereafter, the push-pull signals SB2 and SC2 are added by an adder 78C, the added signal SD2 is amplified by an amplifier 78B and then subjected to a subtraction process by a subtractor 78A with respect to the push-pull signal SA2, whereby a tracking error signal SE2 with a high accuracy in which each offset component of the push-pull signals SA2, SB2, and SC2 is canceled out can be generated.

On the other hand, even if the first laser beam compliant with the CD standard is irradiated on the optical disc D, the detection of the tracking error signal SE1 is performed as follows.

In a case where the main beam for CD forming the detection light spot 80 conforming to the CD standard is reflected from the signal layer Da of the optical disc D, and irradiated on a main-light-receiving portion 74A in the first light receiving region 74 or, for example, a CD light receiving region 74, of the photodetector 73A as a main-detection-light spot 90i, a subtractor connected to the main-light-receiving portion 74A calculates a difference between output signals from the main-light-receiving portion 74A, and generates a main-push-pull signal SA1, for example.

Further, in a case where the first sub-beam for CD forming the first sub-detection-light spot 81 conforming to the CD standard is reflected from the signal layer Da of the optical disc D and irradiated on one of the first sub-light-receiving portions 74B in the CD light receiving region 74 of the photodetector 73A as a first sub-detection-light spot 91i, the subtractor connected to the one first sub-light-receiving portion 74B calculates a difference between output signals from the one first sub-light-receiving portion 74B, and generates a preceding sub-push-pull signal SB1, for example.

Further, in a case where the second sub-beam for CD forming the second sub-detection-light spot 82 conforming to the CD standard is reflected from the signal layer Da of the optical disc D and irradiated on the other first sub-light-receiving portion 74C in the CD light receiving region 74 of the photodetector 73A as a second sub-detection-light spot 92i, the subtractor connected to the other first sub-light-receiving portion 74C calculates a difference between output signals from the other first sub-light-receiving portion 74C, and generates a lagging sub-push-pull signal SC1, for example.

The push-pull signal SA1 detected from the main-detection-light spot 90*i* corresponding to the main spot 80 and the push-pull signals SB1 and SC1 detected from the sub-detection-light spots 91*i* and 92*i* corresponding to the sub-spots 81 and 82, respectively, are outputted in opposite phases to each other. Thereafter, the push-pull signals SB1 and SC1 are added by the adder 78C, an added signal SD1 is amplified by the amplifier 78B and then, the push-pull signal SA1 is subjected to a subtraction process by the subtractor 78A, whereby a tracking error signal SE1 with a high accuracy in which respective offset component of the push-pull signals SA1, SB1, and SC1 are canceled out can be generated.

The signal generated by the photodetector 73A of the optical pickup apparatus is sent to an operation unit 76A of a board (not shown) of the optical disc device connected in an electrically conducting manner to the optical pickup apparatus, for example, and calculated, and a signal generated by the operation unit 76A of the board of the optical disc device is sent to an objective-lens driving unit 79 of the optical pickup apparatus. When an electric signal flowing through the objective-lens driving unit 79 of the optical pickup apparatus, the objective lens 70 of the optical pickup apparatus is moved. The tracking error signals SE1 and SE2 generated by the operation unit 76A are sent to the objective-lens driving unit 79, and tracking adjustment of the objective lens 70 with respect to the track D80 of the optical disc D is automatically performed.

However, the diffraction grating 64A only includes the diffraction grating member 20 for DVD conforming to the second wavelength, which is the second laser beam compliant with the DVD standard, for example, and is not adapted to the first wavelength, which is the first laser beam compliant with the CD standard. Thus, an interval (hereinafter referred to as main-sub pitch) between the main-detection-light spot 90*i* and the sub-detection-light spots 91*i* and 92*i* obtained by diffracting and branching the first laser beam compliant with the CD standard with the diffraction grating 64A has a size inversely proportional to a wavelength to which the diffraction grating 64A corresponds, and it is enlarged as compared to the main-sub pitch for a case in which diffraction and branching is performed by the diffraction grating for CD which should have been used. Also, as the result of enlargement of the main-sub pitch, the light splitting ratio among the main-detection-light spot 90*i* and the sub-detection-light spots 91*i* and 92*i* will also be changed.

Figure 7:
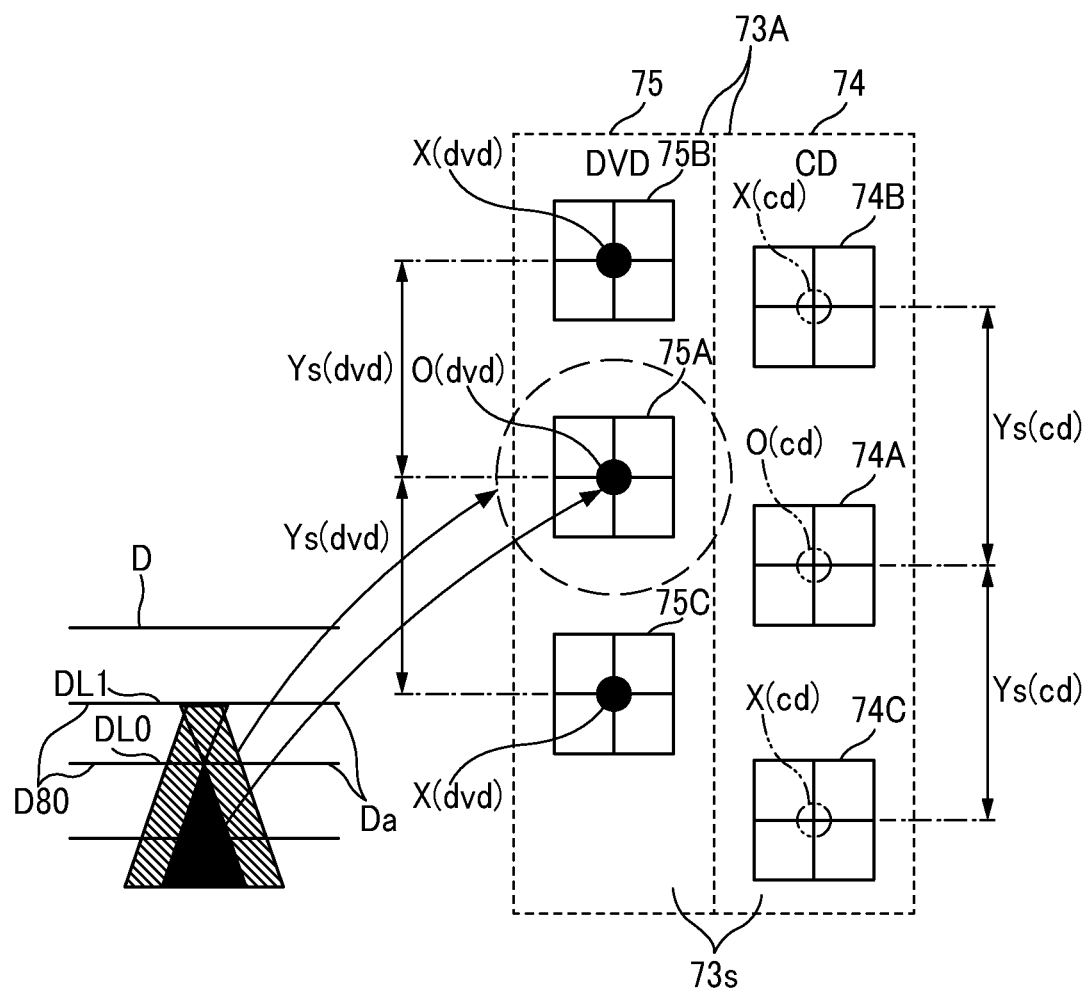
FIG. 7 is a diagram for explaining a light receiving region of a photodetector according to the embodiment of the present invention.

Thus, as shown in FIGS. 5 and 7, in the photodetector 73A, it is necessary to appropriately set a light receiving interval Ys (dvd) between the second main-light-receiving portion 75A that receives the main-detection-light spot 90*ii* and the one second sub-light-receiving portion 75B that receives the one sub-detection-light spot 91*ii* and a light receiving interval Ys (dvd) between the second main-light-receiving portion 75*a* that receives the main-detection-light spot 90*ii* and the other second sub-light-receiving portion 75C that receives the other sub-detection-light spot 92*ii* and/or a light receiving interval Ys (cd) between the first main-light-receiving portion 74A that receives the main-detection-light spot 90*i* and the one first sub-light-receiving portion 74B that receives the one sub-detection-light spot 91*i* and a light receiving interval Ys (cd) between the first main-light-receiving portion 74*a* that receives the main-detection-light spot 90*i* and the other first sub-light-receiving portion 74C that receives the other sub-detection-light spot 92*i*, to match the main-sub pitch corresponding to the respective laser beams.

<<Photodetector 73A and Operation Unit 76A>>

The photodetector 73A and the operation unit 76A will be described below with reference to FIGS. 5 and 6.

Figure 6:
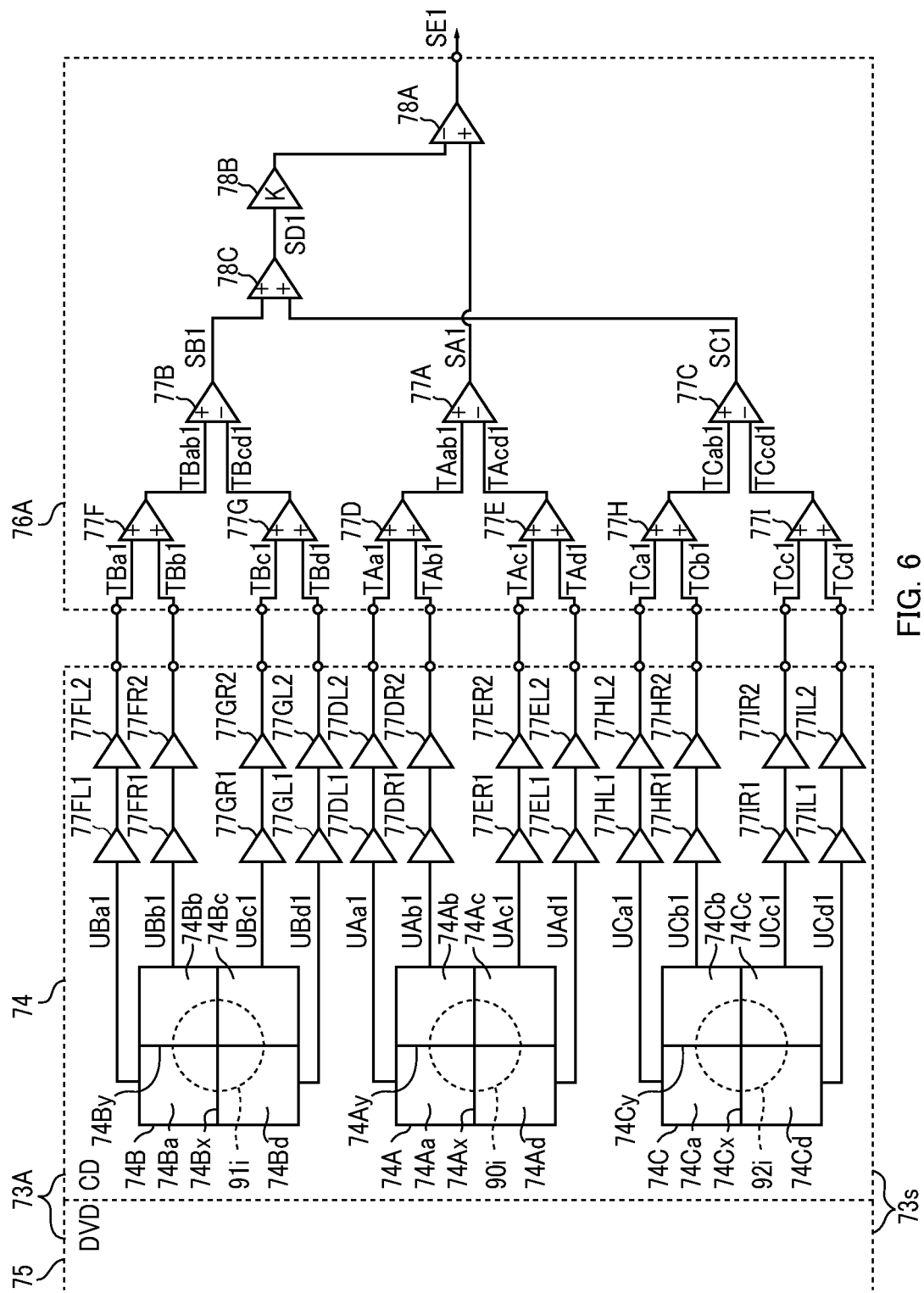
FIG. 6 is a diagram illustrating an entire configuration of a calculation processing circuit according to the embodiment of the present invention.

FIG. 6 is a calculation process circuit diagram illustrating an exemplary overall configuration of the operation unit 76A that generates the tracking error signal SE1 based on a light receiving result of the photodetector 73A.

The optical pickup apparatus includes the photodetector 73A having the first light receiving region 74 and the second light receiving region 75 with the first light receiving region 74 being provided with a single first main-light-receiving portion 74A on which a single first main beam is irradiated and two first sub-light-receiving portions 74B and 74C on which two first sub-beams are irradiated and the second light receiving region 75 being provided with a single second main-light-receiving portion 75A on which a single second main beam is irradiated and two second sub-light-receiving portions 75B and 75C on which two second sub-beams are irradiated.

The first light receiving region 74 for use in recording/reproduction of the CD-standard optical disc D or, for example, the CD light receiving region 74, and the second light receiving region 75 for use in recording/reproduction of the DVD-standard optical disc D or, for example, the DVD light receiving region 75, are arranged on the same light receiving surface portion 73*s* of the photodetector 73A.

The CD light receiving region 74 is, for example, formed on the photodetector 73A with the main-light-receiving portion 74A and the sub-light-receiving portions 74B and 74C for CD being arranged vertically, each light receiving portion including four light detection surface portions by being split into four with two dividing lines orthogonal to each other in a substantially crossed-shape. Reflection laser beams of the 0th-order diffraction laser beam, +1st order diffraction laser beam, and the −1st order diffraction laser beam, respectively, reflected by the optical disc D conforming to the CD standard are received by the main-light-receiving portion 74A and the sub-light-receiving portions 74B and 74C for CD. The CD light receiving region 74 of the photodetector 73A receives, for example, the laser beam conforming to the CD standard and with astigmatism generated by an astigmatic difference generating optical system. Dividing lines 74Ax and 74Ay of the main-light-receiving portion 74A and dividing lines 74Bx and 74By, 74Cx and 74Cy of the sub-light-receiving portions 74B and 74C, respectively, for CD of the photodetector 73A are set, respectively, so as to form an angle of approximately 45° with respect to a direction in which astigmatism is generated in the received laser beam.

The DVD light receiving region 75 is, for example, formed on the photodetector 73A with the main-light-receiving portion 75A and the sub-light-receiving portions 75B and 75C for DVD being arranged vertically, each light receiving portion including configured by four light detection surface portions by being divided into four with two dividing lines orthogonal to each other in a substantially crossed shape. Reflection laser beams of the 0th-order diffraction laser beam, +1st order diffraction laser beam, and the −1st order diffraction laser beam, respectively, reflected by the optical disc D conforming to the DVD standard are received by the main-light-receiving portion 75A and the sub-light-receiving portions 75B and 75C for DVD. The DVD light receiving region 75 of the photodetector 73A receives, for example, the laser beam conforming to the DVD standard and with astigmatism generated by an astigmatic difference generating optical system. Dividing lines 75Ax and 75Ay of the mainlight-receiving portion 75A and dividing lines 75Bx and 75By, 75Cx and 75Cy of the sub-light-receiving portions 75B and 75C, respectively, for DVD of the photodetector 73A are set, respectively, so as to form an angle of approximately 45° with respect to the direction of generation of astigmatism in the received laser beam.

The operation unit 76A of the optical disc device includes seven adders 77D, 77E, 77F, 77G, 77H, 77I, and 78C, four subtractors 77A, 77B, 77C, and 78A, and an amplifier 78B. The adders 77D and 77E and the subtractor 77A are those forming the operation unit 76A and are provided in the operation unit 76A to generate the signal SA1 which corresponds to the light amount of the 0th-order reflection light and which serves as a basis for the tracking error signal SE1. The adders 77F and 77G and the subtractor 77B those forming the operation unit 76A and are provided in the operation unit 76A to generate the signal SB1 which corresponds to the light amount of the +1st order reflection light and which serves as a basis for the tracking error signal SE1. The adders 77H and 77I and the subtractor 77C are those forming the operation unit 76A and are provided in the operation unit 76A to generate the signal SC1 which corresponds to the light amount of the −1st order reflection light and which serves as a basis for the tracking error signal SE1. The subtractors 77A, 77B, 77C, and 78A may be, for example, differential amplifiers 77A, 77B, 77C, and 78A. The amplifier 78B may be, for example, an amplifying amp 78B.

The photodetector 73A constituting the optical pickup apparatus is connected to the operation unit 76A of the board constituting the optical disc device in an electrically conductive manner. A signal generated by the photodetector 73A of the optical pickup apparatus is sent to the operation unit 76A of the optical disc device via a connector, a flexible circuit board (not shown) and the like. In more detail, the photodetector 73A constituting the optical pickup apparatus and the like and the operation unit 76A constituting the board of the optical disc device and the like are connected in an electrically conductive manner via each conductor portion of a flexible circuit board such as a flexible printed circuit (FPC: Flexible Printed Circuit/Flexible Printed Cable), a flexible flat circuit (FFC: Flexible Flat Circuit/flexible Flat Cable) and the like, which are circuit boards (none of them is shown), or a connector provided with a terminal to be connected to each conductor portion of the flexible circuit board.

In order that various electronic components and various electric components are soldered and connected in an electrically conductive manner to an FPC, a base portion of the FPC is made of a heat-resistant synthetic polymer such as polyimide resin with excellent heat resistance. Polyimide is abbreviated as "PI", for example. The FPC is configured in such a manner that, by printing a plurality of circuit conductor portions on an insulating sheet made of aromatic heat-resistant resin such as wholly aromatic polyimide resin or the like, pieces of metal foil such as a copper foil, for example, are provided side by side on the insulating sheet and a transparent or translucent protective layer made of aromatic heat-resistant resin such as wholly aromatic polyimide resin or the like are provided on top of it, for example. The FPC is, for example, formed as a sheet object in a substantially flexible thin band shape.

With the use of the FPC provided with the insulation sheet and/or the protective layer made of aromatic heat-resistant resin such as wholly aromatic polyimide resin, an improved soldering is achieved between the FPCs. Further, an improved soldering of various electronic components, various electric components and the like to the FPC is achieved. The FPC is configured, for example, as a standardized FPC that can be used for other optical pickup apparatuses in common.

In the CD light receiving region 74 of the photodetector 73A constituting the optical pickup apparatus, the first main-light-receiving portion 74A and two first sub-light-receiving portions 74B and 74C are formed in such a manner that they correspond respectively to the three beams obtained by diffracting and branching the first laser beam compliant with the CD standard by the diffraction grating 64A, or more specifically, the main beam (0th order light) and two sub-beams (±1st order diffraction light fluxes) arranged front and rear of the main beam. The front-side first sub-light-receiving portion is provided adjacent to the first main-light-receiving portion and the rear-side first sub-light-receiving portion is provided adjacent at a position opposite to the front-side first sub-light-receiving portion. The first main-light-receiving portion and the front-side and the rear-side first sub-light-receiving portions are arranged in a row. Definitions of the terms "front" and "rear" in this application are definitions for convenience. The first main-light-receiving portion 74A and first sub-light-receiving portions 74B and 74C are each divided into four and includes four light detection surface portions, respectively.

In more detail, the first main-light-receiving portion 74A at the center in a substantially rectangular shape of the CD light receiving region 74 is divided into four by two dividing lines 74Ax and 74Ay substantially orthogonal to each other and includes four substantially rectangular light detection surface portions 74Aa, 74Ab, 74Ac, and 74Ad, or so-called segments 74Aa, 74Ab, 74Ac, and 74Ad. The term "segment" here means one of those, for example, such as a part or a piece, divided from an entirety. The first main-light-receiving portion 74A at the center in a substantially rectangular shape of the CD light receiving region 74 includes the substantially rectangular first main segment 74Aa, the substantially rectangular second main segment 74Ab adjacent to the first main segment 74Aa, the substantially rectangular third main segment 74Ac adjacent to the second main segment 74Ab, and the substantially rectangular fourth main segment 74Ad adjacent to the third main segment 74Ac, and the first main segment 74Aa is adjacent to the fourth main segment 74Ad. The first main-light-receiving portion 74A at the center of the CD light receiving region 74 has a substantially square shape.

The CD light receiving region 74 of the photodetector 73A is provided with the central main-light-receiving portion 74A, current/voltage conversion amplifiers 77DL1, 77DR1, 77ER1, and 77EL1 that convert light reception output signals UAa1, UAb1, UAc1, and UAd1 from the segments 74Aa, 74Ab, 74Ac, and 74Ad of the central main-light-receiving portion 74A from current signals into voltage signals and also amplify them, respectively, and subsequent-stage amplifiers 77DL2, 77DR2, 77ER2, and 77EL2 that further amplify the signals which have been converted into the voltage signals and amplified by the current/voltage conversion amplifiers 77DL1, 77DR1, 77ER1, and, 77EL1 respectively.

The subtractor 77A constitutes the operation unit 76A calculates a difference, {(TAa1+TAb1)−(TAc1+TAd1)}, i.e., (TAab1−TAcd1), between output signals from, for example, upper and lower pairs of segments 74Aa and 74Ab, and 74Ac and 74Ad constituting the central first main-light-receiving portion 74A in the CD light receiving region 74 of the photodetector 73A and generates the main-push-pull signal SA1.

The front-side first sub-light-receiving portion 74B having a substantially rectangular shape of the CD light receiving region 74 is divided into four with the two dividing lines 74Bx and 74By substantially orthogonal to each other and includes four substantially rectangular light detection surface portions 74Ba, 74Bb, 74Bc, and 74Bd, or so-called segments 74Ba, 74Bb, 74Bc, and 74Bd. The front-side first sub-light-receiving portion 74B in a substantially rectangular shape of the CD light receiving region 74 includes the substantially rectangular first sub segment 74Ba, the substantially rectangular second sub segment 74Bb adjacent to the first sub segment 74Ba, the substantially rectangular third sub segment 74Bc adjacent to the second sub segment 74Bb, and the substantially rectangular fourth sub segment 74Bd adjacent to the third sub segment 74Bc, and the first sub segment 74Ba is adjacent to the fourth sub segment 74Bd. The front-side first sub-light-receiving portion 74B of the CD light receiving region 74 is configured in a substantially square shape.

The CD light receiving region 74 of the photodetector 73A is provided with the front-side sub-light-receiving portion 74B, current/voltage conversion amplifiers 77FL1, 77FR1, 77GR1, and 77GL1 that convert light reception output signals UBa1, UBb1, UBc1, and UBd1 from the segments 74Ba, 74Bb, 74Bc, and 74Bd of the front-side sub-light-receiving portion 74B from current signals into voltage signals and also amplify them, respectively, and subsequent-stage amplifiers 77FL2, 77FR2, 77GR2, and 77GL2 that further amplify the signals which have been converted and amplified by the current/voltage conversion amplifiers 77FL1, 77FR1, 77GR1, and 77GL1 into the voltage signals, respectively.

The subtractor 77B that constitutes the operation unit 76A calculates a difference, {(TBa1+TBb1)−(TBc1+TBd1)}, i.e., (TBab1−TBcd1), between output signals from, for example, upper and lower pairs of segments 74Ba and 74Bb, and 74Bc and 74Bd constituting the front-side first sub-light-receiving portion 74B in the CD light receiving region 74 of the photodetector 73A and generates the preceding sub-push-pull signal SB1.

The rear-side first sub-light-receiving portion 74C having a substantially rectangular shape of the CD light receiving region 74 is divided into four with the two dividing lines 74Cx and 74Cy substantially orthogonal to each other and includes four substantially rectangular light detection surface portions 74Ca, 74Cb, 74Cc, and 74Cd, or so-called segments 74Ca, 74Cb, 74Cc, and 74Cd. The rear-side first sub-light-receiving portion 74C in a substantially rectangular shape of the CD light receiving region 74 includes the substantially rectangular first sub segment 74Ca, the substantially rectangular second sub segment 74Cb adjacent to the first sub segment 74Ca, the substantially rectangular third sub segment 74Cc adjacent to the second sub segment 74Cb, and the substantially rectangular fourth sub segment 74Cd adjacent to the third sub segment 74Cc, and the first sub segment 74Ca is adjacent to the fourth sub segment 74Cd. The rear-side first sub-light-receiving portion 74C of the CD light receiving region 74 is configured in a substantially square shape.

The CD light receiving region 74 of the photodetector 73A is provided with the rear-side sub-light-receiving portion 74C, current/voltage conversion amplifiers 77HL1, 77HR1, 77IR1, and 77IL1 that convert light reception output signals UCa1, UCb1, UCc1, and UCd1 from the segments 74Ca, 74Cb, 74Cc, and 74Cd of the rear-side sub-light-receiving portion 74C from current signals to voltage signals and also amplify them, respectively, and subsequent-stage amplifiers 77HL2, 77HR2, 77IR2, and 77IL2 that further amplify the signals which have been converted and amplified by the current/voltage conversion amplifiers 77HL1, 77HR1, 77IR1, and 77IL1 into the voltage signals, respectively.

The subtractor 77C that constitutes the operation unit 76A calculates a difference, {(TCa1+TCb1)−(TCc1+TCd1)}, i.e., (TCab1−TCcd1), between output signals from, for example, upper and lower pairs of segments 74Ca and 74Cb, and 74Cc and 74Cd constituting the rear-side first sub-light-receiving portion 74C in the CD light receiving region 74 of the photodetector 73A and generates the lagging sub-push-pull signal SC1.

The preceding sub-push-pull signal SB1, which is an output signal of the subtractor 77B, and the lagging sub-push-pull signal SC1, which is an output signal of the subtractor 77C, are inputted into the adder 78C. The adder 78C carries out an addition operation on these signals (SB1+SC1) and generates the added sub-push-pull signal SD1. The added sub-push-pull signal SD1, which is an output signal of the adder 78C, is inputted into the amplifier 78B. The amplifier 78B amplifies the added sub-push-pull signal SD1 to a signal level equivalent to that of the main-push-pull signal SA1 by, for example, an amplification factor K. The output signal of the subtractor 77A and the output signal of the amplifier 78B are inputted into the subtractor 78A. The subtractor 78A calculates a difference between the main-push-pull signal SA1 and a signal obtained by amplifying the added sub-push-pull signal SD1 and outputs it as the tracking error signal SE1.

The tracking error signal SE1 generated by the operation unit 76A is sent to the objective-lens driving unit 79 (FIGS. 2 and 3), and tracking adjustment of the objective lens 70 (FIGS. 2 and 3) with respect to the track D80 (FIG. 5) of the optical disc D is automatically performed.

By performing predetermined calculations for each light reception output obtained from each segment constituting the first main-light-receiving portion 74A and the first sub-light-receiving portions 74B and 74C, a main information signal, a focus error signal, and the tracking error signal SE1 are obtained during recording/reproducing and the like of the CD-standard optical disc D.

For example, when a laser beam emission signal having a single and high frequency, for example, is sent to a light emitting element (LD: Laser Diode) of the optical pickup apparatus from the LSI on the board, not shown, constituting the optical disc device via the FPC, unnecessary radiation could be generated around the FPC and the like. The LSI (Large Scale Integration) is considered as a semiconductor integrated circuit (IC: Integrated Circuit) with an integration density of elements of approximately 1000 to 100000, for example, or simply as a synonym for the IC. The unnecessary radiation means electromagnetic waves emitted from electronic devices, unnecessary radio waves and the like, for example.

For example, when data, information, and signals are recorded on the optical disc D from an inner peripheral side D84 to an outer peripheral side D88 of the optical disc D, the FPC that connects the LSI on the board constituting the optical disc device to the LD of the optical pickup apparatus capable of conducting electricity could be deflected or stretched, and in an environment where the FPC is pulled around, for example, those having a structure in which a pulse signal having a single and high frequency, for example, flows through the FPC could be disadvantageous in terms of the unnecessary radiation.

If the photodetector 73A of the optical pickup apparatus is equipped with the current/voltage conversion amplifiers 77DL1, 77DR1, 77ER1, 77EL1, 77FL1, 77FR1, 77GR1, 77GL1, 77HL1, 77HR1, 77IR1, and 77IL1 that convert each of the light reception output signals UAa1, UAb1, UAc1, UAd1, UBa1, UBb1, UBc1, UBd1, UCa1, UCb1, UCc1, and UCd1 from current signals into voltage signals, respectively, and also amplify them, and the subsequent-stage amplifiers 77DL2, 77DR2, 77ER2, 77EL2, 77FL2, 77FR2, 77GR2, 77GL2, 77HL2, 77HR2, 77IR2, and 77IL2 that further amplify each of the signals which has been converted into voltage signals by each of the current/voltage conversion amplifiers 77DL1, 77DR1, 77EL1, 77ER1, 77FL1, 77FR1, 77GL1, 77GR1, 77HL1, 77HR1, 77IL1, and 77IR1 and also amplified, by means of each of the current/voltage conversion amplifiers 77DL1, 77DR1, 77ER1, 77EL1, 77FL1, 77FR1, 77GR1, 77GL1, 77HL1, 77HR1, 77IR1, and 77IL1 and each of the subsequent-stage amplifiers 77DL2, 77DR2, 77ER2, 77EL2, 77FL2, 77FR2, 77GR2, 77GL2, 77HL2, 77HR2, 77IR2, and 77IL2, each of the light reception output signals UAa1, UAb1, UAc1, UAd1, UBa1, UBb1, UBc1, UBd1, UCa1, UCb1, UCc1, and UCd1 outputted from each of the light receiving portions 74A, 74B, and 74C of the photodetector 73A is outputted from the photodetector 73A as, for example, photoelectrically converted signals TAa1, TAb1, TAc1, TAd1, TBa1, TBb1, TBc1, TBd1, TCa1, TCb1, TCc1, and TCd1 with reliable gain-up.

As a result, even if the unnecessary radiation is generated around the FPC and the like that connects the photodetector 73A and the like constituting the optical pickup apparatus and the operation unit 76A and the like constituting the board of the optical disc device in an electrically conductive manner, for example, deterioration of the photoelectrically converted signals TAa1, TAb1, TAc1, TAd1, TBa1, TBb1, TBc1, TBd1, TCa1, TCb1, TCc1, and TCd1 outputted from the photodetector 73A can be suppressed. Therefore, in the operation unit 76A of the board of the optical disc device, the detection of the one first main beam and the detection of the two first sub-beams are performed accurately and reliably.

Depending on the design/specification and the like of the optical pickup apparatus, the current/voltage conversion amplifiers (77DL1, 77DR1, 77EL1, 77ER1, 77FL1, 77FR1, 77GL1, 77GR1, 77HL1, 77HR1, 77IL1, and 77IR1) may be configured as ordinary front-stage amplification amps (77DL1, 77DR1, 77EL1, 77ER1, 77FL1, 77FR1, 77GL1, 77GR1, 77HL1, 77HR1, 77IL1, and 77IR1) which are not provided with a current/voltage conversion function, for example.

Also, depending on the design/specification and the like of the optical pickup apparatus, the current/voltage conversion amplifiers (77DL1, 77DR1, 77EL1, 77ER1, 77FL1, 77FR1, 77GL1, 77GR1, 77HL1, 77HR1, 77IL1, and 77IR1) may be located downstream of the flow of signals rather than the amplification amps (77DL2, 77DR2, 77EL2, 77ER2, 77FL2, 77FR2, 77GL2, 77GR2, 77HL2, 77HR2, 77IL2, and 77IR2), for example.

For example, if the first laser beam compliant with the CD standard is irradiated on the first optical disc D compliant with the CD standard, the detection of the tracking error signal SE1 is performed as follows.

First, the adder 77D of the operation unit 76A adds the photoelectrically converted signal TAa1 corresponding to apart of the light amount of the 0th-order reflection light received by the first segment 74Aa of the main-light-receiving portion 74A of the photodetector 73A and the photoelectrically converted signal TAb1 corresponding to a part of the light amount of the 0th-order reflection light received by the second segment 74Ab of the main-light-receiving portion 74A of the photodetector 73A, and generates the photoelectrically converted signal TAab1.

The adder 77E of the operation unit 76A adds the photoelectrically converted signal TAc1 corresponding to apart of the light amount of the 0th-order reflection light received by the third segment 74Ac of the main-light-receiving portion 74A of the photodetector 73A and the photoelectrically converted signal TAd1 corresponding to a part of the light amount of the 0th-order reflection light received by the fourth segment 74Ad of the main-light-receiving portion 74A of the photodetector 73A, and generates the photoelectrically converted signal TAcd1.

The subtractor 77A of the operation unit 76A subtracts the addition result of the adder 77E (photoelectrically converted signal TAc1+photoelectrically converted signal TAd1) from the addition result of the adder 77D (photoelectrically converted signal TAa1+photoelectrically converted signal TAb1), and generates the main-push-pull signal SA1. As a result, the subtractor 77A outputs a signal corresponding to the light amount of the 0th-order reflection light to serve as the basis of the tracking error signal SE1 {(photoelectrically converted signal TAa1+photoelectrically converted signal TAb1)−(photoelectrically converted signal TAc1+photoelectrically converted signal TAd1)}, that is, the main-push-pull signal SA1.

When the main beam for CD forming the main-detection-light spot 80 corresponding to the CD standard is reflected from the signal layer Da of the optical disc D and irradiated as the main-detection-light spot 90i on the main-light-receiving portion 74A in the CD light receiving region 74 of the photodetector 73A, the subtractor 77A connected to the main-light-receiving portion 74A calculates a difference between the output signals from the main-light-receiving portion 74A, and generates the main-push-pull signal SA1, for example.

Further, the adder 77F of the operation unit 76A adds the photoelectrically converted signal TBa1 corresponding to a part of the light amount of the +1st order reflection light received by the first segment 74Ba of the front-side sub-light-receiving portion 74B of the photodetector 73A and the photoelectrically converted signal TBb1 corresponding to a part of the light amount of the +1st order reflection light received by the second segment 74Bb of the front-side sub-light-receiving portion 74B of the photodetector 73A, and generates the photoelectrically converted signal TBab1.

The adder 77G of the operation unit 76A adds the photoelectrically converted signal TBc1 corresponding to a part of the light amount of the +1st order reflection light received by the third segment 74Bc of the front-side sub-light-receiving portion 74B of the photodetector 73A and the photoelectrically converted signal TBd1 corresponding to a part of the light amount of the +1st order reflection light received by the fourth segment 74Bd of the front-side sub-light-receiving portion 74B of the photodetector 73A, and generates the photoelectrically converted signal TBcd1.

The subtractor 77B of the operation unit 76A subtracts the addition result of the adder 77G (photoelectrically converted signal TBc1+photoelectrically converted signal TBd1) from the addition result of the adder 77F (photoelectrically converted signal TBa1+photoelectrically converted signal TBb1), and generates the sub-push-pull signal SB1.

When the first sub-beam for CD forming the first sub-detection-light spot 81 corresponding to the CD standard is reflected from the signal layer Da of the optical disc D and irradiate as the first sub-detection-light spot 91i on the front-side first sub-light-receiving portion 74B in the CD light receiving region 74 of the photodetector 73A, the subtractor 77B connected to the front-side first sub-light-receiving portion 74B calculates a difference between the output signals from the front-side first sub-light-receiving portion 74B, and generates the preceding sub-push-pull signal SB1, for example.

Further, the adder 77H of the operation unit 76A adds the photoelectrically converted signal TCa1 corresponding to photoelectrically converted signal TCa1 corresponding to apart of the light amount of the −1st order reflection light received by the first segment 74Ca of the rear-side sub-light-receiving portion 74C of the photodetector 73A and the photoelectrically converted signal TCb1 corresponding to apart of the light amount of the −1st order reflection light received by the second segment 74Cb of the rear-side sub-light-receiving portion 74C of the photodetector 73A, and generates the photoelectrically converted signal TCab1.

The adder 77I of the operation unit 76A adds the photoelectrically converted signal TCc1 corresponding to apart of the light amount of the −1st order reflection light received by the third segment 74Cc of the rear-side sub-light-receiving portion 74C of the photodetector 73A and the photoelectrically converted signal TCd1 corresponding to apart of the light amount of the −1st order reflection light received by the fourth segment 74Cd of the rear-side sub-light-receiving portion 74C of the photodetector 73A, and generates the photoelectrically converted signal TCcd1.

The subtractor 77C of the operation unit 76A subtracts the addition result of the adder 77I (photoelectrically converted signal TCc1+photoelectrically converted signal TCd1) from the addition result of the adder 77H (photoelectrically converted signal TCa1+photoelectrically converted signal TCb1), and generates the sub-push-pull signal SC1.

When the second sub-beam for CD forming the second sub-detection-light spot 82 corresponding to the CD standard is reflected from the signal layer Da of the optical disc D and irradiated as the second sub-detection-light spot 92$i$ on the rear-side first sub-light-receiving portion 74C in the CD light receiving region 74 of the photodetector 73A, the subtractor 77C connected to the rear-side first sub-light-receiving portion 74C calculates a difference between the output signals from the rear-side first sub-light-receiving portion 74C, and generates the lagging sub-push-pull signal SC1, for example.

The adder 78C of the operation unit 76A adds the subtraction result of the subtractor 77B {(photoelectrically converted signal TBa1+photoelectrically converted signal TBb1)−(photoelectrically converted signal TBc1+photoelectrically converted signal TBd1)} and the subtraction result of the subtractor 77C {(photoelectrically converted signal TCa1+photoelectrically converted signal TCb1)−(photoelectrically converted signal TCc1+photoelectrically converted signal TCd1)}, and generates the added sub-push-pull signal SD1.

The amplifier 78B of the operation unit 76A amplifies the addition result of the adder 78C [{(photoelectrically converted signal TBa1+photoelectrically converted signal TBb1)−(photoelectrically converted signal TBc1+photoelectrically converted signal TBd1)}+{(photoelectrically converted signal TCa1+photoelectrically converted signal TCb1)−(photoelectrically converted signal TCc1+photoelectrically converted signal TCd1)}], i.e., the added sub-push-pull signal SD1, by the amplification factor K. This amplification factor K is a value determined to adjust, for example, a difference between light intensities of the $0^{th}$-order light and the ±1st order diffraction lights caused by the diffraction efficiency of the diffraction grating 64A.

The subtractor 78A of the operation unit 76A generates the tracking error signal SE1 by subtracting the amplification result of the amplifier 78B [K·[{(photoelectrically converted signal TBa1+photoelectrically converted signal TBb1)−(photoelectrically converted signal TBc1+photoelectrically converted signal TBd1)}+{(photoelectrically converted signal TCa1+photoelectrically converted signal TCb1)−(photoelectrically converted signal TCc1+photoelectrically converted signal TCd1)}]] from the subtraction result of the subtractor 77A [(photoelectrically converted signal TAa1+photoelectrically converted signal TAb1)−(photoelectrically converted signal TAc1+photoelectrically converted signal TAd1)]. This tracking error signal SE1 is expressed as [[(photoelectrically converted signal TAa1+photoelectrically converted signal TAb1)−(photoelectrically converted signal TAc1+photoelectrically converted signal TAd1)]−K·[[{(photoelectrically converted signal TBa1+photoelectrically converted signal TBb1)−(photoelectrically converted signal TBc1+photoelectrically converted signal TBd1)}+{(photoelectrically converted signal TCa1+photoelectrically converted signal TCb1)−(photoelectrically converted signal TCc1+photoelectrically converted signal TCd1)}]]].

The main-push-pull signal SA1 detected from the central detection light spot 90$i$ corresponding to the main spot 80 at the center and the sub-push-pull signals SB1 and SC1 detected from the front and rear sub-detection-light spots 91$i$ and 92$i$ corresponding to the front and rear sub-spots 81 and 82, respectively, are outputted with phases opposite to each other. Thereafter, the sub-push-pull signals SB1 and SC1 are added by the adder 78C, and the added and generated added sub-push-pull signal SD1 is amplified by the amplifier 78B and then, the main-push-pull signal SA1 is subjected to the subtraction processing by the subtractor 78A, so that the tracking error signal SE1 with high accuracy in which the offset component of each of the push-pull signals SA1, SB1, and SC1 is canceled out can be generated.

In the DVD light receiving region 75 of the photodetector 73A constituting the optical pickup apparatus, the second main-light-receiving portion 75A and the two second sub-light-receiving portions 75B and 75C are formed in such a manner that they correspond to the three beams obtained by diffracting and branching the second laser beam compliant with the DVD standard by the diffraction grating 64A, or more specifically, the main beam (0th-order light) and the two sub-beams (±1st order diffraction light fluxes) arranged front and rear of the main beam are formed. The second main-light-receiving portion 75A and second sub-light-receiving portions 75B and 75C are each divided into four and includes four segments, respectively.

In more detail, the second main-light-receiving portion 75A at the center in a substantially rectangular shape of the DVD light receiving region 75 is divided into four with two dividing lines 75Ax and 75Ay substantially orthogonal to each other and includes four substantially rectangular segments 75Aa, 75Ab, 75Ac, and 75Ad. The second main-light-receiving portion 75A at the center in a substantially rectangular shape of the DVD light receiving region 75 includes the substantially rectangular first main segment 75Aa, the substantially rectangular second main segment 75Ab adjacent to the first main segment 75Aa, the substantially rectangular third main segment 75Ac adjacent to the second main segment 75Ab, and the substantially rectangular fourth main segment 75Ad adjacent to the third main segment 75Ac, and the first main segment 75Aa is adjacent to the fourth main segment 75Ad. The second main-light-receiving portion 75A at the center of the DVD light receiving region 75 has a substantially square shape.

The front-side second sub-light-receiving portion 75B in a substantially rectangular shape of the DVD light receiving region 75 is divided into four by two dividing lines 75Bx and 75By substantially orthogonal to each other and includes four substantially rectangular segments 75Ba, 75Bb, 75Bc, and 75Bd. The front-side second sub-light-receiving portion 75B in a substantially rectangular shape of the DVD light receiving region 75 includes the substantially rectangular first sub segment 75Ba, the substantially rectangular second sub segment 75Bb adjacent to the first sub segment 75Ba, the substantially rectangular third sub segment 75Bc adjacent to the second sub segment 75Bb, and the substantially rectangular fourth sub segment 75Bd adjacent to the third sub segment 75Bc, and the first sub segment 75Ba is adjacent to the fourth sub segment 75Bd. The front-side second sub-light-receiving portion 75B of the DVD light receiving region 75 has a substantially square shape.

The rear-side second sub-light-receiving portion 75C in a substantially rectangular shape of the DVD light receiving region 75 is divided into four by two dividing lines 75Cx and 75Cy substantially orthogonal to each other and includes four substantially rectangular segments 75Ca, 75Cb, 75Cc, and 75Cd. The rear-side second sub-light-receiving portion 75C in a substantially rectangular shape of the DVD light receiving region 75 includes the substantially rectangular first sub segment 75Ca, the substantially rectangular second sub segment 75Cb adjacent to the first sub segment 75Ca, the substantially rectangular third sub segment 75Cc adjacent to the second sub segment 75Cb, and the substantially rectangular fourth sub segment 75Cd adjacent to the third sub segment 75Cc, and the first sub segment 75Ca is adjacent to the fourth sub segment 75Cd. The rear-side second sub-light-receiving portion 75C of the DVD light receiving region 75 has a substantially square shape.

The DVD light receiving region 75 of the photodetector 73A is provided with the current/voltage conversion amplifiers and subsequent-stage amplifiers similar to the circuit shown in FIG. 6, for example, but detailed description will be omitted here. Also, the operation unit 76A is provided with the adders, subtractors, and amplifiers that approximate the circuit shown in FIG. 6, for example, and calculate DVD signals, and the adders, subtractors, and amplifiers for DVD signal calculation are connected to the DVD light receiving region 75, but the detailed description thereof will be omitted here.

By performing predetermined calculations for each light reception output obtained from each segment constituting the second main-light-receiving portion 75A and the second sub-light-receiving portions 75B and 75C, the main information signal, the focus error signal, and the tracking error signal SE2 can be obtained during recording/reproducing and the like of the DVD-standard optical disc D.

For example, when the second laser beam compliant with the DVD standard is irradiated on the second optical disc D compliant with the DVD standard, the detection of the tracking error signal SE2 is performed as follows.

When the main beam for DVD forming the main-detection-light spot 80 corresponding to the DVD standard is reflected from the signal layer Da of the optical disc D and irradiated as the main-detection-light spot 90$ii$ on the main-light-receiving portion 75A in the DVD light receiving region 75 of the photodetector 73A, the subtractor connected to the main-light-receiving portion 75A calculates a difference between the output signals from the main-light-receiving portion 75A, and generates the main-push-pull signal SA2, for example.

When the second sub-beam for DVD forming the second sub-detection-light spot 81 corresponding to the DVD standard is reflected from the signal layer Da of the optical disc D and irradiated as the second sub-detection-light spot 91$ii$ on the front-side second sub-light-receiving portion 75B in the DVD light receiving region 75 of the photodetector 73A, the subtractor connected to the front-side second sub-light-receiving portion 75B calculates a difference between the output signals from the front-side second sub-light-receiving portion 75B, and generates the preceding sub-push-pull signal SB2, for example.

When the second sub-beam for DVD forming the second sub-detection-light spot 82 corresponding to the DVD standard is reflected from the signal layer Da of the optical disc D and irradiated as the second sub-detection-light spot 92$ii$ on the rear-side second sub-light-receiving portion 75C in the DVD light receiving region 75 of the photodetector 73A, the subtractor connected to the rear-side second sub-light-receiving portion 75C calculates a difference between the output signals from the rear-side second sub-light-receiving portion 75C, and generates the lagging sub-push-pull signal SC2, for example.

The main-push-pull signal SA2 detected from the central main-detection-light spot 90$ii$ corresponding to the central main spot 80 and the sub-push-pull signals SB2 and SC2 detected from the front and rear sub-detection-light spots 91$ii$ and 92$ii$ corresponding to each of the front and rear sub-spots 81 and 82 are outputted with phases opposite to each other. Thereafter, the sub-push-pull signals SB2 and SC2 are added by an adder 78C, the added and generated sub-push-pull signal SD2 is amplified by an amplifier 78B and then, the main-push-pull signal SA2 is subjected to subtraction processing by a subtractor 78A, whereby the tracking error signal SE2 with a high accuracy in which each of offset components of the push-pull signals SA2, SB2, and SC2 is canceled out can be generated.

<<Light Receiving Regions 74 and 75 of Photodetector 73A>>

The light receiving regions 74 and 75 of the photodetector 73A will be described below with reference to FIGS. 7 and 8.

Figure 8:
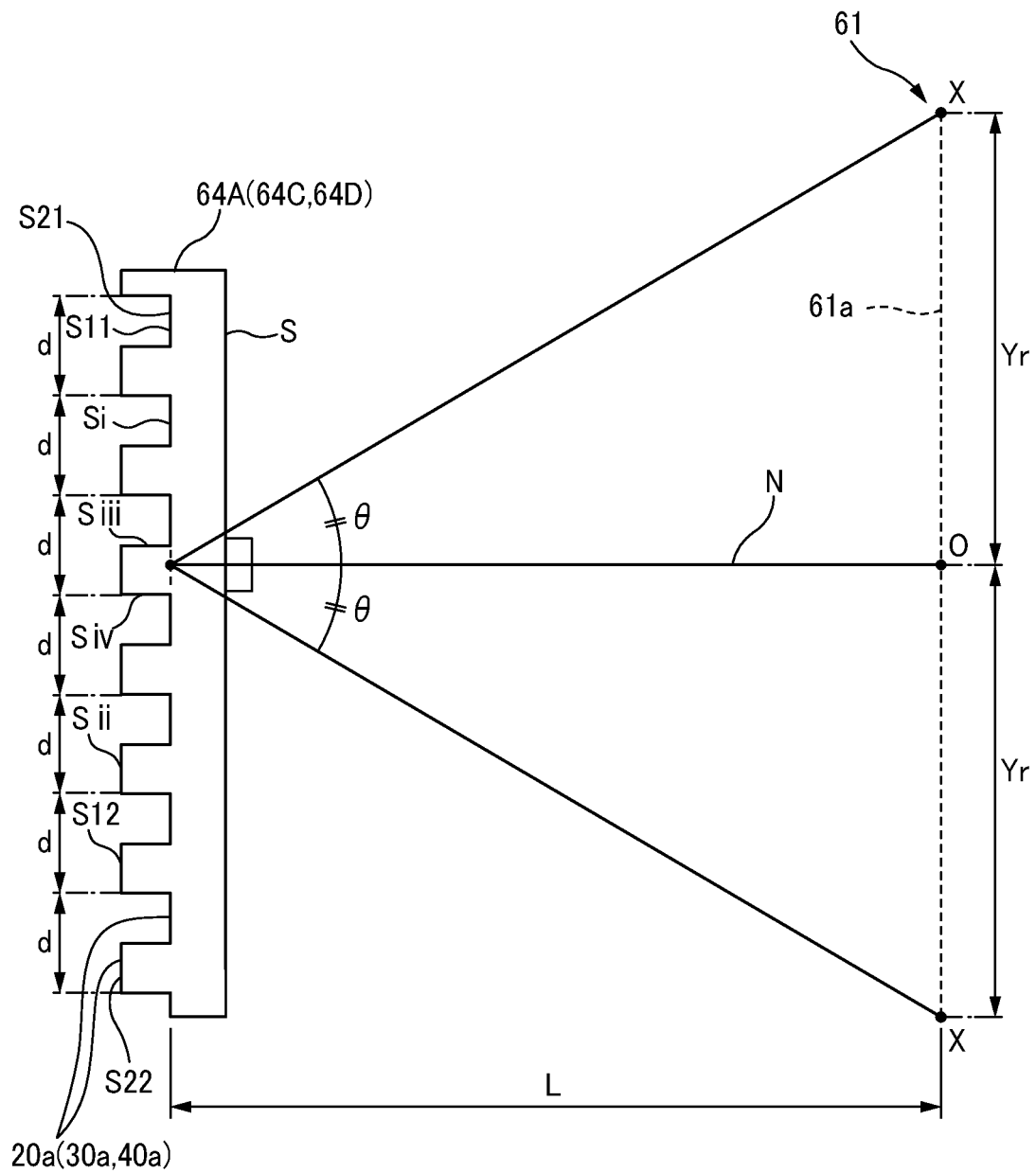
FIG. 8 is a diagram for explaining a deriving method of an interval between the light receiving portions in the light receiving region of the photodetector according to the embodiment of the present invention.

FIG. 7 is an explanatory diagram of the light receiving regions of the photodetector according to the embodiment of the present invention, and FIG. 8 is an explanatory diagram of a method of deriving an interval between the light receiving portions in the light receiving region of the photodetector according to the embodiment of the present invention.

The DVD light receiving region 75 used for recording/reproducing the DVD-standard optical disc D and the CD light receiving region 74 used for recording/reproducing the CD-standard optical disc D are formed side by side in the same light receiving surface portion 73$s$ of the photodetector 73A.

In the DVD light receiving region 75, the second main-light-receiving portion 75A and the second sub-light-receiving portions 75B and 75C are formed in such a manner that they correspond to the three beams obtained by diffracting and branching the second laser beam compliant with the DVD standard with the diffraction grating 64A, or more specifically, the main beam (0th-order light) and the two sub-beams (±1st-order diffraction light fluxes) arranged front and rear of the main beam, respectively. Each of the second main-light-receiving portion 75A and second sub-light-receiving portions 75B and 75C is divided into four and includes four segments, respectively. By performing predetermined calculations on each light reception output obtained from each segment constituting the second main-light-receiving portion 75A and second sub-light-receiving portions 75B and 75C, the main information signal, the focus error signal, and the tracking error signal SE2 are obtained during recording/reproducing and the like of the DVD-standard optical disc D. Division of the second main-light-receiving portion 75A and second sub-light-receiving portions 75B and 75C is not limited to the division into four but may be division into two. Also, the second sub-light-receiving portions 75$b$ and 75$c$ do not have to be divided, for example.

In the CD light receiving region 74, the first main-light-receiving portion 74A and the two first sub-light-receiving portions 74B and 74C are formed in such a manner that they correspond to the three beams obtained by diffracting and branching the first laser beam compliant with the CD standard by the diffraction grating 64A, or more specifically, the main beam (0th-order light) and the two sub-beams (±1st-order diffraction light fluxes) arranged front and rear of the main beam. Each of the first main-light-receiving portion 74A and first sub-light-receiving portions 74B and 74C is divided into four and includes four segments, respectively. By performing predetermined calculations on each light reception output obtained from each segment constituting the first main-light-receiving portion 74A and first sub-light-receiving portions 74B and 74C, the main information signal, the focus error signal, and the tracking error signal SE1 are obtained during recording/reproducing and the like of the CD-standard optical disc D. Division of the first main-light-receiving portion 74A and first sub-light-receiving portions 74B and 74C is not limited to the division into four but may be division into two. Also, the first sub-light-receiving portions 74b and 74c do not have to be divided, for example.

The light receiving interval Ys (dvd) between the second main-light-receiving portion 75A and the second sub-light-receiving portions 75B and 75C in the DVD light receiving region 75 and the light receiving interval Ys (cd) between the first main-light-receiving portion 74A and the first sub-light-receiving portions 74B and 74C in the CD light receiving region 74 are derived as follows.

First, based on the wavelength λ of the first or second laser beam emitted from the first or second light source 62 or 63 of the laser unit 61 and a grating interval d having one cycle in the diffraction grating 64A that is continuous from a recess portion S11 to a projection portion S12 or from the projection portion S12 to the recess portion S11, a diffraction angle θ is acquired by an approximate equation based on the Bragg condition represented by the following equation (16) (See FIG. 8). The grating interval d is assumed to be, for example, several to several hundreds of μm.

$$\theta = \sin^{-1}(\lambda/d) \qquad (16)$$

The recess portion S11 includes a bottom face Si and both side faces Siii and Siv substantially orthogonal to the bottom face Si. Also, a recess surface S21 forming the recess portion S11 is also formed by the bottom face Si and the both side faces Siii and Siv substantially orthogonal to the bottom face Si. The projection portion S12 is formed by an outer face Sii substantially parallel with the bottom face Si and the both side faces Siii and Siv substantially orthogonal to the bottom face Si and the outer face Sii. Also, a projecting surface S21 forming the projection portion S12 is also formed by the outer face Sii substantially parallel with the bottom face Si and the both side faces Siii and Siv substantially orthogonal to the bottom face Si and the outer face Sii. The diffraction angle θ is an angle formed by the diffraction light with respect to a normal N to the bottom face Si of the recess surface S21 and the outer face Sii of the projecting surface S22 forming a diffraction surface portion 20a on the back side of a substantially smooth surface S of the diffraction grating 64A. Virtual light emitting points X are provided in a substantially symmetrical pair about the normal N as a center axis. For simplification of description, the explanatory diagram shown in FIG. 8 is a figure drawn for the sake of convenience.

Subsequently, based on a normal distance L from a first light emitting point O indicating an actual position of the first or second light source 62 or 63 in a light emitting surface 61a of the laser unit 61 to the bottom face Si forming the recess surface S21 or the outer face Sii forming the projecting surface S22 on the back side of the substantially smooth surface S of the diffraction grating 64A, and the diffraction angle θ derived from the above equation (16), a second light emitting point X indicating the position of the apparent first or second light source 62 or 63 relating to the sub-beam on the light emitting surface 61a of the laser unit 61 can be determined.

The light emitting surface 61a of the laser unit 61 is perpendicular to the normal N of the substantially smooth surface S of the diffraction grating 64A and is a plane located substantially at a normal distance L away from the bottom face Si forming the recess surface S21 and the outer face Sii forming the projecting surface S22 on the back side of the surface S. With the following equation (17), a distance Yr from the first light emitting point O to the second light emitting point X on the light emitting surface 61a of the laser unit 61 can be obtained (See FIG. 8):

$$Yr = L \times \tan(\theta) \qquad (17)$$

Now, a first irradiation point Oa which is a substantial center part of the main spot 80 on the signal layer Da of the optical disc D, and a second irradiation point Xb/Xc which is a substantial center part of the sub-spot 81/82 on the signal layer Da of the optical disc D corresponding to the first or second laser beam emitted virtually from the second light emitting point X will be described in brief.

For example, based on a focal distance f2 (not shown) of the collimator lens 67 and a focal distance f1 (not shown) of the objective lens 70, the first irradiation point Oa as the substantial center part of the main spot 80 on the signal layer Da of the optical disc D corresponding to the first or second laser beam emitted virtually from the first light emitting point O, and the second irradiation point Xb/Xc as the substantial center part of the sub-spot 81/82 on the signal layer Da of the optical disc D corresponding to the first or second laser beam emitted virtually from the second light emitting point X are acquired. For example, the distance Yp between the first irradiation point Oa and the second irradiation point Xb or Xc on the signal layer Da of the optical disc D is obtained by the following equation (18), for example, based on the distance Yr from the light emitting point O to the light emitting point X, the focal distance f2 of the collimator lens 67, and the focal distance f1 of the objective lens 70:

$$Yp = Yr \times f1/f2 \qquad (18)$$

Summarizing the above, supposing that the wavelength of the first or second laser beam is λ, the grating interval of the diffraction grating 64A is d, a normal distance between the light emitting surface 61a of the laser unit 61 to the bottom surface Si constituting the recess surface S21 on the back side and the outer surface Sii constituting the projecting surface S22 with respect to the surface S of the diffraction grating 64A is L, the focal distance of the objective lens 70 is f1, and the focal distance of the collimator lens 67 is f2, the distance Yp between the first irradiation point Oa and the second irradiation point Xb or Xc on the signal layer Da of the optical disc D can be obtained based on the following equation (19). The distance Yp indicates each main-sub pitch on the signal layer Da of the optical disc D if the first or second laser beam is diffracted and branched by the diffraction grating 64A.

$$Yp = L \times \tan\{\sin-1(\lambda/d)\} \times f1/f2 \qquad (19)$$

The main beam and two sub-beams of the first or second laser beam irradiated on the signal layer Da of the optical disc D are reflected by the signal layer Da of the optical disc D and finally irradiated on the photodetector 73A.

Next, a method of setting the light receiving interval Ys(cd) between the first main-light-receiving portion 74A and the first sub-light-receiving portions 74B and 74C and the light receiving interval Ys(dvd) between the second main-light-receiving portion 75A and the second sub-light-receiving portions 75B and 75C in the photodetector 73A will be described.

The following equation (20) is obtained based on the above equations (16) and (17):

$$Yr = L \times \tan\{\sin^{-1}(\lambda/d)\} \quad (20)$$

Here, in order to arrange the light emitting points O and X for DVD on the light emitting surface 61a of the laser unit 61 and the irradiation point O(dvd) and X(dvd) for DVD on the light receiving surface of the photodetector 73A corresponding to the reflection light for DVD at optically equivalent positions, for example, a virtual light source interval Yr(dvd) corresponding to the outgoing light for DVD and the actual light receiving interval Ys(dvd) corresponding to the reflection light for DVD are assumed to be substantially equal.

For example, the following equation (21) is assumed:

$$Ys(\text{dvd}) \approx Yr(\text{dvd}) \quad (21)$$

Subsequently, based on equations (20) and (21), for example, the following equation (22) is defined:

$$Ys(\text{dvd}) = L \times \tan\{\sin^{-1}(\lambda(\text{dvd})/d)\} \quad (22)$$

If the wavelength for the DVD standard (second wavelength) λ(dvd) is approximately 660 nm, for example, by substituting 660 into λ(dvd) in equation (22), the following equation (23) is obtained:

$$Ys(\text{dvd}) = L \times \tan\{\sin^{-1}(660/d)\} \quad (23)$$

By substituting a numeral value of the normal distance L determined in advance and a numeral value of the grating interval d determined in advance into the equation (23), the light receiving interval Ys(dvd) in the DVD light receiving region 75 of the photodetector 73A is acquired.

Next, in order to arrange the light emitting points O and X for CD on the light emitting surface 61a of the laser unit 61 and the irradiation point O(cd) and X(cd) for CD on the light receiving surface of the photodetector 73A corresponding to the reflection light for CD at optically equivalent positions, for example, a virtual light source interval Yr(cd) corresponding to the outgoing light for CD and the actual light receiving interval Ys(cd) corresponding to the reflection light for CD are assumed to be substantially equal.

For example, the following equation (24) is assumed:

$$Ys(\text{cd}) \approx Yr(\text{cd}) \quad (24)$$

Next, based on equations (20) and equation (24), for example, the following equation (25) is determined:

$$Ys(\text{cd}) = L \times \tan\{\sin^{-1}(\lambda(\text{cd})/d)\} \quad (25)$$

If the wavelength for the CD standard (first wavelength) λ(cd) is, for example, approximately 785 nm, by substituting 785 into λ(cd) in equation (25), the following equation (26) is obtained:

$$Ys(\text{cd}) = L \times \tan\{\sin^{-1}(785/d)\} \quad (26)$$

By substituting a numeral value of the normal distance L determined in advance and a numeral value of the grating interval d determined in advance into equation (26), the light receiving interval Ys(cd) in the CD light receiving region 74 of the photodetector 73A is obtained.

As described above, the light receiving interval Ys(dvd) in the DVD light receiving region 75 of the photodetector 73A and the light receiving interval Ys(cd) in the CD light receiving region 74 of the photodetector 73A are determined.

Since the numeral value of the normal distance L determined in advance and the numeral value of the grating interval d determined in advance are both constant values, when the actual light receiving interval Ys(dvd) corresponding to the reflection light for DVD derived from equation (23) and the actual light receiving interval Ys(cd) corresponding to the reflection light for CD derived from equation (26) are compared with each other, the light receiving interval Ys(cd) is apparently longer than the light receiving interval Ys(dvd).

As described above, the light receiving interval Ys(cd) between the first main-light-receiving portion 74A and the first sub-light-receiving portions 74B and 74C in the photodetector 73A is determined based on the distance Ys(cd) obtained by equation (26). Also, the light receiving interval Ys(dvd) between the second main-light-receiving portion 75A and the second sub-light-receiving portions 75B and 75C in the photodetector 73A is determined based on the distance Ys(dvd) obtained by equation (23).

Specifically, the distance Ys(cd) between the center of the four segments in the first main-light-receiving portion 74A and the center of the four segments in the first sub-light-receiving portions 74B and 74C is determined as the distance Ys(cd) obtained by equation (26). Also, the distance Ys(dvd) between the center of the four segments in the second main-light-receiving portion 75A and the center of the four segments in the second sub-light-receiving portions 75B and 75C is determined as the distance Ys(dvd) obtained by equation (23). As a result, the photodetector 73A can be appropriately adapted to each main-sub pitch when the first or second laser beam is diffracted and branched by the diffraction grating 64A.

<Light Splitting Ratio of Each Spot 90*i*, 91*i*, 92*i*/90*ii*, 91*ii*, 92*ii* Irradiated on Photodetector 73A and Light Receiving Sensitivity of Photodetector 73A>>

A light splitting ratio and the like which is a ratio of light intensities between each of the spots 90*i*, 91*i*, 92*i*/90*ii*, 91*ii*, and 92*ii*, for example, will be described below with reference to FIG. 5.

First, the intensity of light irradiated on the DVD light receiving region 75 of the photodetector 73A and a light splitting ratio and the like will be described.

For example, a light splitting ratio among the sub-detection-light spot 91*ii* corresponding to the preceding sub-spot 81 on the track D80 of the optical disc D based on the DVD standard, the main-detection-light spot 90*ii* corresponding to the main spot 80 on the track D80 of the optical disc D based on the DVD standard, and the sub-detection-light spot 92*ii* corresponding to following sub-spot 82 on the track D80 of the optical disc D based on the DVD standard is approximately 1:15:1.

The intensity of light in the sub-detection-light spot 91*ii* or 92*ii* in this case is approximately $1/17$ of the total intensity of light irradiated on the DVD light receiving region 75 of the photodetector 73A. The intensity of light in the main-detection-light spot 90*ii* in this case is approximately $15/17$ of the total intensity of light irradiated on the DVD light receiving region 75 of the photodetector 73A.

The light splitting ratio of the laser beams irradiated on the DVD light receiving region 75 of the inline-method photodetector 73A shown in FIG. 5 is substantially the same as the light splitting ratio of the laser beams irradiated on the inline-method photodetector 270 for DVD shown in FIG. 28.

For example, the light splitting ratio among the sub-detection-light spot 201 corresponding to the preceding sub-spot 101 on the track D100 of the optical disc D based on the DVD standard, the main-detection-light spot 200 corresponding to the main spot 100 on the track D100 of the optical disc D based on the DVD standard, and the sub-detection-light spot 202 corresponding to following sub-spot 102 on the track D100 of the optical disc D based on the DVD standard is approximately 1:15:1.

The intensity of light in the sub-detection-light spot 201 or 202 in this case is approximately $1/17$ of the total intensity of light irradiated on the photodetector 270. The intensity of light in the main-detection-light spot 200 in this case is approximately $15/17$ of the total intensity of light irradiated on the photodetector 270.

Next, the intensity of the light irradiated on the CD light receiving region 74 of the photodetector 73A shown in FIG. 5 and the light splitting ratio and the like will be described.

For example, the light splitting ratio among the sub-detection-light spot 91i corresponding to the preceding sub-spot 81 on the track D80 of the optical disc D based on the CD standard, the main-detection-light spot 90i corresponding to the main spot 80 on the track D80 of the optical disc D based on the CD standard, and the sub-detection-light spot 92i corresponding to following sub-spot 82 on the track D80 of the optical disc D based on the CD standard is approximately 1:23:1.

The intensity of light in the sub-detection-light spot 91i or 92i in this case is approximately $1/25$ of the total intensity of light irradiated on the CD light receiving region 74 of the photodetector 73A. The intensity of light in the main-detection-light spot 90i in this case is approximately $23/25$ of the total intensity of light irradiated on the CD light receiving region 74 of the photodetector 73A.

The light splitting ratio of the laser beams irradiated on the CD light receiving region 74 of the inline-method photodetector 73A shown in FIG. 5 is different from the light splitting ratio of the laser beams irradiated on the 3-beam method CD photodetector 270 shown in FIG. 27.

For example, the light splitting ratio among the sub-detection-light spot 201 corresponding to the preceding sub-spot 101 on the track D100 of the optical disc D based on the CD standard, the main-detection-light spot 200 corresponding to the main spot 100 on the track D100 of the optical disc D based on the CD standard, and the sub-detection-light spot 202 corresponding to following sub-spot 102 on the track D100 of the optical disc D based on the CD standard is approximately 1:16:1.

The intensity of light in the sub-detection-light spot 201 or 202 in this case is approximately $1/18$ of the total intensity of light irradiated on the photodetector 270. The intensity of light in the main-detection-light spot 200 in this case is approximately $16/18$ of the total intensity of light irradiated on the photodetector 270.

In a case where an optical pickup apparatus provided with the diffraction grating 64A which does not have a diffraction grating portion corresponding to the laser beam for CD is formed, when the laser beam for CD having passed through the diffraction grating 64A is irradiated on the CD light receiving region 74 of the photodetector 73A, the light splitting ratio of each laser beam irradiated on the CD light receiving region 74 is changed from the prior-art ratio.

With the change of the light splitting ratio of each laser beam irradiated on the CD light receiving region 74 from the prior-art one, light receiving sensitivity of the main-light-receiving portion 74A and the sub-light-receiving portions 74B and 74C in the CD light receiving region 74 of the photodetector 73A are changed.

For example, change magnification of the light receiving sensitivity of the sub-light-receiving portions 74B and 74C to which the sub-detection-light spots 91i and 92i are applied can be acquired by the following equation (27):

$$\{(1/18)/(1/25)\}\times 100=138.88889 \quad (27).$$

As described above, the light receiving sensitivity (mV/µW) (millivolts per microwatt) of the sub-light-receiving portions 74B or 74C in the CD light receiving region 74 of the photodetector 73A is, for example, determined as a value of approximately 139% to that of the prior art, while defining that of the prior art as 100%.

For example, the change magnification of the light receiving sensitivity of the main-light-receiving portions 74A on which the main-detection-light spot 90i is formed can be obtained by the following equation (28):

$$\{(16/18)/(23/25)\}\times 100=96.61836 \quad (28)$$

As described above, the light receiving sensitivity (mV/µW) of the main-light-receiving portion 74A in the CD light receiving region 74 of the photodetector 73A is, for example, determined as a value of approximately 97% to that of the prior art, while defining that of the prior art as 100%.

Depending on the design/specification and the like of the optical pickup apparatus, for example, the light splitting ratio among the sub-detection-light spot 91ii corresponding to the preceding sub-spot 81 on the track D80 of the optical disc D conforming to the DVD standard, the main-detection-light spot 90ii corresponding to the main spot 80 on the track D80 of the optical disc D conforming to the DVD standard, and the sub-detection-light spot 92ii corresponding to the following sub-spot 82 on the track D80 of the optical disc D conforming to the DVD standard may be approximately 1:16:1.

The intensity of light in the sub-detection-light spot 91ii or 92ii in this case is approximately $1/18$ of the total intensity of light irradiated on the DVD light receiving region 75 of the photodetector 73A. The intensity of light in the main-detection-light spot 90ii in this case is approximately $16/18$ of the total intensity of light irradiated on the DVD light receiving region 75 of the photodetector 73A.

Further, depending on the design/specification and the like of the optical pickup apparatus, for example, the light splitting ratio among the sub-detection-light spot 91i corresponding to the preceding sub-spot 81 on the track D80 of the optical disc D conforming to the CD standard, the main-detection-light spot 90i corresponding to the main spot 80 on the track D80 of the optical disc D conforming to the CD standard, and the sub-detection-light spot 92i corresponding to the following sub-spot 82 on the track D80 of the optical disc D conforming to the CD standard may be approximately 1:23.5:1.

The intensity of light in the sub-detection-light spot 91i or 92i in this case is approximately 1/25.5 of the total intensity of light irradiated on the CD light receiving region 74 of the photodetector 73A. The intensity of light in the main-detection-light spot 90i in this case is approximately 23.5/25.5 of the total intensity of light irradiated on the CD light receiving region 74 of the photodetector 73A.

In this case, the change magnification of the light receiving sensitivity of the sub-light-receiving portions 74B or 74C on which the sub-detection-light spot 91i or 92i is formed can be obtained by the following equation (29):

$$\{(1/18)/(1/25.5)\}\times 100=141.66667 \quad (29)$$

As described above, the light receiving sensitivity (mV/µW) of the sub-light-receiving portions 74B or 74C in the CD light receiving region 74 of the photodetector 73A is determined, for example, as a value of approximately 142% to that of the prior art, while defining that of the prior art as 100%.

Also, in this case, the change magnification of the light receiving sensitivity of the main-light-receiving portion 74A on which the sub-detection-light spot 90i is formed can be obtained by the following equation (30):

$$\{(16/18)/(23.5/25.5)\}\times 100=96.45390 \quad (30)$$

As described above, the light receiving sensitivity (mV/µW) of the main-light-receiving portion 74A in the CD light receiving region 74 of the photodetector 73A is determined, for example, as a value of approximately 96% to that of the prior art, while defining that of the prior art as 100%.

Further, depending on the design/specification and the like of the optical pickup apparatus, for example, the light splitting ratio among the sub-detection-light spot 91$i$ corresponding to the preceding sub-spot 81 on the track D80 of the optical disc D conforming to the CD standard, the main-detection-light spot 90$i$ corresponding to the main spot 80 on the track D80 of the optical disc D conforming to the CD standard, and the sub-detection-light spot 92$i$ corresponding to the following sub-spot 82 on the track D80 of the optical disc D conforming to the CD standard may be approximately 1:20:1.

The intensity of light in the sub-detection-light spot 91$i$ or 92$i$ is approximately $1/22$ of the total intensity of light irradiated on the CD light receiving region 74 of the photodetector 73A. The intensity of light in the main-detection-light spot 90$i$ in this case is approximately $20/22$ of the total intensity of light irradiated on the CD light receiving region 74 of the photodetector 73A.

Also, in this case, the change magnification of the light receiving sensitivity of the sub-light-receiving portions 74B or 74C on which the sub-detection-light spot 91$i$ or 92$i$ is formed can be obtained by the following equation (31):

$$\{(1/18)/(1/22)\} \times 100 = 122.22222 \tag{31}$$

As described above, the light receiving sensitivity (mV/μW) of the sub-light-receiving portions 74B or 74C in the CD light receiving region 74 of the photodetector 73A is determined, for example, as a value of approximately 122% to that of the prior art, while defining that of the prior art as 100%.

In this case, the change magnification of the light receiving sensitivity of the main-light-receiving portion 74A on which the main-detection-light spot 90$i$ is formed can be obtained by the following equation (32):

$$\{(16/18)/(20/22)\} \times 100 = 97.77778 \tag{32}$$

As described above, the light receiving sensitivity (mV/μW) of the main-light-receiving portion 74A in the CD light receiving region 74 of the photodetector 73A is determined, for example, as a value of approximately 98% to that of the prior art, while defining that of the prior art one as 100%.

Further, depending on the design/specification and the like of the optical pickup apparatus, for example, the light splitting ratio among the sub-detection-light spot 91$i$ corresponding to the preceding sub-spot 81 on the track D80 of the optical disc D conforming to the CD standard, the main-detection-light spot 90$i$ corresponding to the main spot 80 on the track D80 of the optical disc D conforming to the CD standard, and the sub-detection-light spot 92$i$ corresponding to the following sub-spot 82 on the track D80 of the optical disc D conforming to the CD standard may be approximately 1:26:1.

The intensity of light in the sub-detection-light spot 91$i$ or 92$i$ in this case is approximately $1/28$ of the total intensity of light irradiated on the CD light receiving region 74 of the photodetector 73A. The intensity of light in the main-detection-light spot 90$i$ in this case is approximately $26/28$ of the total intensity of light irradiated on the CD light receiving region 74 of the photodetector 73A.

Also, in this case, the change magnification of the light receiving sensitivity of the sub-light-receiving portions 74B or 74C on which the sub-detection-light spot 91$i$ or 92$i$ is formed can be obtained by the following equation (33):

$$\{(1/18)/(1/28)\} \times 100 = 155.55556 \tag{33}$$

As described above, the light receiving sensitivity (mV/μW) of the sub-light-receiving portions 74B or 74C in the CD light receiving region 74 of the photodetector 73A is determined, for example, as a value of approximately 156% to that of the prior art, while defining that of the prior art as 100%.

In this case, the change magnification of the light receiving sensitivity of the main-light-receiving portion 74A on which the main-detection-light spot 90$i$ is formed can be obtained by the following equation (34):

$$\{(16/18)/(26/28)\} \times 100 = 95.72650 \tag{34}$$

As described above, the light receiving sensitivity (mV/μW) of the main-light-receiving portion 74A in the CD light receiving region 74 of the photodetector 73A is determined, for example, as a value of approximately 96% to that of the prior art, while defining that of the prior art one as 100%.

With the above-described optical pickup apparatus being provided with the above diffraction grating 64A and the photodetector 73A, the photodetector 73A can be adapted not only to the main-sub pitch related to the three beams obtained by diffracting and branching the second laser beam compliant with the DVD standard by the diffraction grating 64A but also to the main-sub pitch related to the three beams obtained by diffracting and branching the first laser beam compliant with the CD standard by the diffraction grating 64A and the light splitting ratio, and error signal detection accuracy and the like of the tracking error signals SE1, SE2 and the like can be improved.

Further, since the light receiving interval Ys(dvd) in the DVD light receiving region 75 of the photodetector 73A is based on the grating interval d of the diffraction grating member 20 for DVD or the diffraction grating 64A for DVD, in a case where, for example, the signal layer Da of the DVD-standard optical disc D has the double-layer structure of the first layer DL0 and the second layer DL1, the reflection light from the second layer DL1 can be prevented from being received not only in the second main-light-receiving portion 75A but also in one second sub-light-receiving portion 75B and the other second sub-light-receiving portion 75C during reproduction of the first layer DL0.

<<Outline of Optical Pickup Apparatus>>

The optical pickup apparatus will be described below with reference to FIGS. 1 to 10.

Figure 9:
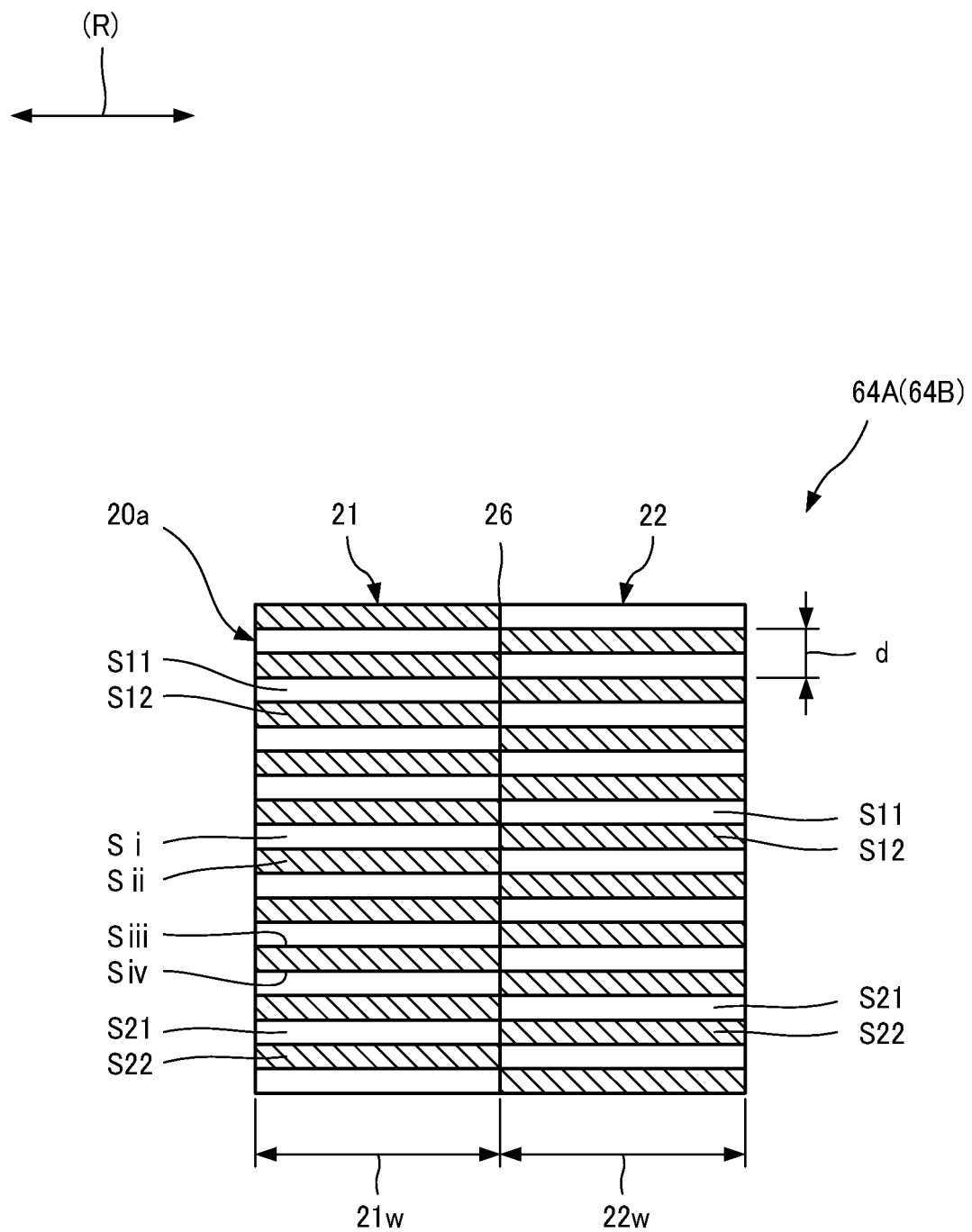
FIG. 9 is an outline plane view illustrating a first embodiment of a diffraction grating equipped in the optical pickup apparatus.
Figure 10:
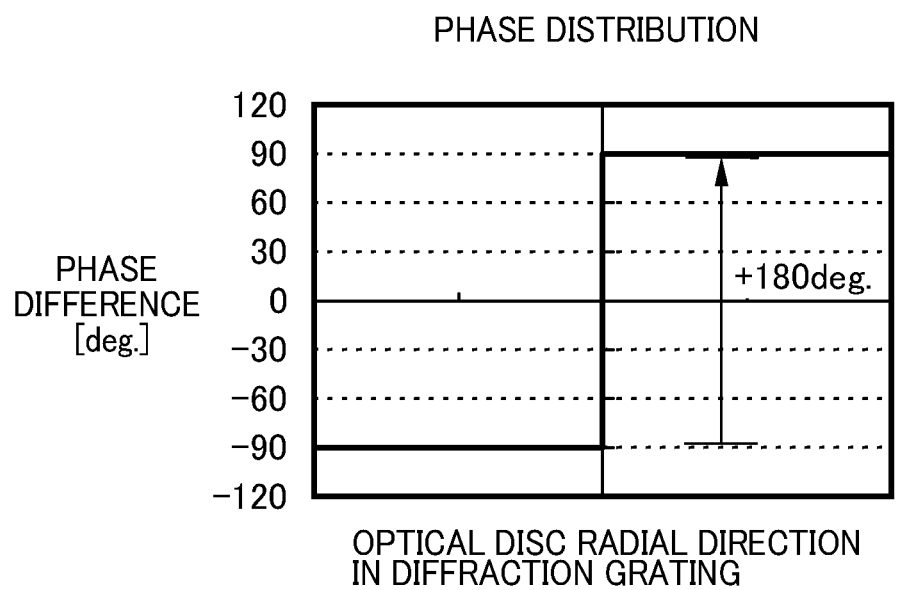
FIG. 10 is a diagram illustrating a relationship between an optical disc radial direction and a phase difference in the diffraction grating in FIG. 9.

FIG. 9 is an overall plan view illustrating a first embodiment of the diffraction grating equipped in the optical pickup apparatus, and FIG. 10 is a diagram illustrating a relationship between the optical disc radial direction and the phase difference in the diffraction grating of FIG. 9.

As shown in FIGS. 1 to 3, this optical pickup apparatus includes the light emitting element 61 having the first light source 62 and the second light source 63, the diffraction grating 64A, the polarization beam splitter 66, the collimator lens 67, the quarter-wave plate 68, the reflection mirror 69, the objective lens 70, the first parallel plate 71, the second parallel plate 72, the photodetector 73A, the objective-lens driving unit 79, the flexible circuit board, not shown, and the connector. Also, this optical pickup apparatus further includes the coupling lens 65$i$ and the light receiving element 65$ii$ as necessary. Also, this optical pickup apparatus (FIGS. 1 to 3) may further include the operation unit 76A (FIGS. 2 and 3) as necessary.

This optical pickup apparatus further includes the multi-wavelength emitting type light emitting element 61 capable of emitting at least the first laser wavelength light and the second laser wavelength light, which is a laser beam different from the first laser wavelength light and having a wavelength shorter than that of the first laser wavelength light, and the diffraction grating 64A that splits the first laser wavelength light to at least one first main beam and at least two first sub-beams at substantially symmetrical positions to the single first main beam and also splits the second laser wavelength light to at least one second main beam and at least two second sub-beams at substantially symmetrical positions to the single second main beam and has the diffraction surface portion 20a corresponding to the second laser wavelength light and conforming to the second wavelength light, without having a diffraction surface portion (not shown) corresponding to the first laser wavelength light.

Here, Yp1 is defined as the interval Yp between the irradiation point Oa which is substantially the central part of the spot 80 of the first main beam and the irradiation point Xb which is substantially the center part of the spot 81 of the first sub-beam when the single first main beam and at least two first sub-beams are irradiated on the first optical disc D corresponding to the first laser wavelength light. Also, Yp1 is determined as the interval Yp between the irradiation point Oa which is substantially the center part of the spot 80 of the first main beam and the irradiation point Xc which is substantially the center part of the spot 82 of the first sub-beam when the single first main beam and at least two first sub-beams are irradiated on the first optical disc D corresponding to the first laser wavelength light.

Further, Yp2 is defined as an interval Yp between the irradiation point Oa which is substantially the center part of the spot 80 of the second main beam and an irradiation point Xb which is substantially the center part of the spot 81 of the second sub-beam when the single second main beam and at least two second sub-beams are irradiated on the second optical disc D corresponding to the second laser wavelength light. Also, Yp2 is defined as an interval Yp between an irradiation point Oa which is substantially the center part of the spot 80 of the second main beam and an irradiation point Xc which is substantially the center part of the spot 82 of the second sub-beam when the single second main beam and at least two second sub-beams are irradiated on the second optical disc D corresponding to the second laser wavelength light.

When the intervals Yp1 and Yp2 are defined as above, based on the above equations (7), (11), and (15), for example, the optical pickup apparatus is configured to achieve the performance satisfying the following equation (1):

$$1.05 < \frac{Yp1}{Yp2} < 2.50 \tag{1}$$

Also, A1 is defined as a light efficiency ratio of the light intensity of the single first main beam to the total sum of the light intensity of the signal first main beam and the light intensity of at least two first sub-beams, when the single first main beam and the at least two first sub-beams are irradiated on the first optical disc D corresponding to the first laser wavelength light.

A2 is defined as a light efficiency ratio if the light intensity of the single second main beam to the total sum of the light intensity of the signal second main beam and the light intensity of at least two second sub-beams, when the single second main beam and the at least two second sub-beams are irradiated on the second optical disc D corresponding to the second laser wavelength light.

With the light efficiency ratios of each light A1 and A2 being defined as above, for example, based on each of the calculated light efficiency ratios A1 and A2, for example, the optical pickup apparatus that is capable of achieving the performance satisfying the following equations (2) and (3) is configured:

$$0.90 < A1 < 0.94 \tag{2}$$

and $$0.87 < A2 < 0.91 \tag{3}$$

Preferably, the optical pickup apparatus that achieves the performance satisfying the following equations (35) and (36) is configured:

$$0.90 < A1 < 0.93 \tag{35}$$

and $$0.87 < A2 < 0.90 \tag{36}$$

By setting the optical pickup apparatus in such a manner that the above equation (1) and/or the above equation (2) and the above equation (3), and preferably the above equation (1) and/or the above equation (35) and the above equation (36) are satisfied, a multi-wavelength compatible type optical pickup apparatus is provided which is capable of reliably handling the first laser wavelength light and the second laser wavelength light, the second laser wavelength light being a laser wavelength light different from the first laser wavelength light and having a wavelength shorter than the first laser wavelength light, and which has an improved detection accuracy of error signals such as the tracking error signals SE1, SE2.

When the first laser wavelength light emitted from the multi-wavelength emitting type light emitting element 61 is, with the diffraction grating 64A that does not have the diffraction surface portion corresponding to the first laser wavelength light and has the diffraction surface portion 20a corresponding to the second laser wavelength light and in which the second laser wavelength light is a reference, split into at least a single first main beam and two first sub-beams at substantially symmetrical positions with respect to the single first main beam, and the signal surface portion Da of the first optical disc D is irradiated with the single first main beam and the at least two first sub-beams at substantially symmetrical positions with respect to the single first main beam, the track D80 of the signal surface portion Da of the first optical disc D is accurately and reliably irradiated with the single first main beam and the at least two first sub-beams at substantially symmetric positions with respect to the single first main beam.

When the second laser wavelength light emitted from the multi-wavelength emitting type light emitting element 61 is, with the diffraction grating 64A that does not have the diffraction surface portion corresponding to the first laser wavelength light and has the diffraction surface portion 20a corresponding to the second laser wavelength light and in which the second laser wavelength light is a reference, split into at least a single second main beam and two second sub-beams at substantially symmetrical positions with respect to the single second main beam, and the signal surface portion Da of the second optical disc D is irradiated with the single second main beam and the at least two second sub-beams at substantially symmetrical positions with respect to the single second main beam, the track D80 of the signal surface portion Da of the second optical disc D is accurately and reliably irradiated with the single second main beam and the at least two second sub-beams at substantially symmetric positions with respect to the single second main beam that does not have the diffraction surface portion corresponding to the first laser wavelength light and has the diffraction surface portion 20*a* corresponding to the second laser wavelength light and in which the second laser wavelength light is a reference that does not have the diffraction surface portion corresponding to the first laser wavelength light and has the diffraction surface portion 20*a* corresponding to the second laser wavelength light and in which the second laser wavelength light is a reference.

In response to the fact that the light emitting position of the first laser wavelength light in the light emitting element 61 and the light emitting position of the second laser wavelength light in the light emitting element 61 are different from each other, the optical pickup apparatus is provided in such a manner that a disc-radial-direction light-collecting position of the first laser wavelength light on the signal surface portion Da of the first optical disc D corresponding to the first laser wavelength light and a disc-radial-direction light-collecting position of the second laser wavelength light on the signal surface portion Da of the second optical disc D corresponding to the second laser wavelength light are different.

Also, for example, when the optical pickup apparatus is located on the innermost peripheral side D84 of the optical disc D, the optical pickup apparatus is located on the outermost peripheral side D88 of the optical disc D, and the optical pickup apparatus is located at any point from the innermost peripheral side D84 to the outermost peripheral side D88 of the optical disc D, the disc radial direction light-collecting position of the second laser wavelength light on the signal surface portion Da of the substantially disc-shaped second optical disc D exists slightly to the inner peripheral side D84 of the substantially disc-shaped optical disc D rather than the disc radial direction light-collecting position of the first laser wavelength light on the signal surface portion Da of the substantially disc-shaped first optical disc D.

By setting the disc radial direction light collecting-position of the first laser wavelength light and the disc radial direction light-collecting position of the second laser wavelength light as above, a multi-wavelength compatible type optical pickup apparatus is provided in which the first laser wavelength light is reliably collected on the signal surface portion Da of the first optical disc D, and also the second laser wavelength light is reliably collected on the signal surface portion Da of the second optical disc D.

For example, on the inner peripheral side D84 of the signal surface portion Da of the substantially disc-shaped first optical disc D corresponding to the first wavelength light and conforming to the CD standard, a region is formed from which various basic information/data and the like relating to the first optical disc D can be read and in which various basic information/data and the like relating to the first optical disc D can be written. Also, for example, on the inner peripheral side D84 of the signal surface portion Da of the substantially disc-shaped second optical disc D corresponding to the second wavelength light and conforming to the DVD standard, a region is formed from which various basic information/data and the like relating to the second optical disc D can be read and in which various basic information/data and the like relating to the second optical disc D can be written.

A size of a pit and the like on the signal surface portion Da of the second optical disc D corresponding to the second wavelength light and conforming to the DVD standard is smaller than a size of a pit and the like on the signal surface portion Da of the first optical disc D corresponding to the first wavelength light and conforming to the CD standard. Also, a size of the spot 80 of the light applied/formed on the signal surface portion Da of the second optical disc D corresponding to the second wavelength light and conforming to the DVD standard is smaller than a size of the spot 80 applied/formed on the signal surface portion Da of the first optical disc D corresponding to the first wavelength light and conforming to the CD standard. For example, in order for the optical pickup apparatus to be able to precisely and accurately handle elaborate pit information and the like on the inner peripheral side D84 of the signal surface portion Da of the substantially disc-shaped second optical disc D, it is preferable that the disc radial direction light collecting position of the first laser wavelength light and the disc radial direction light-collecting position of the second laser wavelength light are set as above.

This optical pickup apparatus conforms to at least the first laser wavelength light and the second laser wavelength light, which is a laser beam having a wavelength different from the first laser wavelength light and having a wavelength shorter than the first laser wavelength light, and includes the diffraction grating 64A having the diffraction surface portion 20*a* (FIGS. 4, 8, and 9) that splits the first laser wavelength light into at least a single first main beam and two first sub-beams, splits the second laser wavelength light into at least a single second main beam and two second sub-beams, corresponds to the second laser wavelength light and conforms to the second laser wavelength light, the photodetector 73A having the first light receiving region 74 provided with the single first main-light-receiving portion 74A (FIGS. 5 to 7) on which the single first main beam is irradiated and the two first sub-light-receiving portions 74B and 74C on which the two first sub-beams are irradiated, and the second light receiving region 75 provided with the single second main-light-receiving portion 75A on which the single second main beam is irradiated and the two second sub-light-receiving portions 75B and 75C on which the two second sub-beams are irradiated.

If the optical pickup apparatus shown in FIGS. 1 to 3 and the like is provided, an optical pickup apparatus in which occurrence of unnecessary diffraction light in the diffraction grating 64A is suppressed is provided.

A prior-art optical pickup apparatus, in general, includes a diffraction grating 300A, 300B having two diffraction surface portions 302 and 304, that is, a first diffraction surface portion 302 (FIGS. 29 and 30) corresponding to the first laser wavelength light and a second diffraction surface portion 304 corresponding to the second laser wavelength light. Thus, in the prior-art optical pickup apparatus, when the first laser wavelength light passes through the first diffraction surface portions 302 of the diffraction grating 300A, 300B corresponding to the first laser wavelength light, the first laser wavelength light is split at least into the single first main beam and two first sub-beams, and when the first wavelength light passes through the second diffraction surface portions 304 of the diffraction grating 300A, 300B corresponding to the second laser wavelength light, unnecessary diffraction light was generated.

Also, in the prior-art optical pickup apparatus, when the second laser wavelength light passes through the first diffraction surface portions 302 of the diffraction grating 300A, 300B (FIGS. 29 and 30) corresponding to the first laser wavelength light, unnecessary diffraction light was generated. When the second wavelength light passes through the second diffraction surface portions 304 of the diffraction grating 300A, 300B corresponding to the second laser wavelength light, the second laser wavelength light is split at least into the single second main beam and two second sub-beams.

On the other hand, if the diffraction grating 64A having the diffraction surface portion 20*a* (FIGS. 4, 8, and 9) corresponding to the second laser wavelength light and conforming to the second laser wavelength light is provided in the optical pickup apparatus, and the first laser wavelength light is split at least into the single first main beam and two first sub-beams when the first laser wavelength light passes through the diffraction surface portion 20a of the diffraction grating 64A corresponding to the second laser wavelength light and conforming to the second laser wavelength light, occurrence of unnecessary diffraction light while the first wavelength light passing through the diffraction grating 64A can be substantially prevented.

Also, when the second laser wavelength light passes through the diffraction surface portion 20a of the diffraction grating 64A (FIGS. 4, 8, and 9) corresponding to the second laser wavelength light and based on the second laser wavelength light, the second laser wavelength light is split at least into the single second main beam and two second sub-beams without substantially generating unnecessary diffraction light.

A center-to-center distance Yt(cd) between the first main-light-receiving portion 200a and the first sub-light-receiving portion 200b, 200c in the CD light receiving region 280 of the prior-art photodetector 270 (FIG. 27) is taken as a ordinary distance Yt(cd) standardized to correspond with the first laser wavelength light. A term "standardization" in the present invention is used for the sake of convenience in explaining, for example, those of the prior art that are widely spread. For example, those that are standardized are assumed to be equivalent to those substantially standardized by mass production and the like. Those that are "standardized" according to the present invention do not mean only those specified by standards such as, for example, JIS (Japanese Industrial Standards). For example, the standardized photodetector 270 is a general-purpose photodetector 270 or the like that have been mass-produced and widely spread in the market and the like. The single first main beam of the first laser wavelength light is irradiated on one first main-light-receiving portion 200a of the prior-art standard, while the two first sub-beams of the first laser wavelength light are irradiated on the two first sub-light-receiving portions 200b and 200c of the prior-art standard.

However, for example, the center-to-center distance Ys(cd) between the first main-light-receiving portion 74A and the first sub-light-receiving portion 74B, 74C in the photodetector 73A (FIG. 7) is changed from the ordinary center-to-center distance Yt(cd) between the first main-light-receiving portion 200a and the first sub-light-receiving portion 200b, 200c of the photodetector 270 (FIG. 27) standardized to correspond with the first wavelength light.

For example, in the photodetector 73A (FIG. 7), since the center-to-center distance Ys(cd) between the first main-light-receiving portion 74A and the first sub-light-receiving portion 74B, 74C is changed from the ordinary center-to-center distance Yt(cd) between the first main-light-receiving portion 200a and the first sub-light-receiving portion 200b, 200c of the photodetector 270 (FIG. 27) standardized to correspond with the first laser wavelength light, when the first laser wavelength light passes through the diffraction surface portion 20a of the diffraction grating 64A (FIGS. 4, 8, and 9) corresponding to the second laser wavelength light and being based on the second laser wavelength light, an occurrence of a drawback is avoided in which the two first sub-beams of the first laser wavelength light split by the diffraction surface portion 20a of the diffraction grating 64A corresponding to the second laser wavelength light and based on the second laser wavelength light are not successfully irradiated on the two first sub-light-receiving portions 74B and 74C of the first light receiving region 74 provided in the photodetector 73A (FIGS. 5 to 7).

The two first sub-beams of the first laser wavelength light, which have been split without substantially producing unnecessary diffraction light when the first laser wavelength light passes through the diffraction surface portion 20a of the diffraction grating 64A (FIGS. 4, 8, and 9) corresponding to the second laser wavelength light and based on the second laser wavelength light, are reliably irradiated on the two first sub-light-receiving portions 74B and 74C whose distance Ys(cd) with respect to the single first main-light-receiving portion 74A of the first light receiving region 74 provided in the photodetector 73A (FIG. 7) has been changed.

The single first main beam of the first laser wavelength light, which has been split without substantially causing unnecessary diffraction light when the first laser wavelength light passes through the diffraction surface portion 20a of the diffraction grating 64A (FIGS. 4, 8, and 9) corresponding to the second laser wavelength light and based on the second laser wavelength light, is reliably irradiated on the single first main-light-receiving portion 74A of the first light receiving region 74 provided in the photodetector 73A (FIGS. 5 to 7).

The center-to-center distance Ys(dvd) between the second main-light-receiving portion 75A and the second sub-light-receiving portion 75B, 75C in the second light receiving region 75 of the photodetector 73A (FIG. 7) is set to be the same as the ordinary distance Yt(dvd) in the photodetector 270 (FIG. 28) standardized in accordance with the second laser wavelength light.

The two second sub-beams of the second laser wavelength light, which have been split without substantially causing unnecessary diffraction light when the second laser wavelength light passes through the diffraction surface portion 20a of the diffraction grating 64A (FIGS. 4, 8, and 9) corresponding to the second laser wavelength light and based on the second laser wavelength light, are reliably applied to the two second sub-light-receiving portions 75B and 75C of the second light receiving region 75, which is the same as the prior-art standard provided in the photodetector 73A (FIGS. 5 and 7).

Also, the single second main beam of the second laser wavelength light split when the second laser wavelength light passes through the diffraction surface portion 20a of the diffraction grating 64A (FIGS. 4, 8, and 9) corresponding to the second laser wavelength light and based on the second laser wavelength light without substantially causing unnecessary diffraction light is reliably applied to the single second main-light-receiving portion 75A of the second light receiving region 75, which is the same as the prior-art standard provided in the photodetector 73A.

The center-to-center distance Ys(cd) between the first main-light-receiving portion 74A and the first sub-light-receiving portion 74B, 74C changed in the photodetector 73A (FIG. 7) is, for example, determined to be longer than the center-to-center distance Yt(cd) between the ordinary first main-light-receiving portion 200a and the first sub-light-receiving portion 200b, 200c of the standardized photodetector 270 (FIG. 27).

In more detail, when a value of the center-to-center distance Yt(cd) between the ordinary first main-light-receiving portion 200a and the first sub-light-receiving portion 200b, 200c of the standardized photodetector 270 (FIG. 27) is defined as a value of 100%, the value of the center-to-center distance Ys(cd) between the first main-light-receiving portion 74A and the first sub-light-receiving portion 74B, 74C changed in the photodetector 73A (FIG. 7) is, for example, determined as a value of approximately 111% to the value of the center-to-center distance Yt(cd) between of the ordinary first main-light-receiving portion 200a and the first sub-light-receiving portion 200b, 200c of the standardized photodetector 270 (FIG. 27).

With the photodetector 73A shown in FIGS. 5 to 7 being provided, an optical pickup apparatus with improved detection accuracy of a signal such as error signals can be provided. An adverse effect on the two first sub-light-receiving portions 74B and 74C of the photodetector 73A (FIGS. 5 to 7) caused by the single first main beam generated by dividing the first laser wavelength light by the diffraction surface portion 20a of the diffraction grating 64A (FIGS. 4, 8, and 9) is avoided.

Also, with the photodetector 73A shown in FIGS. 5 to 7 being provided, an optical pickup apparatus with improved detection accuracy of a signal such as error signals can be provided. An adverse effect on the single first main-light-receiving portion 74A of the photodetector 73A (FIGS. 5 to 7) caused by one or both of the two first sub-beams generated by splitting the first laser wavelength light by the diffraction surface portion 20a of the diffraction grating 64A (FIGS. 4, 8, and 9) is avoided.

For example, if the center-to-center distance Ys(cd) between the first main-light-receiving portion 74A and the first sub-light-receiving portion 74B, 74C changed in the photodetector 73A (FIG. 7) is set shorter than the center-to-center distance Yt(cd) between the ordinary first main-light-receiving portion 200a and the first sub-light-receiving portion 200b, 200c of the standardized photodetector 270 (FIG. 27), there is concern about interference of the single first main beam with the two first sub-light-receiving portions 74B and 74C of the photodetector 73A (FIGS. 5 to 7).

Also, for example, if the center-to-center distance Ys(cd) between the first main-light-receiving portion 74A and the first sub-light-receiving portion 74B, 74C changed in the photodetector 73A (FIG. 7) is set shorter than the center-to-center distance Yt(cd) between the ordinary first main-light-receiving portion 200a and the first sub-light-receiving portion 200b, 200c of the standardized photodetector 270 (FIG. 27), there is concern about interference of one or both of the two first sub-beams with the single first main-light-receiving portion 74A of the photodetector 73A (FIGS. 5 to 7).

However, since the center-to-center distance Ys(cd) between the first main-light-receiving portion 74A and the first sub-light-receiving portion 74B, 74C changed in the new photodetector 73A (FIG. 7) is set longer than the center-to-center distance Yt(cd) between the ordinary first main-light-receiving portion 200a and the first sub-light-receiving portion 200b, 200c of the standardized photodetector 270 (FIG. 27), interference of the single first main beam with one or both of the two first sub-light-receiving portions 74B and 74C can be more easily avoided when the single first main-light-receiving portion 74A of the photodetector 73A is irradiated with the single first main beam.

With a value of center-to-center the distance Yt(cd) between the ordinary first main-light-receiving portion 200a and the first sub-light-receiving portion 200b, 200c of the standardized photodetector 270 (FIG. 27) being defined as a value of 100%, the value of the center-to-center distance Ys(cd) between the first main-light-receiving portion 74A and the first sub-light-receiving portion 74B, 74C changed in the new photodetector 73A (FIG. 7) is determined as a value of approximately 111% to the value of the center-to-center distance Yt(cd) between the ordinary first main-light-receiving portion 200a and the first sub-light-receiving portion 200b, 200c of the standardized photodetector 270 (FIG. 27), and thus, interference of the single first main beam with one or both of the two first sub-light-receiving portions 74B and 74C is avoided when on the single first main-light-receiving portion 74A of the photodetector 73A (FIG. 7) is irradiated with the single first main beam.

Also, since the center-to-center distance Ys(cd) between the first main-light-receiving portion 74A and the first sub-light-receiving portion 74B, 74C changed in the new photodetector 73A (FIG. 7) is set longer than the center-to-center distance Yt(cd) between the ordinary first main-light-receiving portion 200a and the first sub-light-receiving portion 200b, 200c of the standardized photodetector 270 (FIG. 27), interference of one or both of the two first sub-beams with the single first main-light-receiving portion 74A can be easily avoided when the two front and rear first sub-light-receiving portions 74B and 74C of the photodetector 73A are irradiated with the two front and rear first sub-beams.

With a value of the center-to-center distance Yt(cd) between the ordinary first main-light-receiving portion 200a and the first sub-light-receiving portion 200b, 200c of the standardized photodetector 270 (FIG. 27) being defined as a value of 100%, the value of the center-to-center distance Ys(cd) between the first main-light-receiving portion 74A and the first sub-light-receiving portion 74B, 74C changed in the new photodetector 73A (FIG. 7) is determined as a value of approximately 111% to the value of the center-to-center distance Yt(cd) between the ordinary first main-light-receiving portion 200a and the first sub-light-receiving portion 200b, 200c of the standardized photodetector 270 (FIG. 27), and thus, interference of one or both of the two first sub-beams with the single first main-light-receiving portion 74A is avoided when the two front and rear first sub-light-receiving portions 74B and 74C of the photodetector 73A (FIG. 7) are irradiated with the two front and rear first sub-beams.

The center-to-center distance Ys(dvd) between the second main-light-receiving portion 75A and the second sub-light-receiving portion 75B, 75C of the photodetector 73A is set equal to the center-to-center distance Yt(dvd) between the usual second main-light-receiving portion 200a and the second sub-light-receiving portion 200b, 200c of the standardized photodetector 270 (FIG. 28).

When a value of the center-to-center distance Yt(dvd) between the ordinary second main-light-receiving portion 200a and the second sub-light-receiving portion 200b, 200c of the standardized photodetector 270 (FIG. 28) is defined as the value of 100%, a value of the center-to-center distance Ys(dvd) between the second main-light-receiving portion 75A and the second sub-light-receiving portion 75B, 75C in the photodetector 73A (FIG. 7) is determined as a value of approximately 100% to the value of the center-to-center distance Yt(dvd) between the ordinary second main-light-receiving portion 200a and the second sub-light-receiving portion 200b, 200c of the standardized photodetector 270 (FIG. 28), for example.

If the photodetector 73A shown in FIGS. 5 to 7 is provided, an optical pickup apparatus with improved detection accuracy of a signal such as error signals is provided. An adverse effect on the two second sub-light-receiving portions 75B and 75C of the photodetector 73A (FIGS. 5 and 7) caused by the single second main beam generated by splitting the second laser wavelength light by the diffraction surface portion 20a of the diffraction grating 64A (FIGS. 4, 8, and 9) is avoided. Also, an adverse effect on the single second main-light-receiving portion 75A of the photodetector 73A (FIGS. 5 and 7) caused by one or both of the two second sub-beams generated by splitting the second laser wavelength light by the diffraction surface portion 20a of the diffraction grating 64A (FIGS. 4, 8, and 9) is avoided.

If, for example, in the photodetector 73A (FIG. 7), the center-to-center distance Ys(cd) between the first main-light-receiving portion 74A and the first sub-light-receiving portion 74B, 74C is not changed and the center-to-center distance Ys(cd) between the first main-light-receiving portion 74A and the first sub-light-receiving portion 74B, 74C is set equal to the center-to-center distance Yt(cd) between the ordinary first main-light-receiving portion 200a and the first sub-light-receiving portion 200b, 200c of the standardized photodetector 270 (FIG. 27), the center-to-center distance Ys(dvd) between the second main-light-receiving portion 75A and the second sub-light-receiving portion 75B, 75C in the photodetector 73A (FIG. 7) needs to be narrowed.

If, for example, the center-to-center distance Ys(dvd) between the second main-light-receiving portion 75A and the second sub-light-receiving portion 75B, 75C in the photodetector 73A is set shorter than the center-to-center distance Yt(dvd) between the ordinary second main-light-receiving portion 200a and the second sub-light-receiving portion 200b, 200c of the standardized photodetector 270 (FIG. 28), there is a concern about an interference of the single second main beam generated by splitting the second laser wavelength light by the diffraction surface portion 20a of the diffraction grating 64A (FIGS. 4, 8, and 9) with the two second sub-light-receiving portions 75B and 75C of the photodetector 73A (FIGS. 5 and 7).

As can be seen in FIG. 7, for example, during reproduction of a signal or recording of a signal or the like in the first layer DL0 of the optical disc D conforming to the DVD standard having the plurality of layers DL0 and DL1, i.e., the first layer DL0 and the second layer DL1, there is a concern that unnecessary reflection light from the second layer DL1 of the optical disc D conforming to the DVD standard may be introduced as a noise into one or both of the one second sub-light-receiving portion 75B or the other second sub-light-receiving portion 75C of the DVD light receiving region 75 in the photodetector 73A.

As described above, when reproduction of a signal or recording of a signal or the like is performed in either one of the layer DL0 or DL1 in the first layer DL0 or the second layer DL1 using the optical disc D conforming to the DVD standard having the plurality of layers DL0 and DL1, there is a concern about occurrence of a so-called inter-layer cross talk, that is, introduction of a leakage signal to one or both of the one second sub-light-receiving portion 75B or the other second sub-light-receiving portion 75C of the DVD light receiving region 75 in the photodetector 73A.

Also, for example, when the center-to-center distance Ys(dvd) between the second main-light-receiving portion 75A and the second sub-light-receiving portion 75B, 75C in the photodetector 73A is set shorter than the center-to-center distance Yt(dvd) between the ordinary second main-light-receiving portion 200a and the second sub-light-receiving portion 200b, 200c of the standardized photodetector 270 (FIG. 28), there is a concern about an interference of one or both of the two second sub-beams generated by splitting the second laser wavelength light by the diffraction surface portion 20a of the diffraction grating 64A (FIGS. 4, 8, and 9) with the single second main-light-receiving portion 75A of the photodetector 73A (FIGS. 5 and 7).

If the center-to-center distance Ys(dvd) between the second main-light-receiving portion 75A and the second sub-light-receiving portion 75B, 75C in the photodetector 73A is set equal to the center-to-center distance Yt(dvd) between the ordinary second main-light-receiving portion 200a and the second sub-light-receiving portion 200b, 200c of the standardized photodetector 270 (FIG. 28), interference of the single second main beam with one or both of the two second sub-light-receiving portions 75B and 75C of the photodetector 73A (FIG. 7) or interference of one or both of the two second sub-beams with the single second main-light-receiving portion 75A of the photodetector 73A is, for example, avoided.

With a value of the center-to-center distance Yt(dvd) between the ordinary second main-light-receiving portion 200a and the second sub-light-receiving portion 200b, 200c of the standardized photodetector 270 (FIG. 28) being defined as a value of 100%, a value of the center-to-center distance Ys(dvd) between the second main-light-receiving portion 75A and the second sub-light-receiving portion 75B, 75C in the new photodetector 73A (FIG. 7) is determined as a value of approximately 100% to the value of the center-to-center distance Yt(dvd) between the ordinary second main-light-receiving portion 200a and the second sub-light-receiving portion 200b, 200c of the standardized photodetector 270 (FIG. 28), and thus, interference of the single second main beam with one or both of the two second sub-light-receiving portions 75B and 75C is avoided when the single second main-light-receiving portion 75A of the photodetector 73A (FIG. 7) is irradiated with the single second main beam.

Also, with a value of the center-to-center distance Yt(dvd) between the ordinary second main-light-receiving portion 200a and the second sub-light-receiving portion 200b, 200c of the standardized photodetector 270 (FIG. 28) being defined as a value of 100%, the value of the center-to-center distance Ys(dvd) between the second main-light-receiving portion 75A and the second sub-light-receiving portion 75B, 75C in the new photodetector 73A (FIG. 7) determined as a value of approximately 100% to the value of the center-to-center distance Yt(dvd) between the ordinary second main-light-receiving portion 200a and the second sub-light-receiving portions 200b and 200c of the standardized photodetector 270 (FIG. 28), and thus, interference of one or both of the two second sub-beams with the single second main-light-receiving portion 75A is avoided when the two front and rear second sub-light-receiving portions 75B and 75C of the photodetector 73A (FIG. 7) are irradiated with the two front and rear second sub-beams.

When the repositioned first sub-light-receiving portions 74B and 74C are disposed in a pairwise manner with respect to the first main-light-receiving portion 74A disposed at the center in the photodetector 73A (FIGS. 5 to 7), and the front-side repositioned first sub-light-receiving portion 74B, the central first main-light-receiving portion 74A, and the rear-side repositioned first sub-light-receiving portion 74C are provided adjacent to each other substantially on a straight line, the light splitting ratio among the front-side repositioned first sub-light-receiving portion 74B, the central first main-light-receiving portion 74A, and the rear-side repositioned first sub-light-receiving portion 74C is changed from the light splitting ratio among the front-side first sub-light-receiving portion 200b, the central first main-light-receiving portion 200a, and the rear-side first sub-light-receiving portion 200c of the prior-art standardized photodetector 270 (FIG. 27).

In more detail, when the repositioned first sub-light-receiving portions 74B and 74C are disposed in a pairwise manner with respect to the first main-light-receiving portion 74A in the photodetector 73A (FIGS. 5 to 7) disposed at the center and the front-side repositioned first sub-light-receiving portion 74B, the central first main-light-receiving portion 74A, and the rear-side repositioned first sub-light-receiving portion 74C are provided adjacent to each other substantially on a straight line, the light splitting ratio among the front-side repositioned first sub-light-receiving portion 74B, the central first main-light-receiving portion 74A, and the rear-side repositioned first sub-light-receiving portion 74C is set at approximately 1:(20 to 26):1. That is, the light splitting ratio among the front-side repositioned first sub-light-receiving portion 74B, the central first main-light-receiving portion 74A, and the rear-side repositioned first sub-light-receiving portion 74C is set at approximately 1:(23±3):1. Preferably, the light splitting ratio among the front-side repositioned first sub-light-receiving portion 74B, the central first main-light-receiving portion 74A, and the rear-side repositioned first sub-light-receiving portion 74C is set at approximately 1:(23±2.3):1.

If the light splitting ratio of the first laser wavelength light of the setting-changed photodetector 73A (FIGS. 5 to 7) has been changed from the light splitting ratio of the first laser wavelength light of the prior-art standardized photodetector 270 (FIG. 27), the detection of the single first main beam and the detection of the two first sub-beams can be favorably performed accurately and favorably by the new setting-changed photodetector 73A. On the contrary to the setting of the light splitting ratio of the first laser wavelength light of the prior-art standardized photodetector 270 (FIG. 27) set at approximately 1:16:1, if the light splitting ratio of the first laser wavelength light of the setting-changed photodetector 73A (FIGS. 5 to 7) is set approximately at 1:(20 to 26):1, that is, at approximately 1:(23±3):1 or preferably at approximately 1:(23±2.3):1, the detection of the single first main beam and the detection of the two first sub-beams can be performed accurately and favorably by the new setting-changed photodetector 73A.

If the first laser wavelength light passes through the prior-art diffraction gratings 300A and 300B having the two diffraction surface portions 302 and 304, that is, the first diffraction surface portion 302 (FIGS. 29 and 30) corresponding to the first laser wavelength light and the second diffraction surface portion 304 corresponding to the second laser wavelength light, and when the first laser wavelength light is split at least into the front-side single first sub-beam, the central single first main beam, and the rear-side single first sub-beam, by setting the light splitting ratio among the front-side first sub-light-receiving portion 200b (FIG. 27) on which the front-side single first sub-beam is irradiate, the central first main-light-receiving portion 200a on which the central single first main beam is irradiated, and the rear-side first sub-light-receiving portion 200c on which the rear-side single first sub-beam is irradiated at ordinary approximately 1:16:1, for example, the detection of the single first main beam and the detection of the two first sub-beams have been performed with accuracy by the prior-art standardized photodetector 270.

However, when the diffraction grating 320 having the diffraction surface portion 302 (FIGS. 29 and 30) corresponding to the first laser wavelength light is not provided and omitted, the first laser wavelength light passes through the diffraction gratings 300A and 300B having the diffraction surface portion 304 corresponding to the second laser wavelength light and based on the second laser wavelength light and the first laser wavelength light is split at least into the front-side single first sub-beam, the central single first main beam, and the rear-side single first sub-beam, for example, if the light splitting ratio among the front-side repositioned first sub-light-receiving portion 200b (FIG. 27) on which the front-side single first sub-beam is irradiated, the central first main-light-receiving portion 200a on which the central single first main beam is irradiated, and the rear-side repositioned first sub-light-receiving portion 200c on which the rear-side single first sub-beam is irradiated is set at ordinary approximately 1:16:1, for example, there was concern about the detection of the single first main beam and the detection of the two first sub-beams are not accurately performed in the prior-art standardized photodetector 270.

On the other hand, when the first laser wavelength light passes through the diffraction grating 64A having the diffraction surface portion 20a (FIGS. 4, 8, and 9) corresponding to the second laser wavelength light and based on the second laser wavelength light and the first laser wavelength light is split at least into the front-side single first sub-beam, the central single first main beam, and rear-side single first sub-beam, if the light splitting ratio among the front-side repositioned first sub-light-receiving portion 74B on which the front-side single first sub-beam is irradiated (FIGS. 5 to 7), the central first main-light-receiving portion 74A on which the central single first main beam is irradiated, and the rear-side repositioned first sub-light-receiving portion 74C on which the rear-side single first sub-beam is irradiated is changed from the light splitting ratio among the front-side first sub-light-receiving portion 200b, the central first main-light-receiving portion 200a, and the rear-side first sub-light-receiving portion 200c of the prior-art standardized photodetector 270 (FIG. 27) and set approximately at 1:(20 to 26):1, that is, at approximately 1:(23±3):1 or preferably at approximately 1:(23±2.3):1, the detection of the single first main beam and the detection of the two first sub-beams are accurately and favorably performed by the new setting-changed photodetector 73A (FIGS. 5 to 7).

Also, if the light splitting ratio among the front-side repositioned first sub-light-receiving portion 74B on which the front-side single first sub-beam is irradiated, the central first main-light-receiving portion 74A on which the central single first main beam is irradiated, and the rear-side repositioned first sub-light-receiving portion 74C on which the rear-side single first sub-beam is irradiated is set approximately at 1:less than 20:1, for example, or if this light splitting ratio is set approximately at 1:exceeding 26:1, for example, there is a concern that the detection of the single first main beam and the detection of the two first sub-beams may not be performed with accuracy, but by setting this light splitting ratio approximately at 1:(20 to 26):1 or preferably at approximately 1:(20.7 to 25.3):1 or more preferably at approximately 1:(21 to 25):1, the detection of the single first main beam and the detection of the two first sub-beams are accurately and favorably performed.

When the second sub-light-receiving portions 75B and 75C are disposed in a pairwise manner with respect to the second main-light-receiving portion 75A disposed at the center in the photodetector 73A and the front-side second sub-light-receiving portion 75B, the central second main-light-receiving portion 75A, and the rear-side second sub-light-receiving portion 75C are provided adjacent to each other substantially on a straight line, the light splitting ratio among the front-side second sub-light-receiving portion 75B, the central second main-light-receiving portion 75A, and the rear-side second sub-light-receiving portion 75C is set at approximately 1:(12 to 18):1. That is, the light splitting ratio among the front-side second sub-light-receiving portion 75B, the central second main-light-receiving portion 75A, and the rear-side second sub-light-receiving portion 75C is set at approximately 1:(15±3):1. Preferably, the light splitting ratio among the front-side second sub-light-receiving portion 75B, the central second main-light-receiving portion 75A, and the rear-side second sub-light-receiving portion 75C is set at approximately 1:(16±1.6):1.

If the light splitting ratio is set as above, the detection of the single second main beam and the detection of the two second sub-beams are accurately performed with the photodetector 73A. When the second laser wavelength light passes through the diffraction grating 64A that has the diffraction surface portion 20a (FIGS. 4, 8, and 9) corresponding to the second laser wavelength light and based on the second laser wavelength light and the second laser wavelength light is split at least into the front-side single second sub-beam, the central single second main beam, and the rear-side single second sub-beam, if the light splitting ratio among the front-side second sub-light-receiving portion 75B irradiated with the front-side single second sub-beam (FIGS. 5 and 7), the central second main-light-receiving portion 75A irradiated with the central single second main beam, and the rear-side second sub-light-receiving portion 75C irradiated with the rear-side single second sub-beam is set at approximately 1:(12 to 18):1, that is, at approximately 1:(15±3):1 or preferably at approximately 1:(16±1.6):1, the detection of the single second main beam and the detection of the two second sub-beams are accurately and favorably performed by the photodetector 73A.

If the light splitting ratio among the front-side second sub-light-receiving portion 75B irradiated with the front-side single second sub-beam, the central second main-light-receiving portion 75A irradiated with the central single second main beam, and the rear-side second sub-light-receiving portion 75C irradiated with the rear-side single second sub-beam is set at approximately 1:less than 12:1, for example, or this light splitting ratio is set at approximately 1:exceeding 18:1, for example, there is a concern that the detection of the single second main beam and the detection of the two second sub-beams may not be performed accurately, but by setting this light splitting ratio at approximately 1:(12 to 18):1 or preferably at approximately 1:(14 to 18):1, or more preferably at approximately 1:(14.4 to 17.6):1, the detection of the single second main beam and the detection of the two second sub-beams are accurately and favorably performed.

With respect to the value of the ordinary light receiving sensitivity in the standardized single first main-light-receiving portion 200a (FIG. 27), the value of the light receiving sensitivity in the single first main-light-receiving portion 74A (FIGS. 5 to 7) is changed or made equal. In more detail, if the value of the ordinary light receiving sensitivity in the standardized single first main-light-receiving portion 200a (FIG. 27) is set at the value of 100%, with respect to the value of the ordinary light receiving sensitivity in the standardized single first main-light-receiving portion 200a, the value of the light receiving sensitivity in the single first main-light-receiving portion 74A (FIGS. 5 to 7), which was changed or made equal, is set at approximately 100% or approximately less than 100% or a low value of approximately not more than 100%.

Also, with respect to the values of the ordinary light receiving sensitivity in the standardized two first sub-light-receiving portions 200b and 200c (FIG. 27), the values of the light receiving sensitivity in the two first sub-light-receiving portions 74B and 74C (FIGS. 5 to 7) are changed. In more detail, if the values of the ordinary light receiving sensitivity in the standardized two first sub-light-receiving portions 200b and 200c (FIG. 27) are set at the values of 100%, with respect to the values of the ordinary light receiving sensitivity in the standardized two first sub-light-receiving portions 200b and 200c, the values of the light receiving sensitivity in the two changed first sub-light-receiving portions 74B and 74C (FIGS. 5 to 7) are both set at approximately 100% or more or high values of approximately exceeding 100%.

If the value of the light receiving sensitivity is changed from or set equal to the prior-art value as above, the detection of the single first main beam and the detection of the two first sub-beams become easier to be performed with the new setting-changed photodetector 73A relatively accurately. With the value of the light receiving sensitivity in the single first main-light-receiving portion 74A (FIGS. 5 to 7) being changed from or made equal to the value of the ordinary light receiving sensitivity in the standardized single first main-light-receiving portion 200a (FIG. 27), and with the values of the light receiving sensitivity in the two first sub-light-receiving portions 74B and 74C (FIGS. 5 to 7) being changed from the values of the ordinary light receiving sensitivity in the standardized two first sub-light-receiving portions 200b and 200c (FIG. 27), the detection of the single first main beam and the detection of the two first sub-beams can be performed easier with the new setting-changed photodetector 73A relatively accurately.

In more detail, with respect to the value of the ordinary light receiving sensitivity in the standardized single first main-light-receiving portion 200a (FIG. 27) set at 100%, the value of the light receiving sensitivity in the single first main-light-receiving portion 74A (FIGS. 5 to 7), which was changed or made equal, is set at approximately 100% or approximately less than 100% or a low value of approximately not more than 100%, and with respect to the values of the ordinary light receiving sensitivity in the standardized two first sub-light-receiving portions 200b and 200c (FIG. 27) both set at 100%, the values of the light receiving sensitivity in the two changed first sub-light-receiving portions 74B and 74C (FIGS. 5 to 7) are both set at approximately 100% or more or a high value of approximately exceeding 100%, whereby the detection of the single first main beam and the detection of the two first sub-beams can be performed easier relatively accurately by the new setting-changed photodetector 73A.

When a value of the ordinary light receiving sensitivity in the standardized single first main-light-receiving portion 200a (FIG. 27) is set at a value of 100%, the value of the light receiving sensitivity in the single first main-light-receiving portion 74A (FIGS. 5 to 7), which has been changed or made equal, is set at a value of approximately 95 to 100%, or preferably approximately 96 to 100% to a value of the ordinary light receiving sensitivity in the standardized single first main-light-receiving portion 200a. Also, when values of the ordinary light receiving sensitivity in the standardized two first sub-light-receiving portions 200b and 200c (FIG. 27) are both set at the value of 100%, values of the light receiving sensitivity in the two changed first sub-light-receiving portions 74B and 74C (FIGS. 5 to 7) are both set at a value of approximately 120 to 160%, or preferably approximately 138 to 142% to values of the ordinary light receiving sensitivity in the standardized two first sub-light-receiving portions 200b and 200c.

If the values of the light receiving sensitivity are set as above, the detection of the single first main beam and the detection of the two first sub-beams are accurately and favorably performed with the new setting-changed photodetector 73A. With the value of the light receiving sensitivity in the single first main-light-receiving portion 74A (FIGS. 5 to 7), which was changed or made equal, being set at the value of approximately 95 to 100% or preferably approximately 96 to 100% with respect to the value of the ordinary light receiving sensitivity in the standardized single first main-light-receiving portion 200a (FIG. 27) set at the value of 100%, and, with the values of the light receiving sensitivity in the two changed first sub-light-receiving portions 74B and 74C (FIGS. 5 to 7) being both set at the values of approximately 120 to 160% or preferably approximately 138 to 142%, with respect to the values of the ordinary light receiving sensitivity in the standardized two first sub-light-receiving portions 200*b* and 200*c* (FIG. 27) both set at the value of 100%, the detection of the single first main beam and the detection of the two first sub-beams are accurately and favorably performed with the new setting-changed photodetector 73A.

The value of the light receiving sensitivity in the single second main-light-receiving portion 75A is set at a value of the ordinary light receiving sensitivity in the standardized single second main-light-receiving portion 200*a* (FIG. 28). When a value of the ordinary light receiving sensitivity in the standardized single second main-light-receiving portion 200*a* is set at a value of 100%, a value of the light receiving sensitivity in the single second main-light-receiving portion 75A (FIGS. 5 and 7) to the ordinary light receiving sensitivity in the standardized single second main-light-receiving portion 200*a* is set at a value of approximately 100%.

Also, the values of the light receiving sensitivity in the two second sub-light-receiving portions 75B and 75C are set at the values of the ordinary light receiving sensitivity in the standardized two second sub-light-receiving portions 200*b* and 200*c* (FIG. 28). When values of the ordinary light receiving sensitivity in the standardized two second sub-light-receiving portions 200*b* and 200*c* are both set at a value of 100%, values of the light receiving sensitivity in the two second sub-light-receiving portions 75B and 75C (FIGS. 5 and 7) to the values of the ordinary light receiving sensitivity in the standardized two second sub-light-receiving portions 200*b* and 200*c* are both set at a value of approximately 100%.

If the values of the light receiving sensitivity are set as above, the detection of the single second main beam and the detection of the two second sub-beams are performed accurately with the photodetector 73A. By setting the value of the light receiving sensitivity in the single second main-light-receiving portion 75A at the value of the ordinary light receiving sensitivity in the standardized single second main-light-receiving portion 200*a* (FIG. 28) and by setting the values of the light receiving sensitivity in the two second sub-light-receiving portions 75B and 75C (FIGS. 5 and 7) at the values of the ordinary light receiving sensitivity in the standardized two second sub-light-receiving portions 200*b* and 200*c* (FIG. 28), the detection of the single second main beam and the detection of the two second sub-beams are performed accurately with the photodetector 73A.

With the value of the light receiving sensitivity of the single second main-light-receiving portion 75A (FIGS. 5 and 7) being set at the value of approximately 100% with respect to the value of the ordinary light receiving sensitivity in the standardized single second main-light-receiving portion 200*a* (FIG. 28) set at 100%, and with the values of the light receiving sensitivity in the two second sub-light-receiving portions 75B and 75C (FIGS. 5 and 7) being both set at approximately 100% with respect to the values of the ordinary light receiving sensitivity in the standardized two second sub-light-receiving portions 200*b* and 200*c* (FIG. 28) both set at 100%, the detection of the single second main beam and the detection of the two second sub-beams are performed accurately with the photodetector 73A.

With respect to a current and/or voltage value of an ordinary signal outputted from the standardized single first main-light-receiving portion 200*a* (FIG. 27), the current/voltage values of signals UAa1, UAb1, UAc1, and UAd1 (FIG. 6) outputted from the single first main-light-receiving portion 74A (FIGS. 5 to 7) have been changed or made equal. In more detail, when the current/voltage value of an ordinary signal outputted from the standardized single first main-light-receiving portion 200*a* (FIG. 27) is set at the current/voltage value of 100%, the current/voltage values of the signals UAa1, UAb1, UAc1, and UAd1/TAa1, TAb1, TAc1, and TAd1 (FIG. 6) outputted from the single first main-light-receiving portion 74A (FIGS. 5 to 7), which have been changed or made equal, are set at approximately 100% or approximately less than 100% or a low value of approximately not more than 100% to the current/voltage value of the ordinary signal outputted from the standardized single first main-light-receiving portion 200*a*. If settings of the current/voltage values of the signals UAa1, UAb1, UAc1, and UAd1 outputted from the single first main-light-receiving portion 74A are to be changed, setting of the current/voltage value of the signal outputted from the single first main-light-receiving portion 74A is changed by using, for example, an attenuator (not shown) or the like.

Also, with respect to current and/or voltage values of the ordinary signals outputted from the standardized two first sub-light-receiving portions 200*b* and 200*c* (FIG. 27), the current/voltage values of the signals UBa1, UBb1, UBc1, UBd1, UCa1, UCb1, UCc1, and UCd1 (FIG. 6) outputted from the two first sub-light-receiving portions 74B and 74C (FIGS. 5 to 7) have been changed. In more detail, when the current/voltage values of the ordinary signals outputted from the standardized two first sub-light-receiving portions 200*b* and 200*c* (FIG. 27) are both set at the current/voltage value of 100%, the current/voltage values of the signals UBa1, UBb1, UBc1, UBd1, UCa1, UCb1, UCc1, and UCd1 (FIG. 6) outputted from the two first sub-light-receiving portions 74B and 74C (FIGS. 5 to 7) are also changed from the current/voltage values of the ordinary signals outputted from the standardized two first sub-light-receiving portions 200*b* and 200*c*, and the current/voltage values of the signals TBa1, TBb1, TBc1, TBd1, TCa1, TCb1, TCc1, and TCd1 (FIG. 6) outputted from the two first sub-light-receiving portions 74B and 74C (FIGS. 5 to 7) are also gained-up and set at approximately 100% or more or a high value approximately exceeding 100%.

The setting of the current/voltage values of the signals UBa1, UBb1, UBc1, UBd1, UCa1, UCb1, UCc1, and UCd1 outputted from the two first sub-light-receiving portions 74B and 74C are changed at upstream amplifiers 77FL1, 77FR1, 77GL1, 77GR1, 77HL1, 77HR1, 77IL1, 77IR1 and/or the subsequent-stage amplifiers 77FL2, 77FR2, 77GL2, 77GR2, 77HL2, 77HR2, 77IL2, 77IR2 provided in the photodetector 73A.

If the current/voltage values of the signals UBa1, UBb1, UBc1, UBd1, UCa1, UCb1, UCc1, and UCd1 or the current/voltage values of the signals UAa1, UAb1, UAc1, and UAd1 are changed or set equal to the current/voltage value of the prior-art signal, the detection of the single first main beam and the detection of the two first sub-beams is made easier to be performed accurately in the operation unit 76A while deterioration of the signal is being suppressed, for example. With the current/voltage values of the signals UAa1, UAb1, UAc1, and UAd1 (FIG. 6) outputted from the single first main-light-receiving portion 74A (FIGS. 5 to 7) being changed from or made equal to the current/voltage value of the ordinary signal outputted from the standardized single first main-light-receiving portion 200*a* (FIG. 27), and with the current/voltage values of the signals UBa1, UBb1, UBc1, UBd1, UCa1, UCb1, UCc1, and UCd1 (FIG. 6) outputted from the two first sub-light-receiving portions 74B and 74C (FIGS. 5 to 7) being gain-up changed from the current/voltage values of the ordinary signal outputted from the standardized two first sub-light-receiving portions 200*b* and 200*c* (FIG. 27), the detection of the single first main beam and the detection of the two first sub-beams are made easier to be performed easily accurately in the operation unit 76A while deterioration of the signal is suppressed, for example.

In more detail, with the current/voltage values of the signals UAa1, UAb1, UAc1, and UAd1 (FIG. 6) outputted from the single first main-light-receiving portion 74A (FIGS. 5 to 7), which were changed or made equal, being set at approximately 100% or approximately less than 100% or a low value of approximately not more than 100% with respect to the current/voltage value of the ordinary signal outputted from the standardized single first main-light-receiving portion 200a (FIG. 27) set at 100%, and with the current/voltage values of the signals UBa1, UBb1, UBc1, UBd1, UCa1, UCb1, UCc1, and UCd1 (FIG. 6) outputted from the two first sub-light-receiving portions 74B and 74C (FIGS. 5 to 7) being also changed with respect to the values of the current/voltage value of the ordinary signal outputted from the standardized two first sub-light-receiving portions 200b and 200c (FIG. 27) both set at 100%, and with the current/voltage values of the signals TBa1, TBb1, TBc1, TBd1, TCa1, TCb1, TCc1, and TCd1 (FIG. 6) outputted from the two first sub-light-receiving portions 74B and 74C (FIGS. 5 to 7) being also gained-up and set at approximately 100% or more or a high value approximately exceeding 100%, the detection of the single first main beam and the detection of the two first sub-beams are made easier to be performed accurately in the operation unit 76A while deterioration of the signal is suppressed, for example.

If the current/voltage value of the ordinary signal outputted from the standardized single first main-light-receiving portion 200a (FIG. 27) is set at the current/voltage value of 100%, the current/voltage values of the signals UAa1, UAb1, UAc1, and UAd1 outputted from the single first main-light-receiving portion 74A (FIGS. 5 to 7), which have been changed or made equal, are set at the current/voltage value of approximately at 95 to 100%, or preferably approximately 96 to 100% to the current/voltage value of the ordinary signal outputted from the standardized single first main-light-receiving portion 200a. Also, if the current/voltage values of the current/voltage value of the ordinary signal outputted from the standardized two first sub-light-receiving portions 200b and 200c (FIG. 27) are both set at 100%, the current/voltage values of the signals UBa1, UBb1, UBc1, UBd1, UCa1, UCb1, UCc1, and UCd1 (FIG. 6) outputted from the two first sub-light-receiving portions 74B and 74C (FIGS. 5 to 7) are also changed from the current/voltage values of the ordinary signals outputted from the standardized two first sub-light-receiving portions 200b and 200c, and the current/voltage values of the signals TBa1, TBb1, TBc1, TBd1, TCa1, TCb1, TCc1, and TCd1 (FIG. 6) outputted from the two first sub-light-receiving portions 74B and 74C (FIGS. 5 to 7) are also gained-up and set at the current/voltage values of approximately 120 to 160% or preferably 138 to 142%.

By setting the current/voltage values of the signals UBa1, UBb1, UBc1, UBd1, UCa1, UCb1, UCc1, and UCd1 or the current/voltage values of the signals UAa1, UAb1, UAc1, and UAd1 as above, the detection of the single first main beam and the detection of the two first sub-beams are performed accurately and favorably with the operation unit 76A while deterioration of the signal is being suppressed, for example. With the current/voltage values of the signals UAa1, UAb1, UAc1, and UAd1 (FIG. 6) outputted from the single first main-light-receiving portion 74A (FIGS. 5 to 7), which have been changed or made equal, being set at the current/voltage values of approximately 95 to 100% or preferably 96 to 100% with respect to the current/voltage value of the ordinary signal outputted from the standardized single first main-light-receiving portion 200a (FIG. 27) set at 100%, and with the current/voltage values of the signals UBa1, UBb1, UBc1, UBd1, UCa1, UCb1, UCc1, and UCd1 (FIG. 6) outputted from the two first sub-light-receiving portions 74B and 74C (FIGS. 5 to 7) being also changed with respect to the current/voltage values of the current/voltage value of the ordinary signal outputted from the standardized two first sub-light-receiving portions 200b and 200c (FIG. 27) both set at 100%, and the current/voltage values of the signals UBa1, UBb1, UBc1, UBd1, UCa1, UCb1, UCc1, and UCd1 (FIG. 6) outputted from the two first sub-light-receiving portions 74B and 74C (FIGS. 5 to 7) being also gained-up and set at the current/voltage values of approximately 120 to 160% or preferably 138 to 142%, the detection of the single first main beam and the detection of the two first sub-beams are performed accurately and favorably with in the operation unit 76A while deterioration of the signal is being suppressed, for example.

In this manner, the tracking error signal SE1 is generated accurately.

Depending on the design/specification and the like of the optical pickup apparatus, for example, those in which the settings for the current/voltage value of the signal (UAa1, UAb1, UAc1, and UAd1) immediately after being outputted from the single first main-light-receiving portion (74A), for example, have been changed by the attenuator or the like, not shown, provided in the photodetector (73A), can be also used. Also, depending on the design/specification and the like of the optical pickup apparatus, those in which the settings for the current/voltage values of the signals (TAa1, TAb1, TAc1, and TAd1) outputted from the single first main-light-receiving portion (74A), for example, are changed by the attenuator or the like, not shown, provided in the operation unit (76A), can be also used.

The current/voltage value of the signal outputted from the single second main-light-receiving portion 75A (FIGS. 5 and 7) is set at a current/voltage value of an ordinary signal outputted from the standardized single second main-light-receiving portion 200a (FIG. 28). If the current/voltage value of the ordinary signal outputted from the standardized single second main-light-receiving portion 200a is set at the current/voltage value of 100%, the current/voltage value of the signal outputted from the single second main-light-receiving portion 75A (FIGS. 5 and 7) is set at the current/voltage value of approximately 100% to the current/voltage value of the ordinary signal outputted from the standardized single second main-light-receiving portion 200a.

Also, the current/voltage values of the signals outputted from the two second sub-light-receiving portions 75B and 75C are set at current/voltage values of ordinary signals outputted from the standardized two second sub-light-receiving portions 200b and 200c (FIG. 28). If the current/voltage values of the ordinary signals outputted from the standardized two second sub-light-receiving portions 200b and 200c are both set at the current/voltage values of 100%, the current/voltage values of the signals outputted from the two second sub-light-receiving portions 75B and 75C (FIGS. 5 and 7) are both set at the current/voltage values of approximately 100% to the current/voltage values of the ordinary signals outputted from the standardized two second sub-light-receiving portions 200b and 200c.

If the current/voltage values of the signals are set as above, the detection of the single second main beam and the detection of the two second sub-beams are performed accurately in the operation unit 76A. With the current/voltage value of the signal outputted from the single second main-light-receiving portion 75A being set at the current/voltage value of the ordinary signal outputted from the standardized single second main-light-receiving portion 200a (FIG. 28), and the current/voltage values of the signals outputted from the two second sub-light-receiving portions 75B and 75C (FIGS. 5 and 7)

being set at the current/voltage values of the ordinary signals outputted from the standardized two second sub-light-receiving portions 200b and 200c (FIG. 28), the detection of the single second main beam and the detection of the two second sub-beams are performed with accuracy in the operation unit 76A.

With the current/voltage value of the signal outputted from the single second main-light-receiving portion 75A (FIGS. 5 and 7) being set at the current/voltage value of approximately 100%, with respect to the current/voltage value of the ordinary signal outputted from the standardized single second main-light-receiving portion 200a (FIG. 28) set at 100%, and with the current/voltage values of the signals outputted from the two second sub-light-receiving portions 75B and 75C (FIGS. 5 and 7) being both set at the current/voltage values of approximately 100% with respect to the current/voltage values of the ordinary signals outputted from the standardized two second sub-light-receiving portions 200b and 200c (FIG. 28) both set at 100%, the detection of the single second main beam and the detection of the two second sub-beams are performed accurately in the operation unit 76A.

Detailed description of a process in which the tracking error signal SE2 is generated accurately using each of the current/voltage conversion amplifiers, subsequent-stage amplifiers, adders, subtractors, amplifiers and the like based on the laser beam irradiated on the DVD light receiving region 75 of the photodetector 73A will be omitted here. The detailed description of a process in which the focus error signal is generated accurately based on the laser beam irradiated on the CD light receiving region 74 and the DVD light receiving region 75 of the photodetector 73A will be also omitted here. The detailed description of a process in which signals such as data, information and the like recorded in the optical disc D are generated accurately based on the laser beam irradiated on the CD light receiving region 74 and the DVD light receiving region 75 of the photodetector 73A will be also omitted here.

Also, depending on the design/specification and the like of the optical pickup apparatus, for example, a single-stage current/voltage conversion amplifier (not shown) having an amplification function in which the upstream current/voltage conversion amplifiers (77DL1, 77DR1, 77EL1, 77ER1, 77FL1, 77FR1, 77GL1, 77GR1, 77HL1, 77HR1, 77IL1, 77IR1) and the subsequent-stage amplifiers (77DL2, 77DR2, 77EL2, 77ER2, 77FL2, 77FR2, 77GL2, 77GR2, 77HL2, 77HR2, 77IL2, 77IR2) are combined and integrated is equipped in the photodetector (73A), and those with the reduced number of components such as an amplifier in the photodetector (73A) can be also used.

Also, depending on the design/specification and the like of an optical pickup apparatus, the operation unit (76A) including the adders (77D, 77E, 77F, 77G, 77H, 77I, 78C), the subtractors (77A, 77B, 77C, 78A), the amplifier (78B) and the like is provided in the photodetector (73A) including the light receiving portions (74A, 74B, 74C), the current/voltage conversion amplifiers (77DL1, 77DR1, 77EL1, 77ER1, 77FL1, 77FR1, 77GL1, 77GR1, 77HL1, 77HR1, 77IL1, 77IR1), the subsequent-stage amplifiers (77DL2, 77DR2, 77EL2, 77ER2, 77FL2, 77FR2, 77GL2, 77GR2, 77HL2, 77HR2, 77IL2, 77IR2) and the like, for example, and the photodetector with operation unit (not shown) in which the operation unit (76A) including the adders (77D, 77E, 77F, 77G, 77H, 77I, 78C), the subtractors (77A, 77B, 77C, 78A), the amplifier (78B) and the like and the photodetector (73A) including the light receiving portions (74A, 74B, 74C), the current/voltage conversion amplifiers (77DL1, 77DR1, 77EL1, 77ER1, 77FL1, 77FR1, 77GL1, 77GR1, 77HL1, 77HR1, 77IL1, 77IR1), the subsequent-stage amplifiers (77DL2, 77DR2, 77EL2, 77ER2, 77FL2, 77FR2, 77GL2, 77GR2, 77HL2, 77HR2, 77IL2, 77IR2) and the like are integrated can be also used.

The diffraction surface portion 20a of the diffraction grating 64A (FIGS. 4, 8, and 9) is formed as the single surface portion 20a corresponding to diffraction of the plurality of types of laser wavelength light serving both as the diffraction surface portion 20a that splits the first laser wavelength light at least into one first main beam and two first sub-beams and the diffraction surface portion 20a that splits the second laser wavelength light at least into one second main beam and two second sub-beams.

If the diffraction surface portion 20a of the diffraction grating 64A is formed as above, an optical pickup apparatus can be provided in which occurrence of unnecessary diffraction light in the diffraction grating 64A can be suppressed, a decrease in efficiency of the laser light can be prevented, and moreover, a price can be kept low.

For example, when the first laser wavelength light passes through the first diffraction surface portion 302 of the prior-art diffraction gratings 300A and 300B having the two diffraction surface portions 302 and 304, that is, the first diffraction surface portion 302 (FIGS. 29 and 30) corresponding to the first laser wavelength light and the second diffraction surface portion 304 corresponding to the second laser wavelength light, and the first laser wavelength light is split at least into one first main beam and two first sub-beams, there has been concern that the first main beam of the first laser wavelength light is further diffracted unnecessarily and the first sub-beam is further diffracted unnecessarily by the second diffraction surface portions 304 of the diffraction gratings 300A and 300B, and as a result, the efficiency of the light of the first main beam and the first sub-beam of the first laser wavelength light may decrease.

Also, for example, when the second laser wavelength light passes through the second diffraction surface portion 304 of the prior-art diffraction gratings 300A and 300B having the two diffraction surface portions 302 and 304, that is, the first diffraction surface portion 302 corresponding to the first laser wavelength light and the second diffraction surface portion 304 corresponding to the second laser wavelength light and the second laser wavelength light is split at least into one second main beam and two second sub-beams, there has been concern that the second laser wavelength light is diffracted unnecessarily by the first diffraction surface portions 302 of the diffraction gratings 300A and 300B, and as a result, the efficiency of the light of the second laser wavelength light may decrease.

However, with the diffraction surface portion 20a of the diffraction grating 64A (FIGS. 4, 8, and 9) being formed as the single surface portion 20a corresponding to diffraction of the plurality of types of laser wavelength light serving both as the diffraction surface portion 20a that splits the first laser wavelength light at least into one first main beam and two first sub-beams and the diffraction surface portion 20a that splits the second laser wavelength light at least into one second main beam and two second sub-beams, unnecessary diffraction of the first main beam and the first sub-beam of the first laser wavelength light which results in decrease in efficiency of light of the first main beam and the first sub-beam of the first laser wavelength light or unnecessary diffraction of the second laser wavelength light which results in decrease in efficiency of light of the second laser wavelength light is avoided.

Also, since the diffraction surface portion 20a of the diffraction grating 64A is formed as the single surface portion 20a corresponding to diffraction of the plurality of types of laser wavelength light serving both as the diffraction surface portion 20a that splits the first laser wavelength light at least into one first main beam and two first sub-beams and the diffraction surface portion 20a that splits the second laser wavelength light at least into one second main beam and two second sub-beams, the diffraction grating 64A in which the numbers of parts to be worked, work processes and the like are reduced is constituted. Since the numbers of parts to be worked, work processes and the like of the diffraction grating 64A are reduced, the price of the diffraction grating 64A is kept low. As a result, an optical pickup apparatus whose price can be kept low can be constituted.

As shown in FIGS. 4 and 9, the diffraction grating 64A is provided with phase shift region portions 21 and 22 (FIGS. 4 and 9) that generate a phase shift of $\pi$ radian in a part of the laser beam emitted from the laser unit 61 (FIGS. 1 to 3). The diffraction grating 64A is divided into at least two region portions 21 and 22, that is, the substantially rectangular first region portion 21 and the substantially rectangular second region portion 22 adjacent to the first region portion 21. The diffraction grating 64A is divided into the plurality of region portions 21 and 22. In each of the region portions 21 and 22, a predetermined periodic structure is constituted.

In the diffraction grating 64A shown in FIGS. 4 and 9, the periodic structure of each of the region portions 21 and 22 constituting the diffraction grating 64A is a repetitive periodic structure with minute projections/recesses. Also, the diffraction grating 64A is, for example, a glass plate having a dimension of an approximately 3 to 10 mm square and a thickness of approximately 0.3 to 3 mm.

With the diffraction grating 64A divided into the plurality of region portions 21 and 22 being provided, the detection of the error signal of the optical pickup apparatus for the signal surface portion Da of the media D (FIGS. 5 and 7) can be easily performed favorably. For example, the tracking of the optical pickup apparatus with respect to signal surface portion Da of the media D can be easily performed favorably. Since the diffraction grating 64A (FIGS. 4 and 9) is constituted by being divided into the plurality of region portions 21 and 22, at least three independent light collection spots 80, 81, and 82 are formed on the signal surface portion Da of the media D (FIG. 5). Since at least three independent light collection spots 80, 81, and 82 are formed on the signal surface portion Da of the media D, during recording/reproducing and the like of the two types or more of the media D with different track pitches Dtp, deterioration of detection accuracy of the error signal such as the tracking error signals SE1, SE2 and the like can be easily avoided. Therefore, an optical pickup apparatus in which the tracking control can be performed easily can be provided.

As shown in FIGS. 4 and 9, the diffraction grating 64A is divided into an even number of region portions 21 and 22.

With the diffraction grating 64A divided into an even number of region portions 21 and 22 being provided, the light collection spots 80, 81, and 82 formed on the signal surface portion Da of the media D (FIG. 5) are formed as the light collection spots 80, 81, and 82 with accuracy. For example, since the diffraction grating 64A is divided by a boundary line portion 26 of the diffraction grating 64A (FIGS. 4 and 9) equally into two, that is, into an even number of parts, which are the one region portion 21 and the other region portion 22, when the optical pickup apparatus is equipped with the diffraction grating 64A, the light incident on the diffraction grating 64A can be easily applied in a state substantially equally divided into two on the one region portion 21 and the other region portion 22 of the diffraction grating 64A. Since the light can be easily incident on the one region portion 21 and the other region portion 22 of the diffraction grating 64A in the state substantially equally divided into two, the diffraction grating 64A can be easily equipped with accuracy in the optical pickup apparatus. Therefore, the light collection spots 80, 81, and 82 can be easily formed with accuracy on the signal surface portion Da of the media D (FIG. 5). As a result, during recording/reproducing and the like of the two or more types of the media D with different track pitches Dtp, detection accuracy of the error signal such as the tracking error signals SE1, SE2 and the like is improved. Also, tracking of the optical pickup apparatus with respect to the signal surface portion Da of the media D can be easily performed with accuracy.

As shown in FIGS. 4 and 9, the diffraction grating 64A is divided into the two region portions 21 and 22, that is, the first region portion 21 and the second region portion 22 adjacent to the first region portion 21 and having a periodic structure different from the periodic structure of the first region portion 21. The diffraction grating 64A is constituted as a so-called inline grating divided into two parts.

If the diffraction grating 64A divided into the plurality of region portions 21 and 22 shown in FIGS. 4 and 9 is equipped in the optical pickup apparatus, the detection of the error signal of the optical pickup apparatus for the signal surface portion Da of the media D (FIGS. 2, 3, 5 and 7) is performed favorably. For example, the tracking of the optical pickup apparatus for the signal surface portion Da of the media D is performed favorably. Since the diffraction grating 64A (FIGS. 4 and 9) is constituted by being divided into the two region portions 21 and 22, at least three independent light collection spots 80, 81, and 82 are irradiated on the signal surface portion Da of the media D (FIG. 5). Since at least three independent light collection spots 80, 81, and 82 are irradiated on the signal surface portion Da of the media D, during data recording or the like in the two or more types of the media D with different track pitches Dtp or in data reproduction of the two or more types of the media D with different track pitches Dtp, detection accuracy of the error signal such as the tracking error signals SE1, SE2 and the like caused by displacement of the objective lens 70 (FIGS. 1 to 3), for example, is avoided from being decreased. Therefore, an optical pickup apparatus in which the tracking control can be easily performed can be provided.

As shown in FIG. 9, the diffraction grating 64A has the one substantially rectangular region portion 21, which is the one region portion 21, and the other substantially rectangular region portion 22, which is adjacent to the first region portion 21 and is the second region portion 22. A width 21w of the first region portion 21 and a width 22w of the second region portion 22 of the diffraction grating 64A are approximately equal to each other. The diffraction grating 64A is equally divided by the boundary line portion 26 between the first region portion 21 of the diffraction grating 64A and the second region portion 22 of the diffraction grating 64A adjacent to the first region portion 21 into the one region portion 21 constituting the diffraction grating 64A and the other region portion 22 constituting the diffraction grating 64A. The diffraction grating 64A is divided into an even number of parts.

As a result, the light collection spots 80, 81, and 82 formed on the signal surface portion Da of the media D (FIG. 5) are formed as the light collection spots 80, 81, and 82 with accuracy. Since the diffraction grating 64A is equally divided into two, i.e., the one region portion 21, which is the first region portion 21, and the other region portion 22, which is adjacent to the one region portion 21 and is the second region portion 22, by the boundary line portion 26 between the first region portion 21 and the second region portion 22 adjacent to the first region portion 21 of the diffraction grating 64A (FIGS. 4 and 9) divided into an even number of parts, when the diffraction grating 64A is equipped in a housing (not shown) of the optical pickup apparatus, the laser beam emitted from the laser unit 61 (FIGS. 1 to 3) and incident on the diffraction grating 64A has its optical axis adjusted easily by a camera for optical axis adjustment, not shown, for example. The laser beam emitted from the laser unit 61 and irradiated on the diffraction grating 64A and then, passing through the objective lens 70 is made capable of being observed by using a camera for optical axis adjustment, for example.

In the diffraction grating 64A divided into two parts (FIGS. 4 and 9), since the boundary line portion 26 that equally splits the substantial center of the diffraction grating 64A into two parts so as to constitute the one substantially rectangular region portion 21 and the other substantially rectangular region portion 22 is provided in the diffraction grating 64A, when the optical axis adjustment of the laser beam is performed using the camera for optical axis adjustment or the like, the laser beam can be easily irradiated on the one substantially rectangular region portion 21 constituting the diffraction grating 64A and the other substantially rectangular region portion 22 constituting the diffraction grating 64A in a state divided substantially equally into two parts.

Since the laser beam can be easily incident on the one substantially rectangular region portion 21 constituting the diffraction grating 64A and the other substantially rectangular region portion 22 constituting the diffraction grating 64A in a state divided substantially equally into two parts, it becomes easier for the diffraction grating 64A to be provided in the housing of the optical pickup apparatus while being accurately positioned and adjusted. Therefore, the light collection spots 80, 81, and 82 can be easily formed with accuracy on the signal surface portion Da of the media D (FIG. 5). As a result, the tracking of the optical pickup apparatus for the signal surface portion Da of the media D can be easily performed with accuracy.

The substantially linear boundary line portion 26 constituting the diffraction grating 64A is located between the substantially strip-shaped first region portion 21 and the substantially strip-shaped second region portion 22 constituting the diffraction grating 64A (FIGS. 4 and 9). The periodic structure of the second region portion 22 is a periodic structure having a different phase with respect to the periodic structure of the first region portion 21. The periodic structure of the second region portion 22 is a periodic structure having a phase that is different by approximately 180 degrees with respect to the periodic structure of the first region portion 21.

As a result, the first region portion 21 and the second region portion 22 in the diffraction grating 64A are differentiated from each other, and the phase difference between the first region portion 21 and the second region portion 22 in the diffraction grating 64A is made clear. Since the periodic structure of the second region portion 22 of the diffraction grating 64A has a periodic structure having a phase that is different by approximately 180 degrees with respect to the periodic structure of the first region portion 21 of the diffraction grating 64A, at least three light collection spots 80, 81, and 82 are formed favorably on the signal surface portion Da of the media D (FIG. 5). By means of at least three light collection spots 80, 81, and 82 formed favorably on the signal surface portion Da of the media D, during data recording/reproduction and the like of the plural types of media D with different track pitches Dtp, it becomes easier to avoid deterioration of the tracking error signals SE1 and SE2 caused by displacement of the objective lens 70 (FIGS. 1 to 3), for example.

The first region portion 21 and the second region portion 22 are separated from each other by the boundary line portion 26 that separates the first region portion 21 (FIGS. 4 and 9) from the second region portion 22.

Since the diffraction grating 64A is divided into the two region portions and differentiated, at least three independent light collection spots 80, 81, and 82 are formed on the signal surface portion Da of the media D (FIG. 5). Since at least three light collection spots 80, 81, and 82 are formed independently on the signal surface portion Da of the media D, the tracking of the optical pickup apparatus for the signal surface portion Da of the media D can be performed easily.

The diffraction grating 64A (FIGS. 4 and 9) is formed in a substantially rectangular plate shape. When the diffraction grating 64A is seen in a plan view, the diffraction grating 64A is visually recognized as having a substantially rectangular plate shape.

When the diffraction grating 64A is seen in a plan view in a state in which the vertically long and substantially rectangular first region portion 21 and the vertically long and substantially rectangular second region portion 22 are aligned laterally, in a case where, with respect to the phase of the one region portion of the diffraction grating 64A, the phase of the other region portion adjacent on the right side of the one region portion is shifted in a stepped manner substantially upward to the right, it is defined that the phase of the other region portion is shifted to the positive (+) side.

Also, when the diffraction grating 64A is seen in a plan view in a state in which the vertically long and substantially rectangular first region portion 21 and the vertically long and substantially rectangular second region portion 22 are aligned laterally, in a case where, with respect to the phase of the one region portion of the diffraction grating 64A, the phase of the other region portion adjacent to the right side of the one region portion is shifted in a stepped manner substantially downward to the right it is defined that the phase of the other region portion is shifted to the negative (−) side.

The definitions of the positive (+) phase and the negative (−) phase in this application are definitions for convenience in explaining the phase difference state of the diffraction grating. The definitions of the terms "vertical" and "lateral" in this application are also definitions for convenience in explaining the diffraction grating.

When the diffraction grating 64A is seen in a plan view, with respect to the periodic structure of the first region portion 21, the periodic structure of the second region portion 22 adjacent to the right side of the first region portion 21 is a periodic structure having a phase shifted to the positive side (FIG. 10). With respect to the periodic structure of the first region portion 21 (FIG. 9), the periodic structure of the second region portion 22 is a periodic structure having a phase different by approximately +180 degrees.

This optical pickup apparatus can be used by being equipped in an optical disc device for a desktop personal computer (PC: Personal Computer) and also can be used by being equipped in an optical disc device for a notebook PC or a laptop PC.

This optical pickup apparatus (FIGS. 1 to 3) includes the diffraction grating 64A (FIG. 9) having a substantially rectangular shape in a plan view, the objective lens 70 (FIGS. 1 to 3) that collects at least three light fluxes and applies them to at least three independent light collection spots 80, 81, and 82 on the signal surface portion Da (FIG. 5) of the media D (FIGS. 1 to 3 and 5), and the photodetector 73A (FIGS. 1 to 3 and 5 to 7) that receives reflection light of the three light collection spots 80, 81, and 82 (FIG. 5) in the media D.

If the optical pickup apparatus is configured as above, the tracking of the optical pickup apparatus for the signal surface portion Da of the media D (FIG. 5) is performed with accuracy. Deterioration of amplitudes of the tracking error signals SE1 and SE2 caused by displacement of the objective lens 70 (FIGS. 1 to 3) during the data recording/reproduction and the like of the plurality of types of the media D with different track pitches Dtp or remaining of offset in the tracking error signals SE1 and SE2 can be easily avoided.

With the optical pickup apparatus provided with the phase-shift type diffraction grating 64A divided into two part (FIGS. 4 and 9), the data reproducing operation or the data recording operation of the optical pickup apparatus for DVD-RAM is performed reliably. The data reproducing operation or the data recording operation of the optical pickup apparatus for DVD±R, DVD±RW can also be performed reliably.

The photodetector 73A shown in FIGS. 1 to 3 is configured as the one photodetector 73A capable of receiving a plurality of types of laser wavelength light such as, for example, two types of laser wavelength light, three types of laser wavelength light and the like.

With the one photodetector 73A capable of receiving the plurality of types of laser wavelength light being equipped in the optical pickup apparatus, the optical pickup apparatus is configured as being capable of handling multiple types of the media D (FIGS. 1 to 3, 5 and 7), and reduction of price is achieved due to the reduction in the number of components in the optical pickup apparatus. Since the photodetector 73A (FIGS. 1 to 3) is configured as the photodetector 73A capable of handling a plurality of types of wavelength light, that can receive two or more types of wavelength light, that is, the first wavelength light and the second wavelength light, which has a wavelength different from the first wavelength light and is the laser beam having a wavelength shorter than the first laser wavelength light, the optical pickup apparatus can handle multiple types of the media D. Also, as a result, since the photodetector capable of receiving the first wavelength light and the photodetector capable of receiving the second wavelength light are integrated as the single photodetector 73A, reduction of the number of components, size reduction, weight and thickness reduction of the optical pickup apparatus can be realized. As the result of the reduction of the number of components of the optical pickup apparatus, the price of the optical pickup apparatus is kept low. Therefore, an optical pickup apparatus that can handle the multiple types of the media D and in which reduction of the number of components, price reduction, size reduction, weight and thickness reduction of the optical pickup apparatus and the like are realized can be provided.

Also, this optical pickup apparatus includes the one light emitting element 61 (FIGS. 1 to 3) capable of emitting multiple types of laser wavelength light such as two types of laser wavelength light, three types of laser wavelength light and the like.

If the one light emitting element 61 capable of emitting multiple types of laser wavelength light is equipped in the optical pickup apparatus, an optical pickup apparatus capable of handling multiple types of the media D (FIGS. 1 to 3, 5, and 77) is configured, and price reduction with the reduction of the number of components of the optical pickup apparatus can be also realized. Since the light emitting element 61 (FIGS. 1 to 3) is configured as the light emitting element 61 capable of emitting a plurality of types of wavelength light, that can emit at last two or more types of wavelength light, that is, the first wavelength light and the second wavelength light, which has a wavelength different from the first wavelength light and is the laser beam having a wavelength shorter than the first laser wavelength light, for example, the optical pickup apparatus can handle the multiple types of the media D. Also, as a result, since the light emitting element capable of emitting at least the first wavelength light and the light emitting element capable of emitting the second wavelength light are integrated as the single light emitting element 61, reduction of the number of components, size reduction, weight and thickness reduction of the optical pickup apparatus can be achieved. As the result of the reduction in the number of components of the optical pickup apparatus, the price of the optical pickup apparatus is kept low. Therefore, an optical pickup apparatus that can handle the multiple types of the media D and in which reduction of the number of components, price reduction, size reduction, weight and thickness reduction of the optical pickup apparatus and the like are realized can be provided.

Also, as the result of the reduction of the number of components of the optical pickup apparatus, performances/quality of the optical pickup apparatus is made stable. For example, if the first light emitting element capable of emitting the first wavelength light and the second light emitting element capable of emitting the second wavelength light are separately equipped in the housing or the like, "fluctuation" might occur in the optical axis of the first wavelength light and the optical axis of the second wavelength light due to a mounting error of the first light emitting element and/or the second light emitting element, for example. However, if the light emitting element capable of emitting the first wavelength light and the light emitting element capable of emitting the second wavelength light are integrated as the single light emitting element 61, occurrence of the "fluctuation" of the optical axis caused by the mounting error or the like can be reduced. Therefore, performances/quality of the optical pickup apparatus is made stable.

The first laser wavelength light is a wavelength light compliant with the CD standard. The first laser wavelength light is infrared laser light compliant with the CD standard. In more detail, the wavelength of the first laser wavelength light is approximately 765 to 840 nm corresponding to the CD-standard optical disc D and the wavelength to be the basis is approximately 780 to 782 nm. The wavelength light with the wavelength to be the basis contained in a range of approximately 765 to 840 nm is assumed to be the first laser wavelength light, for example. The first laser wavelength light emitted from the first light source 62 of the two-wavelength light emitting element 61 might be fluctuated by a heat accumulation temperature and the like of the light emitting element 61, for example.

Also, the second laser wavelength light is a wavelength light compliant with the DVD standard. The second laser wavelength light is red laser light compliant with the DVD standard. In more detail, the wavelength of the second laser wavelength light is approximately 630 to 685 nm corresponding to the DVD-standard optical disc D and the wavelength to be the basis is approximately 635 to 660 nm. The wavelength light with the wavelength to be the basis contained in a range of approximately 630 to 685 nm is assumed to be the second laser wavelength light, for example. The second laser wavelength light emitted from the second light source 63 of the two-wavelength light emitting element 61 might be fluctuated by a heat accumulation temperature and the like of the light emitting element 61, for example.

If the diffraction grating 64A having the diffraction surface portion 20a (FIGS. 4, 8, and 9) only on one side face is used, when the first laser wavelength light having approximately 765 to 840 nm corresponding to the CD-standard optical disc D (FIGS. 1 to 3) and compliant with the CD-standard with the wavelength to be the basis of approximately 780 to 782 nm passes through the diffraction grating 64A, occurrence of unnecessary diffraction light is substantially prevented.

Also, if the diffraction grating 64A having the diffraction surface portion 20a (FIGS. 4, 8, and 9) only on one side face is used, when the second laser wavelength light having approximately 630 to 685 nm and compliant with the DVD-standard optical disc D (FIGS. 1 to 3) with the wavelength to be the basis of approximately 635 to 660 nm passes through the diffraction grating 64A, occurrence of unnecessary diffraction light is substantially prevented.

When the first laser wavelength light with predetermined wavelength light compliant with the CD standard passes through the diffraction surface portion 20a of the diffraction grating 64A (FIGS. 4, 8, and 9) corresponding to the second laser wavelength light compliant with the DVD standard and based on the second laser wavelength light, the two first sub-beams of the first laser wavelength light compliant with the CD standard divided substantially without generating unnecessary diffraction light are reliably irradiated on the two first sub-light-receiving portions 74B and 74C with the center-to-center distance Ys(cd) between which is changed with respect to the single first main-light-receiving portion 74A of the first light receiving region 74 provided in the photodetector 73A (FIG. 7). Also, when the first laser wavelength light with predetermined wavelength light compliant with the CD standard passes through the diffraction surface portion 20a of the diffraction grating 64A (FIGS. 4, 8, and 9) corresponding to the second laser wavelength light compliant with the DVD standard and based on the second laser wavelength light, the single first main beam of the first laser wavelength light compliant with the CD standard divided substantially without generating unnecessary diffraction light is reliably irradiated on the single first main-light-receiving portion 74A of the first light receiving region 74 provided in the photodetector 73A (FIG. 7).

Also, when the second laser wavelength light with predetermined wavelength light compliant with the DVD standard passes through the diffraction surface portion 20a of the diffraction grating 64A (FIGS. 4, 8, and 9) corresponding to the second laser wavelength light compliant with the DVD standard and based on the second laser wavelength light, the second laser wavelength light with the predetermined wavelength light compliant with the DVD standard is divided at least into one second main beam and two second sub-beams substantially without generating unnecessary diffraction light. The two second sub-beams of the second laser wavelength light compliant with the DVD standard are reliably irradiated on the two second sub-light-receiving portions 75B and 75C of the second light receiving region 75 compliant with the same standard as the prior-art one provided in the photodetector 73A (FIG. 7), and the single second main beam of the second laser wavelength light compliant with the DVD standard is reliably irradiated on the single second main-light-receiving portion 75A of the second light receiving region 75 compliant with the same standard as the prior-art one provided in the photodetector 73A.

Depending on the design/specification and the like of the optical pickup apparatus and the like, the first laser wavelength light may be wavelength light compliant with the "DVD" standard, for example. The first laser wavelength light may be red laser light compliant with the "DVD" standard, for example. In more detail, the wavelength of the first laser wavelength light is approximately 630 to 685 mm corresponding to the optical disc (D) of the "DVD" standard and has the wavelength to be the basis of approximately 635 to 660 nm. The wavelength light with the wavelength to be the basis contained in the range of approximately 630 to 685 nm, for example, is assumed to be the first laser wavelength light. The first laser wavelength light emitted from the first light source (62) of the two-wavelength light emitting element (61) might be fluctuated by a heat accumulation temperature and the like of the light emitting element (61), for example.

Also, depending on the design/specification and the like of the optical pickup apparatus and the like, the second laser wavelength light may be wavelength light compliant with the "Blu-ray Disc" standard, the "HD DVD" standard, the "CBHD" standard and the like, for example. The second laser wavelength light may be blue-violate laser light compliant with the "Blu-ray Disc" standard, the "HD DVD" standard, the "CBHD" standard and the like, for example. In more detail, the wavelength of the second laser wavelength light is approximately 340 to 450 mm, preferably approximately 380 to 450 nm or more preferably exceeding approximately 400 nm and not more than 450 nm, for example, corresponding to the optical disc (D) of the "Blu-ray Disc" standard, the "HD DVD" standard, the "CBHD" standard and the like and has the reference wavelength of approximately 405 nm. The wavelength light with the reference wavelength within the range of approximately 340 to 450 nm, preferably the wavelength light with the reference wavelength within the range of approximately 380 to 450 nm or more preferably the wavelength light with the reference wavelength within the range exceeding approximately 400 nm and not more than 450 nm, for example, is assumed to be the second laser wavelength light. The second laser wavelength light emitted from the second light source (63) of the two-wavelength light emitting element (61) might be fluctuated by a heat accumulation temperature and the like of the light emitting element (61), for example.

If the diffraction grating (64A) having the diffraction surface portion (20a) (FIGS. 4, 8, and 9) only on one side face is used, when the first laser wavelength light having the wavelength of approximately 630 to 685 nm corresponding to the "DVD" standard optical disc (D) (FIGS. 1 to 3) and compliant with the "DVD" standard with the wavelength to be the basis of approximately 635 to 660 nm passes through the diffraction grating (64A), occurrence of unnecessary diffraction light is substantially prevented.

Also, if the diffraction grating (64A) having the diffraction surface portion (20a) (FIGS. 4, 8, and 9) only on one side face is used, when the second laser wavelength light having the wavelength of approximately 340 to 450 nm, preferably approximately 380 to 450 nm or more preferably exceeding approximately 400 nm and not more than 450 nm corresponding to the optical disc (D) (FIGS. 1 to 3) of the "Blu-ray Disc" standard, the "HD DVD" standard, "CBHD" standard and the like with the reference wavelength of approximately 405 nm and compliant with the "Blu-ray Disc" standard, the "HD DVD" standard, "CBHD" standard and the like with the reference wavelength of approximately 405 nm passes through the diffraction grating (64A), occurrence of unnecessary diffraction light is substantially prevented.

When the first laser wavelength light with predetermined wavelength light compliant with the "DVD" standard passes through the diffraction surface portion (20a) of the diffraction grating (64A) (FIGS. 4, 8, and 9) corresponding to the second laser wavelength light compliant with the "Blu-ray Disc" standard, the "HD DVD" standard, "CBHD" standard and the like and based on the second laser wavelength light, the two first sub-beams of the first laser wavelength light compliant with the "DVD" standard divided substantially without generating unnecessary diffraction light are reliably irradiated on the two first sub-light-receiving portions (74B and 74C) the center-to-center distance (Ys(cd)) between which is changed with respect to the single first main-light-receiving portion (74A) of the first light receiving region (74) provided in the photodetector (73A) (FIG. 7). Also, when the first laser wavelength light with predetermined wavelength light compliant with the "DVD" standard passes through the diffraction surface portion (20a) of the diffraction grating (64A) (FIGS. 4, 8, and 9) corresponding to the second laser wavelength light compliant with the "Blu-ray Disc" standard, the "HD DVD" standard, "CBHD" standard and the like and based on the second laser wavelength light, the single first main beam of the first laser wavelength light compliant with the "DVD" standard divided substantially without generating unnecessary diffraction light is reliably irradiated on the single first main-light-receiving portion (74A) of the first light receiving region (74) provided in the photodetector (73A) (FIG. 7).

Also, when the second laser wavelength light with predetermined wavelength light compliant with the "Blu-ray Disc" standard, the "HD DVD" standard, "CBHD" standard and the like passes through the diffraction surface portion (20a) of the diffraction grating (64A) (FIGS. 4, 8, and 9) corresponding to the second laser wavelength light compliant with the "Blu-ray Disc" standard, the "HD DVD" standard, "CBHD" standard and the like and based on the second laser wavelength light, the second laser wavelength light with the predetermined wavelength light compliant with the "Blu-ray Disc" standard, the "HD DVD" standard, "CBHD" standard and the like is split at least into one second main beam and two second sub-beams substantially without generating unnecessary diffraction light. The two second sub-beams of the second laser wavelength light compliant with the "Blu-ray Disc" standard, the "HD DVD" standard, "CBHD" standard and the like are reliably irradiated on the two second sub-light-receiving portions (75B, 75C) of the second light receiving region (75) compliant with the same standard as the prior-art one provided in the photodetector (73A) (FIG. 7), and the single second main beam of the second laser wavelength light compliant with the "Blu-ray Disc" standard, the "HD DVD" standard, "CBHD" standard and the like is reliably irradiated on the single second main-light-receiving portion (75A) of the second light receiving region (75) compliant with the same standard as the prior-art one provided in the photodetector (73A).

Also, the optical pickup apparatus shown in FIGS. 1 to 3 and the like can handle the media D having a plurality of signal surface portions Da such as the first layer DL0 (FIG. 7), the second layer DL1 and the like.

With the optical pickup apparatus configured as above, reading of signals and information by the optical pickup apparatus from the media D having the plurality of signal surface portion Da such as the first layer DL0 (FIG. 7), the second layer DL1 and the like and/or writing of signals and information by the optical pickup apparatus in the media D having the plurality of signal surface portion Da such as the first layer DL0, the second layer DL1 and the like are performed favorably. Since the optical pickup apparatus (FIGS. 1 to 3) in which occurrence of unnecessary light by the diffraction grating 64A (FIGS. 1 to 4, 8 and 9) is suppressed is configured, nonconformity caused by occurrence of unnecessary light, for example, during reading of data, signals, information and the like by the optical pickup apparatus from the media D having the plurality of signal surface portions Da and during writing of the data, signals, information and the like in the media D having the plurality of signal surface portions Da and the like is avoided.

When signal reproduction or signal recording and the like is performed in the first layer DL0 of the DVD-standard media D having the plurality of layers DL0 and DL1, that is, the first layer DL0 (FIG. 7) and the second layer DL1, for example, a situation is avoided that unnecessary light by the diffraction grating 64A (FIGS. 1 to 4, 8, and 9) is irradiated on the second layer DL1 of the DVD-standard media D, and as a result, unnecessary reflection light in the second layer DL1 in the DVD-standard media D enters one or both of the one second sub-light-receiving portion 75B or the other second sub-light-receiving portion 75C of the DVD light receiving region 75 of the photodetector 73A as noise and results in a so-called inter-layer crosstalk in the photodetector 73A.

Also, when signal reproduction or signal recording and the like is performed in the first layer (DL0) of the media (D) of the "Blu-ray Disc" standard, the "HD DVD" standard, "CBHD" standard and the like having the plurality of layers (DL0) and (DL1), that is, the first layer (DL0) (FIG. 7) and the second layer (DL1), for example, a situation is avoided that unnecessary light by the diffraction grating (64A) (FIGS. 1 to 4, 8, and 9) is irradiated on the second layer (DL1) of the media (D) of the "Blu-ray Disc" standard, the "HD DVD" standard, "CBHD" standard and the like, and as a result, unnecessary reflection light in the second layer (DL1) in the media (D) of the "Blu-ray Disc" standard, the "HD DVD" standard, "CBHD" standard and the like enters one or both of the one second sub-light-receiving portion (75B) or the other second sub-light-receiving portion (75C) of the DVD light receiving region (75) of the photodetector (73A) as noise and results in a so-called inter-layer crosstalk in the photodetector (73A).

Embodiment 2

Figure 11:
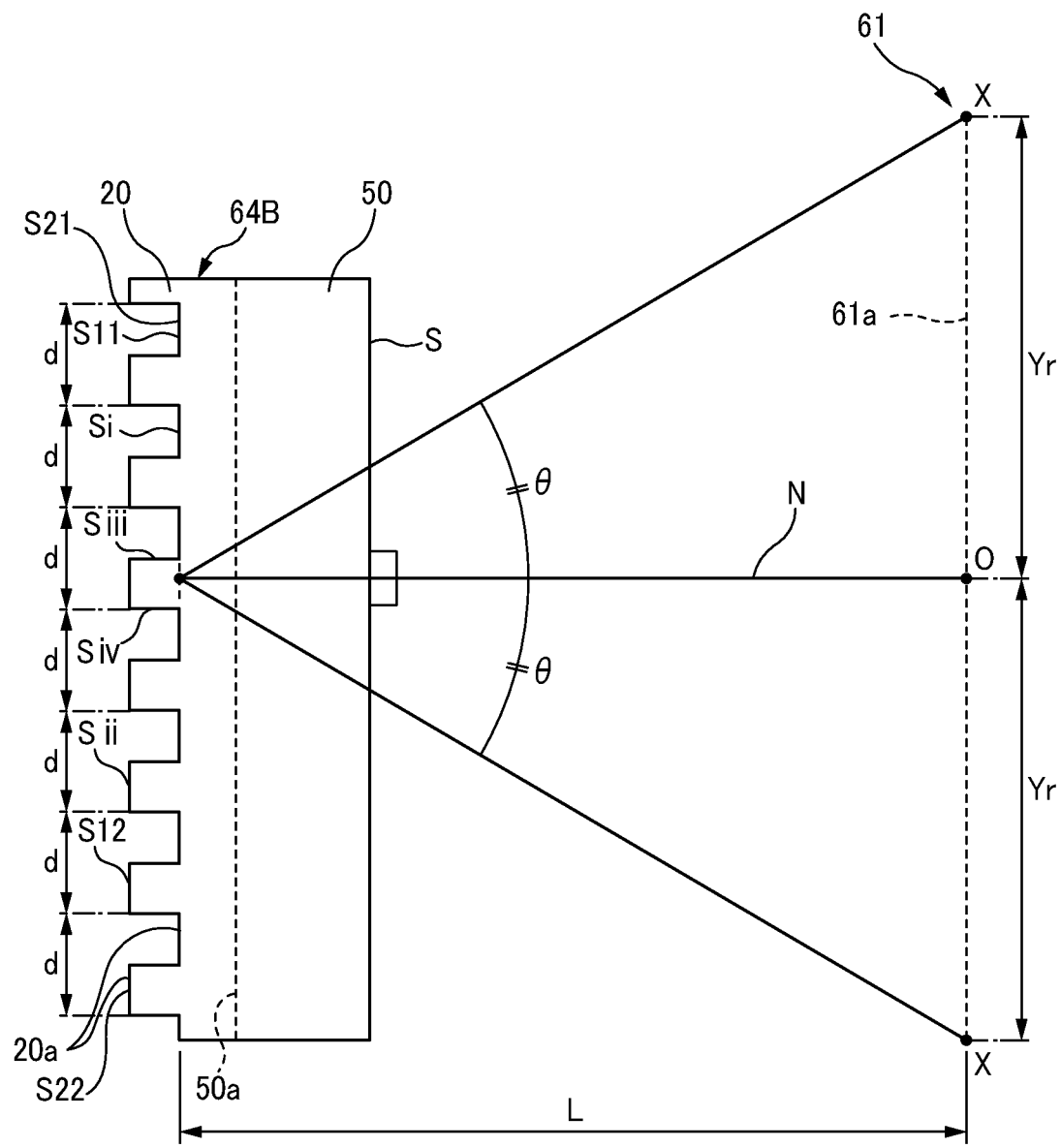
FIG. 11 is an outline view illustrating a second embodiment of the diffraction grating equipped in the optical pickup apparatus.

FIG. 11 is an outline diagram illustrating a second embodiment of a diffraction grating equipped in an optical pickup apparatus.

Instead of the diffraction grating 64A shown in FIGS. 1 to 3 and 8, a diffraction grating 64B shown on the right hand side of FIG. 4 and FIG. 11 is equipped in the optical pickup apparatus (FIGS. 1 to 3). There is no change in the optical pickup apparatus and the optical disc device except that the diffraction grating 64A shown in FIGS. 1 to 3 and 8 is replaced with the diffraction grating 64B shown on the right hand side of FIG. 4 and FIG. 11. Embodiment 1 and Embodiment 2 are different from each other in that the diffraction grating 64A shown in FIGS. 1 to 3 and 8 is replaced with the diffraction grating 64B shown on the right hand side of FIG. 4 and FIG. 11, but Embodiment 1 and Embodiment 2 are common in portions other than the diffraction gratings 64A and 64B. For the sake of convenience, Embodiment 2 will be described also with reference to FIGS. 1 to 10. Also, in Embodiment 2, portions which are the same as those described in the description in Embodiment 1 are indicated with the same reference numerals, and detailed description thereof is omitted.

The diffraction grating 64B is, as shown in FIG. 4, configured in such a manner that the diffraction grating member 20 for DVD in which the phase of the periodic structure of grating grooves formed in one half plane 21 is shifted from the phase of the periodic structure of the grating grooves formed in the other half plane 22 by approximately 180 degrees is fastened to one of the plane portions 50a of an optical glass plate 50. Since the optical glass plate 50 is provided, the diffraction grating 64B is more improved in mechanical strength than the diffraction grating 64A (left hand side in FIG. 4 and FIG. 8).

First, the diffraction angle θ is determined by an approximate equation on the basis of the Bragg condition expressed as the above equation (16) based on the wavelength λ of the first or second laser beam emitted from the first or second light source 62 or 63 of the laser unit 61 and the grating interval d having a cycle which is continuous in the diffraction grating 64B from the recess portion S11 to the projection portion S12 or from the projection portion S12 to the recess portion S11 (See FIG. 11). The explanatory diagram shown in FIG. 11 is a diagram illustrated for the sake of convenience in facilitating the explanation.

Subsequently, the second light emitting point X indicating an apparent position of the first or second light source 62 or 63 related to the sub-beam on the light emitting surface 61a of the laser unit 61 can be determined based on the normal distance L from the first light emitting point O indicating the actual position of the first or second light source 62 or 63 included in the light emitting surface 61a of the laser unit 61 to the bottom face Si forming the recess surface S21 on the back side of the substantially smooth surface S of the diffraction grating 64B or to the outer face Sii forming the projecting surface S22 and the diffraction angle θ acquired by the above equation (16). The light emitting surface 61a of the laser unit 61 is perpendicular to the normal N to the substantially smooth surface S of the diffraction grating 64B and is a plane spaced apart from the bottom face Si forming the recess surface S21 on the back side of the surface S and the outer face Sii forming the projecting surface S22 only by a substantial normal distance L. From the above equation (17), the distance Yr from the first light emitting point O to the second light emitting point X on the light emitting surface 61a of the laser unit 61 can be determined (See FIG. 11).

Also, based on the above equation (16) and the equation (17), the above equation (20) is obtained. Also, using the above equations (21), (22), and (23), the light receiving interval Ys(dvd) in the DVD light receiving region 75 in the photodetector 73A is obtained. Also, using the above equations (24), (25), and (26), the light receiving interval Ys(cd) in the CD light receiving region 74 in the photodetector 73A is obtained.

Embodiment 3

Figure 12:
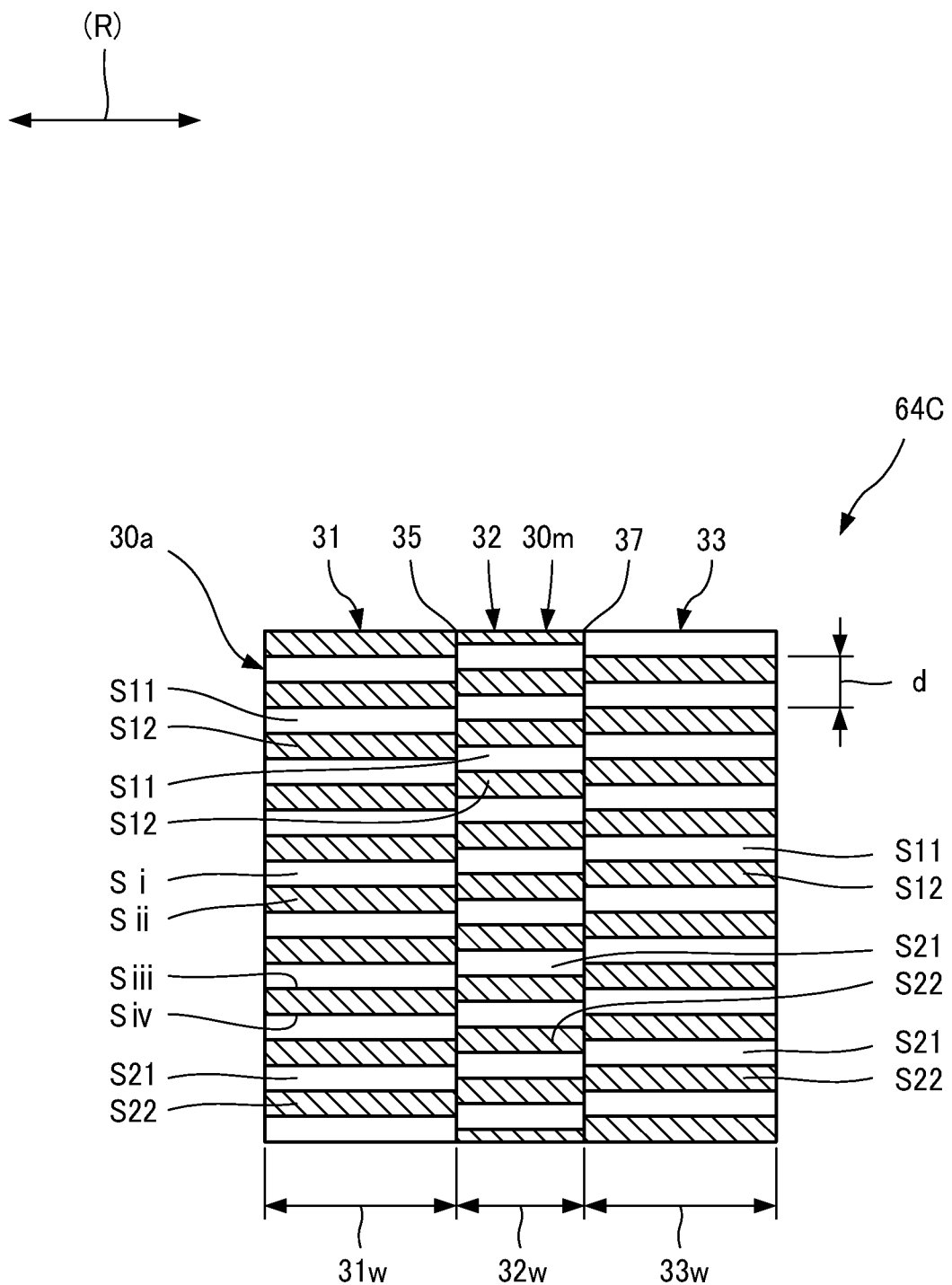
FIG. 12 is an outline plan view illustrating a third embodiment of the diffraction grating equipped in the optical pickup apparatus.
Figure 13:
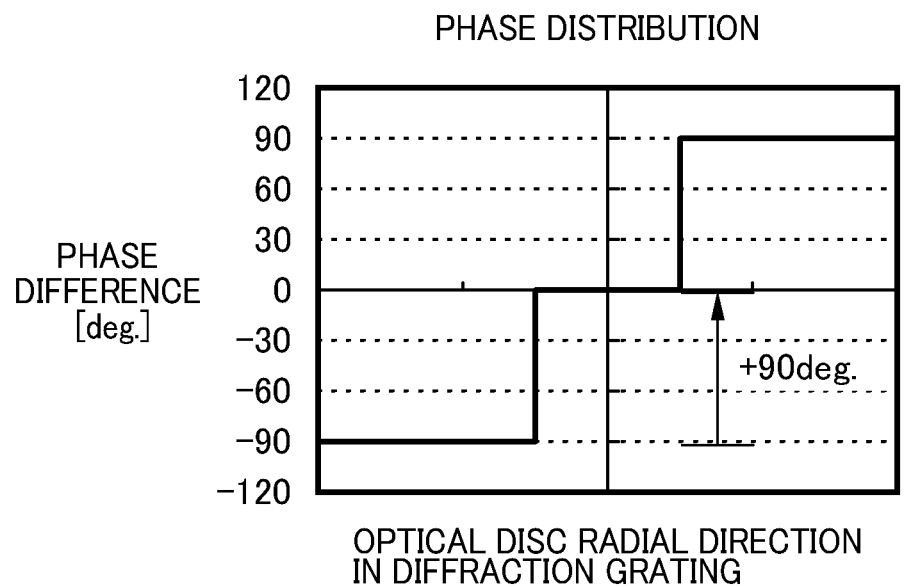
FIG. 13 is a diagram illustrating a relationship between an optical disc radial direction and a phase difference in the diffraction grating in FIG. 12.

FIG. 12 is a schematic plan view illustrating a third embodiment of a diffraction grating provided in an optical pickup apparatus, and FIG. 13 is a diagram illustrating a relationship between an optical disc radial direction in the diffraction grating in FIG. 12 and a phase difference.

Instead of the diffraction grating 64A shown in FIGS. 1 to 3 and 8, a diffraction grating 64C shown in FIG. 12 is provided in the optical pickup apparatus (FIGS. 1 to 3). There is no change in the optical pickup apparatus and the optical disc device except for the diffraction grating 64A shown in FIGS. 1 to 3 and 8 replaced with the diffraction grating 64C shown in FIG. 12. Embodiment 1 and Embodiment 3 are different from each other in a point that the diffraction grating 64A shown in FIGS. 1 to 3 and 8 is replaced with the diffraction grating 64C shown in FIG. 12, but Embodiment 1 and Embodiment 3 are considered to be common in other part thereof except for the diffraction gratings 64A and 64C. Embodiment 3 will be described using also FIGS. 1 to 8 and 16 to 24 for convenience. In Embodiment 3, components equivalent to those described in Embodiment 1 are designated by the same reference numerals, to omit the detailed descriptions thereof.

Figure 16:
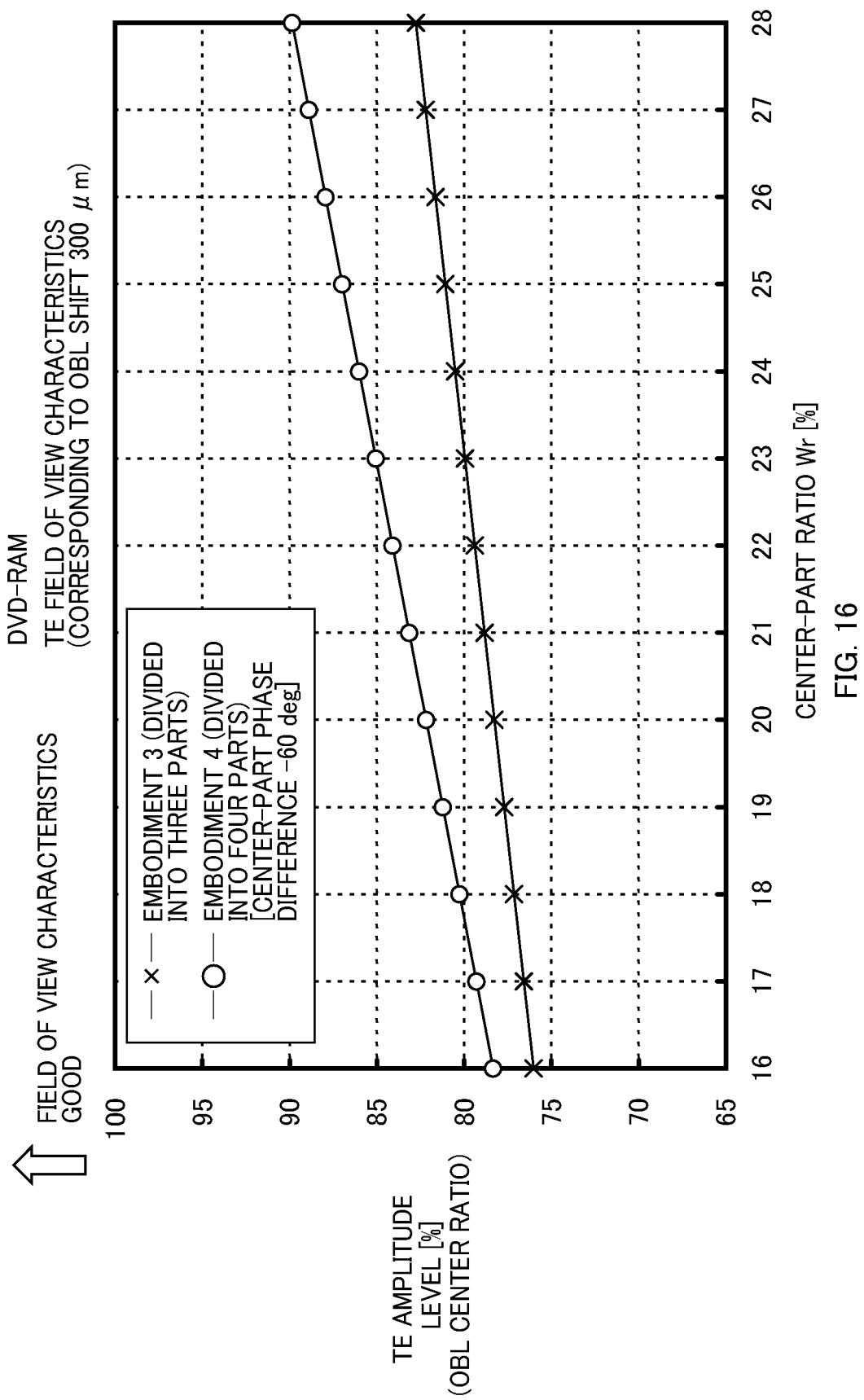
FIG. 16 is an explanatory diagram illustrating field of view characteristics of the optical pickup apparatus.
Figure 17:
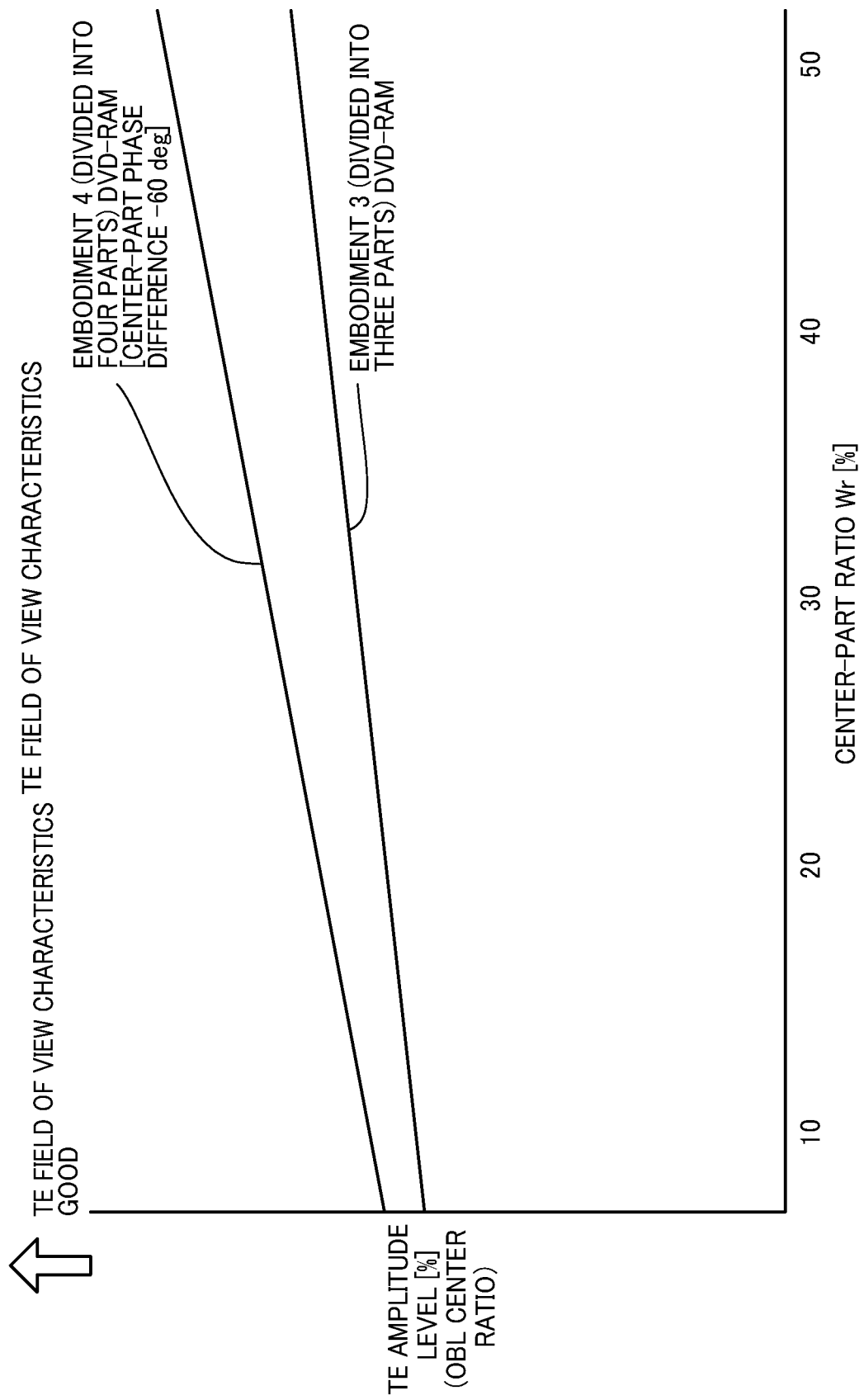
FIG. 17 is an explanatory diagram illustrating field of view characteristics of the optical pickup apparatus.
Figure 18:
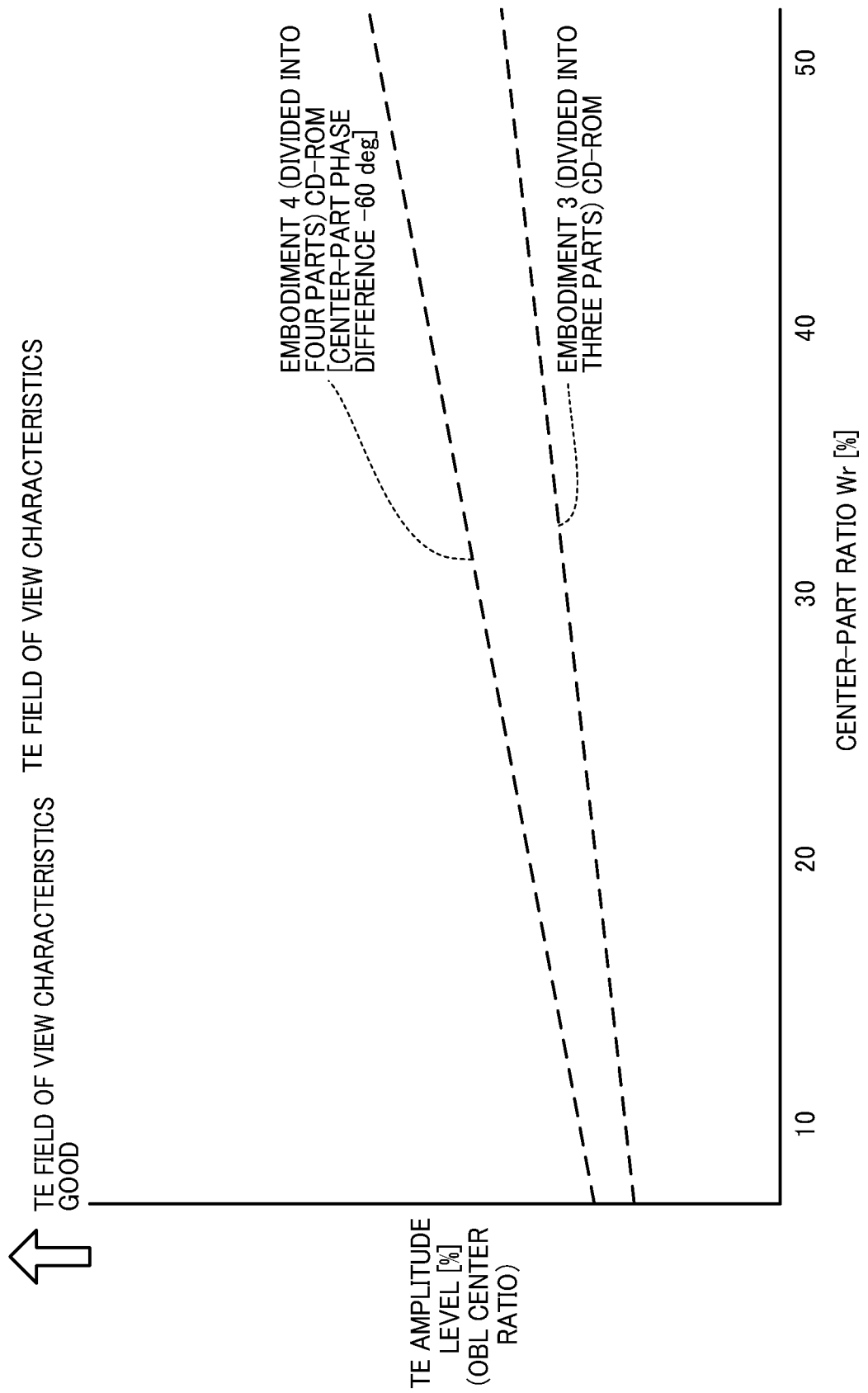
FIG. 18 is an explanatory diagram illustrating field of view characteristics of the optical pickup apparatus.
Figure 19:
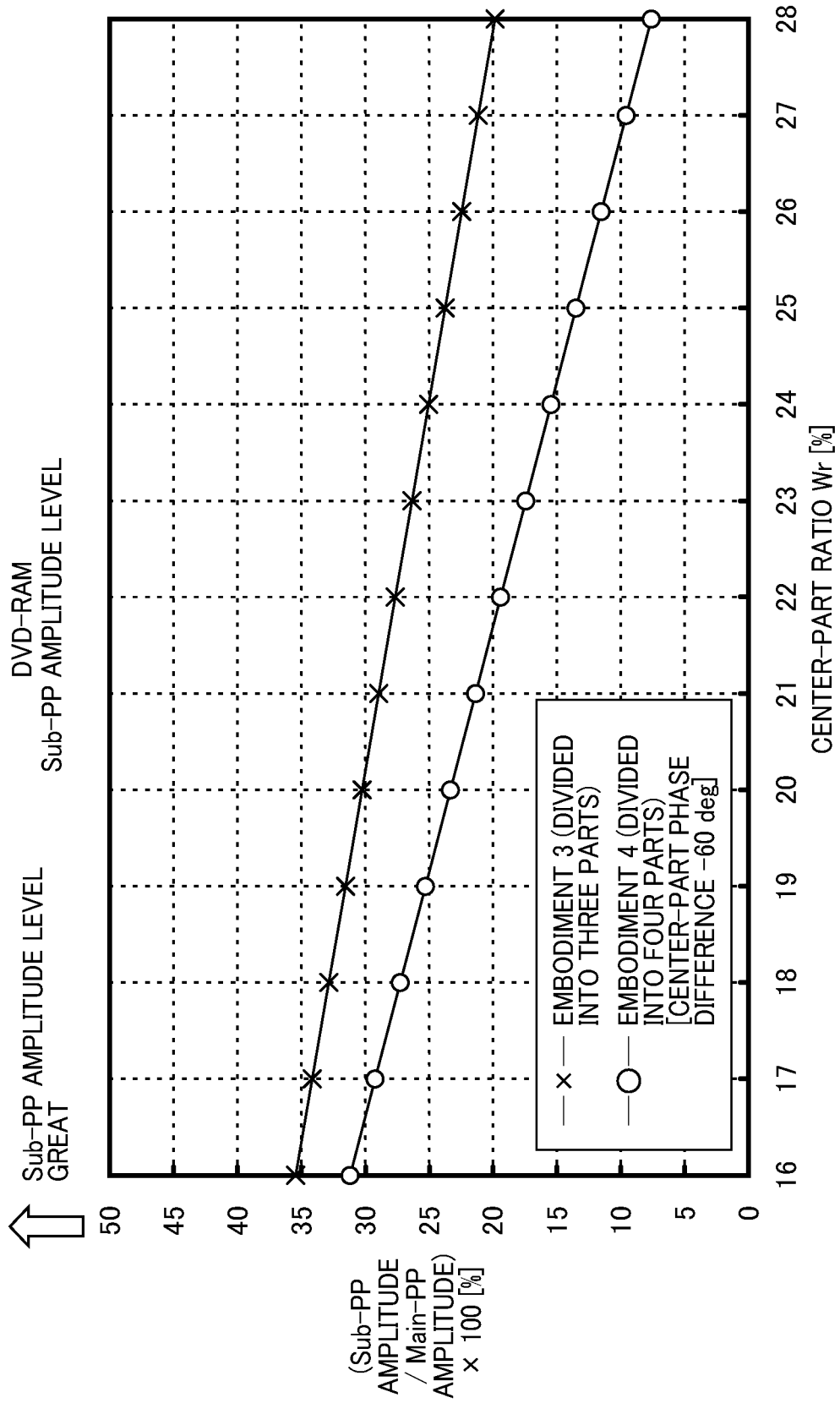
FIG. 19 is an explanatory diagram illustrating an amplitude level characteristic of a sub-push-pull signal of the optical pickup apparatus.
Figure 20:
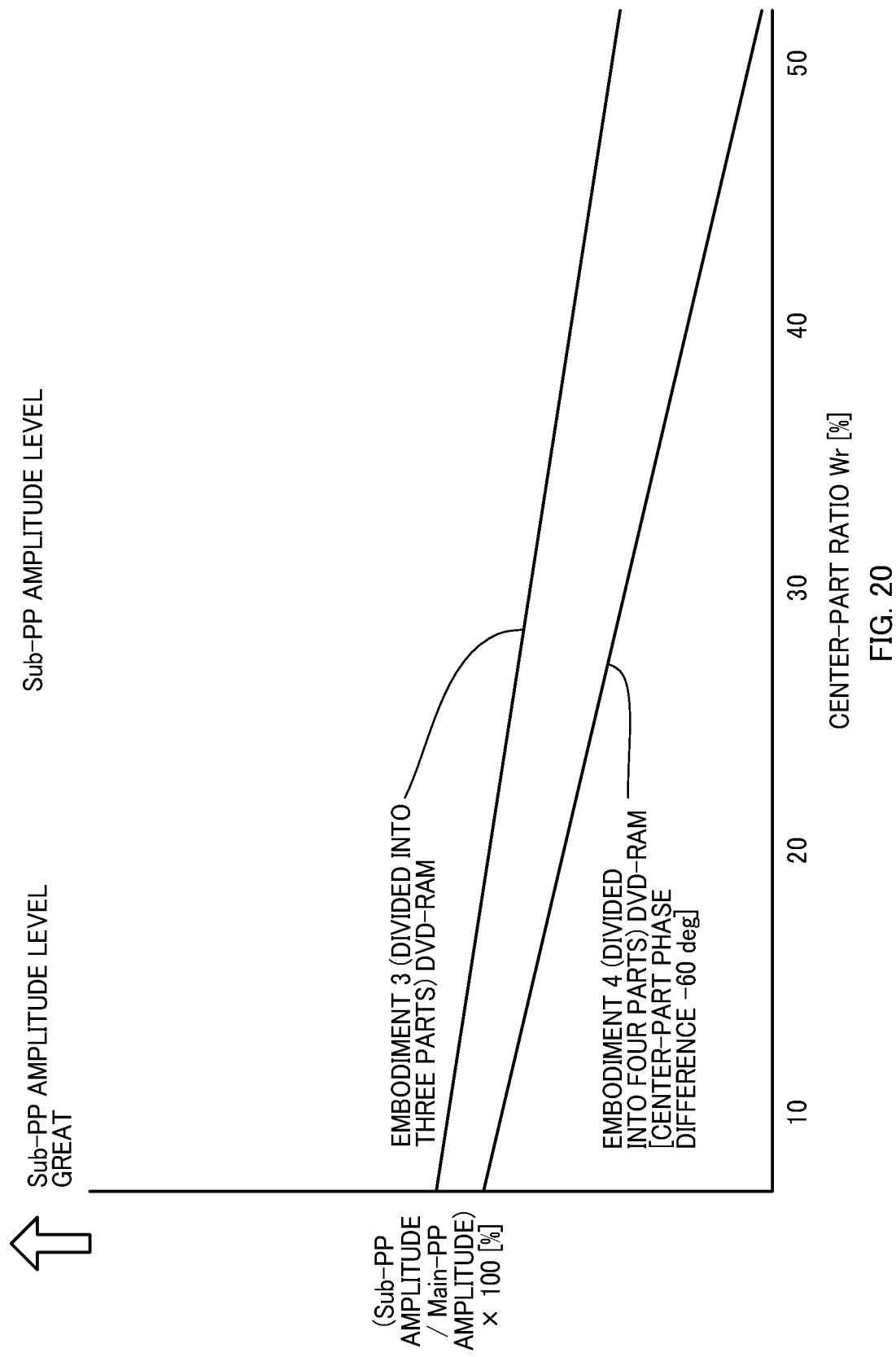
FIG. 20 is an explanatory diagram illustrating an amplitude level characteristic of a sub-push-pull signal of the optical pickup apparatus.
Figure 21:
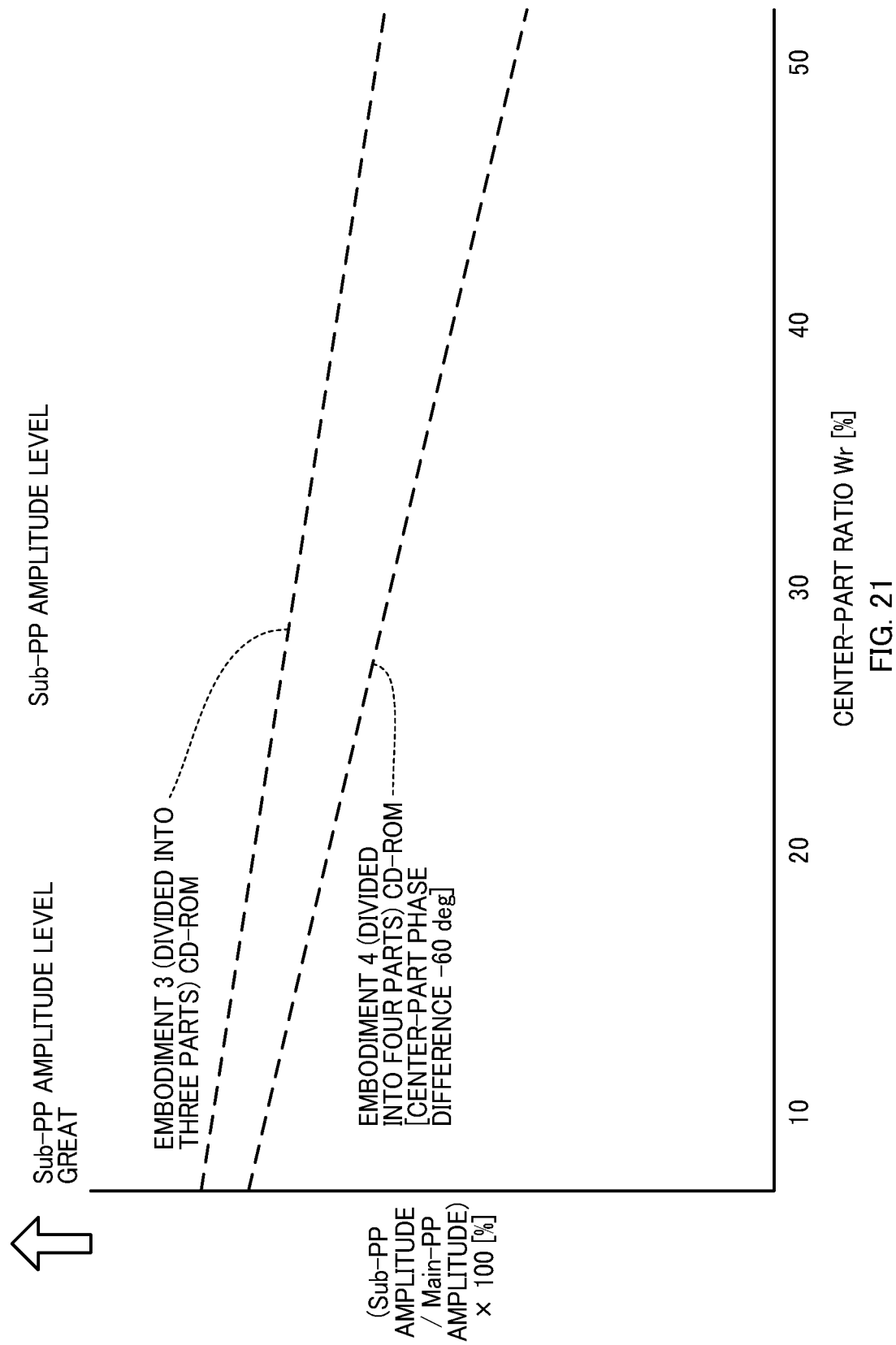
FIG. 21 is an explanatory diagram illustrating an amplitude level characteristic of a sub-push-pull signal of the optical pickup apparatus.
Figure 22:
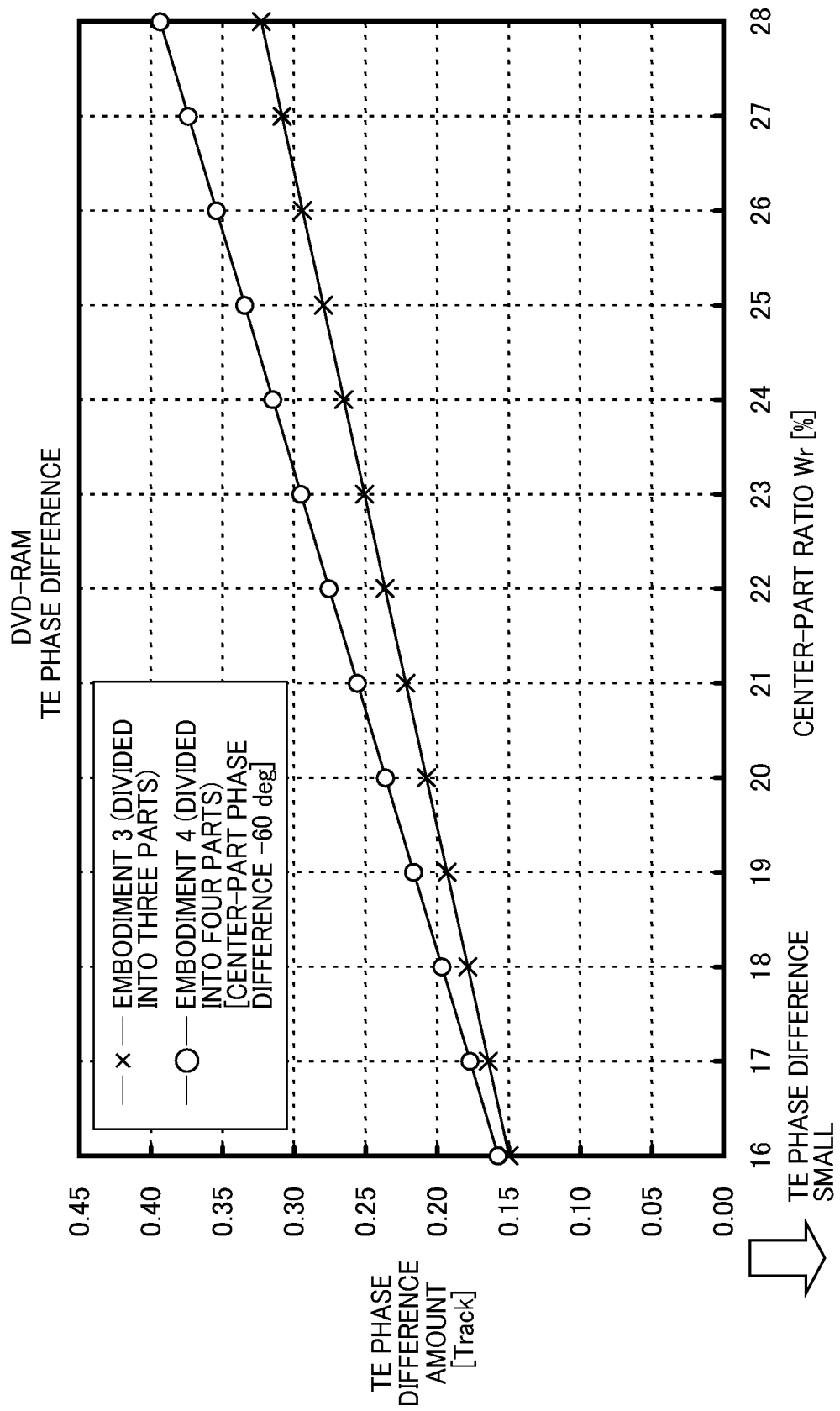
FIG. 22 is an explanatory diagram illustrating a tracking error phase difference characteristic of the optical pickup apparatus.
Figure 23:
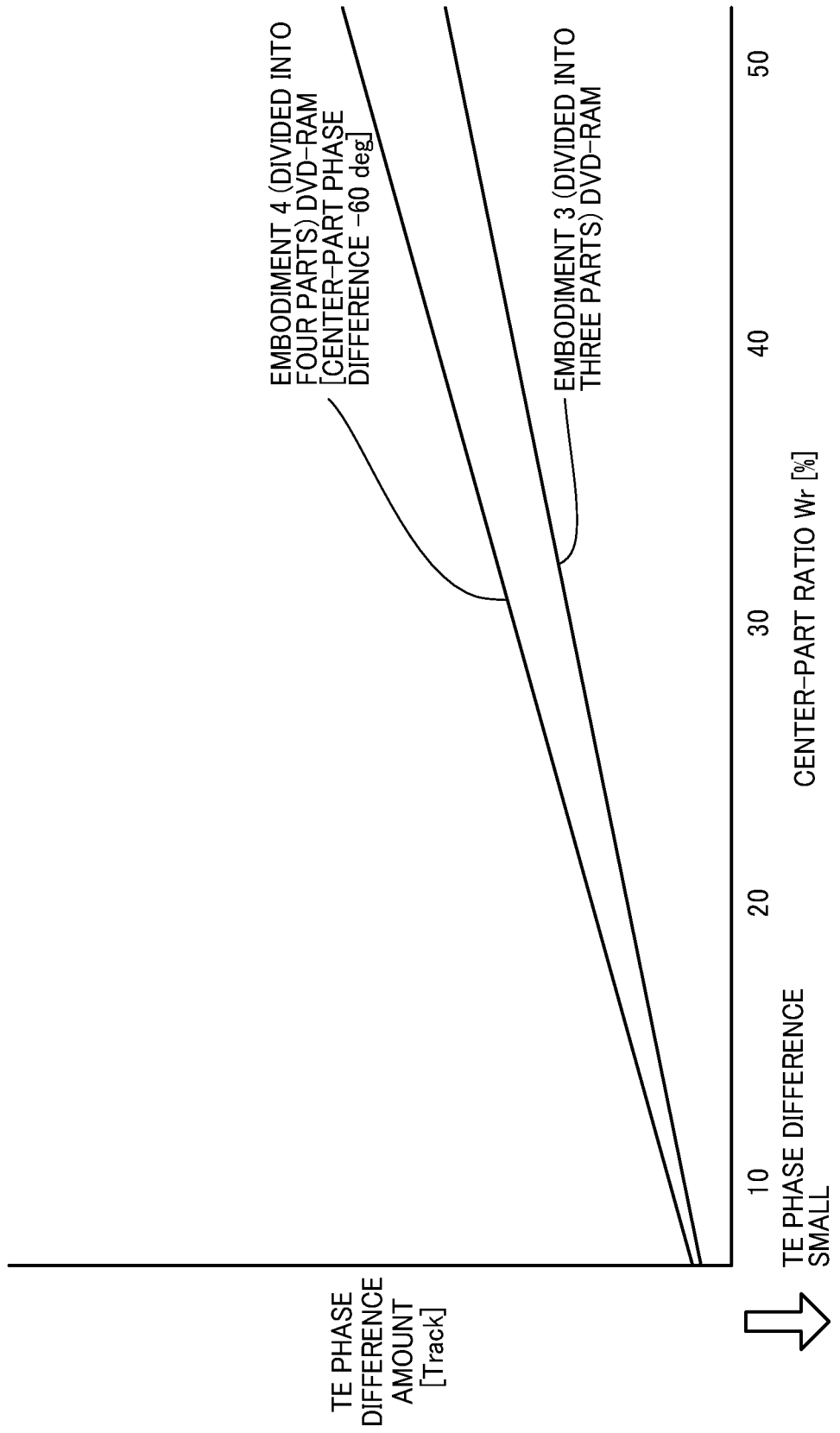
FIG. 23 is an explanatory diagram illustrating a tracking error phase difference characteristic of the optical pickup apparatus.
Figure 24:
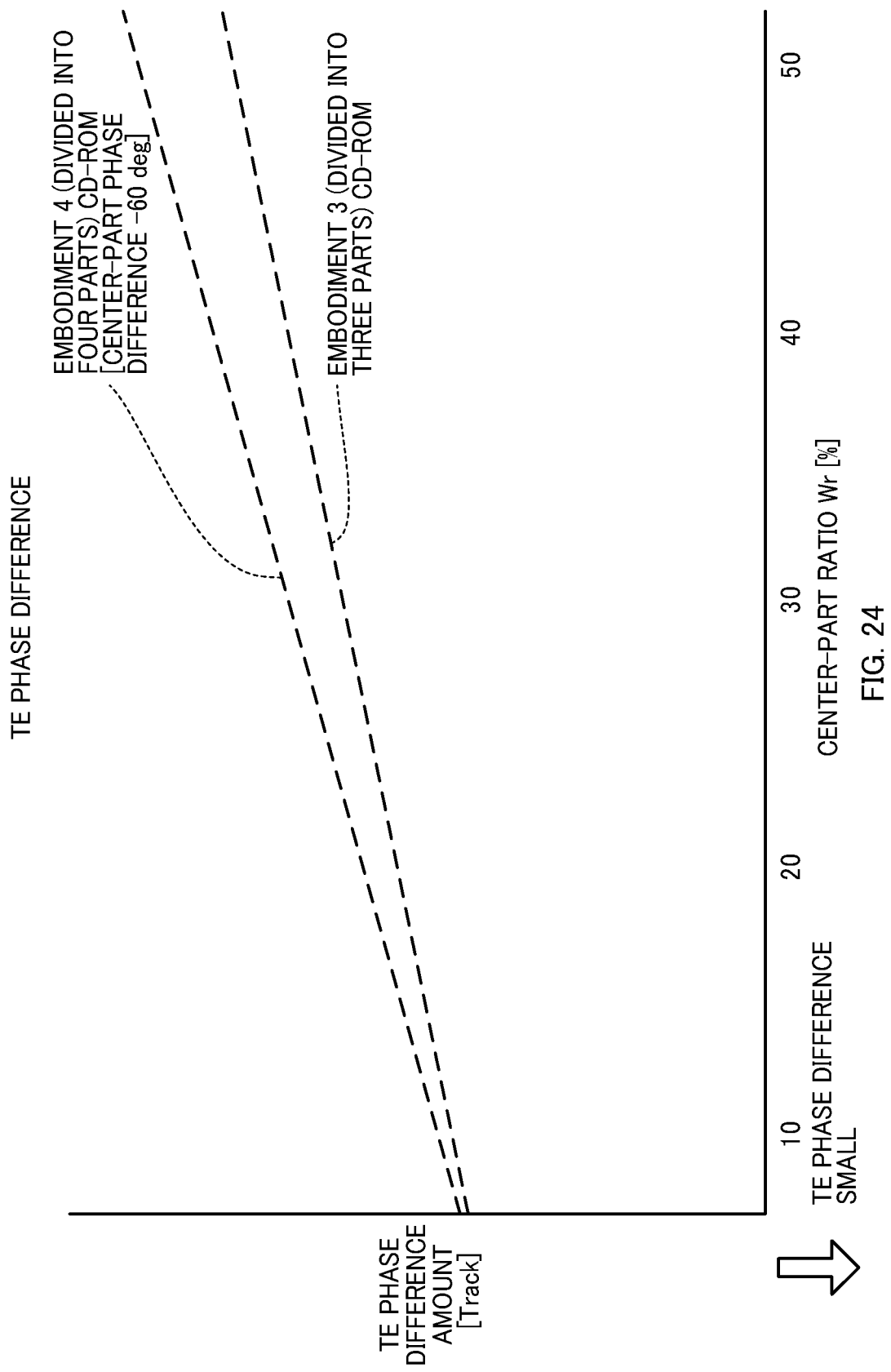
FIG. 24 is an explanatory diagram illustrating a tracking error phase difference characteristic of the optical pickup apparatus.

FIGS. 16, 17, and 18 are explanatory diagrams illustrating field view characteristics of the optical pickup apparatus, FIGS. 19, 20, and 21 are explanatory diagrams illustrating amplitude level characteristics of a sub-push-pull signal of the optical pickup apparatus, and FIGS. 22, 23, and 24 are explanatory diagrams illustrating tracking error phase difference characteristics of the optical pickup apparatus.

A diffraction surface portion 30a of the diffraction grating 64C (FIG. 12) is formed as a single surface portion 30a corresponding to diffraction of the plurality of types of laser wavelength light serving both as the diffraction surface portion 30a that splits the first laser wavelength light at least into one first main beam and two first sub-beams and the diffraction surface portion 30a that splits the second laser wavelength light at least into one second main beam and two second sub-beams.

If the diffraction surface portion 30a of the diffraction grating 64C is formed as above, an optical pickup apparatus is configured in which occurrence of unnecessary diffraction light in the diffraction grating 64C is suppressed, deterioration of efficiency of laser beams is prevented, and a price can be further kept low.

For example, if the first laser wavelength light passes through the first diffraction surface portions 302 of the diffraction gratings 300A and 300B having the two diffraction surface portions 302 and 304, that is, the first diffraction surface portion 302 (FIGS. 29 and 30) corresponding to the first laser wavelength light and the second diffraction surface portion 304 corresponding to the second laser wavelength light and the first laser wavelength light is divided at least into the single first main beam and the two first sub-beams, there has been concern that the first main beam of the first laser wavelength light is further diffracted unnecessarily and the first sub-beam is further diffracted unnecessarily by the second diffraction surface portions 304 of the diffraction gratings 300A and 300B, and as a result, the efficiency of the light of the first main beam and the first sub-beam of the first laser wavelength light is deteriorated.

Also, for example, if the second laser wavelength light passes through the second diffraction surface portions 304 of the diffraction gratings 300A and 300B having the two diffraction surface portions 302 and 304, that is, the first diffraction surface portion 302 corresponding to the first laser wavelength light and the second diffraction surface portion 304 corresponding to the second laser wavelength light and the second laser wavelength light is divided at least into one second main beam and two second sub-beams, there has been concern that the second laser wavelength light is diffracted unnecessarily by the first diffraction surface portions 302 of the diffraction gratings 300A and 300B, and as a result, the efficiency of the light of the second laser wavelength light is deteriorated.

However, if the diffraction surface portion 30a of the diffraction grating 64C (FIG. 12) is formed as the single surface portion 30a corresponding to diffraction of the plurality of types of laser wavelength light serving both as the diffraction surface portion 30a that splits the first laser wavelength light at least into one first main beam and two first sub-beams and the diffraction surface portion 30a that splits the second laser wavelength light at least into one second main beam and two second sub-beams, unnecessary diffraction of the first main beam and the first sub-beam of the first laser wavelength light which results in deterioration of efficiency of light of the first main beam and the first sub-beam of the first laser wavelength light or unnecessary diffraction of the second laser wavelength light which results in deterioration of efficiency of light of the second laser wavelength light is avoided.

Also, since the diffraction surface portion 30a of the diffraction grating 64C is formed as the single surface portion 30a corresponding to diffraction of the plurality of types of laser wavelength light serving both as the diffraction surface portion 30a that splits the first laser wavelength light at least into one first main beam and two first sub-beams and the diffraction surface portion 30a that splits the second laser wavelength light at least into one second main beam and two second sub-beams, the diffraction grating 64C in which the numbers of parts to be worked, work processes and the like are reduced is configured. Since the numbers of parts to be worked, work processes and the like of the diffraction grating 64C are reduced, the price of the diffraction grating 64C is kept low. As a result, an optical pickup apparatus whose price can be kept low can be configured.

As shown in FIG. 12, in the diffraction grating 64C, phase shift region portions 31 and 33 (FIG. 12) that generate phase shifts of π radian in a part of the laser beam emitted from the laser unit 61 (FIGS. 1 to 3) are provided. The diffraction grating 64C is divided into at least three region portions 31, 32, and 33, that is, the substantially rectangular first region portion 31, the substantially linear second region portion 32 adjacent to the first region portion 31, and the substantially rectangular third region portion 33 adjacent to the second region portion 32. The diffraction grating 64C is divided into the plurality of region portions 31, 32, and 33. In each of the region portions 31, 32 and 33, a predetermined periodic structure is configured.

In the diffraction grating 64C shown in FIG. 12, in order to facilitate understanding of the phase state of the second region portion 32, the second region portion 32 is expressed with some width for convenience. Actually, the second region portion 32 of the diffraction grating 64C is a narrow linear shape having a width 32w of approximately 20 to 200 μm, for example. Also, the periodic structure of each of the region portions 31, 32, and 33 included in the diffraction grating 64C is a repetitive periodic structure with minute projections/recesses. Also, the diffraction grating 64C is a glass plate having a dimension of an approximately 3 to 10 mm square and a thickness of approximately 0.3 to 3 mm, for example. If the diffraction grating 64C shown in FIG. 12 is viewed on perspective, the diffraction grating 64C is seen as the diffraction grating 64A shown in FIG. 1, for example.

If the diffraction grating 64C divided into the plurality of region portions 31, 32, and 33 (FIG. 12) is configured, the detection of the error signal of the optical pickup apparatus for the signal surface portion Da of the media D (FIGS. 5 and 7) can be easily performed favorably. For example, the tracking of the optical pickup apparatus for the signal surface portion Da of the media D can be easily performed favorably. Since the diffraction grating 64C (FIG. 12) is configured by being divided into the plurality of region portions 31, 32, and 33, at least three independent light collection spots 80, 81, and 82 are formed on the signal surface portion Da of the media D (FIG. 5). Since at least three independent light collection spots 80, 81, and 82 are formed on the signal surface portion Da of the media D, during recording/reproducing and the like of the two types or more of the media D with different track pitches Dtp, deterioration of detection accuracy of the error signal such as the tracking error signals SE1, SE2 and the like can be easily avoided. Therefore, an optical pickup apparatus in which the tracking control can be performed easily can be provided.

As shown in FIG. 12, the diffraction grating 64C is divided into the three region portions 31, 32, and 33, that is, the first region portion 31, the second region portion 32 adjacent to the first region portion 31 and having a periodic structure different from the periodic structure of the first region portion 31, and the third region portion 33 adjacent to the second region portion 32 and having a periodic structure different from the periodic structure of the second region portion 32. The diffraction grating 64C is configured as a so-called inline grating divided into three parts.

If the diffraction grating 64C divided into the plurality of region portions 31, 32, and 33 shown in FIG. 12 is provided in the optical pickup apparatus, the detection of the error signal of the optical pickup apparatus for the signal surface portion Da of the media D (FIGS. 2, 3, 5, and 7) is performed favorably. For example, the tracking of the optical pickup apparatus for the signal surface portion Da of the media D is performed favorably. Since the diffraction grating 64C (FIG. 12) is configured by being divided into the three region portions 31, 32, and 33, at least three independent light detection spots 80, 81, and 82 are formed on the signal surface portion Da of the media D (FIG. 5). Since the at least three light collection spots 80, 81, and 82 are formed on the signal surface portion Da of the media D independently, during data recording and the like in the two types or more of the media D with different track pitches Dtp or during the data reproduction of the two types or more of the media D with different track pitches Dtp, deterioration of detection accuracy of the error signal such as the tracking error signals SE1, SE2 and the like caused by the displacement of the objective lens 70 (FIGS. 1 to 3), for example, is avoided. Therefore, an optical pickup apparatus in which the tracking control can be performed easily can be provided.

As shown in FIG. 12, the diffraction grating 64C has the substantially rectangular one region portion 31, which is the first region portion 31, and the substantially rectangular other region portion 32, which is the third region portion 32. A width 31w of the first region portion 31 and a width 33w of the third region portion 33 of the diffraction grating 64C are set substantially equal to each other. By means of the second region portion 32 of the diffraction grating 64C, the diffraction grating 64C is divided into the one region portion 31 included in the diffraction grating 64C and the other region portion 32 included in the diffraction grating 64C. The diffraction grating 64C is divided into the odd number of parts.

Between the substantially strip-shaped first region portion 31 and the substantially strip-shaped third region portion 33 included in the diffraction grating 64C, the substantially linear second region portion 32 included in the diffraction grating 64C is arranged. With respect to the periodic structure of the first region portion 31, the periodic structure of the second region portion 32 is a periodic structure having a different phase. With respect to the periodic structure of the second region portion 32, the periodic structure of the third region portion 33 is a periodic structure having a different phase. With respect to the periodic structure of the first region portion 31, the periodic structure of the third region portion 33 is a periodic structure having a phase different by approximately 180 degrees.

As a result, the first region portion 31, the second region portion 32, and the third region portion 33 in the diffraction grating 64C are differentiated from each other, and the phase difference between the first region portion 31 and the third region portion 33 in the diffraction grating 64C is made clear. With respect to the periodic structure of the first region portion 31 of the diffraction grating 64C, the periodic structure of the third region portion 33 of the diffraction grating 64C has a periodic structure having a phase different by approximately 180 degrees, and thus, at least three light collection spots 80, 81, and 82 are formed favorably on the signal surface portion Da of the media D (FIG. 5). By means of at least three light collection spots 80, 81, and 82 formed favorably on the signal surface portion Da of the media D, during data recording/reproduction and the like of the plurality of types of media D with different track pitches Dtp, deterioration of the tracking error signals SE1 and SE2 caused by displacement of the objective lens 70 (FIGS. 1 to 3), for example, can be easily avoided.

By a boundary line portion 35 that separates the first region portion 31 (FIG. 12) from the second region portion 32, the first region portion 31 and the second region portion 32 are separated from each other. Also, by a boundary line portion 37 that separates the second region portion 32 from the third region portion 33, the second region portion 32 and the third region portion 33 are separated from each other.

Since the diffraction grating 64C is divided into the three region portions and differentiated, at least three independent light collection spots 80, 81, and 82 are formed on the signal surface portion Da of the media D (FIG. 5). Since at least three light collection spots 80, 81, and 82 are formed independently on the signal surface portion Da of the media D, the tracking of the optical pickup apparatus for the signal surface portion Da of the media D can be performed easily.

The diffraction grating 64C (FIG. 12) is formed in a substantially rectangular plate shape. When the diffraction grating 64C is seen on a plan view, the diffraction grating 64C is visually recognized as the substantially rectangular plate shape.

When the diffraction grating 64C is seen on a plan view in a state in which the vertically long and substantially rectangular first region portion 31, the vertically long and substantially linear second region portion 32, and the vertically long and substantially rectangular third region portion 33 are aligned laterally, if the phase of the other region portion adjacent to the right side of the one region portion is shifted in a substantially right upward stepped shape with respect to the phase of the one region portion of the diffraction grating 64C, the phase of the other region portion is assumed as being shifted to the positive (+) side.

Also, when the diffraction grating 64C is seen on a plan view in a state in which the vertically long and substantially rectangular first region portion 31, the vertically long and substantially linear second region portion 32, and the vertically long and substantially rectangular third region portion 33 are aligned laterally, if the phase of the other region portion adjacent to the right side of the one region portion is shifted in a substantially right downward stepped shape with respect to the phase of the one region portion of the diffraction grating 64C, the phase of the other region portion is assumed as being shifted to the negative (−) side.

When the diffraction grating 64C is seen on a plan view, with respect to the periodic structure of the first region portion 31, the periodic structure of the second region portion 32 adjacent to the right side of the first region portion 31 is a periodic structure having a phase shifted to the positive side. Also, when the diffraction grating 64C is seen on a plan view, with respect to the periodic structure of the second region portion 32, the periodic structure of the third region portion 33 adjacent to the right side of the second region portion 32 is a periodic structure having a phase shifted to the positive side.

The diffraction grating 64C is configured such that each phase of the periodic structures of the region portions 31, 32, and 33 is shifted in order in a stepped manner (FIG. 13). The diffraction grating 64C (FIG. 12) is the diffraction grating 64C having a so-called in-phase periodic structure.

Depending on the design/specification and the like of the optical pickup apparatus, in the diffraction grating 64C shown in FIG. 12, for example, a diffraction grating (64C) in which only profile lines are mirror-reversed while reference numerals, lead lines, dimension lines and the like are substan-tially left as they are may be used. Such a diffraction grating will be described in more detail. If the diffraction grating (64C) is seen on a plan view, with respect to the periodic structure of the first region portion (31), the periodic structure of the second region portion (32) adjacent to the right side of the first region portion (31) may be a periodic structure having a phase shifted to the negative side. Also, if the diffraction grating (64C) is seen on a plan view, with respect to the periodic structure of the second region portion (32), the periodic structure of the third region portion (33) adjacent to the right side of the second region portion (32) may be a periodic structure having a phase shifted to the negative side.

The diffraction grating (64C) is configured such that each phase of the periodic structures of the region portions (31, 32, and 33) is shifted in order in a stepped manner. The diffraction grating (64C) is the diffraction grating (64C) having a so-called in-phase periodic structure.

If the diffraction grating provided with the in-phase periodic structure is provided in the optical pickup apparatus, a sub-push-pull signal amplitude level (Sub-PP amplitude level) is increased, and the sub-push-pull signal amplitude level characteristic (Sub-PP amplitude level characteristic) can be easily improved (FIGS. 19, 20, and 21). A decrease of the Sub-PP amplitude level (%) and deterioration of the Sub-PP amplitude level characteristic are avoided.

The at least three light collection spots 80, 81, and 82 formed on the signal surface portion Da (FIG. 5) of the media D (FIGS. 1 to 3 and 5) are assumed to include the main spot 80 and a pair of sub-spots 81 and 82 sandwiching the main spot 80. The Sub-PP amplitude level, which is a signal amplitude level relating to the main spot 80 and the sub-spots 81 and 82, is determined based on the following equation (37):

$$\text{Sub-push-pull signal amplitude level (\%)} = \text{Sub-push-pull signal amplitude value/Main-push-pull signal amplitude value} \times 100 \quad (37).$$

Also, a tracking error phase difference amount (TE phase difference amount) is decreased, and a tracking error phase difference characteristic (TE phase difference characteristic) can be easily improved (FIGS. 22, 23, and 24). An increase of the TE phase difference amount and deterioration of the TE phase difference characteristic are avoided.

Since both the Sub-PP amplitude level characteristic and the TE phase difference characteristic are improved, this optical pickup apparatus can be used by being provided in an optical disc device for desktop PC and also can be used by being provided in an optical disc device for note or laptop PC. Since a large-sized objective lens can be used in the optical pickup apparatus used in the optical disc device for desktop PC, for example, the Sub-PP amplitude level characteristic and the TE phase difference characteristic might be considered more important than the field of view characteristics in design, while the field of view characteristics are considered.

Also, since deterioration of the tracking error field of view characteristics (TE field of view characteristics) are suppressed, this optical pickup apparatus can be used by being provided in an optical disc device for desktop PC and also can be used by being provided in an optical disc device for note or laptop PC.

As shown in FIGS. 12 and 13, with respect to the periodic structure of the first region portion 31, the periodic structure of the second region portion 32 is a periodic structure having a phase different by approximately +90 degrees. Also, with respect to the periodic structure of the second region portion 32, the periodic structure of the third region portion 33 is a periodic structure having a phase different by approximately +90 degrees. With respect to the periodic structure of the first region portion 31, the periodic structure of the third region portion 33 is a periodic structure having a phase different by approximately +180 degrees.

If the diffraction grating 64C configured as above is provided in the optical pickup apparatus, the Sub-PP amplitude level (%) is increased, and the Sub-PP amplitude level characteristic is improved (FIGS. 19, 20, and 21). A decrease of the Sub-PP amplitude level (%) and deterioration of the Sub-PP amplitude level characteristic are avoided. Also, the TE phase difference amount is decreased, and the TE phase difference characteristic is improved (FIGS. 22, 23, and 24). An increase of the TE phase difference amount and deterioration of the TE phase difference characteristic are avoided.

With the optical pickup apparatus (FIGS. 1 to 3) in which the phase-shift type diffraction grating 64C divided into three parts (FIG. 12) is adopted and the tracking error detection method by the inline DPP method is executed, the TE phase difference amount can be kept small (FIGS. 22, 23, and 24). Therefore, in the optical disc device provided with the optical pickup apparatus (FIGS. 1 to 3) provided with the phase-shift type diffraction grating 64C divided into three parts (FIG. 12), reading/writing and the like of data/information can be performed in a stable operation for any media D with different track pitch Dtp (FIG. 5), for example.

Since the Sub-PP amplitude level characteristic irradiated on the signal surface portion Da of the media D and the TE phase difference characteristic are both improved, this optical pickup apparatus can be used by being provided in an optical disc device for desktop PC and also can be used by being provided in an optical disc device for note or laptop PC.

Also, if the diffraction grating 64C configured as above is provided in the optical pickup apparatus, a drastic decrease of the tracking error amplitude level (TE amplitude level) (%) and extreme deterioration of the TE field of view characteristics is avoided (FIGS. 16, 17, and 18). Since the drastic decrease of the TE field of view characteristics is suppressed, this optical pickup apparatus can be used by being provided in an optical disc device for note or laptop PC and also can be used by being provided in an optical disc device for desktop PC. Also, since the drastic decrease of the TE field of view characteristics is suppressed, this optical pickup apparatus can be also used as an optical pickup apparatus provided with a plurality of small objective lenses 70, for example.

With respect to a diameter 70b of the second laser wavelength light having a wavelength of approximately 630 to 685 nm compliant with the DVD standard and passing through a pupil plane portion 70a (FIG. 2) of the objective lens 70 (FIGS. 1 and 2), the width 32w at a center part 30m (FIG. 12) of the diffraction grating 64C is set at 14 to 30%, preferably 16 to 28%, more preferably 18 to 26% or further preferably 18 to 25%, for example. That is, when the second laser wavelength light having a wavelength of approximately 630 to 685 nm compliant with the DVD standard passes through the diffraction grating 64C, a center-part ratio Wr of the diffraction grating 64C is 14 to 30%, preferably 16 to 28%, more preferably 18 to 26% or further preferably 18 to 25%, for example (FIGS. 16 to 23).

If the diffraction grating 64C configured as above is provided in the optical pickup apparatus, during data recording/reproduction and the like of the plurality of types of media D with different track pitches Dtp, deterioration of the tracking error signals SE1 and SE2 caused by displacement of the objective lens 70 can be easily avoided.

If the width 32w of the center part 30m of the diffraction grating 64C is set at less than 14% to the diameter 70b of the second laser wavelength light having a wavelength of approximately 630 to 685 nm compliant with the DVD standard and passing through a pupil plane portion 70a of the objective lens 70, the TE amplitude level (%) is decreased, and the TE field of view characteristics are deteriorated (FIGS. 16 and 17). That is, when the second laser wavelength light having a wavelength of approximately 630 to 685 nm compliant with the DVD standard passes through the diffraction grating 64C, if the center-part ratio Wr of the diffraction grating 64C is set at less than 14%, the OBL center ratio (%) is decreased, and the TE field of view characteristics are deteriorated. If the width 32w of the center part 30m of the diffraction grating 64C is set at less than 16% to the diameter 70b of the second laser wavelength light having a wavelength of approximately 630 to 685 nm compliant with the DVD standard and passing through the pupil plane portion 70a of the objective lens 70, the TE amplitude level (%) is decreased, and the TE field of view characteristics can be easily deteriorated (FIGS. 16 and 17). That is, when the second laser wavelength light having a wavelength of approximately 630 to 685 nm compliant with the DVD standard passes through the diffraction grating 64C, if the center-part ratio Wr of the diffraction grating 64C is set at less than 16%, an OBL center ratio (%) is decreased, and the TE field of view characteristics can be easily deteriorated.

If the width 32w of the center part 30m of the diffraction grating 64C is set at 18% or more to the diameter 70b of the second laser wavelength light having a wavelength of approximately 630 to 685 nm compliant with the DVD standard and passing through the pupil plane portion 70a of the objective lens 70, the decrease of the TE amplitude level (%) is suppressed, and deterioration of the TE field of view characteristics is suppressed. That is, when the second laser wavelength light having a wavelength of approximately 630 to 685 nm compliant with the DVD standard passes through the diffraction grating 64C, if the center-part ratio Wr of the diffraction grating 64C is set at 18% or more, the decrease of the OBL center ratio (%) is suppressed, and deterioration of the TE field of view characteristics is suppressed. The OBL (objective lens) means an objective lens.

If the width 32w of the center part 30m of the diffraction grating 64C is set at exceeding 30% to the diameter 70b of the second laser wavelength light having a wavelength of approximately 630 to 685 nm compliant with the DVD standard and passing through the pupil plane portion 70a of the objective lens 70, the sub-push-pull signal amplitude level (Sub-PP amplitude level) (%) is decreased, and the Sub-PP amplitude level characteristic is deteriorated (FIGS. 19 and 20). If the width 32w of the center part 30m of the diffraction grating 64C is set at exceeding 28% to the diameter 70b of the second laser wavelength light having a wavelength of approximately 630 to 685 nm compliant with the DVD standard and passing through the pupil plane portion 70a of the objective lens 70, the sub-push-pull signal amplitude level (Sub-PP amplitude level) (%) is decreased, and the Sub-PP amplitude level characteristic can be easily deteriorated.

If the width 32w of the center part 30m of the diffraction grating 64C is set at not more than 26% to the diameter 70b of the second laser wavelength light having a wavelength of approximately 630 to 685 nm compliant with the DVD standard and passing through the pupil plane portion 70a of the objective lens 70, the decrease of the Sub-PP amplitude level (%) can be easily suppressed, and deterioration of the Sub-PP amplitude level characteristic can be easily suppressed. More specifically, if the width 32w of the center part 30m of the diffraction grating 64C is set at not more than 25% to the diameter 70b of the second laser wavelength light having a wavelength of approximately 630 to 685 nm compliant with the DVD standard and passing through the pupil plane portion 70a of the objective lens 70, the decrease of the Sub-PP amplitude level (%) is suppressed, and deterioration of the Sub-PP amplitude level characteristic is suppressed.

Also, if the width 32w of the center part 30m of the diffraction grating 64C (FIG. 12) is set at exceeding 30% to the diameter 70b of the second laser wavelength light having a wavelength of approximately 630 to 685 nm compliant with the DVD standard and passing through the pupil plane portion 70a of the objective lens 70 (FIG. 2), the tracking error phase difference amount (TE phase difference amount) is increased, and the tracking error phase difference characteristic (TE phase difference characteristic) is deteriorated (FIGS. 22 and 23). More specifically, if the width 32w of the center part 30m of the diffraction grating 64C (FIG. 12) is set at exceeding 28% to the diameter 70b of the second laser wavelength light having a wavelength of approximately 630 to 685 nm compliant with the DVD standard and passing through the pupil plane portion 70a of the objective lens 70 (FIG. 2), the tracking error phase difference amount (TE phase difference amount) is increased, and the tracking error phase difference characteristic (TE phase difference characteristic) can be easily deteriorated (FIGS. 22 and 23).

If the width 32w of the center part 30m of the diffraction grating 64C is set at not more than 26% to the diameter 70b of the second laser wavelength light having a wavelength of approximately 630 to 685 nm compliant with the DVD standard and passing through the pupil plane portion 70a of the objective lens 70, the increase of the TE phase difference amount can be easily suppressed, and deterioration of the TE phase difference characteristic can be easily suppressed. More specifically, if the width 32w of the center part 30m of the diffraction grating 64C is set at not more than 25% to the diameter 70b of the second laser wavelength light having a wavelength of approximately 630 to 685 nm compliant with the DVD standard and passing through the pupil plane portion 70a of the objective lens 70, the increase of the TE phase difference amount is suppressed, and deterioration of the TE phase difference characteristic is suppressed.

If the width 32w of the center part 30m of the diffraction grating 64C is set at 14 to 30%, preferably 16 to 28%, more preferably 18 to 26% or further preferably 18 to 25% to the diameter 70b of the second laser wavelength light having a wavelength of approximately 630 to 685 nm compliant with the DVD standard and passing through the pupil plane portion 70a of the objective lens 70, the TE amplitude level (FIGS. 16 and 17), the Sub-PP amplitude level (FIGS. 19 and 20), and the TE phase difference amount (FIGS. 22 and 23) can be easily set at appropriate values.

If the width 32w of the center part 30m of the diffraction grating 64C is set at approximately 20% to the diameter 70b of the second laser wavelength light having a wavelength of approximately 630 to 685 nm compliant with the DVD standard and passing through the pupil plane portion 70a of the objective lens 70, for example, the TE amplitude level (FIGS. 16 and 17), the Sub-PP amplitude level (FIGS. 19 and 20), and the TE phase difference amount (FIGS. 22 and 23) can be easily set at optimal values. Since the TE amplitude level, the Sub-PP amplitude level, and the TE phase difference amount are set at appropriate values in a balanced manner, and the tracking control of the optical pickup apparatus can be easily performed.

With respect to the diameter 70c of the first laser wavelength light having a wavelength of approximately 765 to 840 nm compliant with the CD standard and passing through the pupil plane portion 70a (FIG. 3) of the objective lens 70 (FIGS. 1 and 3), the width 32w of the center part 30m of the diffraction grating 64C (FIG. 12) is set at 10% and more and 40% or less, preferably 12% and more and 30% or less, or 14% and more and 25% or less depending on the design/specification and the like or 16% and more and 20% or less depending on the design/specification and the like, for example. That is, when the first laser wavelength light having a wavelength of approximately 765 to 840 nm compliant with the CD standard passes through the diffraction grating 64C, the center-part ratio Wr of the diffraction grating 64C is 10% and more and 40% or less, preferably 12% and more and 30% or less, or 14% and more and 25% or less depending on the design/specification and the like or 16% and more and 20% or less depending on the design/specification and the like, for example (FIGS. 18, 21, and 24).

If the diffraction grating 64C configured as above is provided in the optical pickup apparatus, during data recording/reproduction and the like of the plurality of types of media D with different track pitches Dtp, deterioration of the tracking error signals SE1 and SE2 caused by displacement of the objective lens 70 can be easily avoided.

If the width 32w of the center part 30m of the diffraction grating 64C is set at less than 10% to a diameter 70c of the first laser wavelength light having a wavelength of approximately 765 to 840 nm compliant with the CD standard and passing through the pupil plane portion 70a of the objective lens 70, the TE amplitude level (%) is decreased, and the TE field of view characteristics are deteriorated (FIG. 18). That is, when the first laser wavelength light having a wavelength of approximately 765 to 840 nm compliant with the CD standard passes through the diffraction grating 64C, if the center-part ratio Wr of the diffraction grating 64C is set at less than 10%, the OBL center ratio (%) is decreased, and the TE field of view characteristics are deteriorated. If the width 32w of the center part 30m of the diffraction grating 64C is set at less than 12% to the diameter 70c of the first laser wavelength light having a wavelength of approximately 765 to 840 nm compliant with the CD standard and passing through the pupil plane portion 70a of the objective lens 70, the TE amplitude level (%) is decreased, and the TE field of view characteristics can be easily deteriorated (FIG. 18). That is, when the first laser wavelength light having a wavelength of approximately 765 to 840 nm compliant with the CD standard passes through the diffraction grating 64C, if the center-part ratio Wr of the diffraction grating 64C is set at less than 12%, an OBL center ratio (%) is decreased, and the TE field of view characteristics can be easily deteriorated.

If the width 32w of the center part 30m of the diffraction grating 64C is set at 14% or more to the diameter 70c of the first laser wavelength light having a wavelength of approximately 765 to 840 nm compliant with the CD standard and passing through the pupil plane portion 70a of the objective lens 70, the decrease of the TE amplitude level (%) is suppressed, and deterioration of the TE field of view characteristics is suppressed. That is, when the first laser wavelength light having a wavelength of approximately 765 to 840 nm compliant with the CD standard passes through the diffraction grating 64C, if the center-part ratio Wr of the diffraction grating 64C is set at 14% or more, the decrease of the OBL center ratio (%) is suppressed, and deterioration of the TE field of view characteristics is suppressed. In more detail, if the width 32w of the center part 30m of the diffraction grating 64C is set at 16% or more to the diameter 70c of the first laser wavelength light having a wavelength of approximately 765 to 840 nm compliant with the CD standard and passing through the pupil plane portion 70a of the objective lens 70, the decrease of the TE amplitude level (%) is suppressed, and deterioration of the TE field of view characteristics is reliably suppressed. That is, when the first laser wavelength light having a wavelength of approximately 765 to 840 nm compliant with the CD standard passes through the diffraction grating 64C, if the center-part ratio Wr of the diffraction grating 64C is set at 16% or more, the decrease of the OBL center ratio (%) is suppressed, and deterioration of the TE field of view characteristics is reliably suppressed.

Also, if the width 32w of the center part 30m of the diffraction grating 64C is set at exceeding 40% to the diameter 70c of the first laser wavelength light having a wavelength of approximately 765 to 840 nm compliant with the CD standard and passing through the pupil plane portion 70a of the objective lens 70, the sub-push-pull signal amplitude level (Sub-PP amplitude level) (o) is decreased, and the Sub-PP amplitude level characteristic is deteriorated (FIG. 21). If the width 32w of the center part 30m of the diffraction grating 64C is set at exceeding 30% to the diameter 70c of the first laser wavelength light having a wavelength of approximately 765 to 840 nm compliant with the CD standard and passing through the pupil plane portion 70a of the objective lens 70, the sub-push-pull signal amplitude level (Sub-PP amplitude level) (%) is decreased, and the Sub-PP amplitude level characteristic can be easily deteriorated.

If the width 32w of the center part 30m of the diffraction grating 64C is set at not more than 25% to the diameter 70c of the first laser wavelength light having a wavelength of approximately 765 to 840 nm compliant with the CD standard and passing through the pupil plane portion 70a of the objective lens 70 depending on the design/specification and the like, the decrease of the Sub-PP amplitude level (%) can be easily suppressed, and deterioration of the Sub-PP amplitude level characteristic can be easily suppressed. Also, if the width 32w of the center part 30m of the diffraction grating 64C is set at not more than 20% to the diameter 70c of the first laser wavelength light having a wavelength of approximately 765 to 840 nm compliant with the CD standard and passing through the pupil plane portion 70a of the objective lens 70 depending on the design/specification and the like, the decrease of the Sub-PP amplitude level (%) is suppressed, and deterioration of the Sub-PP amplitude level characteristic is suppressed.

Also, if the width 32w of the center part 30m of the diffraction grating 64C (FIG. 12) is set at exceeding 40% to the diameter 70c of the first laser wavelength light having a wavelength of approximately 765 to 840 nm compliant with the CD standard and passing through the pupil plane portion 70a of the objective lens 70 (FIG. 3), the tracking error phase difference amount (TE phase difference amount) is increased, and the tracking error phase difference characteristic (TE phase difference characteristic) is deteriorated (FIG. 24). More specifically, if the width 32w of the center part 30m of the diffraction grating 64C (FIG. 12) is set at exceeding 30% to the diameter 70c of the first laser wavelength light having a wavelength of approximately 765 to 840 nm compliant with the CD standard and passing through the pupil plane portion 70a of the objective lens 70 (FIG. 3), the tracking error phase difference amount (TE phase difference amount) is increased, and the tracking error phase difference characteristic (TE phase difference characteristic) can be easily deteriorated (FIG. 24).

If the width 32w of the center part 30m of the diffraction grating 64C is set at not more than 25% to the diameter 70c of the first laser wavelength light having a wavelength of approximately 765 to 840 nm compliant with the CD standard and passing through the pupil plane portion 70a of the objective lens 70 depending on the design/specification and the like, the increase of the TE phase difference amount can be easily suppressed, and deterioration of the TE phase difference characteristic can be easily suppressed. Also, if the width 32w of the center part 30m of the diffraction grating 64C is set at not more than 20% to the diameter 70c of the first laser wavelength light having a wavelength of approximately 765 to 840 nm compliant with the CD standard and passing through the pupil plane portion 70a of the objective lens 70 depending on the design/specification and the like, the increase of the TE phase difference amount is suppressed, and deterioration of the TE phase difference characteristic is suppressed.

If the width 32w of the center part 30m of the diffraction grating 64C is set at 10% or more and 40% or less, preferably 12% or more and 30% or less, 14% or more and 25% or less depending on the design/specification and the like, or 16% or more and 20% or less depending on the design/specification and the like to the diameter 70c of the first laser wavelength light having a wavelength of approximately 765 to 840 nm compliant with the CD standard and passing through the pupil plane portion 70a of the objective lens 70, for example, the TE amplitude level (FIG. 18), the Sub-PP amplitude level (FIG. 21), and the TE phase difference amount (FIG. 24) can be easily set at appropriate values.

Based on the above, the following equation (38) and the equation (39) are set, for example. In order to set the following equation (38) and the equation (39), first, the width 32w of the center part 30m of the diffraction grating 64C is set at B1. Also, the diameter 70c of the first laser wavelength light having the wavelength of approximately 765 to 840 nm compliant with the CD standard and passing through the pupil plane portion 70a of the objective lens 70 is set at B2. Also, the diameter 70b of the second laser wavelength light having the wavelength of approximately 630 to 685 nm compliant with the DVD standard and passing through the pupil plane portion 70a of the objective lens 70 is set at B3.

When being defined as above, an optical pickup apparatus that exerts performances satisfying the following equation (38) and the equation (39) is configured:

$$0.10 < \frac{B1}{B2} < 0.40 \tag{38}$$

$$0.14 < \frac{B1}{B3} < 0.30 \tag{39}$$

By setting B1/B2 at 0.10 or more and 0.40 or less, preferably 0.12 or more and 0.30 or less, 0.14 or more and 0.25 or less depending on the design/specification and the like or 0.16 or more and 0.20 or less depending on the design/specification and the like, for example, when reading/writing and the like of data/information/signals are performed by the optical pickup apparatus with respect to the optical disc D compliant with the CD standard, a minimum value "DPP_L" of the field of view characteristics and a ratio "SPP/MPP" of the signal level of the sub-push-pull signal to the signal level of the main-push-pull signal can be easily set to appropriate values.

Also, by setting B1/B3 at 0.14 to 0.30, preferably 0.16 to 0.28, more preferably 0.18 to 0.26 or further preferably 0.18 to 0.25, for example, when reading/writing and the like of data/information/signals are performed by the optical pickup apparatus with respect to the optical disc D compliant with the DVD standard, a minimum value "DPP_L" of the field of view characteristics and a ratio "SPP/MPP" of the signal level of the sub-push-pull signal to the signal level of the main-push-pull signal can be easily set to appropriate values.

The width 32w of the second region portion 32 of the diffraction grating 64C of the diffraction grating 64C (FIG.

12) is set at 20 to 200 µm, preferably 60 to 160 µm or more preferably 96 to 144 µm. That is, the width 32w of the divided portion of the diffraction grating 64C is set at 20 to 200 µm, preferably 60 to 160 µm or more preferably 96 to 144 µm.

As a result, the tracking of the optical pickup apparatus for the signal surface portion Da of the media D can be easily performed favorably. During recording/reproduction and the like of the plurality of types of media D with different track pitches Dtp, deterioration of the tracking error signals SE1 and SE2 caused by displacement of the objective lens 70, for example, can be easily avoided.

If the width 32w of the second region portion 32 of the diffraction grating 64C is as small as less than 20 µm or the width 32w of the second region portion 32 of the diffraction grating 64C is as large as exceeding 200 µm, the balance among the TE field of view characteristics, the Sub-PP amplitude level characteristic, and the TE phase difference characteristic is lost. If a balance among each characteristic is lost, the tracking error signals SE1 and SE2 are deteriorated, and the tracking of the optical pickup apparatus for the signal surface portion Da of the media D cannot be performed accurately.

For example, by setting the width 32w of the second region portion 32 of the diffraction grating 64C at approximately 60 to 160 µm, the balance among the TE field of view characteristics, the Sub-PP amplitude level characteristic, and the TE phase difference characteristic can be substantially maintained easily. As a result, the tracking of the optical pickup apparatus for the signal surface portion Da of the media D can be easily performed accurately.

Preferably by setting the width 32w of the second region portion 32 of the diffraction grating 64C at 96 to 144 µm, the balance among the TE field of view characteristics, the Sub-PP amplitude level characteristic, and the TE phase difference characteristic is maintained. As a result, deterioration of the tracking error signals SE1 and SE2 is avoided. Therefore, the tracking of the optical pickup apparatus for the signal surface portion Da of the media D is performed accurately.

This optical pickup apparatus (FIGS. 1 to 3) includes, for example, the diffraction grating 64C (FIG. 12), which is substantially rectangular on a plan view, the objective lens 70 (FIGS. 1 to 3) that collects at least three light fluxes and forms the at least three independent light collection spots 80, 81, and 82 on the signal surface portion Da (FIG. 5) of the media D (FIGS. 1 to 3 and 5), and the photodetector 73A (FIGS. 1 to 3 and 5 to 7) that receives reflection light of each of the three light collection spots 80, 81, and 82 in the media D.

If the optical pickup apparatus is configured as above, the tracking of the optical pickup apparatus for the signal surface portion Da of the media D (FIG. 5) is performed with accuracy. During data recording/reproduction and the like of the plurality of types of media D with different track pitches Dtp, deterioration of the amplitudes of the tracking error signals SE1 and SE2 or remaining of offset in the tracking error signals SE1 and SE2 caused by displacement of the objective lens 70 (FIGS. 1 to 3) can be easily avoided.

By configuring the optical pickup apparatus provided with the phase-shift diffraction grating 64C divided into three parts (FIG. 12), the data reproducing operation or the data recording operation of the optical pickup apparatus with respect to the DVD-RAM is reliably performed. Also, the data reproducing operation or the data recording operation of the optical pickup apparatus with respect to the DVD±R and DVD±RW is reliably performed.

Embodiment 4

Figure 14:
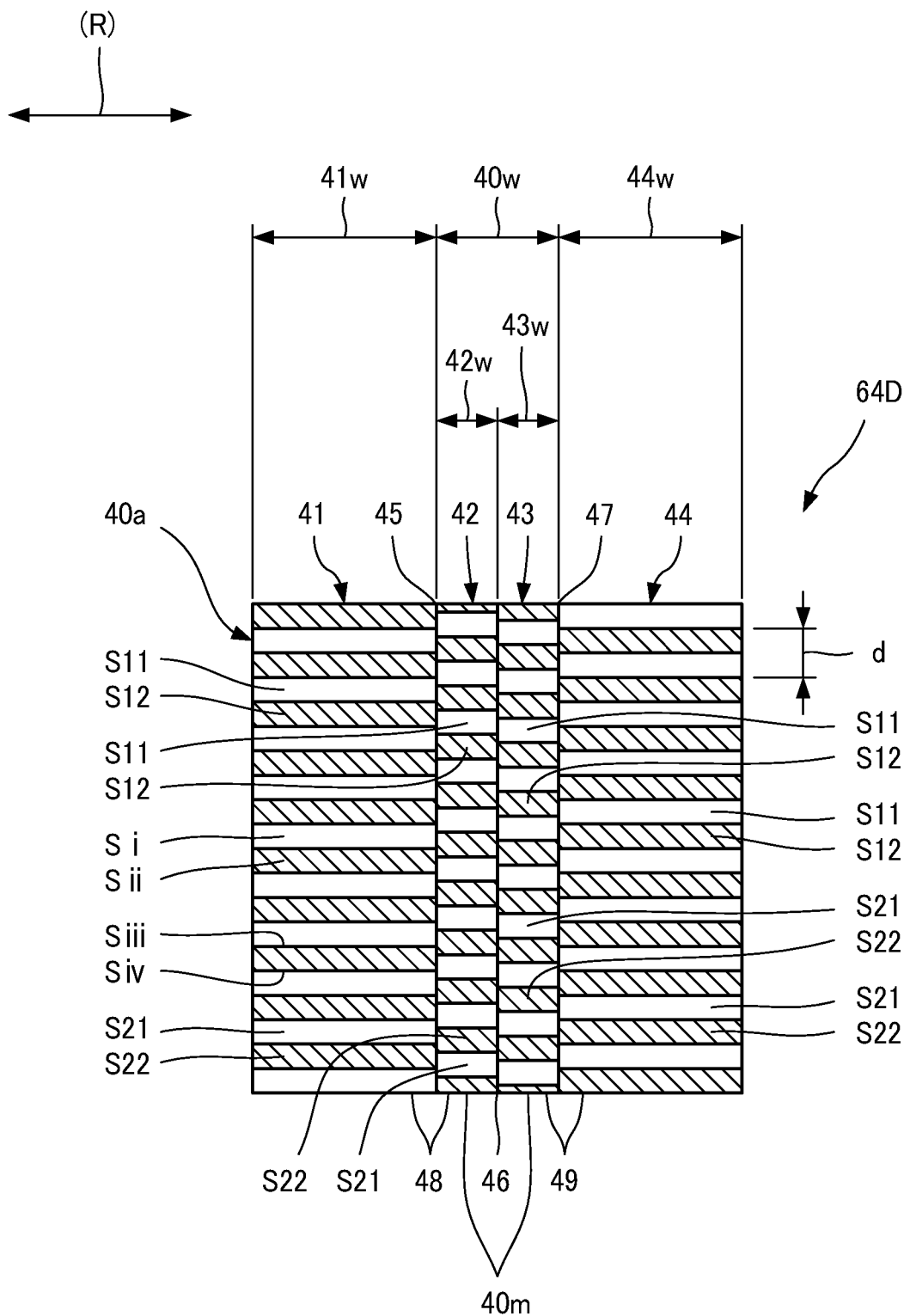
FIG. 14 is an outline plan view illustrating a fourth embodiment of the diffraction grating equipped in the optical pickup apparatus.
Figure 15:
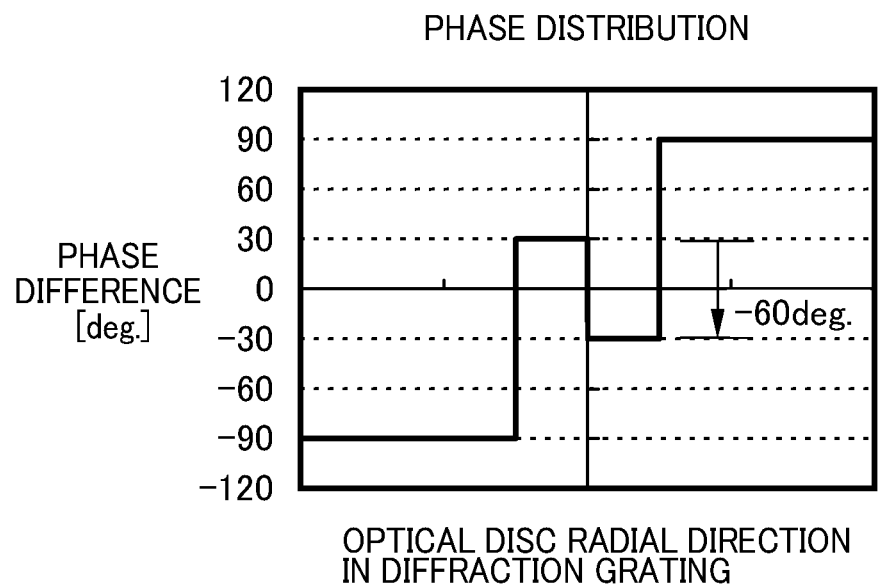
FIG. 15 is a diagram illustrating a relationship between an optical disc radial direction and a phase difference in the diffraction grating in FIG. 14.

FIG. 14 is a schematic plan view illustrating a fourth embodiment of a diffraction grating provided in an optical pickup apparatus, and FIG. 15 is a diagram illustrating a relationship between an optical disc radial direction in the diffraction grating in FIG. 14 and a phase difference.

Instead of the diffraction grating 64A shown in FIGS. 1 to 3 and 8, a diffraction grating 64D shown in FIG. 14 is provided in the optical pickup apparatus (FIGS. 1 to 3). There is no change in the optical pickup apparatus and the optical disc device except for the diffraction grating 64A shown in FIGS. 1 to 3 and 8 replaced with the diffraction grating 64D shown in FIG. 14. Embodiment 1 and Embodiment 4 are different from each other in that the diffraction grating 64A shown in FIGS. 1 to 3 and 8 is replaced with the diffraction grating 64D shown in FIG. 14, but Embodiment 1 and Embodiment 4 are considered to be common in other part thereof except for the diffraction gratings 64A and 64D. Embodiment 4 will be described using FIGS. 1 to 8 and 16 to 24 for convenience. In Embodiment 4, components equivalent to those described in Embodiment 1 are designated by the same reference numerals, to omit the detailed descriptions thereof.

A diffraction surface portion 40a of the diffraction grating 64D (FIG. 14) is formed as a single surface portion 40a corresponding to diffraction of a plurality of types of laser wavelength light serving both as the diffraction surface portion 40a configured to split the first laser wavelength light at least into one first main beam and two first sub-beams and the diffraction surface portion 40a configured to split the second laser wavelength light at least into one second main beam and two second sub-beams.

If the diffraction surface portion 40a of the diffraction grating 64D is formed as above, an optical pickup apparatus is configured in which occurrence of unnecessary diffraction light in the diffraction grating 64D is suppressed, reduction in efficiency of laser beams is prevented, and a price can be further kept low.

For example, if the first laser wavelength light passes through the first diffraction surface portions 302 of the diffraction gratings 300A and 300B having the two diffraction surface portions 302 and 304, that is, the first diffraction surface portion 302 (FIGS. 29 and 30) corresponding to the first laser wavelength light and the second diffraction surface portion 304 corresponding to the second laser wavelength light, and the first laser wavelength light is split at least into the single first main beam and the two first sub-beams, there has been concern that the first main beam of the first laser wavelength light is further diffracted wastefully and the first sub-beam is further diffracted wastefully by the second diffraction surface portions 304 of the diffraction gratings 300A and 300B, and as a result, the efficiency of the light of the first main beam and the first sub-beam of the first laser wavelength light is reduced.

Further, for example, if the second laser wavelength light passes through the second diffraction surface portions 304 of the diffraction gratings 300A and 300B having the two diffraction surface portions 302 and 304, that is, the first diffraction surface portion 302 corresponding to the first laser wavelength light and the second diffraction surface portion 304 corresponding to the second laser wavelength light, and the second laser wavelength light is split at least into one second main beam and two second sub-beams, there has been concern that the second laser wavelength light is diffracted wastefully by the first diffraction surface portions 302 of the diffraction gratings 300A and 300B, and as a result, the efficiency of the light of the second laser wavelength light is reduced.

However, if the diffraction surface portion 40a of the diffraction grating 64D (FIG. 14) is formed as the single surface portion 40a corresponding to diffraction of the plurality of types of laser wavelength light serving both as the diffraction surface portion 40*a* configured to split the first laser wavelength light at least into one first main beam and two first sub-beams and the diffraction surface portion 40*a* configured to split the second laser wavelength light at least into one second main beam and two second sub-beams, unnecessary diffraction of the first main beam and the first sub-beam of the first laser wavelength light which results in reduction in efficiency of light of the first main beam and the first sub-beam of the first laser wavelength light, and/or unnecessary diffraction of the second laser wavelength light which results in reduction in efficiency of light of the second laser wavelength light is avoided.

Further, since the diffraction surface portion 40*a* of the diffraction grating 64D is formed as the single surface portion 40*a* corresponding to diffraction of the plurality of types of laser wavelength light serving both as the diffraction surface portion 40*a* configured to split the first laser wavelength light at least into one first main beam and two first sub-beams and the diffraction surface portion 40*a* configured to split the second laser wavelength light at least into one second main beam and two second sub-beams, the diffraction grating 64D in which the numbers of parts to be worked, work processes and the like are reduced is configured. Since the numbers of parts to be worked, work processes and the like of the diffraction grating 64D are reduced, the price of the diffraction grating 64D is kept low. As a result, an optical pickup apparatus whose price can be kept low can be configured.

As shown in FIG. 14, in the diffraction grating 64D, phase shift region portions 41 and 44 (FIG. 14) are provided which are configured to generate phase shifts of $\pi$ radian in a part of the laser beam emitted from the laser unit 61 (FIGS. 1 to 3). The diffraction grating 64D is divided into at least four region portions 41, 42, 43 and 44, that is, the substantially rectangular first region portion 41, the substantially linear second region portion 42 adjacent to the first region portion 41, the substantially linear third region portion 43 adjacent to the second region portion 42, and the substantially rectangular fourth region portion 44 adjacent to the third region portion 43. The diffraction grating 64D is divided into the plurality of region portions 41, 42, 43, and 44. In each of the region portions 41, 42, 43, and 44, a predetermined periodic structure is configured.

In the diffraction grating 64D shown in FIG. 14, in order to facilitate understanding of the phase state of the second region portion 42 and the phase state of the third region portion 43, the second region portion 42 and the third region portion are illustrated with some width for convenience. In actuality, each of the second region portion 42 of the diffraction grating 64D and the third region portion 43 of the diffraction grating 64D is a narrow linear shape having a width 40*w* of approximately 20 to 200 μm, for example. The periodic structure of each of the region portions 41, 42, 43, and 44 included in the diffraction grating 64D is a repetitive periodic structure with minute projections/recesses. The diffraction grating 64D is a glass plate having a dimension of a substantially 3 to 10 mm square and a thickness of substantially 0.3 to 3 mm. If the diffraction grating 64D shown in FIG. 14 is viewed in perspective, the diffraction grating 64D is viewed as the diffraction grating 64A shown in FIG. 1, for example.

If the diffraction grating 64D divided into the plurality of region portions 41, 42, 43, and 44 (FIG. 14) is configured, the detection of the error signal of the optical pickup apparatus for the signal surface portion Da of the media D (FIGS. 5 and 7) can be easily performed in a favorable manner. For example, the tracking of the optical pickup apparatus for the signal surface portion Da of the media D can be easily performed in a favorable manner. Since the diffraction grating 64D (FIG. 14) is configured being divided into the plurality of region portions 41, 42, 43, and 44, at least three independent light collection spots 80, 81, and 82 are formed on the signal surface portion Da of the media D (FIG. 5). Since at least three independent light collection spots 80, 81, and 82 are formed on the signal surface portion Da of the media D, during recording/reproducing and the like of the two types or more of the media D with different track pitches Dtp, it can easily be avoided that detection accuracy of the error signal such as the tracking error signals SE1, SE2 and the like is reduced. Therefore, it becomes possible to provide an optical pickup apparatus which can easily perform the tracking control.

As shown in FIG. 14, the diffraction grating 64D is divided into the even number of region portions, 41, 42, 43, and 44.

If the diffraction grating 64D divided into the even number of region portions 41, 42, 43, and 44 is configured, the light collection spots 80, 81, and 82 formed on the signal surface portion Da of the media D (FIG. 5) are formed as the light collection spots 80, 81, and 82 with accuracy. For example, by a boundary line portion 46 between the second region portion 42 of the diffraction grating 64D (FIG. 14) and the third region portion 43 adjacent to the second region portion 42, the diffraction grating 64D is divided into the even number of parts or at least two equal parts, that is, a one region portion 48 including the first region portion 41 and the second region portion 42 adjacent to the first region portion 41 and the other region portion 49 including the third region portion 43 and the fourth region portion 44 adjacent to the third region portion 43, and thus, when the diffraction grating 64D is provided in the optical pickup apparatus, the light incident on the diffraction grating 64D can be easily incident on the one region portion 48 of the diffraction grating 64D and the other region portion 49 of the diffraction grating 64D, in a state of being substantially equally divided into two parts. Since the light can be easily incident on the one region portion 48 of the diffraction grating 64D and the other region portion 49 of the diffraction grating 64D in a state of being substantially equally divided into two parts, the diffraction grating 64D can be easily provided in the optical pickup apparatus with accuracy. Therefore, the light collection spots 80, 81, and 82 can easily be formed on the signal surface portion Da of the media D (FIG. 5) with accuracy. As a result, detection accuracy is improved of the error signals such as the tracking error signals SE1 and SE2 in recording/reproducing and the like of the two types or more of the media D with different track pitches Dtp. Further, the tracking of the optical pickup apparatus for the signal surface portion Da of the media D can become easily performed with accuracy.

As shown in FIG. 14, the diffraction grating 64D is divided into at least four region portions 41, 42, 43, and 44, that is, the first region portion 41, the second region portion 42 adjacent to the first region portion 41 and having a periodic structure different from the periodic structure of the first region portion 41, the third region portion 43 adjacent to the second region portion 42 and having a periodic structure different from the periodic structure of the second region portion 42, and the fourth region portion 44 adjacent to the third region portion 43 and having a periodic structure different from the periodic structure of the third region portion 43. The diffraction grating 64D is configured as a so-called inline grating divided into four parts.

If the diffraction grating 64D shown in FIG. 14 divided into the plurality of region portions 41, 42, 43, and 44 is provided in the optical pickup apparatus, detection of the error signal of the optical pickup apparatus for the signal surface portion Da of the media D (FIGS. 2, 3, 5, and 7) is performed favorably.

For example, the tracking of the optical pickup apparatus for the signal surface portion Da of the media D is performed favorably. Since the diffraction grating 64D (FIG. 14) is configured being divided into the four region portions 41, 42, 43, and 44, the at least three independent light collection spots 80, 81, and 82 are formed on the signal surface portion Da of the media D (FIG. 5). Since the at least three light collection spots 80, 81, and 82 are formed on the signal surface portion Da of the media D independently, during data recording and the like in the two types or more of the media D with different track pitches Dtp or during the data reproduction of the two types or more of the media D with different track pitches Dtp, it is avoided that detection accuracy of the error signal such as the tracking error signals SE1, SE2 and the like is reduced with the displacement of the objective lens 70 (FIGS. 1 to 3), for example. Therefore, it becomes possible to provide an optical pickup apparatus which can easily perform the tracking control.

As shown in FIG. 14, the diffraction grating 64D includes: the one substantially rectangular region portion 48 including the first region portion 41 and the second region portion 42 adjacent to the first region portion 41; and the other substantially rectangular region portion 49 including the third region portion 43 and the fourth region portion 44 adjacent to the third region portion 43. A width 41w of the first region portion 41 of the diffraction grating 64D and a width 44w of the fourth region portion 44 are set substantially equal to each other. A width 42w of the second region portion 42 of the diffraction grating 64D and a width 43w of the third region portion 43 are set substantially equal to each other. By means of the boundary line portion 46 between the second region portion 42 of the diffraction grating 64D and the third region portion 43 of the diffraction grating 64D adjacent to this second region portion 42, the diffraction grating 64D is divided equally into two parts, that is, into the one region portion 48 included in the diffraction grating 64D and the other region portion 49 included in the diffraction grating 64D. The diffraction grating 64D is divided into the even number of parts.

As a result, the light collection spots 80, 81, and 82 formed on the signal surface portion Da of the media D (FIG. 5) are formed as the light collection spots 80, 81, and 82 with accuracy. By means of the boundary line portion 46 between the second region portion 42 of the diffraction grating 64D (FIG. 14) divided into the even number of parts and the third region portion 43 adjacent to the second region portion 42, the diffraction grating 64D is divided equally into two parts, that is, into the one region portion 48 including the first region portion 41 and the second region portion 42 adjacent to the first region portion 41 and the other region portion 49 including the third region portion 43 and the fourth region portion 44 adjacent to the third region portion 43, and thus, when the diffraction grating 64D is provided in the housing (not shown) of the optical pickup apparatus, the laser beam emitted from the laser unit 61 (FIGS. 1 to 3) and incident on the diffraction grating 64D has the optical axis thereof adjusted easily by a camera for optical axis adjustment, not shown, for example. The laser beam, which is emitted from the laser unit 61, is incident on the diffraction grating 64D, and then has passed through the objective lens 70, is capable of being observed using the camera for optical axis adjustment and the like, for example.

In the diffraction grating 64D divided into four parts shown in FIG. 14, the boundary line portion 46, which equally divides the diffraction grating 64D substantially at the center thereof so as to form the one substantially rectangular region portion 48 and the other substantially rectangular region portion 49, is provided in the diffraction grating 64D, and thus, when the optical axis of the laser beam is adjusted using the camera for optical axis adjustment or the like, the laser beam can be easily incident on the one substantially rectangular region portion 48 included in the diffraction grating 64D and the other substantially rectangular region portion 49 included in the diffraction grating 64D, in a state of being divided substantially equally into two parts.

Since the laser beam can be easily incident on the one substantially rectangular region portion 48 included in the diffraction grating 64D and the other substantially rectangular region portion 49 included in the diffraction grating 64D in a state of being divided substantially equally into two parts, the diffraction grating 64D can be easily provided in the housing of the optical pickup apparatus while being positioned and adjusted with accuracy. Therefore, the light collection spots 80, 81, and 82 can easily be formed with accuracy on the signal surface portion Da of the media D (FIG. 5). As a result, the tracking of the optical pickup apparatus for the signal surface portion Da of the media D can be easily performed with accuracy.

With respect to the periodic structure of the second region portion 42 of the diffraction grating 64D, the periodic structure of the third region portion 43 of the diffraction grating 64D is a periodic structure having a phase difference in the range of 3 to 180 degrees.

As a result, the light collection spots 80, 81, and 82 formed on the signal surface portion Da of the media D can easily be formed as the light collection spots 80, 81, and 82 with higher accuracy. With respect to the periodic structure of the second region portion 42 included in the diffraction grating 64D, the periodic structure of the third region portion 43 included in the diffraction grating 64D is a periodic structure having a phase difference in the range of 3 to 180 degrees, and thus, the boundary line portion 46 between the second region portion 42 of the diffraction grating 64D and the third region portion 43 of the diffraction grating 64D adjacent to the second region portion 42 is substantially made clear.

With respect to the periodic structure of the second region portion 42, if the periodic structure of the third region portion 43 is a periodic structure having a phase difference in the range of less than 3 degrees, the boundary line portion 46 between the second region portion 42 and the third region portion 43 is not made clear. With respect to the periodic structure of the second region portion 42, if the periodic structure of the third region portion 43 is a periodic structure having a phase difference of 180 degrees, the boundary line portion 46 between the second region portion 42 and the third region portion 43 is made clear the most. With respect to the periodic structure of the second region portion 42, if the periodic structure of the third region portion 43 is a periodic structure having a phase difference in the range of 3 to 90 degrees, for example, the diffraction grating 64D with appropriate characteristics is formed while the boundary line portion 46 between the second region portion 42 and the third region portion 43 is made clear.

Since the boundary line portion 46 between the second region portion 42 of the diffraction grating 64D and the third region portion 43 of the diffraction grating 64D is substantially made clear, the boundary line portion 46 between the one region portion 48 of the diffraction grating 64D including the first region portion 41 and the second region portion 42 adjacent to the first region portion 41; and the other region portion 49 of the diffraction grating 64D including the third region portion 43 and the fourth region portion 44 adjacent to the third region portion 43 is made clear. Therefore, the laser beam is incident on the one region portion 48 of the diffraction grating 64D and the other region portion 49 of the diffraction grating 64D, in a state of being divided substantially equally into two parts. When the laser beam is incident on the one region portion 48 of the diffraction grating 64D and the other region portion 49 of the diffraction grating 64D in a state of being divided substantially equally into two parts, the diffraction grating 64D is provided in the housing of the optical pickup apparatus with accuracy.

Between the substantially strip-shaped first region portion 41 and the substantially strip-shaped fourth region portion 44 included in the diffraction grating 64D, the substantially linear second region portion 42 and substantially linear third region portion 43 included in the diffraction grating 64D is arranged. With respect to the periodic structure of the first region portion 41, the periodic structure of the second region portion 42 is a periodic structure having a phase difference. With respect to the periodic structure of the second region portion 42, the periodic structure of the third region portion 43 is a periodic structure having a phase difference. With respect to the periodic structure of third region portion 43, the periodic structure of the fourth region portion 44 is a periodic structure having a phase difference. With respect to the periodic structure of the first region portion 41, the periodic structure of the fourth region portion is a periodic structure having a phase difference of substantially 180 degrees.

As a result, the first region portion 41, the second region portion 42, the third region portion 43, and the fourth region portion 44 in the diffraction grating 64D are differentiated from each other, and the phase difference between the first region portion 41 and the fourth region portion 44 in the diffraction grating 64D is made clear. With respect to the periodic structure of the first region portion 41 of the diffraction grating 64D, the periodic structure of the fourth region portion 44 of the diffraction grating 64D has a periodic structure having a phase difference of substantially 180 degrees, and thus, at least three light collection spots 80, 81, and 82 are formed in a favorable manner on the signal surface portion Da of the media D (FIG. 5). By means of at least three light collection spots 80, 81, and 82 formed in a favorable manner on the signal surface portion Da of the media D, during data recording/reproduction and the like of the plurality of types of media D with different track pitches Dtp, it can easily be avoided that the tracking error signals SE1 and SE2 is deteriorated with displacement of the objective lens 70 (FIGS. 1 to 3), for example.

By a boundary line portion 45 that separates the first region portion 41 (FIG. 14) from the second region portion 42, the first region portion 41 and the second region portion 42 are separated from each other. By a boundary line portion 46 that separates the second region portion 42 from the third region portion 43, the second region portion 42 and the third region portion 43 are separated from each other. By a boundary line portion 47 that separates the third region portion 43 from the fourth region portion 44, the third region portion 43 and the fourth region portion 44 are separated from each other.

With respect to the periodic structure of the first region portion 41, the periodic structure of the second region portion 42 is a periodic structure having a phase difference in a range of 30 to 180 degrees. With respect to the periodic structure of the second region portion 42, the periodic structure of the third region portion 43 is a periodic structure having a phase difference in a range of 3 to 180 degrees. With respect to the periodic structure of the third region portion 43, the periodic structure of the fourth region portion 44 is a periodic structure having a phase difference in a range of 30 to 180 degrees.

As a result, the first region portion 41, the second region portion 42, the third region portion 43, and the fourth region portion 44 in the diffraction grating 64D are substantially clearly differentiated from each other. With respect to the periodic structure of the first region portion 41 included in the diffraction grating 64D, the periodic structure of the second region portion 42 included in the diffraction grating 64D has a periodic structure having a phase difference in the range of 3 to 180 degrees, and thus, the first region portion 41 of the diffraction grating 64D is clearly differentiated from the second region portion 42 of the diffraction grating 64D. With respect to the periodic structure of the second region portion 42 included in the diffraction grating 64D, the periodic structure of the third region portion 43 included in the diffraction grating 64D has a periodic structure having a phase difference in the range of 3 to 180 degrees, and thus, the second region portion 42 of the diffraction grating 64D is substantially differentiated from the third region portion 43 of the diffraction grating 64D. With respect to the periodic structure of the third region portion 43 included in the diffraction grating 64D, the periodic structure of the fourth region portion 44 included in the diffraction grating 64D has a periodic structure having a phase difference in the range of 30 to 180 degrees, the third region portion 43 of the diffraction grating 64D is clearly differentiated from the fourth region portion 44 of the diffraction grating 64D.

Since the diffraction grating 64D is divided into the four region portions to be differentiated, at least three independent light collection spots 80, 81, and 82 are formed on the signal surface portion Da of the media D (FIG. 5). Since at least three light collection spots 80, 81, and 82 are independently formed on the signal surface portion Da of the media D, the tracking of the optical pickup apparatus for the signal surface portion Da of the media D can be performed easily. Since the phase of the periodic structure of each region portion is set in a range of predetermined numeric values as appropriate, additional degrees of freedom in the design of the diffraction grating 64D (FIG. 14) are provided, as well as additional degrees of freedom in the design of the optical pickup apparatus are also provided. Therefore, such an optical pickup apparatus is configured that can easily exert optimal characteristics in accordance with a part to be used.

The diffraction grating 64D is formed in a substantially rectangular plate shape. When the diffraction grating 64D is seen in a plan view, the diffraction grating 64D is visually recognized as an object in the substantially rectangular plate shape.

When the diffraction grating 64D is seen in a plan view in a state where the vertically long substantially rectangular first region portion 41, the vertically long substantially linear second region portion 42, the vertically long substantially linear third region portion 43, and the vertically long substantially rectangular fourth region portion 44 are aligned laterally, in a case where the phase of another region portion adjacent to the right side of one region portion is shifted in a substantially right upward stepped shape with respect to the phase of the one region portion of the diffraction grating 64D, the phase of the another region portion is defined as that being shifted to the positive (+) side.

When the diffraction grating 64D is seen in a plan view in a state where the vertically long substantially rectangular first region portion 41, the vertically long substantially linear second region portion 42, the vertically long substantially linear third region portion 43, and the vertically long substantially rectangular fourth region portion 44 are aligned laterally, in a case where the phase of another region portion adjacent to the right side of one region portion is shifted in a substantially right downward stepped shape with respect to the phase of the one region portion of the diffraction grating 64D, the phase of the another region portion is defined as that being shifted to the negative (−) side.

When the diffraction grating 64D is seen in a plan view, the periodic structure of the second region portion 42 adjacent to the right side of the first region portion 41 is a periodic structure having a phase shifted to the positive side with respect to the periodic structure of the first region portion 41. When the diffraction grating 64D is seen in a plan view, the periodic structure of the third region portion 43 adjacent to the right side of the second region portion 42 is a periodic structure having a phase shifted to the negative side with respect to the periodic structure of the second region portion 42. When the diffraction grating 64D is seen in a plan view, the periodic structure of the fourth region portion 44 adjacent to the right side of the third region portion 43 is a periodic structure having a phase shifted to the positive side with respect to the periodic structure of the third region portion 43.

The diffraction grating 64D is configured such that only the phase of the periodic structure of the third region portion 43 is shifted in the opposite direction with respect to the phases of the periodic structures of the first region portion 41, the second region portion 42, and the fourth region portion 44 (FIG. 15). The diffraction grating 64D (FIG. 14) is the diffraction grating 64D having a so-called out-phase periodic structure.

Depending on the design/specification and the like of the optical pickup apparatus, in the diffraction grating 64D shown in FIG. 14, for example, a diffraction grating (64D) may be used in which only outlines are mirror-reversed with respect to the boundary line portion (46) while reference numerals, lead lines, dimension lines and the like are left substantially as they are. Such a one will be described in specific. For example, when the diffraction grating (64D) is seen in a plan view, the periodic structure of the second region portion (42) adjacent to the right side of the first region portion (41) may be a periodic structure having a phase shifted to the negative side with respect to the periodic structure of the first region portion (41). For example, when the diffraction grating (64D) is seen in a plan view, the periodic structure of the third region portion (43) adjacent to the right side of the second region portion (42) may be a periodic structure having a phase shifted to the positive side with respect to the periodic structure of the second region portion (42). For example, when the diffraction grating (64D) is seen in a plan view, the periodic structure of the fourth region portion (44) adjacent to the right side of the third region portion (43) may be a periodic structure having a phase shifted to the negative side with respect to the periodic structure of the third region portion (43).

The diffraction grating (64D) is configured such that only the phase of the periodic structure of the third region portion (43) is shifted in the opposite direction with respect to the phases of the periodic structures of the first region portion (41), the second region portion (42), and the fourth region portion (44). The diffraction grating (64D) is the diffraction grating (64D) having a so-called out-phase periodic structure.

If the diffraction grating with the out-phase periodic structure is provided in the optical pickup apparatus, the TE amplitude level (%) is increased, and the TE field of view characteristics can easily be improved (FIGS. 16, 17, and 18). It is avoided that the TE amplitude level (%) is decreased and the TE field of view characteristics are deteriorated. Since the TE field of view characteristics are improved, it is preferable that this optical pickup apparatus is provided in an optical disc device for notebook PC or laptop PC. Since the TE field of view characteristics are improved, it is preferable that this optical pickup apparatus is employed as an optical pickup apparatus including a plurality of small objective lenses 70, for example. Since a small-sized objective lens is employed in the optical pickup apparatus which is employed in an optical disc device for notebook PC or laptop PC and the optical pickup apparatus including a plurality of objective lenses 70, mainly the field of view characteristics are considered important.

Depending on the design/specification and the like of the optical pickup apparatus, a diffraction grating divided into four parts (not shown) with the in-phase periodic structure may be provided in this optical pickup apparatus. Depending on the design/specification and the like of the optical pickup apparatus, this optical pickup apparatus may be employed being provided in an optical disc device for desktop PC.

As shown in FIGS. 14 and 15, the periodic structure of the second region portion 42 is a periodic structure having a phase difference of substantially +120 degrees with respect to the periodic structure of the first region portion 41. The periodic structure of the third region portion 43 is a periodic structure having a phase difference of substantially −60 degrees, with respect to the periodic structure of the second region portion 42. The periodic structure of the third region portion is a periodic structure having a phase difference of substantially +60 degrees with respect to the periodic structure of the first region portion 41. The periodic structure of the fourth region portion 44 is a periodic structure having a phase difference of substantially +120 degrees, with respect to the periodic structure of the third region portion 43. The periodic structure of the fourth region portion 44 is a periodic structure having a phase difference of substantially +180 degrees with respect to the periodic structure of the first region portion 41.

If the diffraction grating 64D configured as above is provided in the optical pickup apparatus, the TE amplitude level (%) is increased, and the TE field of view characteristics are drastically improved (FIGS. 16, 17, and 18). It is avoided that the TE amplitude level is decreased and the TE field of view characteristics are deteriorated. The TE field of view characteristics of this optical pickup apparatus are drastically improved (FIGS. 16, 17, and 18) as compared with the TE field of view characteristics of the optical pickup apparatus including the diffraction grating 64C divided into the three phase region portions 31, 32, and 33 (FIG. 12). Since the TE field of view characteristics are drastically improved, it is preferable that this optical pickup apparatus is provided in an optical disc device for notebook or laptop PC. Since the TE field of view characteristics are drastically improved, it is preferable that this optical pickup apparatus is employed as an optical pickup apparatus including a plurality of the small objective lenses 70, for example.

The region portions 42 and 43, in which the second region portion 42 and the third region portion 43 of the diffraction grating 64D (FIG. 14) are combined, are referred to as a vertically long center part 40*m* of the diffraction grating 64D. With respect to a diameter 70*b* of the second laser wavelength light which has a wavelength of substantially 630 to 685 nm conforming to the DVD standard and passes through a pupil plane portion 70*a* (FIG. 2) of the objective lens 70 (FIGS. 1 and 2), the width 40*w* of the center part 40*m* (FIG. 14) of the diffraction grating 64D is set at 14 to 30%, preferably 16 to 28%, more preferably 18 to 26% or further preferably 18 to 25%, for example. That is, when the second laser wavelength light having a wavelength of substantially 630 to 685 nm conforming to the DVD standard passes through the diffraction grating 64D, a center-part ratio Wr of the diffraction grating 64D is 14 to 30%, preferably 16 to 28%, more preferably 18 to 26% or further preferably 18 to 25%, for example (FIGS. 16 to 23).

If the diffraction grating 64D configured as above is provided in the optical pickup apparatus, during data recording/reproduction and the like of the plurality of types of media D with different track pitches Dtp, it can be easily avoided that the tracking error signals SE1 and SE2 are deteriorated with displacement of the objective lens 70.

In a case where the width 40w of the center part 40m of the diffraction grating 64D is set at a value smaller than 14% with respect to the diameter 70b of the second laser wavelength light which has a wavelength of substantially 630 to 685 nm conforming to the DVD standard and passes through a pupil plane portion 70a of the objective lens 70, the TE amplitude level (%) is decreased, and the TE field of view characteristics are deteriorated (FIGS. 16 and 17). That is, when the second laser wavelength light having a wavelength of substantially 630 to 685 nm conforming to the DVD standard passes through the diffraction grating 64D, in a case where the center-part ratio Wr of the diffraction grating 64D is set at a value smaller than 14%, the OBL center ratio (%) is decreased, and the TE field of view characteristics are deteriorated. If the width 40w of the center part 40m of the diffraction grating 64D is set at a value smaller than 16% with respect to the diameter 70b of the second laser wavelength light which has a wavelength of substantially 630 to 685 nm conforming to the DVD standard and passes through the pupil plane portion 70a of the objective lens 70, the TE amplitude level (%) is decreased, and the TE field of view characteristics can easily be deteriorated (FIGS. 16 and 17). That is, when the second laser wavelength light having a wavelength of substantially 630 to 685 nm conforming to the DVD standard passes through the diffraction grating 64D, in a case where the center-part ratio Wr of the diffraction grating 64D is set at that smaller than 16%, an OBL center ratio (%) is decreased, and the TE field of view characteristics can easily be deteriorated.

If the width 40w of the center part 40m of the diffraction grating 64D is set at that equal to or greater than 18% with respect to the diameter 70b of the second laser wavelength light which has a wavelength of approximately 630 to 685 nm conforming to the DVD standard and passes through the pupil plane portion 70a of the objective lens 70, the decrease of the TE amplitude level (%) is suppressed, and deterioration of the TE field of view characteristics is suppressed. That is, when the second laser wavelength light having a wavelength of substantially 630 to 685 nm conforming to the DVD standard passes through the diffraction grating 64D, in a case where the center-part ratio Wr of the diffraction grating 64D is set at that equal to or greater than 18%, the decrease of the OBL center ratio (%) is suppressed, and deterioration of the TE field of view characteristics is suppressed.

If the width 40w of the center part 40m of the diffraction grating 64D is set at that exceeding 30% with respect to the diameter 70b of the second laser wavelength light which has a wavelength of substantially 630 to 685 nm conforming to the DVD standard and passes through the pupil plane portion 70a of the objective lens 70, the sub-push-pull signal amplitude level (Sub-PP amplitude level) (%) is decreased, and the Sub-PP amplitude level characteristics are deteriorated (FIGS. 19 and 20). In a case where the width 40w of the center part 40m of the diffraction grating 64D is set at that exceeding 28% with respect to the diameter 70b of the second laser wavelength light which has a wavelength of approximately 630 to 685 nm conforming to the DVD standard and passes through the pupil plane portion 70a of the objective lens 70, the sub-push-pull signal amplitude level (Sub-PP amplitude level) (%) is decreased, and the Sub-PP amplitude level characteristics can easily be deteriorated.

If the width 40w of the center part 40m of the diffraction grating 64D is set at that equal to or smaller than 26% relative to the diameter 70b of the second laser wavelength light which has a wavelength of substantially 630 to 685 nm conforming to the DVD standard and passes through the pupil plane portion 70a of the objective lens 70, the decrease of the Sub-PP amplitude level (%) can easily be suppressed, and deterioration of the Sub-PP amplitude level characteristics can easily be suppressed. Specifically, if the width 40w of the center part 40m of the diffraction grating 64D is set at that equal to or smaller than 25% with respect to the diameter 70b of the second laser wavelength light which has a wavelength of substantially 630 to 685 nm conforming to the DVD standard and passes through the pupil plane portion 70a of the objective lens 70, the decrease of the Sub-PP amplitude level (%) is suppressed, and deterioration of the Sub-PP amplitude level characteristics is suppressed.

If the width 40w of the center part 40m of the diffraction grating 64D (FIG. 14) is set at that exceeding 30% with respect to the diameter 70b of the second laser wavelength light has a wavelength of substantially 630 to 685 nm conforming to the DVD standard and passes through the pupil plane portion 70a of the objective lens 70 (FIG. 2), the tracking error phase difference amount (TE phase difference amount) is increased, and the tracking error phase difference characteristics (TE phase difference characteristics) are deteriorated (FIGS. 22 and 23). Specifically, if the width 40w of the center part 40m of the diffraction grating 64D (FIG. 14) is set at that exceeding 28% with respect to the diameter 70b of the second laser wavelength light which has a wavelength of substantially 630 to 685 nm conforming to the DVD standard and passes through the pupil plane portion 70a of the objective lens 70 (FIG. 2), the tracking error phase difference amount (TE phase difference amount) is increased, and the tracking error phase difference characteristics (TE phase difference characteristics) can easily be deteriorated (FIGS. 22 and 23).

If the width 40w of the center part 40m of the diffraction grating 64D is set at that equal to or smaller than 26% with respect to the diameter 70b of the second laser wavelength light which has a wavelength of approximately 630 to 685 nm conforming to the DVD standard and passes through the pupil plane portion 70a of the objective lens 70, the increase of the TE phase difference amount can easily be suppressed, and deterioration of the TE phase difference characteristics can easily be suppressed. Specifically, if the width 40w of the center part 40m of the diffraction grating 64D is set at that equal to or smaller than 25% with respect to the diameter 70b of the second laser wavelength light which has a wavelength of substantially 630 to 685 nm conforming to the DVD standard and passes through the pupil plane portion 70a of the objective lens 70, the increase of the TE phase difference amount is suppressed, and deterioration of the TE phase difference characteristics is suppressed.

If the width 40w of the center part 40m of the diffraction grating 64D is set at 14 to 30%, preferably 16 to 28%, more preferably 18 to 26% or further preferably 18 to 25% with respect to the diameter 70b of the second laser wavelength light which has a wavelength of substantially 630 to 685 nm conforming to the DVD standard and passes through the pupil plane portion 70a of the objective lens 70, the TE amplitude level (FIGS. 16 and 17), the Sub-PP amplitude level (FIGS. 19 and 20), and the TE phase difference amount (FIGS. 22 and 23) can easily be set at appropriate values.

If the width 40w of the center part 40m of the diffraction grating 64D is set at substantially 20% with respect to the diameter 70b of the second laser wavelength light which has a wavelength of substantially 630 to 685 nm conforming to the DVD standard and passes through the pupil plane portion 70a of the objective lens 70, for example, the TE amplitude level (FIGS. 16 and 17), the Sub-PP amplitude level (FIGS. 19 and 20), and the TE phase difference amount (FIGS. 22 and 23) can easily be set at optimal values. Since the TE amplitude level, the Sub-PP amplitude level, and the TE phase difference amount are set at appropriate values in a balanced manner, the tracking control of the optical pickup apparatus can easily be performed.

The region portions 42 and 43, in which the second region portion 42 and the third region portion 43 of the diffraction grating 64D (FIG. 14) are combined, are referred to as the vertically long center part 40m of the diffraction grating 64D. With respect to a diameter 70c of the first laser wavelength light which has a wavelength of substantially 765 to 840 nm conforming to the CD standard and passes through a pupil plane portion 70a (FIG. 3) of the objective lens 70 (FIGS. 1 and 3), the width 40w of the center part 40m (FIG. 14) of the diffraction grating 64D is set at that equal to or greater than 10% and equal to or smaller than 40%, preferably that equal to or greater than 12% and equal to or smaller than 30%; that equal to or greater than 14% and equal to or smaller than 25% depending on the design/specification and the like, or that equal to or greater than 16% and equal to or smaller than 20% depending on the design/specification and the like, for example. That is, when the first laser wavelength light, having a wavelength of substantially 765 to 840 nm conforming to the CD standard, passes through the diffraction grating 64D, a center-part ratio Wr of the diffraction grating 64D is set at that equal to or greater than 10% and equal to or smaller than 40%, preferably that equal to or greater than 12% and equal to or smaller than 30%; that equal to or greater than 14% and equal to or smaller than 25% depending on the design/specification and the like, or that equal to or greater than 16% and equal to or smaller than 20% depending on the design/specification and the like, for example (FIGS. 18, 21, and 24).

If the diffraction grating 64D configured as above is provided in the optical pickup apparatus, during data recording/reproduction and the like of the plurality of types of media D with different track pitches Dtp, it can easily be avoided that the tracking error signals SE1 and SE2 are deteriorated with displacement of the objective lens 70.

In a case where the width 40w of the center part 40m of the diffraction grating 64D is set at that smaller than 10% with respect to the diameter 70c of the first laser wavelength light which has a wavelength of approximately 765 to 840 nm conforming to the CD standard and passes through a pupil plane portion 70a of the objective lens 70, the TE amplitude level (%) is decreased, and the TE field of view characteristics are deteriorated (FIG. 18). That is, when the first laser wavelength light, having a wavelength of substantially 765 to 840 nm conforming to the CD standard, passes through the diffraction grating 64D, in a case where the center-part ratio Wr of the diffraction grating 64D is set at that smaller than 10%, the OBL center ratio (%) is decreased, and the TE field of view characteristics are deteriorated. In a case where the width 40w of the center part 40m of the diffraction grating 64D is set at that smaller than 12% with respect to the diameter 70c of the first laser wavelength light which has a wavelength of approximately 765 to 840 nm conforming to the CD standard and passes through the pupil plane portion 70a of the objective lens 70, the TE amplitude level (%) is decreased, and the TE field of view characteristics can easily be deteriorated (FIG. 18). That is, when the first laser wavelength light, having a wavelength of substantially 765 to 840 nm conforming to the CD standard, passes through the diffraction grating 64D, in a case where the center-part ratio Wr of the diffraction grating 64D is set at that smaller than 12%, an OBL center ratio (%) is decreased, and the TE field of view characteristics can easily be deteriorated.

If the width 40w of the center part 40m of the diffraction grating 64D is set at that equal to or greater than 14% with respect to the diameter 70c of the first laser wavelength light which has a wavelength of substantially 765 to 840 nm conforming to the CD standard and passes through the pupil plane portion 70a of the objective lens 70, the decrease of the TE amplitude level (%) is suppressed, and deterioration of the TE field of view characteristics is suppressed. That is, when the first laser wavelength light, having a wavelength of substantially 765 to 840 nm conforming to the CD standard, passes through the diffraction grating 64D, in a case where the center-part ratio Wr of the diffraction grating 64D is set at that equal to or greater than 14%, the decrease of the OBL center ratio (%) is suppressed, and deterioration of the TE field of view characteristics is suppressed. Specifically, if the width 40w of the center part 40m of the diffraction grating 64D is set at that equal to or greater than 16% with respect to the diameter 70c of the first laser wavelength light which has a wavelength of substantially 765 to 840 nm conforming to the CD standard and passes through the pupil plane portion 70a of the objective lens 70, the decrease of the TE amplitude level (%) is suppressed, and deterioration of the TE field of view characteristics is reliably suppressed. That is, when the first laser wavelength light, having a wavelength of substantially 765 to 840 nm conforming to the CD standard, passes through the diffraction grating 64D, in a case where the center-part ratio Wr of the diffraction grating 64D is set at that equal to or greater than 16%, the decrease of the OBL center ratio (%) is suppressed, and deterioration of the TE field of view characteristics is reliably suppressed.

If the width 40w of the center part 40m of the diffraction grating 64D is set at that exceeding 40% with respect to the diameter 70c of the first laser wavelength light which has a wavelength of substantially 765 to 840 nm conforming to the CD standard and passes through the pupil plane portion 70a of the objective lens 70, the sub-push-pull signal amplitude level (Sub-PP amplitude level) (%) is decreased, and the Sub-PP amplitude level characteristics are deteriorated (FIG. 21). In a case where the width 40w of the center part 40m of the diffraction grating 64D is set at that exceeding 30% with respect to the diameter 70c of the first laser wavelength light which has a wavelength of substantially 765 to 840 nm conforming to the CD standard and passes through the pupil plane portion 70a of the objective lens 70, the sub-push-pull signal amplitude level (Sub-PP amplitude level) (%) is decreased, and the Sub-PP amplitude level characteristics can easily be deteriorated. Depending on the design/specification and the like, if the width 40w of the center part 40m of the diffraction grating 64D is set at that equal to or smaller than 25% with respect to the diameter 70c of the first laser wavelength light which has a wavelength of substantially 765 to 840 nm conforming to the CD standard and passes through the pupil plane portion 70a of the objective lens 70, the decrease of the Sub-PP amplitude level (%) can easily be suppressed, and deterioration of the Sub-PP amplitude level characteristics easily can be suppressed.

Depending on the design/specification and the like, if the width 40w of the center part 40m of the diffraction grating 64D is set at that equal to or smaller than 20% with respect to the diameter 70c of the first laser wavelength light which has a wavelength of substantially 765 to 840 nm conforming to the CD standard and passes through the pupil plane portion 70a of the objective lens 70, the decrease of the Sub-PP amplitude level (%) is suppressed, and deterioration of the Sub-PP amplitude level characteristics is suppressed.

If the width 40w of the center part 40m of the diffraction grating 64D (FIG. 14) is set at that exceeding 40% with respect to the diameter 70c of the first laser wavelength light having a wavelength of substantially 765 to 840 nm conforming to the CD standard and passes through the pupil plane portion 70a of the objective lens 70 (FIG. 3), the tracking error phase difference amount (TE phase difference amount) is increased, and the tracking error phase difference characteristics (TE phase difference characteristics) are deteriorated (FIG. 24). Specifically, in a case where the width 40w of the center part 40m of the diffraction grating 64D (FIG. 14) is set at that exceeding 30% with respect to the diameter 70c of the first laser wavelength light which has a wavelength of substantially 765 to 840 nm conforming to the CD standard and passes through the pupil plane portion 70a of the objective lens 70 (FIG. 3), the tracking error phase difference amount (TE phase difference amount) is increased, and the tracking error phase difference characteristics (TE phase difference characteristics) can easily be deteriorated (FIG. 24).

Depending on the design/specification and the like, if the width 40w of the center part 40m of the diffraction grating 64D is set at that equal to or smaller than 25% with respect to the diameter 70c of the first laser wavelength light having a wavelength of substantially 765 to 840 nm conforming to the CD standard and passes through the pupil plane portion 70a of the objective lens 70, the increase of the TE phase difference amount can easily be suppressed, and deterioration of the TE phase difference characteristics can easily be suppressed. Depending on the design/specification and the like, if the width 40w of the center part 40m of the diffraction grating 64D is set at that equal to or smaller than 20% with respect to the diameter 70c of the first laser wavelength light which has a wavelength of substantially 765 to 840 nm conforming to the CD standard and passes through the pupil plane portion 70a of the objective lens 70, the increase of the TE phase amount is suppressed, and deterioration of the TE phase difference characteristics is suppressed.

If the width 40w of the center part 40m of the diffraction grating 64D is set at that equal to or greater than 10% and equal to or smaller than 40%, preferably that equal to or greater than 12% and equal to or smaller than 30%; that equal to or greater than 14% and equal to or smaller than 25% depending on the design/specification and the like, or that equal to or greater than 16% and equal to or smaller than 20% depending on the design/specification and the like, for example, with respect to the diameter 70c of the first laser wavelength light which has a wavelength of substantially 765 to 840 nm conforming to the CD standard and passes through the pupil plane portion 70a of the objective lens 70, the TE amplitude level (FIG. 18), the Sub-PP amplitude level (FIG. 21), and the TE phase difference amount (FIG. 24) can easily be set at appropriate values.

Based on the above, the following equation (38) and the following equation (39) are set up, for example. In order to set up the following equation (38) and the following equation (39), first, the width 40w of the center part 40m of the diffraction grating 64D is defined as B1. The diameter 70c of the first laser wavelength light which has a wavelength of substantially 765 to 840 nm conforming to the CD standard and passes through the pupil plane portion 70a of the objective lens 70 is defined as B2. The diameter 70b of the second laser wavelength light which has a wavelength of substantially 630 to 685 nm conforming to the DVD standard and passes through the pupil plane portion 70a of the objective lens 70 is defined as B3.

When definitions are made as above, an optical pickup apparatus is configured which exerts such performances as to satisfy the following equation (38) and the following equation (39):

$$0.10 < \frac{B1}{B2} < 0.40 \tag{38}$$

$$0.14 < \frac{B1}{B3} < 0.30 \tag{39}$$

By setting B1/B2 at a value equal to or greater than 0.10 and equal to or smaller than 0.40, preferably a value equal to or greater than 0.12 and equal to or smaller than 0.30; a value equal to or greater than 0.14 and equal to or smaller than 0.25 depending on the design/specification and the like or a value equal to or greater than 0.16 and equal to or smaller than 0.20 depending on the design/specification and the like, for example, when reading/writing and the like of data/information/signals are performed by the optical pickup apparatus with respect to the optical disc D conforming to the CD standard, a minimum value "DPP_L" of the field of view characteristics and a ratio "SPP/MPP" of the signal level of the sub-push-pull signal with respect to the signal level of the main-push-pull signal can easily be set at appropriate values.

By setting B1/B3 at 0.14 to 0.30, preferably 0.16 to 0.28, more preferably 0.18 to 0.26 or further preferably 0.18 to 0.25, for example, when reading/writing and the like of data/information/signals are performed by the optical pickup apparatus with respect to the optical disc D conforming to the DVD standard, a minimum value "DPP_L" of the field of view characteristics and a ratio "SPP/MPP" of the signal level of the sub-push-pull signal with respect to the signal level of the main-push-pull signal can easily be set at appropriate values.

The width 42w of the second region portion 42 of the diffraction grating 64D (FIG. 14) and the width 43w of the third region portion 43 of the diffraction grating 64D each are set at 10 to 100 µm, preferably 30 to 80 µm, or more preferably 48 to 72 µm. That is, the widths 42w and 43w of the divided portions of the diffraction grating 64D each are set at 10 to 100 µm, preferably 30 to 80 µm or more preferably 48 to 72 µm.

As a result, the tracking of the optical pickup apparatus with respect to the signal surface portion Da of the media D can easily be performed in a favorable manner. During recording/reproduction and the like of the plurality of types of media D with different track pitches Dtp, it can easily be avoided that the tracking error signals SE1 and SE2 are deteriorated with displacement of the objective lens 70, for example.

If the width 42w of the second region portion 42 of the diffraction grating 64D and the width 43w of the third region portion 43 of the diffraction grating 64D each are set at a narrow width smaller than 10 µm, or if the width 42w of the second region portion 42 of the diffraction grating 64D and the width 43w of the third region portion 43 of the diffraction grating 64D each are set at a wide width exceeding 100 µm, a balance among the TE field of view characteristics, the Sub-PP amplitude level characteristics, and the TE phase difference characteristics are lost. If the balance among the characteristics is lost, the tracking error signals SE1 and SE2 are deteriorated, and the tracking of the optical pickup apparatus with respect to the signal surface portion Da of the media D cannot be performed accurately.

For example, by setting each of the width 42w of the second region portion 42 of the diffraction grating 64D and the width 43w of the third region portion 43 of the diffraction grating 64D at a value of the order of 30 to 80 μm, the balance among the TE field of view characteristics, the Sub-PP amplitude level characteristics, and the TE phase difference characteristics can substantially be maintained easily. As a result, the tracking of the optical pickup apparatus with respect to the signal surface portion Da of the media D can easily be performed accurately.

Preferably, by setting each of the width 42w of the second region portion 42 of the diffraction grating 64D and the width 43w of the third region portion 43 of the diffraction grating 64D at a value in a range of 48 to 72 μm, the balance among the TE field of view characteristics, the Sub-PP amplitude level characteristics, and the TE phase difference characteristics are maintained. As a result, it is avoided that the tracking error signals SE1 and SE2 are deteriorated. Therefore, the tracking of the optical pickup apparatus with respect to the signal surface portion Da of the media D is performed accurately.

In an optical pickup apparatus provided with the diffraction grating 64C divided into three parts (FIG. 12), for example, in order to change the TE field of view characteristics or the TE phase difference characteristics, it was the only way to change the width 32w of the center part 30m of the diffraction grating 64C divided into three parts.

Whereas, in an optical pickup apparatus (FIGS. 1 to 3) provided with the diffraction grating 64D divided into four parts (FIG. 14), in order to change the TE field of view characteristics or the TE phase difference characteristics, the phase difference is changed of the grating pitches making up each of the region portions 42 and 43 of the center part 40m in the diffraction grating 64D divided into four parts, in addition that the width 40w is changed of the center part 40m of the diffraction grating 64D divided into four parts (FIG. 14), so that the various characteristics can be adjusted and changed.

Since the width 40w of the center part 40m of the diffraction grating 64D divided into four parts and the phase difference of the grating pitches making up each of the region portions 42 and 43 of the center part 40m in the diffraction grating 64D divided into four parts are adjusted to be set, it becomes possible to exert desired performances as well as design an optical pickup apparatus with balanced various characteristics. Therefore, additional degrees of freedom in the design of the optical pickup apparatus are provided.

This optical pickup apparatus (FIGS. 1 to 3) includes the diffraction grating 64D (FIG. 14), which is substantially rectangular in a plan view, the objective lens 70 (FIGS. 1 to 3) that condenses at least three light fluxes and causes at least three independent light collection spots 80, 81, and 82 to be form on the signal surface portion Da (FIG. 5) of the media D (FIGS. 1 to 3 and 5), and the photodetector 73A (FIGS. 1 to 3 and 5 to 7) that receives reflected light of each of the three light collection spots 80, 81, and 82 (FIG. 5) in the media D.

If the optical pickup apparatus is configured as above, the tracking of the optical pickup apparatus with respect to the signal surface portion Da of the media D (FIG. 5) is performed with accuracy. It can easily be avoided that the amplitudes of the tracking error signals SE1 and SE2 is deteriorated with displacement of the objective lens 70 (FIGS. 1 to 3) during the data recording/reproduction and the like of the plurality of types of the media D with different track pitches Dtp and offset in the tracking error signals SE1 and SE2 is remained.

The optical pickup apparatus provided with the phase-shift type diffraction grating 64D divided into four parts (FIG. 14), so that the data reproducing operation and/or the data recording operation of the optical pickup apparatus for DVD-RAM is performed reliably. The data reproducing operation and/or the data recording operation of the optical pickup apparatus for DVD±R, DVD±RW is also performed reliably.

<<Description of Optical Disc Device>>

An optical disc device includes at least one of optical pickup apparatuses shown in the above described embodiments 1, 2, 3, and 4 (FIGS. 1 to 3). Specifically, the optical disc device includes any single one of optical pickup apparatuses shown in the above described embodiments 1, 2, 3, and 4. The optical pickup apparatus is provided in the optical disc device.

The optical disc device includes the operation unit 76A (FIGS. 2 and 3), for example.

The optical pickup apparatuses shown in the above described embodiments 1, 2, 3, and 4 are provided in the optical disc device, so that an optical disc device is configured which includes at least the optical pickup apparatus capable of solving at least one of the above various drawbacks.

For example, the optical pickup apparatus, which is set so as to satisfy the above equation (1) and/or the above equation (2) and the above equation (3), is provided in the optical disc device, so that an optical disc device adapted to a plurality of wavelengths is configured which is reliably adapted to the first laser wavelength light and the second laser wavelength light, different from the first laser wavelength light and having a wavelength shorter than that of the first laser wavelength light, and in which the detection accuracy is improved with respect to the error signals such as the tracking error signals SE1, SE2 and the like.

An optical disc device including at least an optical pickup apparatus adapted to the plurality of wavelengths is configured which apparatus reliably condenses the first laser wavelength light onto the signal surface portion Da of the first optical disc D and reliably condenses the second laser wavelength light onto the signal surface portion Da of the second optical disc D.

An optical disc device is configured including at least an optical pickup apparatus in which occurrence of unnecessary diffraction light in the diffraction gratings 64A, 64B, 64C, and 64D is suppressed and the decrease in efficiency of the laser light is prevented.

If the light splitting ratio of the first laser wavelength light of the setting-changed photodetector 73A (FIGS. 5 to 7) is changed from the light splitting ratio of the first laser wavelength light of the standardized photodetector 270 (FIG. 27), the detection of the single first main beam and the detection of the two first sub-beams can easily be performed with accuracy in a favorable manner by the new setting-changed photodetector 73A.

It is possible to provide an optical disc device including a single optical pickup apparatus capable of easily performing control such as tracking control with accuracy. Reading of data from media D and writing of data in media D and the like are performed normally in the optical disc device including the optical pickup apparatus. When each of the media D is inserted into the optical disc device so that data in the plurality of types of media D with different track pitches Dtp is read or data is written in the plurality of types of media D with different track pitches Dtp, it can easily be avoided that the tracking error signals SE1 and SE2 are deteriorated with displacement of the objective lens 70, for example. Therefore, it becomes possible to provide an optical disc device including a single optical pickup apparatus capable of easily performing tracking control with high accuracy.

If a single optical pickup apparatus capable of being adapted to the plurality of types of media D with different track pitches Dtp is incorporated in an optical disc device, the price of the optical disc device can be kept low. It is avoided that a plurality of optical pickup apparatuses are incorporated in the optical disc device conforming to the plurality of types of media D with different track pitches Dtp with the price of the optical disc device being significantly increased.

Embodiment 5

Figure 25:
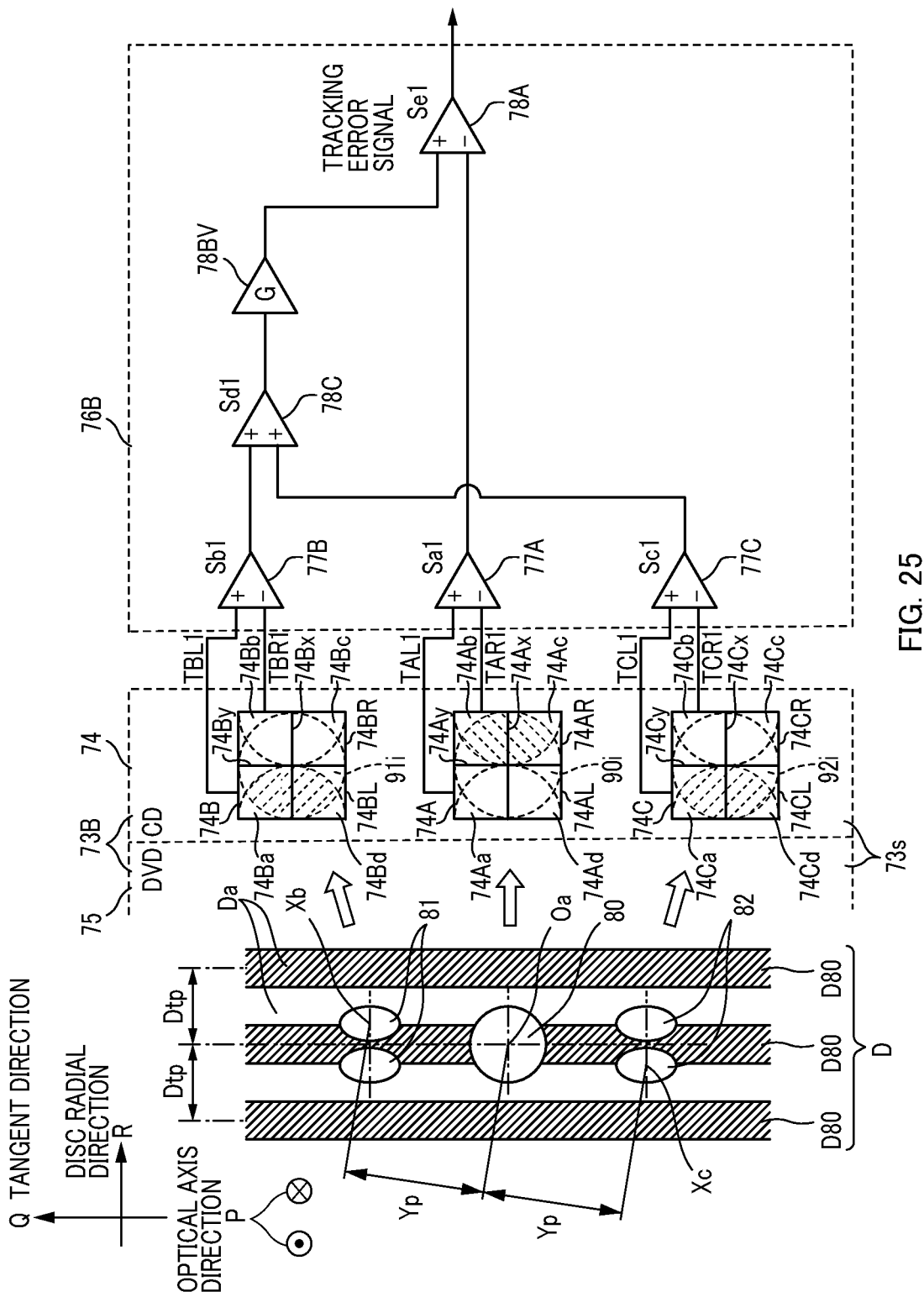
FIG. 25 is an outline diagram illustrating a fifth embodiment of the optical disc device and the optical pickup apparatus.
Figure 26:
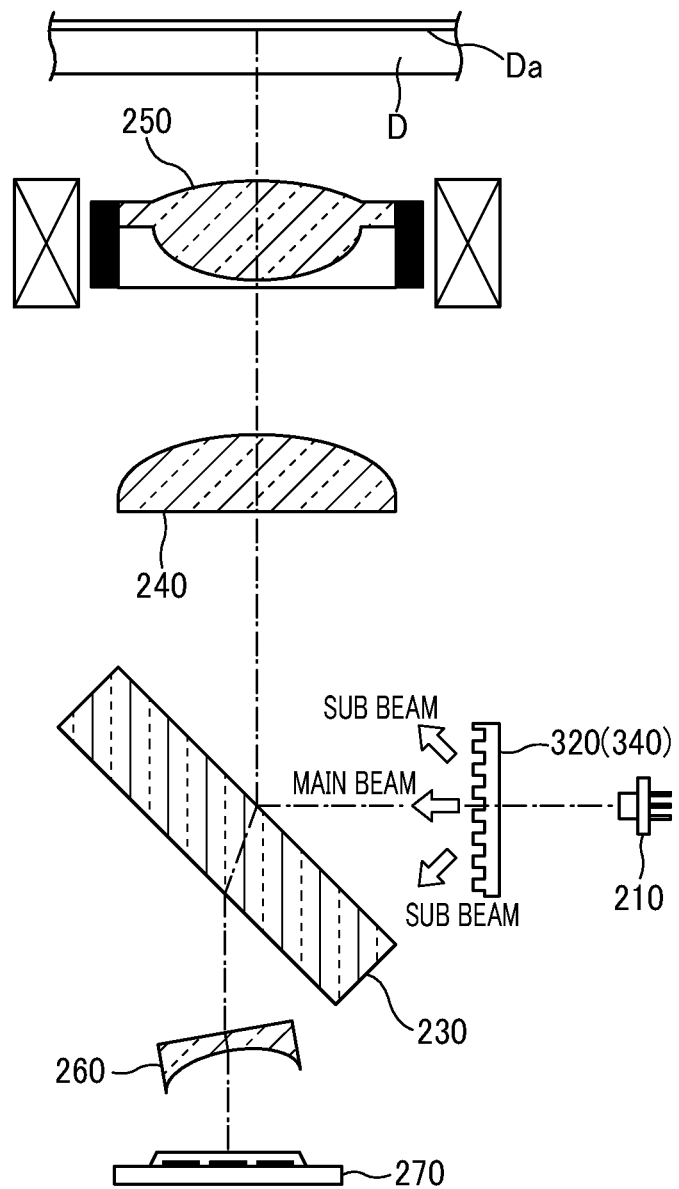
FIG. 26 is a diagram illustrating an optical system of an optical pickup apparatus.

FIG. 25 is an outline diagram illustrating a fifth embodiment of an optical disc device and an optical pickup apparatus.

In place of the setting-changed photodetector 73A and the amplifier 78B with usual setting in the operation unit 76A shown in FIGS. 5 and 6, a photodetector 73B with usual setting is provided in an optical pickup apparatus and an operation unit 76B is configured including an amplifier 78BV (FIG. 25) and the like with setting changed, for example.

Specifically, in place of the amplifier 78B with the usual amplification factor Kin the operation unit 76A shown in FIGS. 5 and 6 is set therefor, the amplifier 78BV (FIG. 25) with an amplification factor changed to an amplification factor G, for example, and the like are provided in the operation unit 76B. The optical pickup apparatus is provided with the photodetector 73B (FIG. 25) including the current/voltage conversion amplifiers 77DL1, 77DR1, 77EL1, 77ER1, 77FL1, 77FR1, 77GL1, 77GR1, 77HL1, 77HR1, 77IL1, 77IR1 and the like, and the subsequent-stage amplifiers 77DL2, 77DR2, 77EL2, 77ER2, 77FL2, 77FR2, 77GL2, 77GR2, 77HL2, 77HR2, 77IL2, 77IR2 and the like, shown in FIG. 6, which are set at the usual values.

The optical system/circuit system including the photodetector 73B and the operation unit 76B shown in FIG. 25 are different in part from the optical system/circuit system shown in FIGS. 1 to 3. The CD light receiving region 74 and the DVD light receiving region 75 in the photodetector 73B includes the current/voltage conversion amplifiers and subsequent-stage amplifiers close to those in the circuit shown in FIG. 6, for example, but the detailed description thereof is omitted here. The operation unit 76B is close to the circuit shown in FIG. 6, for example, includes the adder, the subtractor, and the amplifier configured to operate signals, and the adder, the subtractor, and the amplifier for operating signals are connected to the CD light receiving region 74 and the DVD light receiving region 75, but the detailed description thereof is omitted here.

The detailed description is also omitted of the process in which the tracking error signals are generated with accuracy using the current/voltage conversion amplifiers, the subsequent-stage amplifiers, the adders, the subtractors, the amplifiers and the like, based on the laser beam incident on the DVD light receiving region 75 of the photodetector 73B. The detailed description is also omitted of the process in which a focus error signal is generated with accuracy based on the laser beam incident on the CD light receiving region 74 and the DVD light receiving region 75 of the photodetector 73B. The detailed description is also omitted of the process in which the signals such as data, information and the like recorded in the optical disc D are generated with accuracy based on the laser beam incident on the CD light receiving region 74 and the DVD light receiving region 75 of the photodetector 73B.

There is not a change in the optical pickup apparatus and the optical disc device except for that the setting-changed photodetector 73A and the amplifier 78A with the usual setting of the operation unit 76A shown in FIGS. 5, 6, etc., are replaced by the photodetector 73B with usual setting and the amplifier 78B of the setting-changed operation unit 76B shown in FIG. 25. Embodiments 1, 2, 3, and 4 and Embodiment 5 are different in a point that the setting-changed photodetector 73A and the amplifier 78A with the usual setting of the operation unit 76A shown in FIGS. 5, 6, etc., are replaced by the photodetector 73B with usual setting and the amplifier 78B of the setting-changed operation unit 76B shown in FIG. 25, but Embodiments 1, 2, 3, and 4 and Embodiment 5 are common in a part other than the photodetectors 73A, 73B, and the amplifiers 78A, 78B included in the operation units 76A and 76B. Embodiment 5 will be described also using FIGS. 1 to 24 for convenience. In Embodiment 5, components equivalent to those described in Embodiments 1, 2, 3, and 4 are designated by the same reference numerals, to omit the detailed descriptions thereof.

The photodetector 73B is connected to the operation unit 76B. A signal generated in the photodetector 73B is transmitted to the operation unit 76B. The operation unit 76B includes at least four differential amplifiers 77A, 77B, 77C, and 78A, the adder 78C, and the amplifier 78BV, for example. The differential amplifier 77A calculates a difference (TAL1−TAR1) between the output signals from a pair of right and left photodetection surface portions 74AL and 74AR included in the first main-light-receiving portion 74A at the center, for example, to be generated as a main-push-pull signal Sa1. The differential amplifier 77B calculates a difference (TBL1−TBR1) between the output signals from a pair of right and left photodetection surface portions 74BL and 74BR included in the one first sub-light-receiving portion 74B, for example, to be generated as a preceding sub-push-pull signal Sc1. The differential amplifier 77C calculates a difference (TCL1−TCR1) between the output signals from a pair of right and left photodetection surface portions 74CL and 74CR included in the other first sub-light-receiving portion 74C, for example, to be generated as a lagging sub-push-pull signal Sc1.

The preceding sub-push-pull signal Sb1, which is an output signal of the differential amplifier 77B, and the lagging sub-push-pull signal Sc1, which is an output signal of the differential amplifier 77C, are inputted to the adder 78C. The adder 78C performs addition of these signals (Sb1+Sc1) and generates the added sub-push-pull signal Sd1. The added sub-push-pull signal Sd1, which is an output signal of the adder 78C, is inputted to the amplifier 78BV. The amplifier 78BV amplifies the added sub-push-pull signal Sd1 to a signal level equal to or greater than that of the main-push-pull signal Sa1 by an amplification factor G, for example. The output signal of the differential amplifier 77A and the output signal of the amplifier 78BV are inputted to the differential amplifier 78A. The differential amplifier 78A calculates a difference between the main-push-pull signal Sa1 and a signal obtained by amplifying the added sub-push-pull signal Sd1, to be outputted as the tracking error signal Se1.

The tracking error signal Se1 generated by the operation unit 76B is transmitted to the objective-lens driving unit 79 (FIGS. 2 and 3), and tracking adjustment of the objective lens 70 (FIGS. 2 and 3) is automatically made with respect to the track D80 (FIG. 25) of the optical disc D.

With respect to the standardized current and/or voltage value of a usual signal outputted from the single first main-light-receiving portion 200a (FIG. 27), the current/voltage value of a signal outputted from the single first main-light-receiving portion 74A (FIGS. 5 and 7) is changed or made equal. Specifically, when the standardized current/voltage value of a usual signal outputted from the single first main-light-receiving portion 200a (FIG. 27) is defined as a current/ voltage value of 100%, the current/voltage value of the a signal outputted from the single first main-light-receiving portion 74A (FIGS. 5 and 7), which has been changed or made equal, are set at a lower value of substantially 100% or substantially smaller than 100% or substantially equal to or smaller than 100% with respect to the standardized current/voltage value of the usual signal outputted from the one single first main-light-receiving portion 200a. In a case where setting of the current/voltage value of the signal outputted from the single first main-light-receiving portion 74A is changed, setting of the current/voltage value of the signal outputted from the single first main-light-receiving portion 74A is changed using an attenuator (not shown) or the like, for example.

With respect to standardized current/voltage values of the usual signals outputted from the two first sub-light-receiving portions 200b and 200c (FIG. 27), the current/voltage values of the signals outputted from the two first sub-light-receiving portions 74B and 74C (FIGS. 5 and 7) are changed. Specifically, when the standardized current/voltage values of usual signals outputted from the two first sub-light-receiving portions 200b and 200c (FIG. 27) each are set at the current/voltage value of 100%, the changed current/voltage values of the signals outputted from the two first sub-light-receiving portions 74B and 74C (FIGS. 5 and 7) each are gained-up and set at a higher value equal to or greater than substantially 100% or exceeding substantially 100% with respect to the standardized current/voltage values of the usual signals outputted from the two first sub-light-receiving portions 200b and 200c. The current/voltage values of the signals outputted from the two first sub-light-receiving portions 74B and 74C are changed to be set by the amplifier 78BV.

If the current/voltage values of the signals are changed or made equal to be set with respect to the current/voltage value of the signal, the detection of the single first main beam and the detection of the two first sub-beams can be performed easily and relatively accurately in the operation unit 76B including the new setting-changed amplifier 78BV. The current/voltage value of the signal outputted from the single first main-light-receiving portion 74A (FIGS. 5 and 7) is changed from or made equal to the standardized current/voltage value of the usual signal outputted from the single first main-light-receiving portion 200a (FIG. 27); and the current/voltage values of the signals outputted from the two first sub-light-receiving portions 74B and 74C (FIGS. 5 and 7) are gained up to be changed from the standardized current/voltage values of the usual signal outputted from the two first sub-light-receiving portions 200b and 200c (FIG. 27), and thus, the detection of the single first main beam and the detection of the two first sub-beams can be performed easily and relatively accurately in the operation unit 76B including the new setting-changed amplifier 78BV.

Specifically, with respect to the standardized current/voltage value of the usual signal outputted from the single first main-light-receiving portion 200a (FIG. 27) being set at 100%, the current/voltage value of the signal outputted from the single first main-light-receiving portion 74A (FIGS. 5 and 7), which has been changed or made equal, is set at a lower value of substantially 100% or substantially smaller than 100% or substantially equal to or smaller than 100%; while with respect to the standardized current/voltage values of the usual signals outputted from the two first sub-light-receiving portions 200b and 200c (FIG. 27) each being set at 100%, the changed current/voltage values of the signals outputted from the two first sub-light-receiving portions 74B and 74C (FIGS. 5 and 7) each are gained-up to be set at a higher value equal to or greater than substantially 100% or exceeding substantially 100%, and thus, the detection of the single first main beam and the detection of the two first sub-beams can be performed easily and relatively accurately in the operation unit 76B including the new setting-changed amplifier 78BV.

If the standardized current/voltage value of the usual signal outputted from the single first main-light-receiving portion 200a (FIG. 27) is set at the current/voltage value of 100%, the current/voltage value of the signal outputted from the single first main-light-receiving portion 74A (FIGS. 5 and 7), which has been changed or made equal, is set at the current/voltage value of substantially 95 to 100% or preferably substantially 96 to 100% with respect to the standardized current/voltage value of the usual signal outputted from the single first main-light-receiving portion 200a. When the standardized current/voltage values of the usual signals outputted from the two first sub-light-receiving portions 200b and 200c (FIG. 27) each are defined as the current/voltage value of 100%, the changed current/voltage values of the signals outputted from the two first sub-light-receiving portions 74B and 74C (FIGS. 5 and 7) each are gained up to be set at the current/voltage value of substantially 120 to 160% or preferably substantially 138 to 142% with respect to the standardized current/voltage values of the usual signals outputted from the two first sub-light-receiving portions 200b and 200c.

If the current/voltage values of the signals as described above, the detection of the single first main beam and the detection of the two first sub-beams are performed with accuracy in a favorable manner in the operation unit 76B including the new setting-changed amplifier 78BV. With respect to the standardized current/voltage value of the usual signal outputted from the single first main-light-receiving portion 200a (FIG. 27) being set at 100%, the current/voltage value of the signal outputted from the single first main-light-receiving portion 74A (FIGS. 5 and 7), which has been changed or made equal, is set at the current/voltage value of substantially 95 to 100% or substantially 96 to 100%; while with respect to the standardized current/voltage values of the usual signals outputted from the two first sub-light-receiving portions 200b and 200c (FIG. 27) each being set at 100%, the changed current/voltage values of the signals outputted from the two first sub-light-receiving portions 74B and 74C (FIGS. 5 and 7) each are gained up to be set at the current/voltage value of substantially 120 to 160% or preferably substantially 138 to 142%, and thus, the detection of the single first main beam and the detection of the two first sub-beams are performed with accuracy in a favorable manner in the operation unit 76B including the new setting-changed amplifier 78BV.

Depending on the design/specification and the like of the optical pickup apparatus, the current/voltage value of the signal immediately after being outputted from the single first main-light-receiving portion (74A) may be changed in setting by an attenuator or the like, not shown, provided in the photodetector (73B), for example. Depending on the design/specification and the like of the optical pickup apparatus, the current/voltage value of the signal outputted from the single first main-light-receiving portion (74A) may be changed in setting by an attenuator or the like, not shown, provided in the operation unit (76B), for example. Depending on the design/specification and the like of the optical pickup apparatus, it is possible to use a photodetector with calculation portion (not shown), into which the operation unit (76B) including the amplifier (78BV) and the like and the photodetector (73B) are integrated by providing the photodetector (73B) with the operation unit (76B) including the amplifier (78BV) and the like, for example.

The current/voltage value of the signal outputted from the single second main-light-receiving portion 75A is set at a standardized current/voltage value of a usual signal outputted from the single second main-light-receiving portion 200a (FIG. 28). When the standardized current/voltage value of the usual signal outputted from the single second main-light-receiving portion 200a is defined as the current/voltage value of 100%, the current/voltage value of the signal outputted from the single second main-light-receiving portion 75A (FIGS. 5 and 7) is set at the current/voltage value of substantially 100% with respect to the standardized current/voltage value of the usual signal outputted from the single second main-light-receiving portion 200a.

The current/voltage values of the signals outputted from the two second sub-light-receiving portions 75B and 75C are set at the standardized current/voltage values of the usual signals outputted from the two second sub-light-receiving portions 200b and 200c (FIG. 28). When the standardized current/voltage values of the usual signals outputted from the two second sub-light-receiving portions 200b and 200c each are defined as the current/voltage value of 100%, the current/voltage values of the signals outputted from the two second sub-light-receiving portions 75B and 75C (FIGS. 5 and 7) each are set at the current/voltage value of substantially 100% with respect to the standardized current/voltage values of the usual signals outputted from the two second sub-light-receiving portions 200b and 200c.

If the current/voltage values of the signals are set as described above, the detection of the single second main beam and the detection of the two second sub-beams are performed with accuracy in the operation unit 76B. The current/voltage value of the signal outputted from the single second main-light-receiving portion 75A is set at the standardized current/voltage value of the usual signal outputted from the single second main-light-receiving portion 200a (FIG. 28); while the current/voltage values of the signals outputted from the two second sub-light-receiving portions 75B and 75C (FIGS. 5 and 7) are set at standardized the current/voltage values of the usual signals outputted from the two second sub-light-receiving portions 200b and 200c (FIG. 28), and thus, the detection of the single second main beam and the detection of the two second sub-beams are performed with accuracy in the operation unit 76B.

With respect to the standardized current/voltage value of the usual signal outputted from the single second main-light-receiving portion 200a (FIG. 28) being set at 100%, the current/voltage value of the signal outputted from the single second main-light-receiving portion 75A (FIGS. 5 and 7) is set at the current/voltage value of substantially 100%; and with respect to the standardized current/voltage values of the usual signals outputted from the two second sub-light-receiving portions 200b and 200c (FIG. 28) each being set at 100%, the current/voltage values of the signals outputted from the two second sub-light-receiving portions 75B and 75C (FIGS. 5 and 7) each are set at the current/voltage value of substantially 100%, and thus, the detection of the single second main beam and the detection of the two second sub-beams are performed with accuracy in the operation unit 76B.

It becomes possible to provide an optical disc device including a single optical pickup apparatus capable of easily performing control such as tracking control with accuracy. Reading of data from media D and writing of data in media D and the like are performed normally in the optical disc device including the optical pickup apparatus. When each of the media D is inserted into the optical disc device so that data in a plurality of types of media D with different track pitches Dtp is read or data is written in the plurality of types of media D with different track pitches Dtp, it can easily be avoided that the tracking error signal Se1 and the like are deteriorated with displacement of the objective lens 70, for example. Therefore, it becomes possible to provide an optical disc device including a single optical pickup apparatus capable of easily performing tracking control with accuracy.

If a single optical pickup apparatus capable of being adapted to the plurality of types of media D with different track pitches Dtp is incorporated in an optical disc device, the price of the optical disc device can be kept low. It is avoided that a plurality of optical pickup apparatuses are incorporated in the optical disc device conforming to the plurality of types of media D with different track pitches Dtp, with the price of the optical disc device being significantly increased.

The above optical pickup apparatus and the optical disc device including the above optical pickup apparatus are capable of being employed in a recording/reproducing device, which records data/information/signals and the like in the various types of optical disc D, or reproducing data/information/signals and the like of the various types of optical disc D. Specifically, the optical pickup apparatus and the optical disc device including the above optical pickup apparatus capable of being employed in a recording/reproducing/erasable device, which records data/information/signals and the like in the various types of optical disc D, reproducing data/information/signals and the like of the various types of optical disc D, or erasing data/information/signals and the like of the various types of optical disc D. The optical pickup apparatus and the optical disc device including the above optical pickup apparatus can also be employed in a reproducing only device that reproduces data/information/signals and the like of the various types of optical disc D.

The above optical pickup apparatus and the optical disc device including the above optical pickup apparatus are provided in an optical disc device to be mounted on a computer, a sound/image device, a game machine, an in-vehicle machine (none of them is shown) and the like, for example. The above optical pickup apparatus and the optical disc device including the above optical pickup apparatus is capable of being provided in computers such as a notebook PC, a laptop PC, a desktop PC, an in-vehicle computer and the like, game machines such as a computer game machine, sound and/or image devices such as a CD player/CD recorder, a DVD player/DVD recorder and the like (none of them is shown), for example. The above optical pickup apparatus is capable of being adapted to a plurality of discs such as a CD optical disc, a DVD optical disc, a "HD DVD" optical disc, a "CBHD" optical disc, a "Blu-ray Disc" optical disc and the like. The above optical pickup apparatus is capable of being adapted to a single optical disc with a signal surface portion having a plurality of layers. The above optical pickup apparatus is capable of being provided in computers conforming to various types of optical discs such as "CD", "DVD", "HD DVD", "CBHD", and "Blu-ray Disc" and the like, sound and/or image devices, game machines, in-vehicle machines and the like (none of them is shown), for example.

The above embodiments of the present invention are simply for facilitating the understanding of the present invention and are not in any way to be construed as limiting the present invention. The present invention may variously be changed or altered without departing from its spirit and encompass equivalents thereof.

For example, in place of the diffraction gratings 64A and 64B divided into two parts including the two region portions 21 and 22 shown in FIGS. 4 and 9, a diffraction grating (not shown) may be employed of a type divided into two parts including two region portions in another form. In place of the diffraction grating 64C divided into three parts including the three region portions 31, 32, and 33 shown in FIG. 12, for example, a diffraction grating (not shown) may be employed of a type divided into three parts including three region portions in another form. In place of the diffraction grating 64D divided into four parts including the four region portions 41, 42, 43, and 44 shown in FIG. 14, for example, a diffraction grating (not shown) may be employed of a type divided into four parts including four region portions in another form. As such, it is possible to employ the diffraction grating of a type divided into a plurality of parts including a various plurality of region portions.

The optical glass plate (50) (FIGS. 4 and 11) may be mounted on the diffraction grating (64C) divided into three parts including the three region portions (31, 32, 33) shown in FIG. 12, for example. The optical glass plate (50) (FIGS. 4 and 11) may be mounted on the diffraction grating (64D) divided into four parts including the four region portions (41, 42, 43, and 43) shown in FIG. 14, for example.

The first laser beam may be a red laser beam of the "DVD" standard having a wavelength of substantially 660 nm (first wavelength), and the second laser beam may be a blue-violet laser beam of the "HDDVD" standard, the "CBHD" standard or the "Blu-ray Disc" standard having a wavelength of substantially 405 nm (second wavelength) and the like. In this case, the diffraction gratings 64A, 64B, 64C, and 64D are formed only by diffraction grating members having a grating interval according to the wavelength of "HDDVD", "CBHD" or "Blu-ray Disc" standard and the like.

A laser unit (61) adapted to three wavelengths may be employed, which is capable of emitting an infrared laser beam of the "CD" standard having a wavelength of substantially 780 nm, a red laser beam of the "DVD" standard having a wavelength of substantially 660 nm, and a blue-violate laser beam, having a wavelength of substantially 405 nm, of the "HD DVD" standard, the "CBHD" standard or the "Blu-ray Disc" standard and the like, for example.

An optical pickup apparatus may be configured including a plurality of, i.e., two or more, objective lenses (70), for example. For example, an optical pickup apparatus may be configured including: the objective lens 70 with an NA (Numerical Aperture) of substantially 0.6 to 0.66 conforming to the first wavelength light having a wavelength of substantially 765 to 840 nm and the second wavelength light having a wavelength of substantially 630 to 685 nm; and an objective lens, not shown, with an NA of substantially 0.85 conforming to another wavelength light having a wavelength of substantially 340 to 450 nm.

With the above-described optical pickup apparatus being configured, it is possible to provide a less expensive and highly efficient optical pickup apparatus, which is adapted to first and second laser beams having two different types of wavelengths, and whose detection accuracy with respect to the error signal is improved with unnecessary diffraction light being suppressed, while the optical system being simplified.

INDUSTRIAL APPLICABILITY

Application is possible to an optical pickup apparatus capable of performing detection of a signal and the like with accuracy and an optical disc device including the same, for example. Further, application is possible to an optical pickup apparatus and an optical disc device including the same, which apparatus is capable of reproducing data, information, signals and the like recorded in various media such as various types of optical discs and the like, such as "CD", "DVD", "HD DVD", "CBHD", "Blu-ray Disc", recording data, information, signals and the like in various media such as various types of optical discs and the like which are writable or rewritable, erasing data, information, signals and the like recorded in various media including various types of optical discs and the like which are writable or rewritable.

EXPLANATION OF REFERENCE NUMERALS

20, 320, 340: diffraction grating portion (diffraction grating)
20a, 30a, 40a: diffraction surface portion (surface portion)
21, 22, 341, 342: half plane (region portion)
21w, 22w, 31w, 32w, 33w, 40w, 41w, 44w: width
26, 35, 37, 45, 46, 47: boundary line portion (boundary portion)
30m, 40m: center part
31, 41: first region portion (region portion)
32, 42: second region portion (region portion)
33, 43: third region portion (region portion)
42w, 43w: divided portion width (width)
44: fourth region portion (region portion)
48: one region portion
49: the other region portion
50, 360, 361, 362: optical glass plate (glass substrate)
50a: plane portion
61: laser unit (light emitting element)
61a: light emitting surface
62: first light source (light source)
63: second light source (light source)
64A, 64B, 64C, 64D: diffraction grating
65i: coupling lens
65ii: light receiving element
66, 230: polarization beam splitter
67, 240: collimator lens
68: quarter-wave plate
69: reflective mirror
70, 250: objective lens
70a: pupil plane portion
70b, 70c: diameter of beam (diameter)
71, 72: parallel plane (astigmatic element)
73A, 73B, 270: photodetector (photodetecting device)
73s: same light receiving surface portion (light receiving surface portion)
74, 75, 280, 290: light receiving region (region)
74A, 75A: main-light-receiving portion (light receiving portion)
74Aa, 74Ab, 74Ac, 74Ad, 74AL, 74AR, 74Ba, 74Bb, 74Bc, 74Bd, 74BL, 74BR, 74Ca, 74Cb, 74Cc, 74Cd, 74CL, 74CR, 75Aa, 75Ab, 75Ac, 75Ad, 75Ba, 75Bb, 75Bc, 75Bd, 75Ca, 75Cb, 75Cc, 75Cd: segment (light detection surface portion)
74Ax, 74Ay, 74Bx, 74By, 74Cx, 74Cy, 75Ax, 75Ay, 75Bx, 75By, 75Cx, 75Cy: dividing line
74B, 74C, 75B, 75C: sub-light-receiving portion (light receiving portion)
76A, 76B: operation unit
77A, 77B, 77C, 78A: differential amplifier (subtractor)
77D, 77E, 77F, 77G, 77H, 77I, 78C, 510: adder
77DL1, 77DR1, 77EL1, 77ER1, 77FL1, 77FR1, 77GL1, 77GR1, 77HL1, 77HR1, 77IL1, 77IR1: current/voltage conversion amplifier (amplifier)
77DL2, 77DR2, 77EL2, 77ER2, 77FL2, 77FR2, 77GL2, 77GR2, 77HL2, 77HR2, 77IL2, 77IR2: subsequent-stage amplifier (amplifier)
78B, 78BV: amplifier (amplifier)
79: objective lens driving unit (driving unit)
80, 100: main spot (spot)
81, 82, 101, 102: sub-spot (spot)
90i, 90ii, 200: main-detection-light spot (spot)
91i, 91ii, 92i, 92ii, 201, 202: sub-detection-light spot (spot)

200a, 200b, 200c: light receiving surface (light receiving portion)
210: semiconductor laser element
260: detection lens
300A, 300B: two-wavelength diffraction grating (diffraction grating)
302: first diffraction surface portion (diffraction surface portion)
304: second diffraction surface portion (diffraction surface portion)
400, 500a, 500b, 500c, 530: subtractor
D: optical disc (media)
D80, D100: track
D84: inner peripheral side
D88: outer peripheral side
Da: signal layer (signal surface portion)
DL0: first layer (layer)
DL1: second layer (layer)
Dtp: track pitch (cycle)
d: grating interval
L: normal distance
N: normal line
O, X: light emitting point
Oa, Xb, Xc, O(cd), X(cd), O(dvd), X(dvd): irradiation point S surface
S11: recess portion
S12: projecting portion
S21: recess surface
S22: projecting surface
Si: bottom face
Sii: outer face
Siii, Siv: side face
SA1, Sa1, SA2, Sa, SB1, Sb1, SB2, Sb, SC1, Sc1, SC2, Sc: push-pull signal
SD1, Sd1, SD2: added sub-push-pull signal (signal)
SE1, Set, SE2: tracking error signal (tracking error signal)
TAa1, TAab1, TAb1, TAc1, TAcd1, TAd1, TAL1, TAR1, TBa1, TBab1, TBb1, TBc1, TBcd1, TBd1, TBL1, TBR1, TCa1, TCab1, TCb1, TCc1, TCcd1, TCd1, TCL1, TCR1: photoelectric conversion signal (signal)
UAa1, UAb1, UAc1, UAd1, UBa1, UBb1, UBc1, UBd1, UCa1, UCb1, UCc1, UCd1: light reception output signal (signal)
Yp, Ys(cd), Ys(dvd), Yt(cd), Yt(dvd): interval (distance)
Yr: distance
θ: diffraction angle
δ: interval

What is claimed is:

1. An optical pickup apparatus comprising at least:
a diffraction grating configured to split first wavelength light into at least a first main beam and a first sub-beam, and to split second wavelength light into at least a second main beam and a second sub-beam, the diffraction grating including a diffraction surface portion corresponding to the second wavelength light;
a photodetector including a first main light-receiving portion configured to be irradiated with the first main beam, a first sub-light-receiving portion configured to be irradiated with the first sub-beam, a second main light-receiving portion configured to be irradiated with the second main beam, and a second sub-light-receiving portion configured to be irradiated with the second sub-beam,
a value of a signal outputted from the first main light-receiving portion being changed relative to or being equal to a value of a standardized signal outputted from the first main light-receiving portion,
a value of a signal outputted from the first sub-light-receiving portion is changed relative to a value of a standardized signal outputted from the first sub-light-receiving portion; and
an operation unit coupled to receive the signal outputted from the first main light-receiving portion and the signal outputted from the first sub-light-receiving portion, the operation unit configured to compensate for the difference between the value of the signal outputted from the first sub-light-receiving portion and the value of the standardized signal outputted from the first sub-light-receiving portion.

2. The optical pickup apparatus according to claim 1, wherein
when the value of the standardized signal outputted from the first main light-receiving portion is defined as a value of 100%, a changed or equivalent value of the signal outputted from the first main light-receiving portion is set at a lower value of substantially 100% or less of the value of the standardized signal outputted from the first main light-receiving portion; and wherein
when the value of the standardized signal outputted from the first sub-light-receiving portion is defined as a value of 100%, a changed value of the signal outputted from the first sub-light-receiving portion is set at a higher value of substantially 100% or greater of the value of the standardized signal outputted from the first sub-light-receiving portion.

3. The optical pickup apparatus according to claim 1, wherein
when the value of the standardized signal outputted from the first main light-receiving portion is defined as a value of 100%, a changed or equal value of the signal outputted from the first main light-receiving portion is set at a value of substantially 95 to 100% of the value of the standardized signal outputted from the first main light-receiving portion; and wherein
when the value of the standardized signal outputted from the first sub-light-receiving portion is defined as a value of 100%, a changed value of the signal outputted from the first sub-light-receiving portion is set at a value of substantially 120 to 160% of the value of the standardized signal outputted from the first sub-light-receiving portion.

4. The optical pickup apparatus according to claim 1, wherein
when a value of a standardized signal outputted from the second main light-receiving portion is defined as a value of 100%, a value of a signal outputted from the second main light-receiving portion is set at a value of substantially 100% of the value of the standardized signal outputted from the second main light-receiving portion; and wherein
when a value of a standardized signal outputted from the second sub-light-receiving portion is defined as a value of 100%, a value of the signal outputted from the second sub-light-receiving portion is set a value of substantially 100% of the value of the standardized signal outputted from the second sub-light-receiving portion.

5. The optical pickup apparatus according to claim 1, wherein
a diffraction surface portion of the diffraction grating acts both as
a diffraction surface portion configured to split the first wavelength light into at least the first main beam and the first sub-beam, and a diffraction surface portion configured to split the second wavelength light into at least the second main beam and the second sub-beam.

6. The optical pickup apparatus according to claim 1, wherein
the diffraction grating is divided into a plurality of region portions.

7. The optical pickup apparatus according to claim 6, wherein
the diffraction grating is divided into an even number of region portions.

8. The optical pickup apparatus according to claim 6, wherein
the diffraction grating is divided into at least four region portions including a first region portion, a second region portion, a third region portion, and a fourth region portion.

9. The optical pickup apparatus according to claim 1, further comprising:
a light emitting element capable of emitting the first wavelength light and the second wavelength light.

10. The optical pickup apparatus according to claim 1, wherein
the first wavelength light has a wavelength of substantially 765 to 840 nm, and
the second wavelength light has a wavelength of substantially 630 to 685 nm.

11. The optical pickup apparatus according to claim 1, wherein
the first wavelength light has a wavelength of substantially 630 to 685 nm, and
the second wavelength light has a wavelength of substantially 340 to 450 nm.

12. The optical pickup apparatus according to claim 1, wherein
the optical pickup apparatus is capable of supporting a media having a plurality of signal surface portions.

13. An optical disc device comprising at least:
the optical pickup apparatus according to claim 1.

* * * * *

UNITED STATES PATENT AND TRADEMARK OFFICE
CERTIFICATE OF CORRECTION

PATENT NO. : 8,750,083 B2
APPLICATION NO. : 13/095624
DATED : June 10, 2014
INVENTOR(S) : Sato et al.

It is certified that error appears in the above-identified patent and that said Letters Patent is hereby corrected as shown below:

In the specification

Column 8, line 59: replace --alight-- with "a light".

Column 12, line 61: replace --alight-- with "a light".

Column 44, line 65: replace --apart-- with "a part".

Column 45, line 1: replace --apart-- with "a part".

Column 45, line 7: replace --apart-- with "a part".

Column 45, line 11: replace --apart-- with "a part".

Signed and Sealed this
Sixth Day of January, 2015

Michelle K. Lee
*Deputy Director of the United States Patent and Trademark Office*